(12) United States Patent
Hennesy et al.

(10) Patent No.: US 11,967,730 B2
(45) Date of Patent: Apr. 23, 2024

(54) POWER TOOL HAVING A MULTI-LATCH BATTERY INTERFACE

(71) Applicant: BLACK & DECKER INC., New Britain, CT (US)

(72) Inventors: Timothy J. Hennesy, Baltimore, MD (US); Michael Varipatis, Fallston, MD (US)

(73) Assignee: BLACK & DECKER INC., New Britain, CT (US)

( * ) Notice: Subject to any disclaimer, the term of this patent is extended or adjusted under 35 U.S.C. 154(b) by 41 days.

(21) Appl. No.: 17/398,823

(22) Filed: Aug. 10, 2021

(65) Prior Publication Data

US 2022/0045399 A1    Feb. 10, 2022

Related U.S. Application Data

(60) Provisional application No. 63/063,520, filed on Aug. 10, 2020.

(51) Int. Cl.
| | |
|---|---|
| *H01M 50/264* | (2021.01) |
| *B25F 5/02* | (2006.01) |
| *H01M 50/244* | (2021.01) |
| *H02J 7/00* | (2006.01) |

(52) U.S. Cl.
CPC ............. *H01M 50/264* (2021.01); *B25F 5/02* (2013.01); *H01M 50/244* (2021.01); *H02J 7/0013* (2013.01); *H02J 7/0045* (2013.01); *H01M 2220/30* (2013.01); *H02J 2310/22* (2020.01)

(58) Field of Classification Search
CPC ............. H01M 50/264; H01M 50/244; H01M 50/267; H01M 50/247; H01M 10/6235
See application file for complete search history.

(56) References Cited

U.S. PATENT DOCUMENTS

| | | | |
|---|---|---|---|
| 7,701,172 B2* | 4/2010 | Watson | B23B 45/02 320/113 |
| 8,653,786 B2* | 2/2014 | Baetica | H01M 50/262 56/11.9 |
| 2006/0108981 A1* | 5/2006 | Watson | H02J 7/0045 320/114 |

\* cited by examiner

*Primary Examiner* — Christopher P Domone
*Assistant Examiner* — Jonathan William Estes
(74) *Attorney, Agent, or Firm* — Michael Aronoff

(57) ABSTRACT

This application relates to a cordless power tool system including a set of cordless power tools, a set of rechargeable and removable battery packs, and a set of battery pack chargers.

5 Claims, 162 Drawing Sheets

POWER TOOL HAVING A MULTI-LATCH BATTERY INTERFACE

RELATED APPLICATIONS

This application claims priority under 35 U.S.C. § 119(e) to U.S. Provisional Patent Application No. 63/063,520, filed Aug. 10, 2020, titled "Power Tool Having a Multi-Latch Battery Interface."

TECHNICAL FIELD

This application relates to a cordless power tool system including a set of cordless power tools, a set of rechargeable and removable battery packs, and a set of battery pack chargers.

BACKGROUND

Electric tools include an electric motor and require a source of electricity to power the motor. Electric tools may be broken down into two groups: (1) corded electric tools that source electricity through a cord plugged into a source of alternating current and (2) cordless electric tools that source electricity from a battery. Cordless electric tools may be broken down into two groups: (1) tools that use an internal, integrated battery and (2) tools that use a removable battery pack.

The cordless electric tools that use a removable battery pack and the removable battery pack that provides electricity (energy/power) to a cordless electric tool requires a combination interface between the tool and the pack. The tool includes a tool interface portion/aspect/element of the combination interface and the pack includes a pack interface portion/aspect/element of the combination interface. The combination interface allows the tool and the pack to couple/mate and decouple/unmate with each other such that when the tool and the pack are coupled/mated the pack will provide power to the tool and will stay affixed to the tool during operation of the combination.

The combination interface is configured and defined such that only tools and packs that are intended to work with each will be able to fully couple/mate. Particularly, different tool and pack manufacturers configure and define the combination interface between their tools and packs such that a tool of one manufacturer will not fully couple/mate with a battery pack of another manufacture. In some configurations, the combination interface may include one or more guide rails that allow insertion of the battery pack along a receiving axis (direction) until electrical contact is made between a battery pack terminal block holding a plurality of battery pack terminals and a power tool terminal block holding a plurality of power tool terminals.

A latching mechanism is typically provided to lock the removable battery pack to the tool. The latching mechanism may include male/female components provided as part of the battery pack interface, the tool interface, or a combination of the two. In some configurations, the latching mechanism is provided in the form of an actuatable stop that locks the battery pack relative to the tool along the insertion axis.

A battery pack typically includes a series of battery cells connected in a series, parallel, or series/parallel configuration. The battery cells may be electrically connected in series to increase the voltage rating of the battery pack, in parallel to increase the current and/or charge capacity of the battery pack, or a combination of series and parallel configuration. For example, a battery pack marketed as a 20V Max battery pack in the power tool industry with a nominal voltage of approximately 18V may include a single string of five battery cells (5S1P), or multiple such strings of five battery cells connected in parallel (5SxP, where x>1). The battery pack current capacity, and consequently its runtime, may be increased by increasing the number of parallel strings of battery cells. In this example, the parallel connections are made at the ends of the strings, though it should be understood that parallel connections may also be made between corresponding nodes of different strings of battery cells. In an example embodiment, the battery pack may be a convertible battery pack where the strings of cells may be switchably configured in series or parallel depending on the voltage requirement of the power tool it is intended to supply energy to. U.S. Pat. No. 9,406,915, which is incorporated herein by reference in its entirety, describes examples of such a convertible battery pack.

A power tool may be configured to receive battery packs of different voltage or capacity ratings. For example, a high-power tool such as a concrete breaker or a rotary hammer may be configured to receive one or more conventional 60V Max 4 Ah battery packs, or one or more higher voltage (e.g., 120V) battery packs to increase the output speed and/or power output of the tool, or one or more high capacity (e.g., 6 A.h.) battery packs to increase the battery pack runtime and/or power output. The higher voltage and/or higher capacity battery packs in this example may be generally different in size or shape than conventional battery packs. What is needed is a mechanism that provides effective structural support and ease of operation for battery packs of different sizes or shapes on the power tool.

SUMMARY

According to an example embodiment, a power tool is provided including a housing; and a battery receptacle formed in the housing or coupled to the housing, the battery receptacle capable of receiving a first battery pack having a first latching location or a second battery pack having a second latching location. In an embodiment, the battery receptacle includes a multi-latch mechanism configured to engage the latching location of first battery pack when receiving the first battery pack and engage the latching location of the second battery pack when receiving the second battery pack.

In an embodiment, the battery receptacle comprises a power terminal block and at least one guide rail for guiding the first battery pack or the second battery pack along a receiving axis so as to make an electrical connection with the power terminal block.

In an embodiment, the first latching location is closer to the power terminal block than is the second latching location.

In an embodiment, the multi-latch mechanism includes a first latch hook pivotable around a first pivot member and a second latch hook pivotable around a second pivot member.

In an embodiment, the first battery pack comprises a pocket at the first latching location.

In an embodiment, the second battery pack comprises a translating latch at the second latching location moveable via an actuator in a direction perpendicular to a receiving axis of the second battery pack.

In an embodiment, the first and second battery packs are received along the same receiving axes.

According to an embodiment, a power tool is provided including a housing and a battery receptacle formed in the housing or coupled to the housing. In an embodiment, the battery receptacle includes a multi-latch mechanism comprising a first latch interface for engaging a first battery pack when the first battery pack is received in the battery receptacle and a second latch interface disposed at a distance from the first latch interface for engaging a second battery pack when the second battery pack is received in the battery receptacle.

In an embodiment, the first latch interface comprises a first arm pivotable around a first pivot member and having a first latch hook for engaging the first battery pack, and the second latch interface comprises a second arm pivotable around a second pivot member and having a second latch hook for engaging the second battery pack.

In an embodiment, the multi-latch mechanism further comprises an actuator configured to move both the first latch interface and the second latch interface from a latched position to a released position.

In an embodiment, the second latch interface is integrally formed with the actuator.

In an embodiment, a first end of the first arm is coupled to the first pivot member and a second end of the first arm is coupled to the actuator.

In an embodiment, the second end of the first arm is unfixedly coupled to the actuator.

In an embodiment, the first latch interface is coupled to a first actuator and the second latch interface is coupled to a second actuator independent from the first actuator.

In an embodiment, the first latch interface includes a first lateral recess arranged to engage a first translating latch of the first battery pack and the second latch interface includes a second lateral recess distanced from the first lateral recess arranged to engage a second translating latch of the second battery pack.

In an embodiment, the first latch interface includes a pivoting arm for pivoting engagement with the first battery pack and the second latch interface includes a lateral recess for engagement with a translating latch of the second battery pack.

In an embodiment, the first latch interface includes a first pivoting latch hook and the second latch hook includes a second pivoting latch hook. In an embodiment, the multi-latch mechanism further includes a sliding actuator configured to move along an axis parallel to a receiving axis of the first and second battery packs.

In an embodiment, the sliding actuator includes a slot that engages the first latch interface and an end that engages the second latch interface.

In an embodiment, the slot is sized to allow relative movement of the second latch interface relative to the sliding actuator.

In an embodiment, the first latch interface includes a first pivoting latch hook and the second latch hook includes a second pivoting latch hook. In an embodiment, the multi-latch mechanism further includes a push actuator configured to move along an axis perpendicular to a receiving axis of the first and second battery packs.

In an embodiment, the sliding actuator includes a slot that engages the first latch interface and an end that engages the second latch interface.

In an embodiment, the slot is sized to allow relative movement of the second latch interface relative to the sliding actuator.

In an embodiment, the first latch interface includes a pair of pivoting arms arranged to engage side grooves of the first battery pack.

In an embodiment, the first latch interface includes a pair of sliding side plates arranged to engage side grooves of the first battery pack.

BRIEF DESCRIPTION OF THE DRAWINGS

The drawings described herein are for illustration purposes only and are not intended to limit the scope of this disclosure in any way.

DETAILED DESCRIPTION

Figure 1:
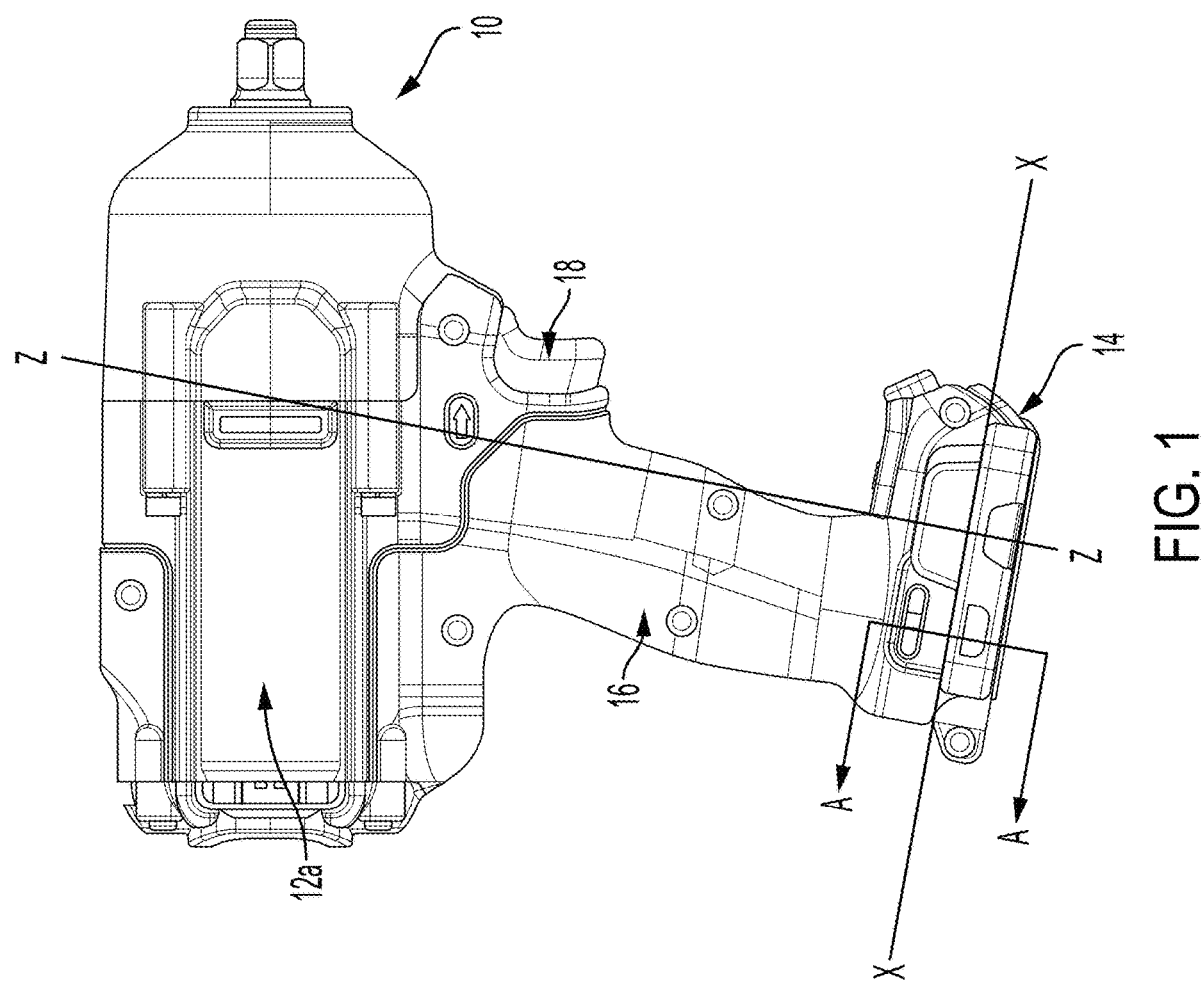
FIG. 1 illustrates a side, elevation view of an example embodiment of a power tool including a single latching interface.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Embodiments of the invention described herein are discussed with reference to a long battery pack and a short battery pack by way of example to illustrate two different types of battery packs having different latching locations. It should be understood, however, that size of the battery pack is not the only determining factor, and that in some configurations, battery packs with substantially the same size may be designed to include different latching locations. For the purpose of this disclosure, a "long battery pack" designates a battery pack having a latching location (or catching location, as the case may be) at a first distance from a battery vertical datum plane (or vertical datum plane) and a "short battery pack" designates a battery pack having a latching location (or a catching location, as the case may be) at a second distance from the battery vertical datum plane, wherein the first distance is greater than the second distance. The vertical datum plane is generally perpendicular to the receiving axis. The vertical datum plane serves to define relative positions and orientations of various elements of the battery pack and the combination interface.

Figure 2:
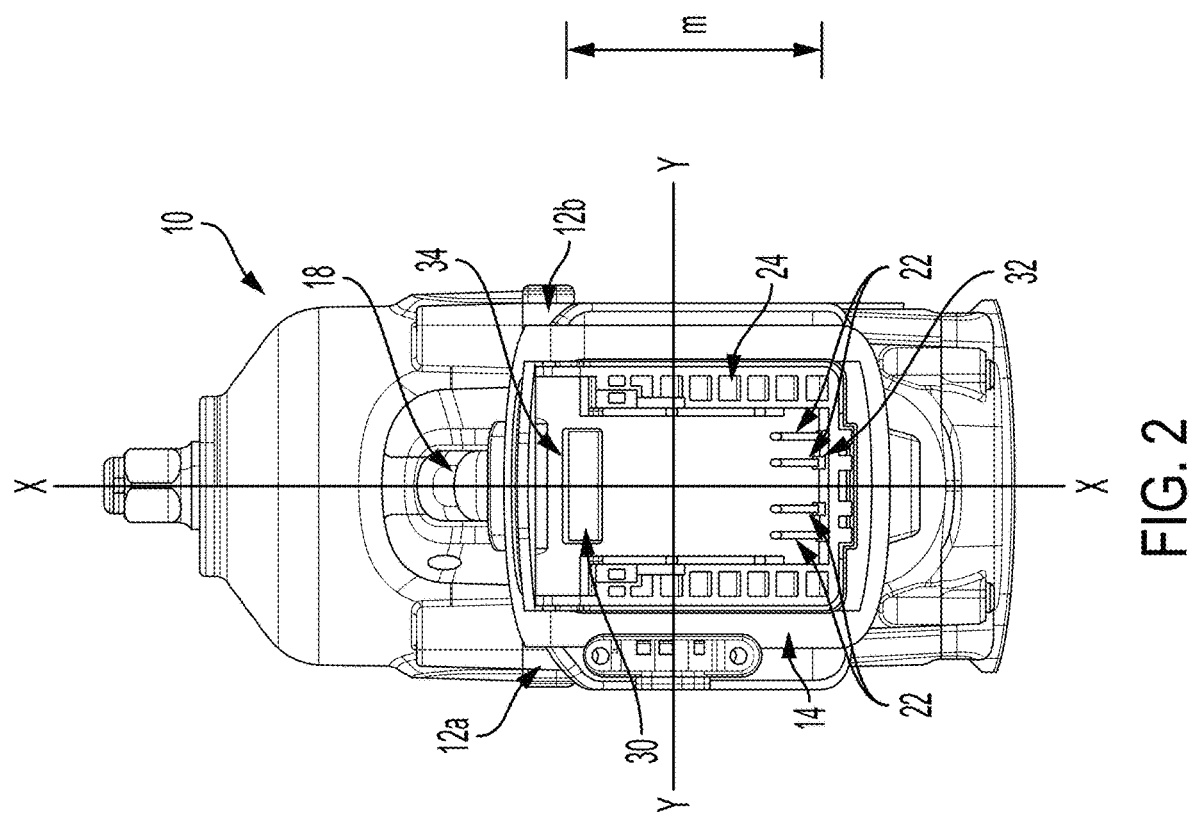
FIG. 2 illustrates a bottom, plan view of the example power tool of FIG. 1.
Figure 3:
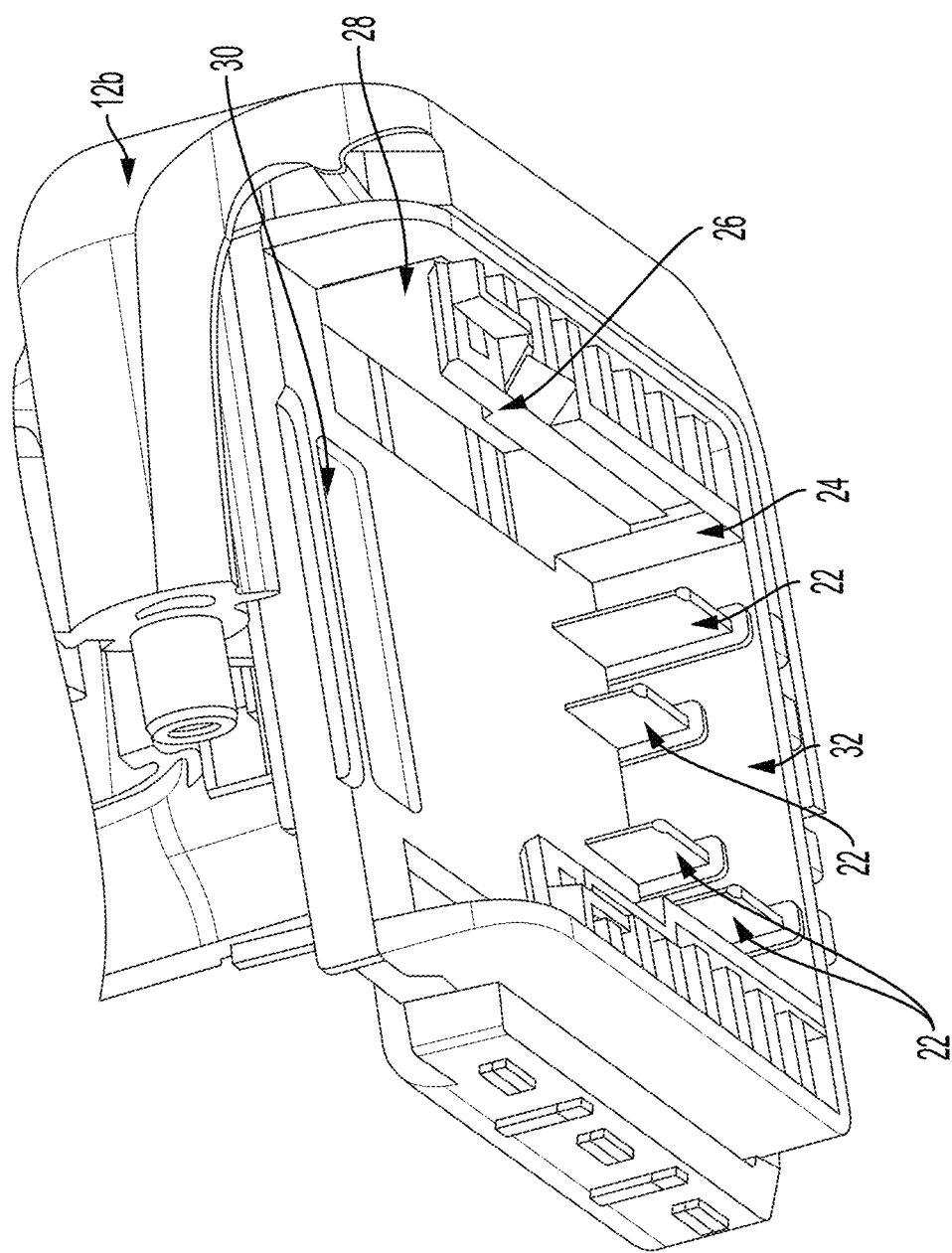
FIG. 3 illustrates a bottom, isometric view of the power tool of FIG. 1.
Figure 4:
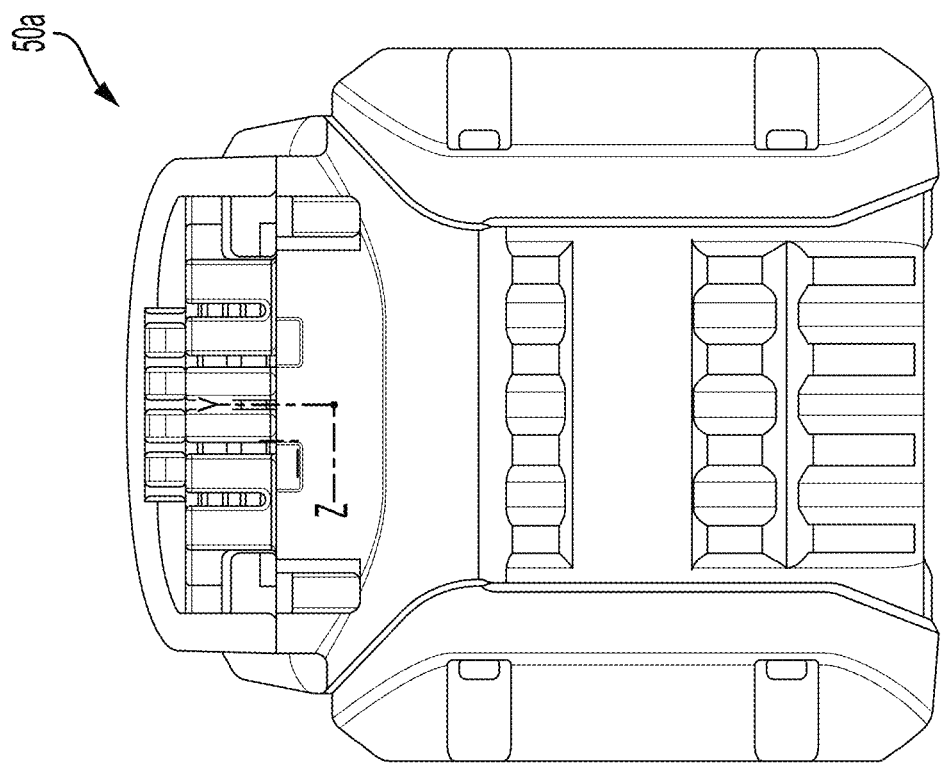
FIG. 4 illustrates a rear, elevation view of a first example embodiment of a battery pack.
Figure 5:
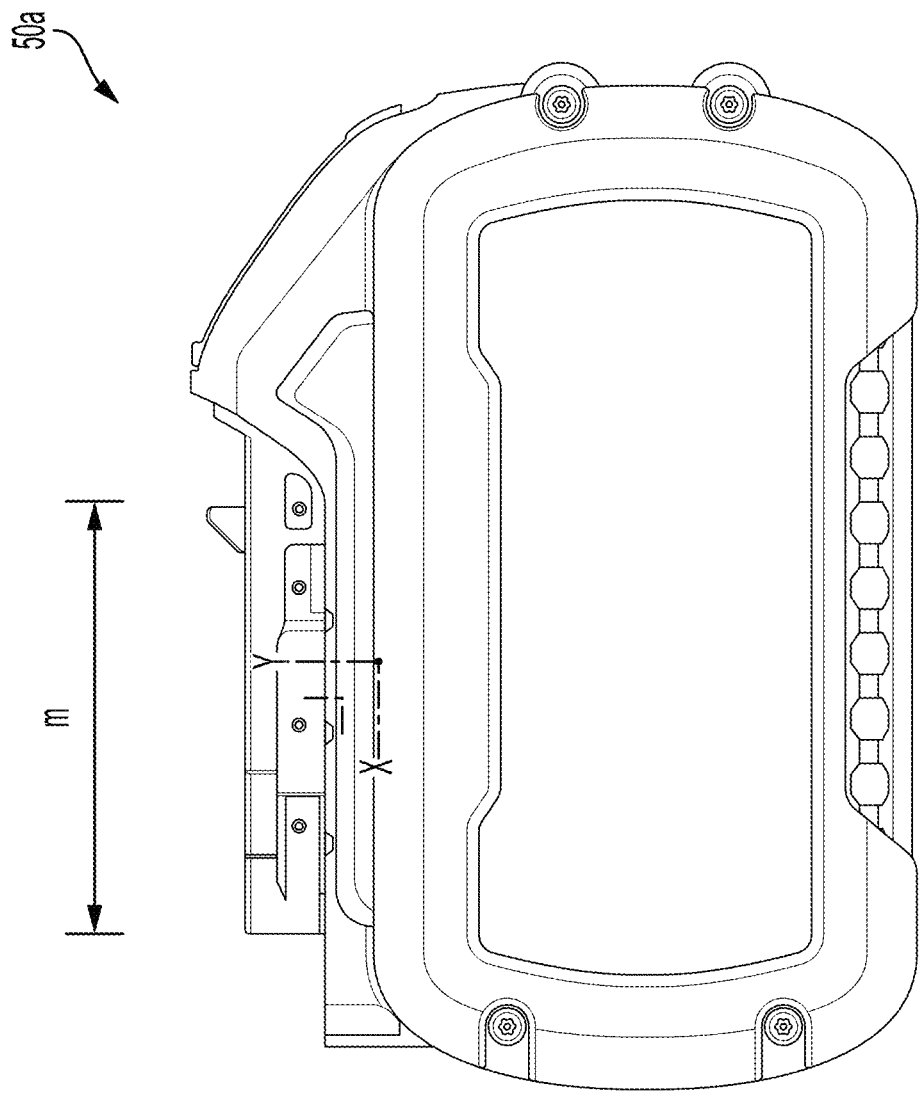
FIG. 5 illustrates a left side, elevation view of the battery pack of FIG. 4.
Figure 6:
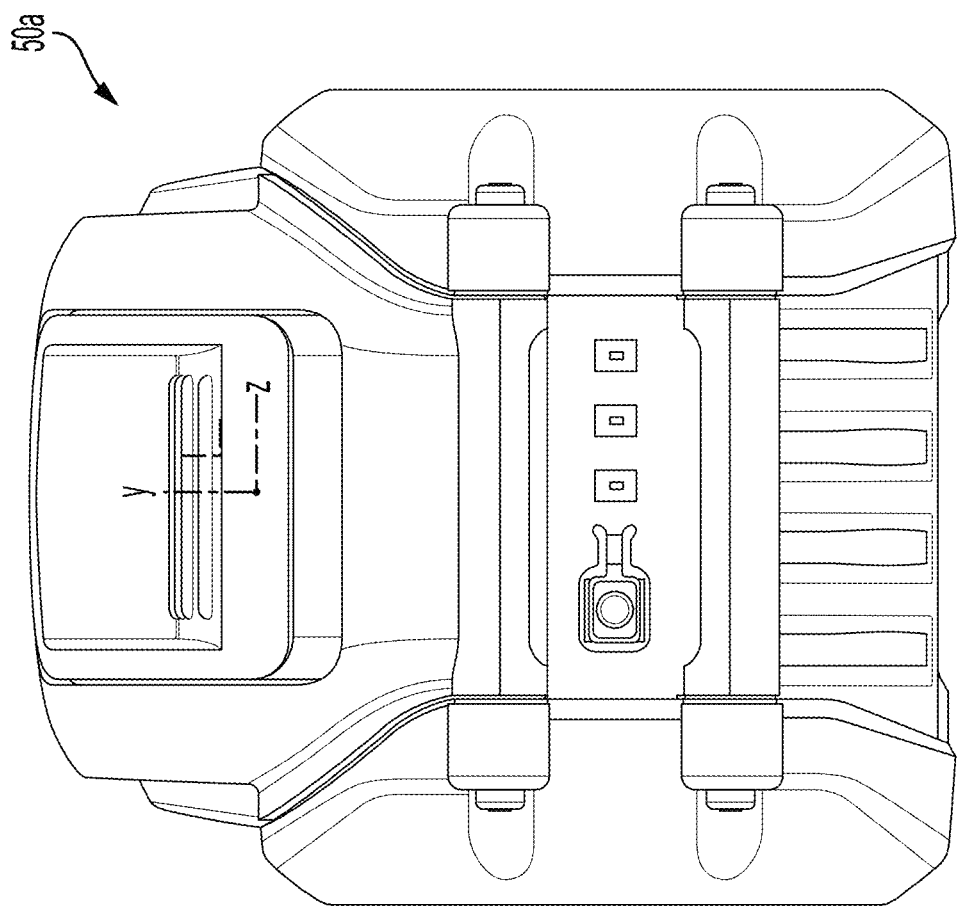
FIG. 6 illustrates a front, elevation view of the battery pack of FIG. 4.
Figure 7:
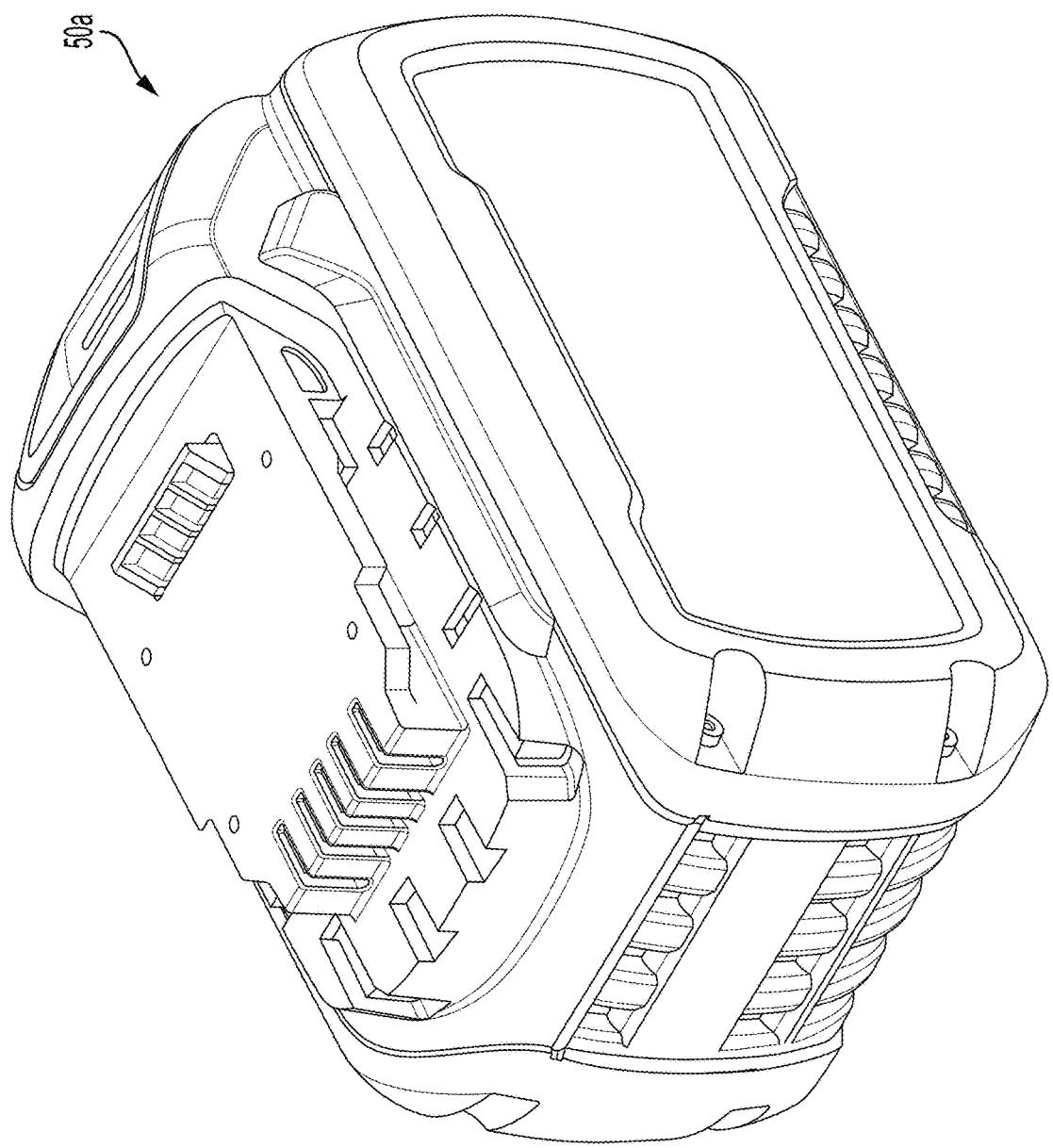
FIG. 7 is an isometric view of the battery pack of FIG. 4.

FIGS. 1-3 illustrate an example embodiment of a first electric power tool 10. The power tool 10 includes a tool housing 12. The tool housing 12 includes left side portion 12a and a right side portion 12b. The left side portion 12a and the right side portion 12b combine to provide the tool housing 12 and form a battery pack receptacle 14. The power tool housing 12 also includes a handle 16 for holding the power tool 10 and trigger 18. The power tool 10 also includes an electric motor (not shown) coupled to a tool terminal block 20. The tool terminal block 20 holds a set of tool terminals 22. The tool terminals 22 are configured to mate with a corresponding set of battery pack terminals, described in more detail below. The trigger 18 allows a user to supply power from an attached battery pack to the motor.

The battery pack receptacle 14 includes a tool interface portion 24 (sometimes referred to as a battery pack interface) of a combination interface between the power tool and the battery pack. The tool interface 24 may also include a set of rails 26 and a corresponding set of grooves 28 formed by the rails 26. The tool interface may also include a catch 30 for receiving a corresponding latch of a battery pack, described in more detail below. The tool 10 includes a tool vertical datum plane 32 that serves a basis to define relative positions and orientations of various elements of the power tool 10, in general, and of the combination interface, relative to a vertical plane.

In the example embodiment, a battery pack couples to and uncouples from the power tool 10 along the X axis. In the example embodiment, the catch 30 includes a catch wall 34 that is generally perpendicular to the tool vertical datum plane 32. The catch wall 34 is configures to abut a battery pack latch, particularly a latch face or latch wall, when the battery pack is fully coupled to the power tool 10. In the example embodiment, there is a distance "m" between the vertical datum plane 32 and the catch wall 34. The distance "m" extends along the X axis.

FIGS. 4-7 illustrate an example embodiment of a first battery pack 50a. For purposes of this disclosure, the battery pack 50a is designated as a "short" battery pack, as will be explained below. The battery pack 50a includes a main housing 52 that houses a plurality of battery cells (not shown), and one or more guide rails 54 that form elongate grooves 56 along the sides. The battery pack also includes a set of slots 58 formed in a battery vertical datum plane 60. The battery vertical datum plane 60 serves a basis to define relative positions and orientations of various elements of the battery pack 50, in general, and of the combination interface, relative to a vertical plane. The plurality of slots provide access to a plurality of battery pack terminals (not shown). The battery pack terminals are housed in a battery pack terminal block (not shown). As the battery pack 50a is slid into the battery receptacle 14 along the receiving axis X, the guide rails 24 are received within the elongate grooves 58 of the battery pack 50a, and the battery pack 50a is guided along the receiving axis X until the battery pack terminals mate with the power tool terminals 22 of the battery receptacle 14.

The battery pack 50 further includes a male moving hook member (herein also referred to as a translating latch or simply a latch) 62 disposed on top of battery pack housing 52 between the guide rails 56. The translating latch 62 is spring-loaded and is coupled to an actuator 64 disposed on the battery pack housing 52. The latch 62 includes a latch face or wall 64 that is generally perpendicular to the battery vertical datum plane 60. The actuator 64, when pressed, causes translating latch 62 to move downwardly in a direction generally perpendicular to the receiving axis X.

In the example embodiment, there is a distance "m" between the battery vertical datum plane 60 and the catch wall 34. The distance "m" extends along the X axis.

The battery pack 50 is adapted to mate with the power tool 10. As noted above, the power tool 10 includes a female catch member (e.g., a pocket or recess) 30 located to engage the male hook member (e.g., translating latch 62) to hold the battery pack 50 in place within a battery receptacle of the power tool. The catch member of the power tool must be positioned at a specific location designed to correspond to the location of the translating latch 60 of the battery pack 50. This location is at a distance "m" from the tool vertical datum plane. Engagement of the translating latch 62 with the catch member of the power tool axially blocks and locks the battery pack 50 into the battery receptacle of the power tool. It is noted that while in this example the battery pack 50 is provided with a male hook member, it may be alternatively provided with a female catch (e.g., a pocket or a recess) that engages a male hook member (e.g., an actuatable translating hook) provided on the battery receptacle of the power tool. The male hook member on either the battery pack or the battery receptacle may be a moveable component or a stationary component. Similarly, the female catch member on either the battery pack or the battery receptacle may be a movable component or a stationary component. For example, the female catch may be provided as a moveable pocket within the battery receptacle that interfaces with a fixed male hook on the battery pack. Alternatively, both the battery receptacle and the battery pack may include moveable components that cooperate together to latch and/or release the battery pack.

Figure 8:
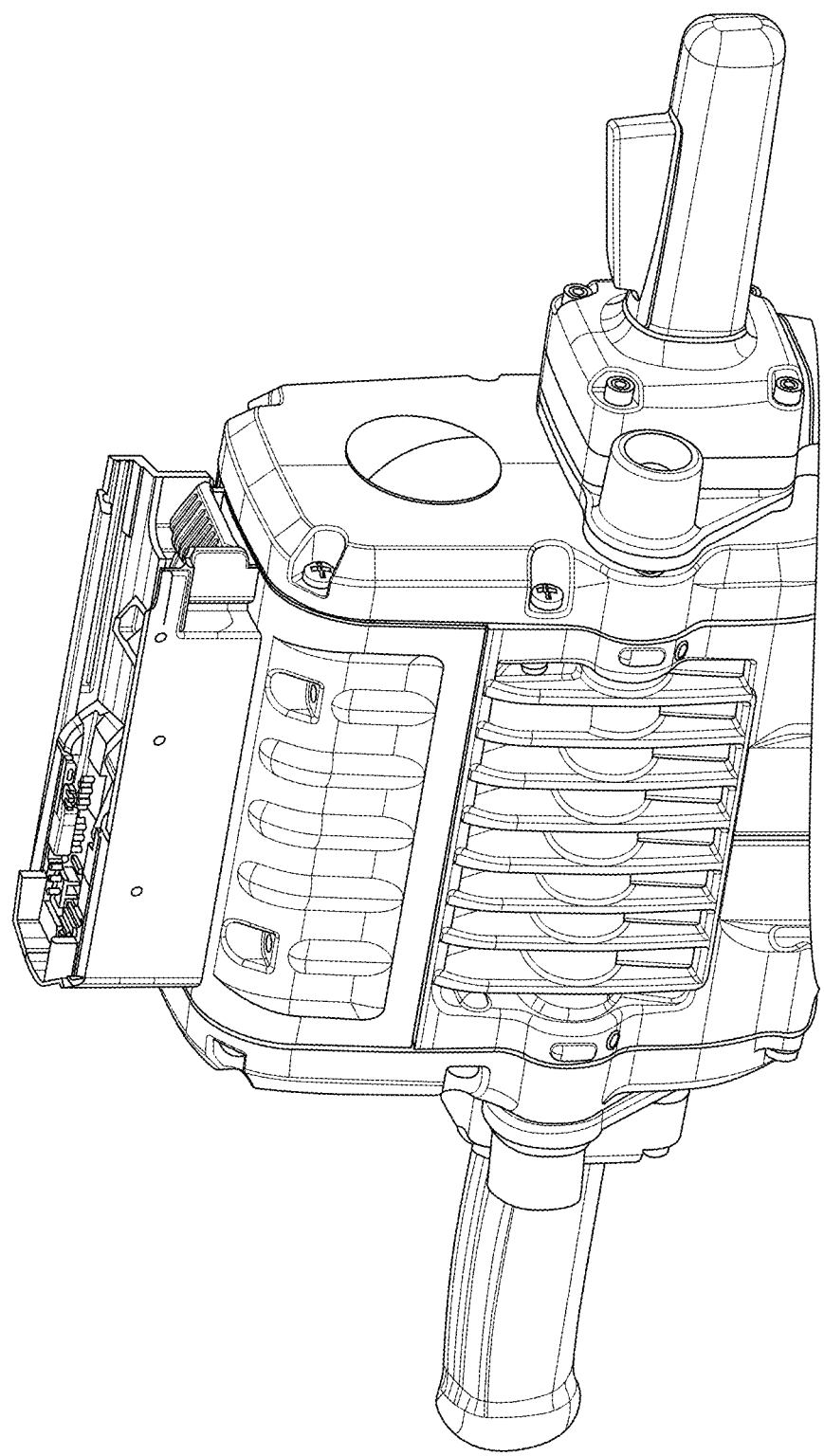
FIG. 8 illustrates a partial isometric view of an example embodiment of an electric power tool having an example embodiment of a multi-latch mechanism.
Figure 9:
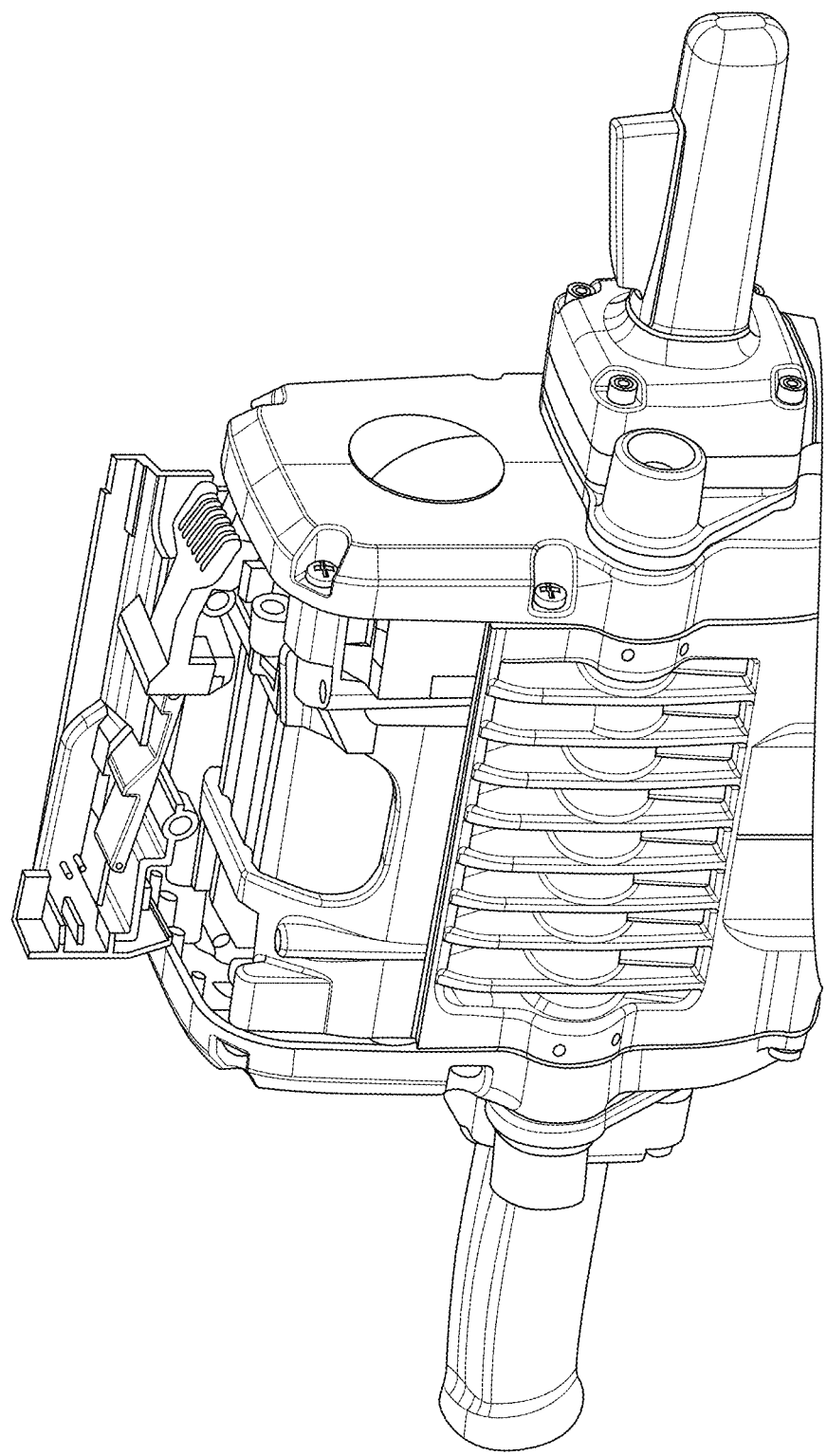
FIG. 9 illustrates a partial isometric view of the example electric power tool with half of a housing removed.
Figure 10:
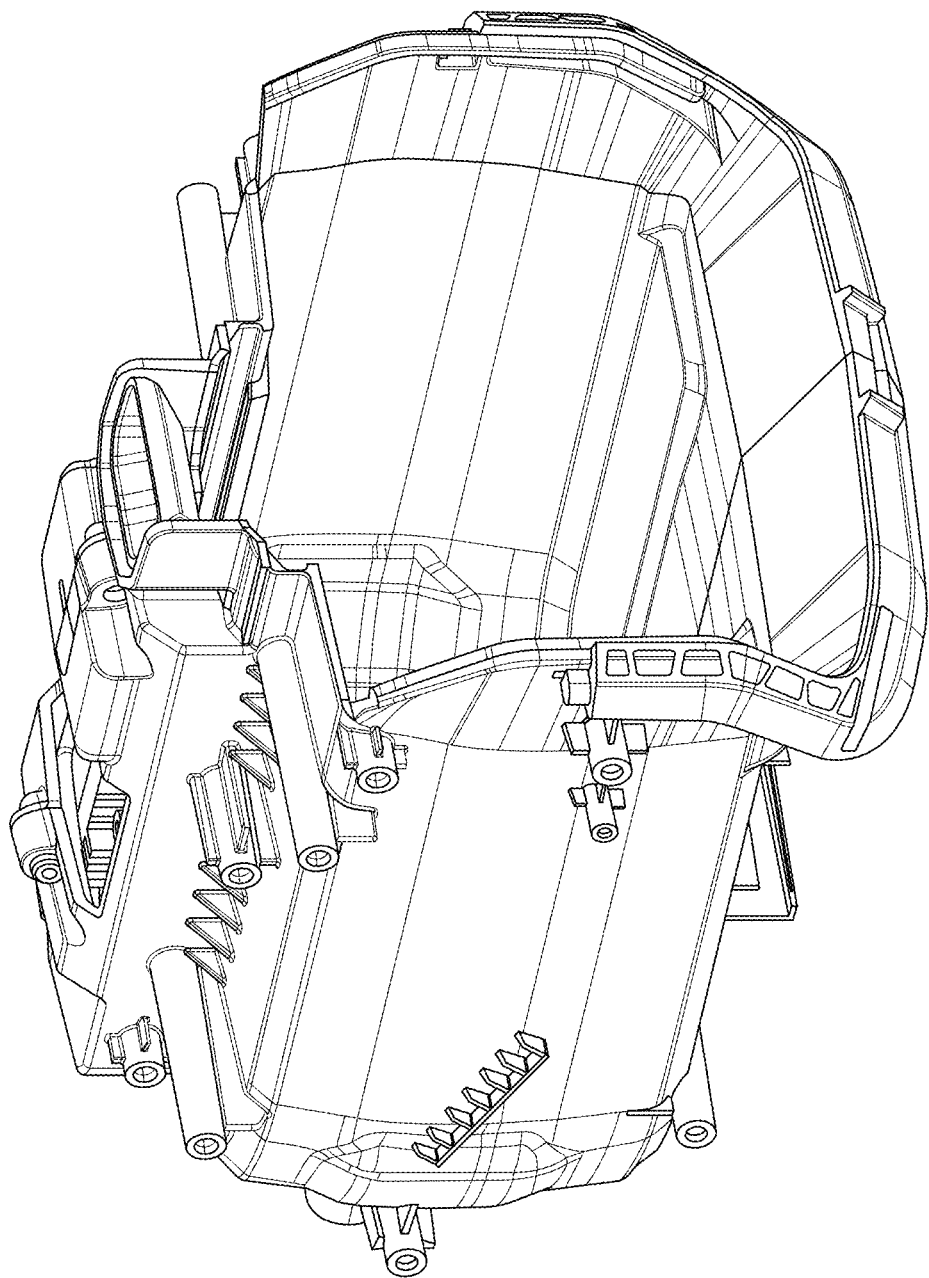
FIG. 10 illustrates an isometric view of an example embodiment of a power tool battery receptacle including the multi-latch mechanism of FIG. 8.
Figure 11:
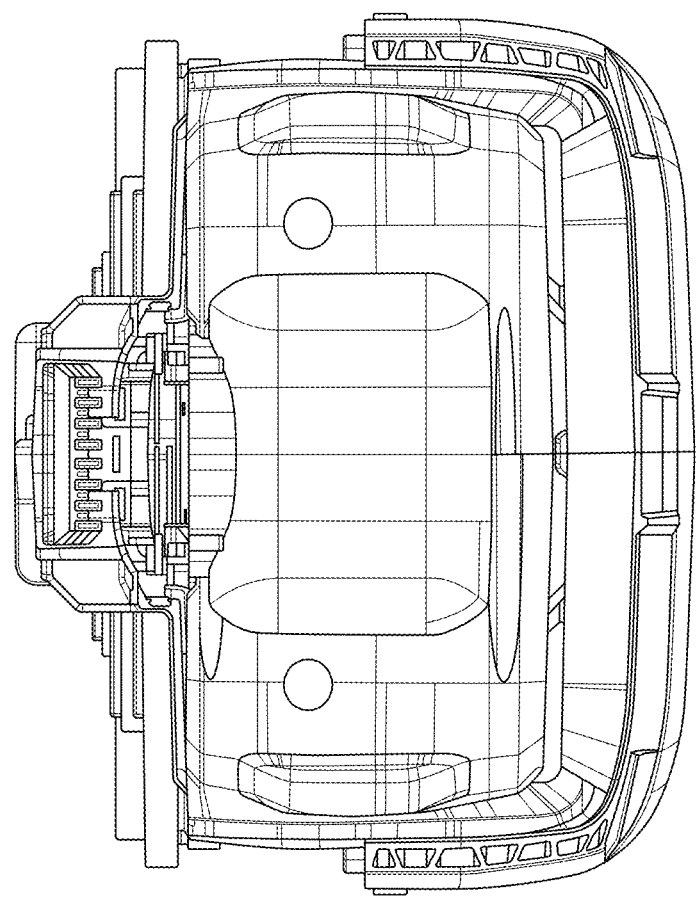
FIG. 11 illustrates a front, elevation view of the example receptacle and multi-latch mechanism of FIG. 10.
Figure 12:
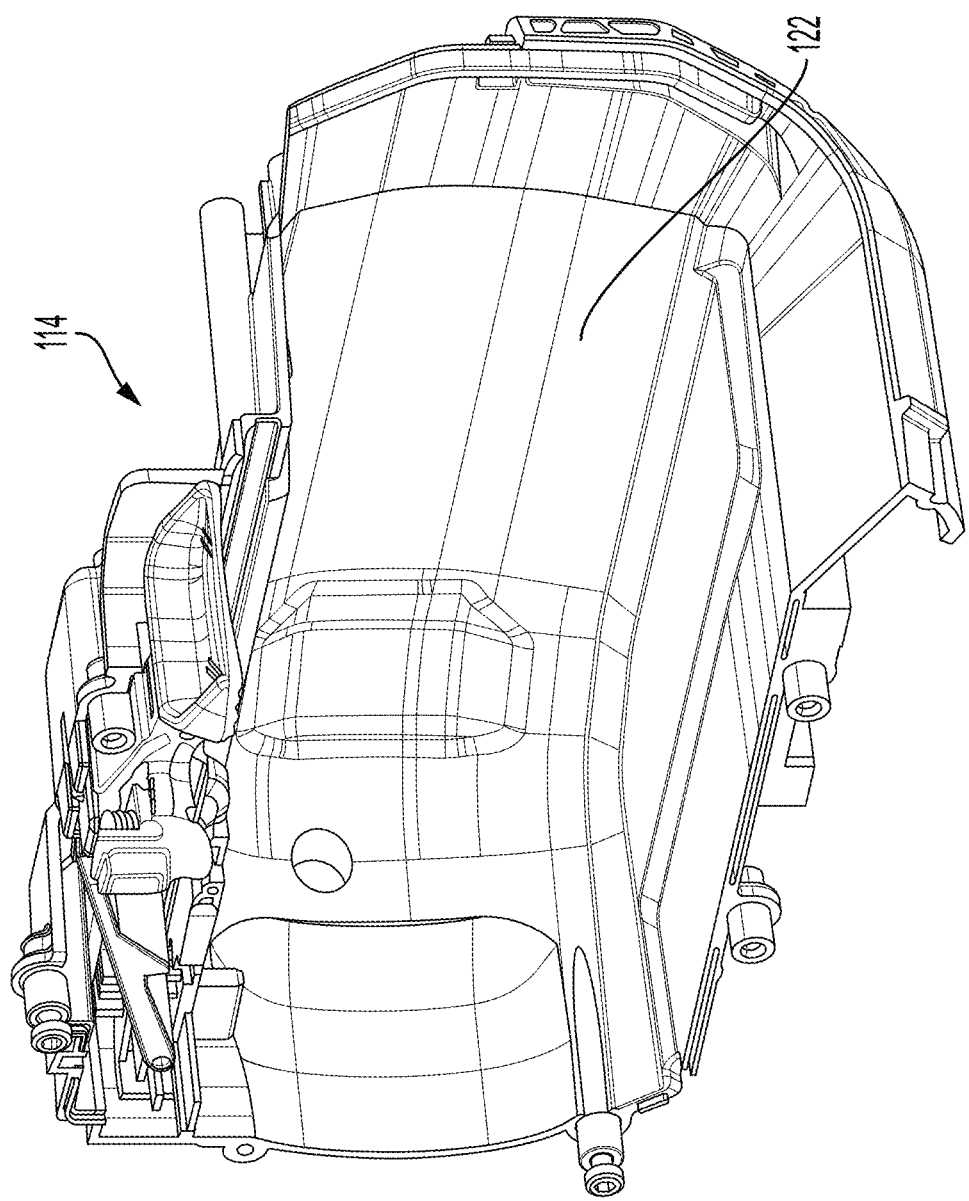
FIG. 12 illustrates a front, isometric view of the example receptacle and multi-latch mechanism of FIG. 10, wherein half of the receptacle housing is removed.
Figure 13:
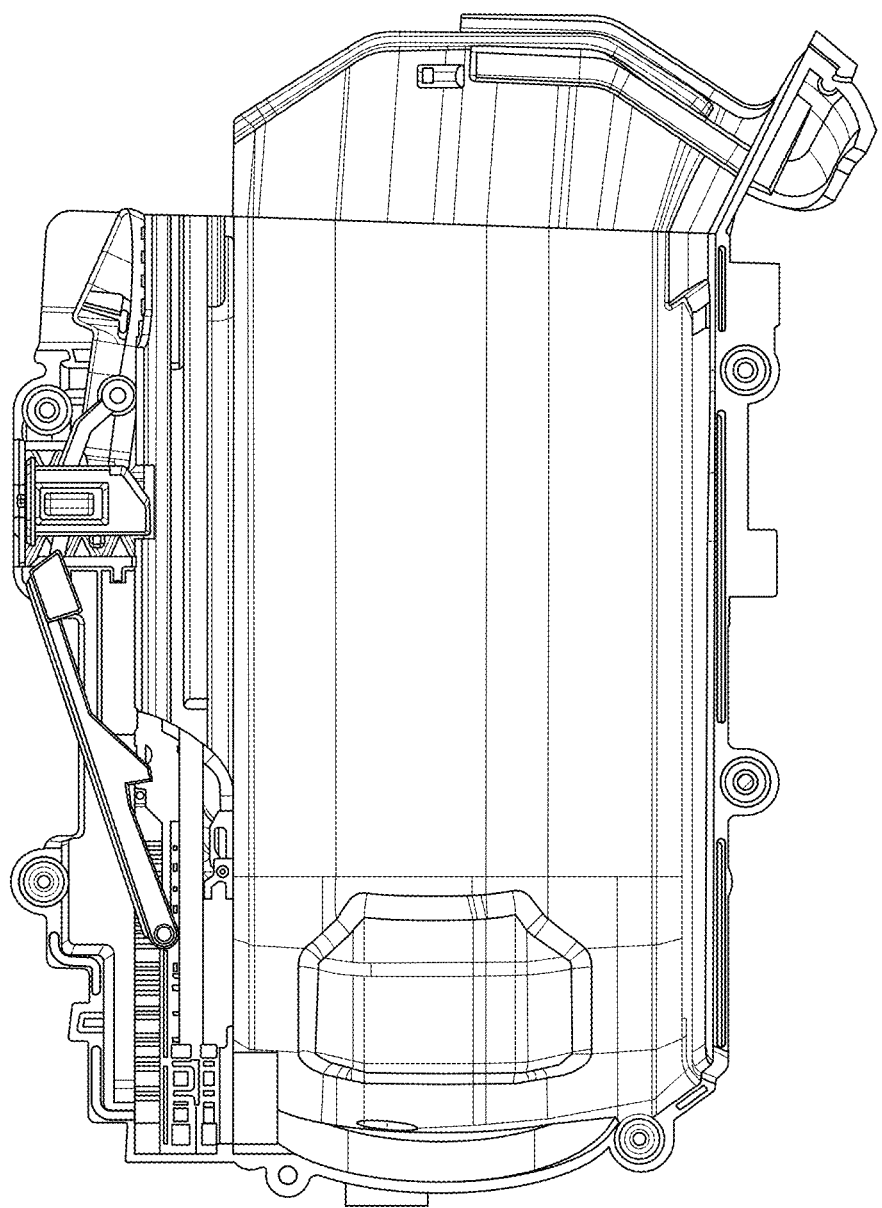
FIG. 13 illustrates a side, elevation view of the example receptacle and multi-latch mechanism of FIG. 10, wherein half of the receptacle housing is removed.
Figure 14:
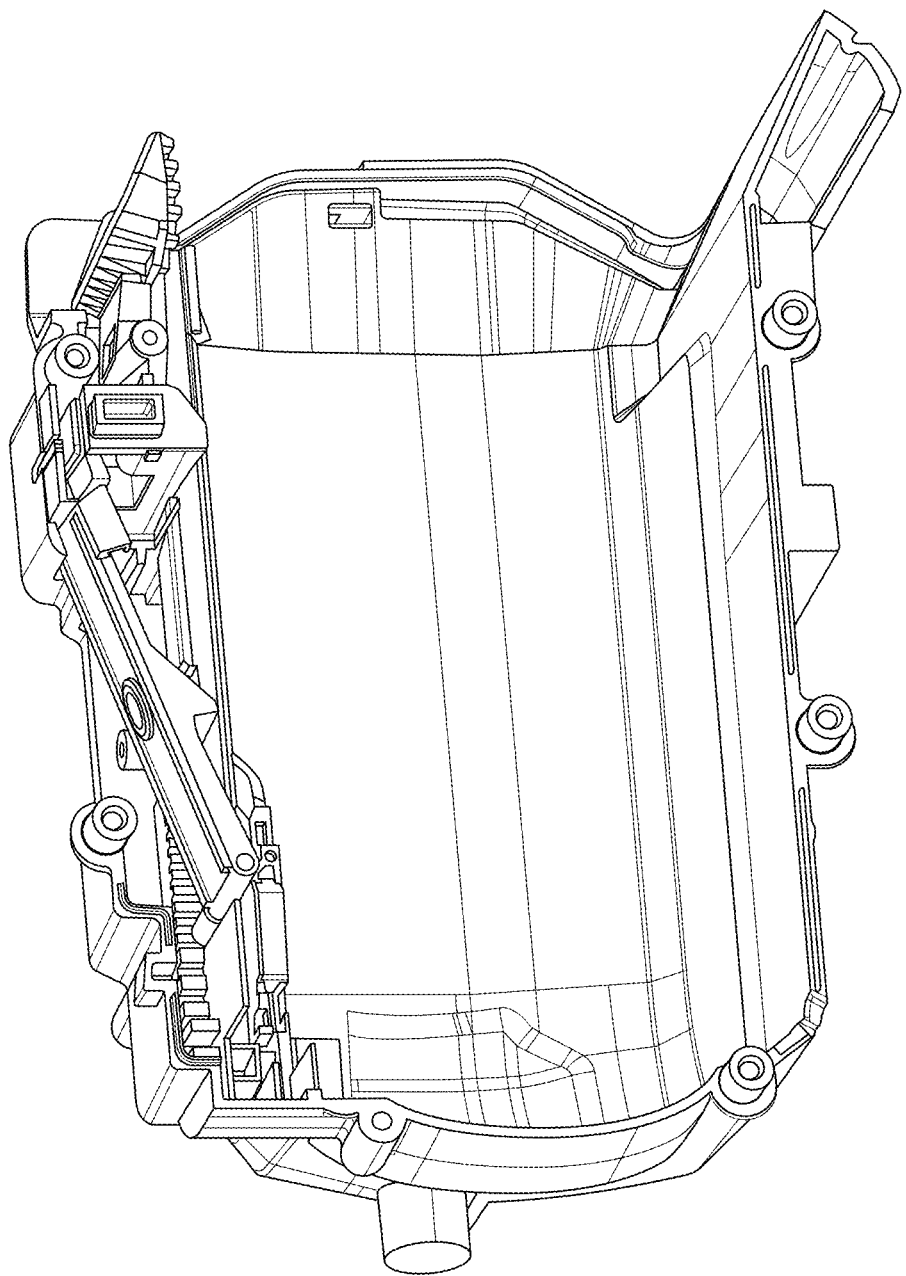
FIG. 14 illustrates a rear, isometric view of the example receptacle and multi-latch mechanism of FIG. 10, wherein half of the receptacle housing is removed.
Figure 15:
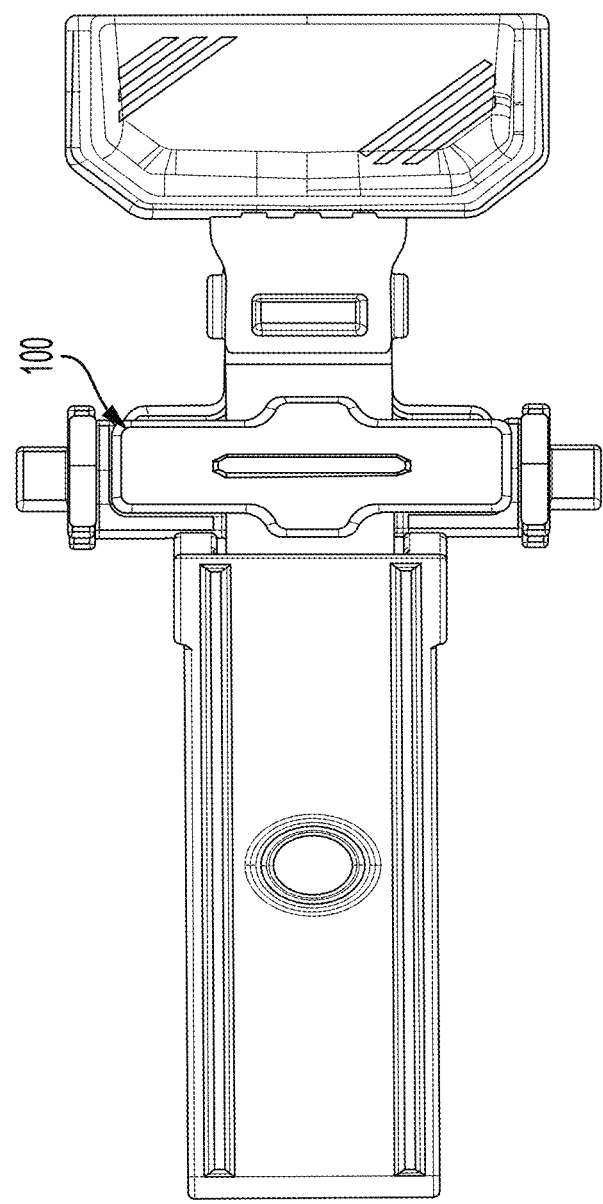
FIG. 15 illustrates a top, plan view of the multi-latch mechanism of FIG. 10.
Figure 16:
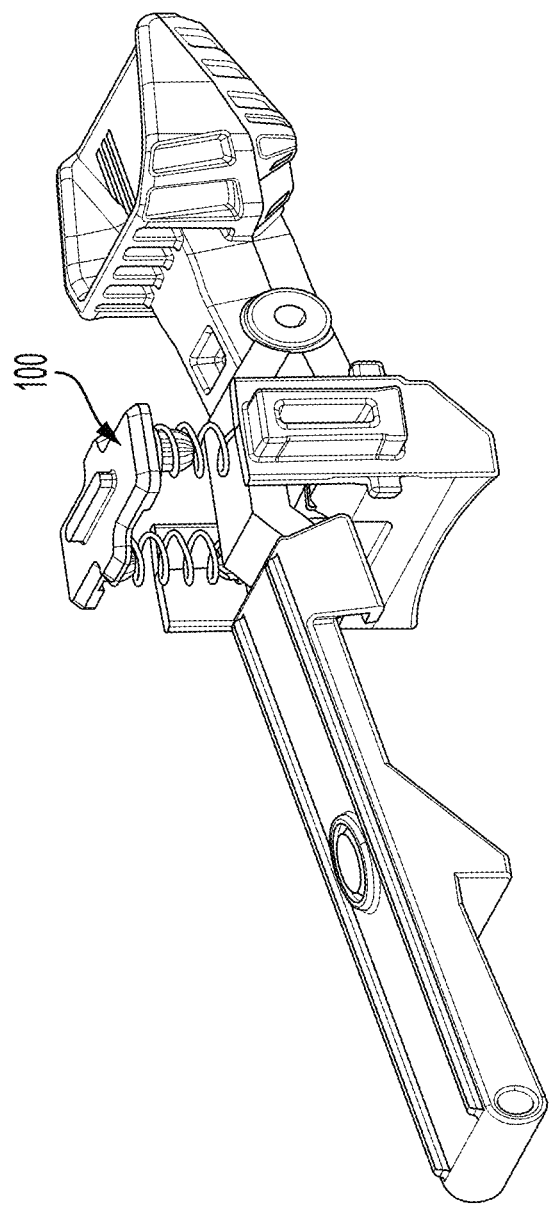
FIG. 16 illustrates a rear, isometric view of the multi-latch mechanism of FIG. 15 in a latching position.
Figure 17:
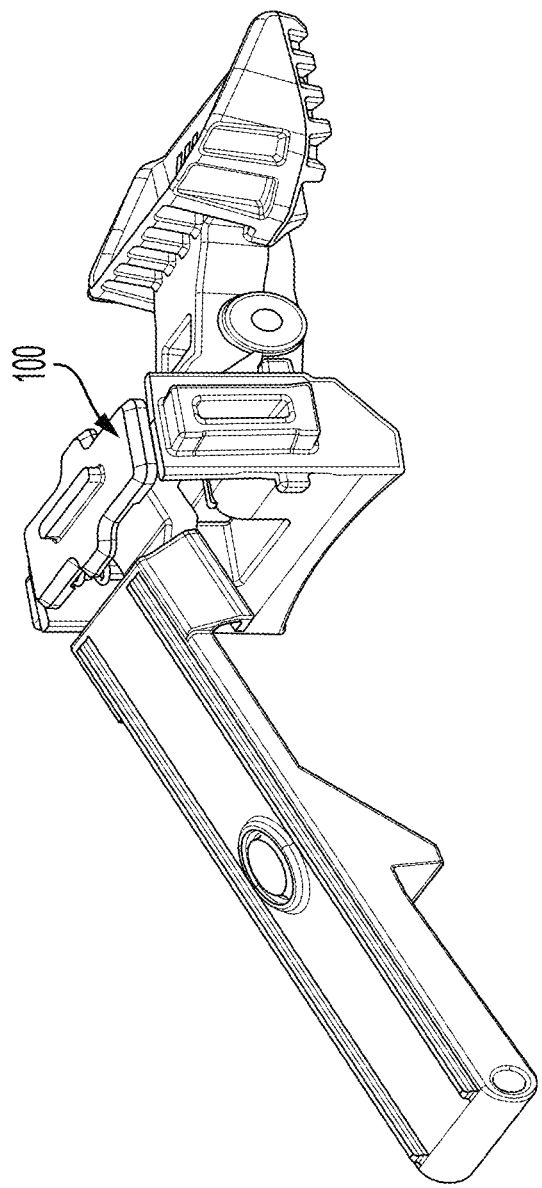
FIG. 17 illustrates a rear, isometric view of the multi-latch mechanism of FIG. 15 in a releasing position.
Figure 18:
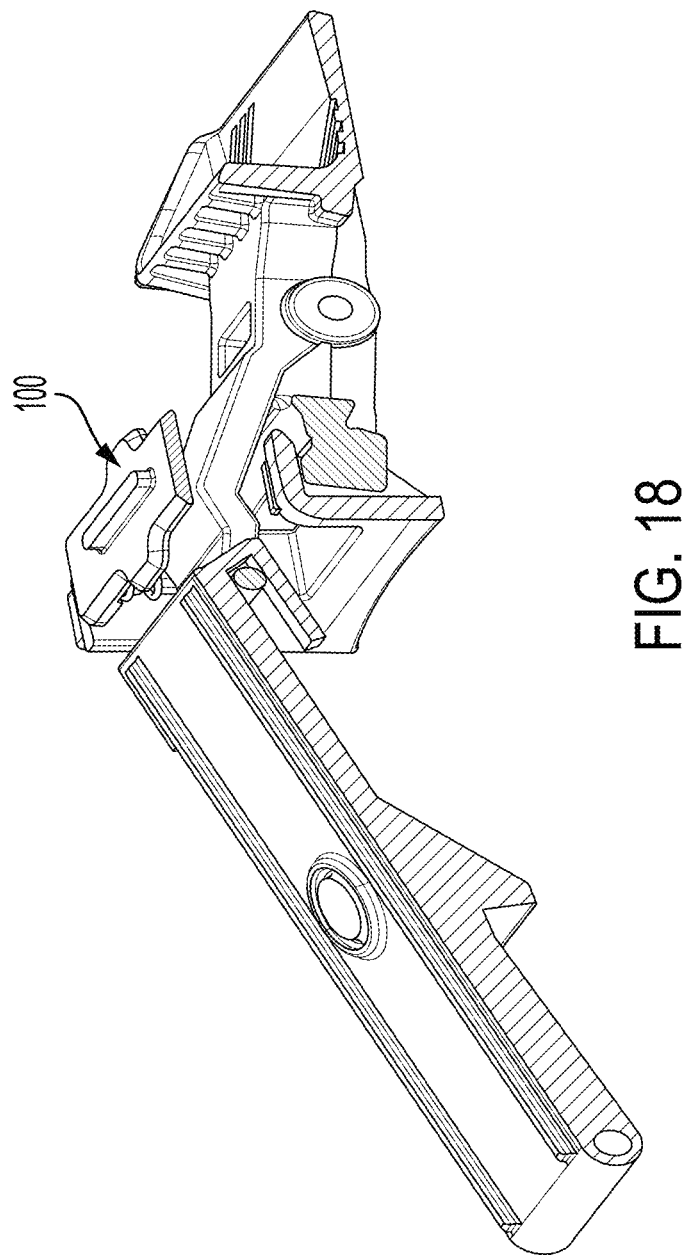
FIG. 18 illustrates a section view of the multi-latch mechanism of FIG. 17.
Figure 19:
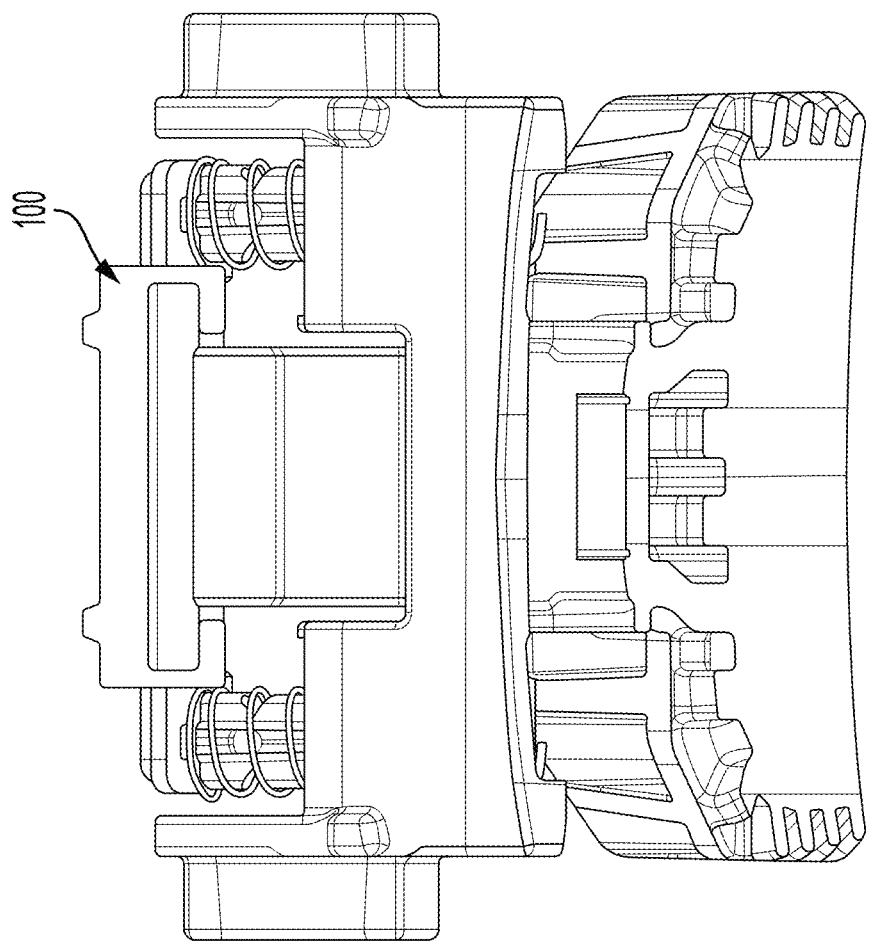
FIG. 19 illustrates a front, plan view of the multi-latch mechanism of FIG. 17.
Figure 20:
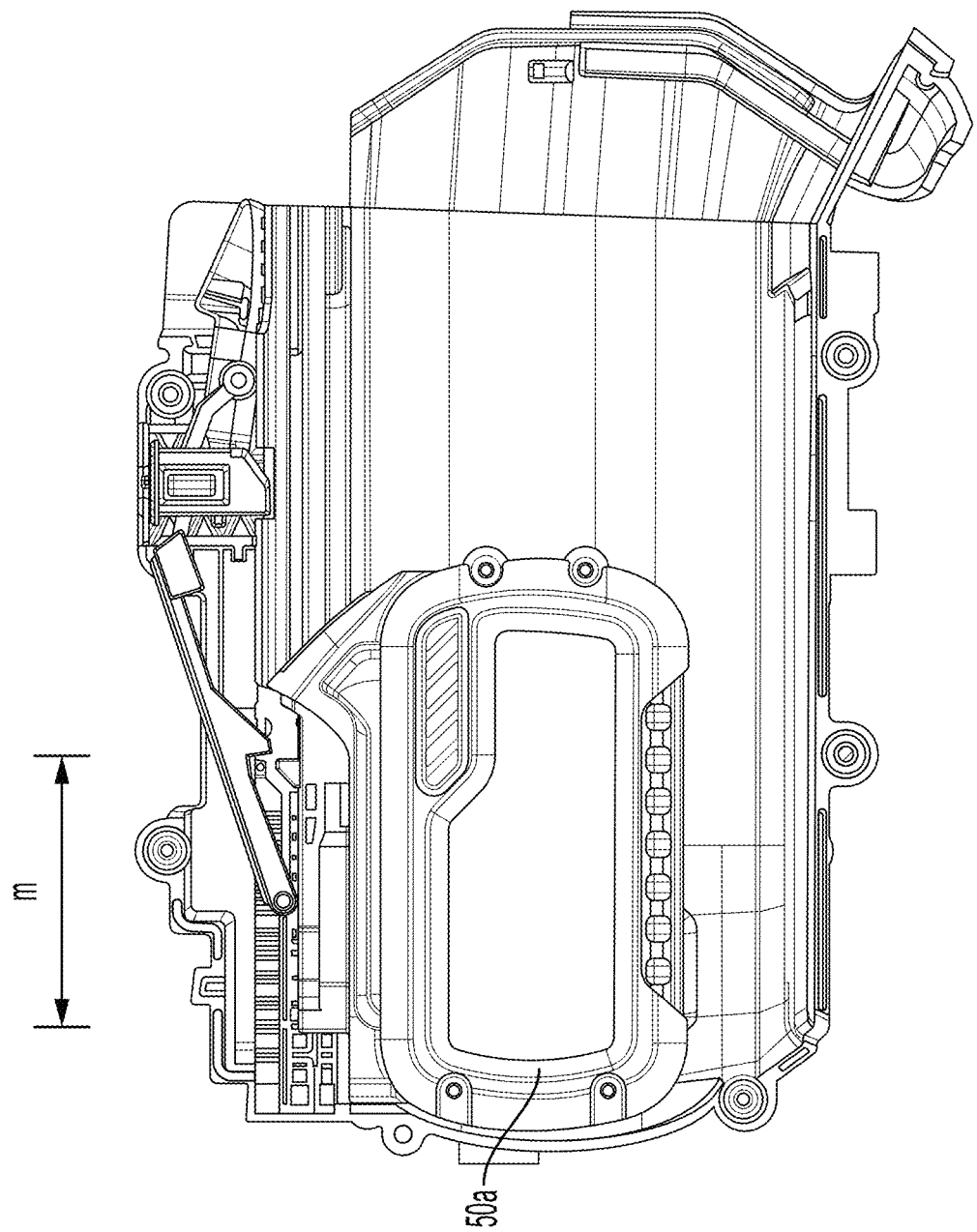
FIG. 20 illustrates a left side, elevation view of the example battery pack of FIG. 4 positioned in the example power tool receptacle of FIG. 10, wherein half of the receptacle housing is removed and the multi-latch mechanism is in the releasing position.
Figure 21:
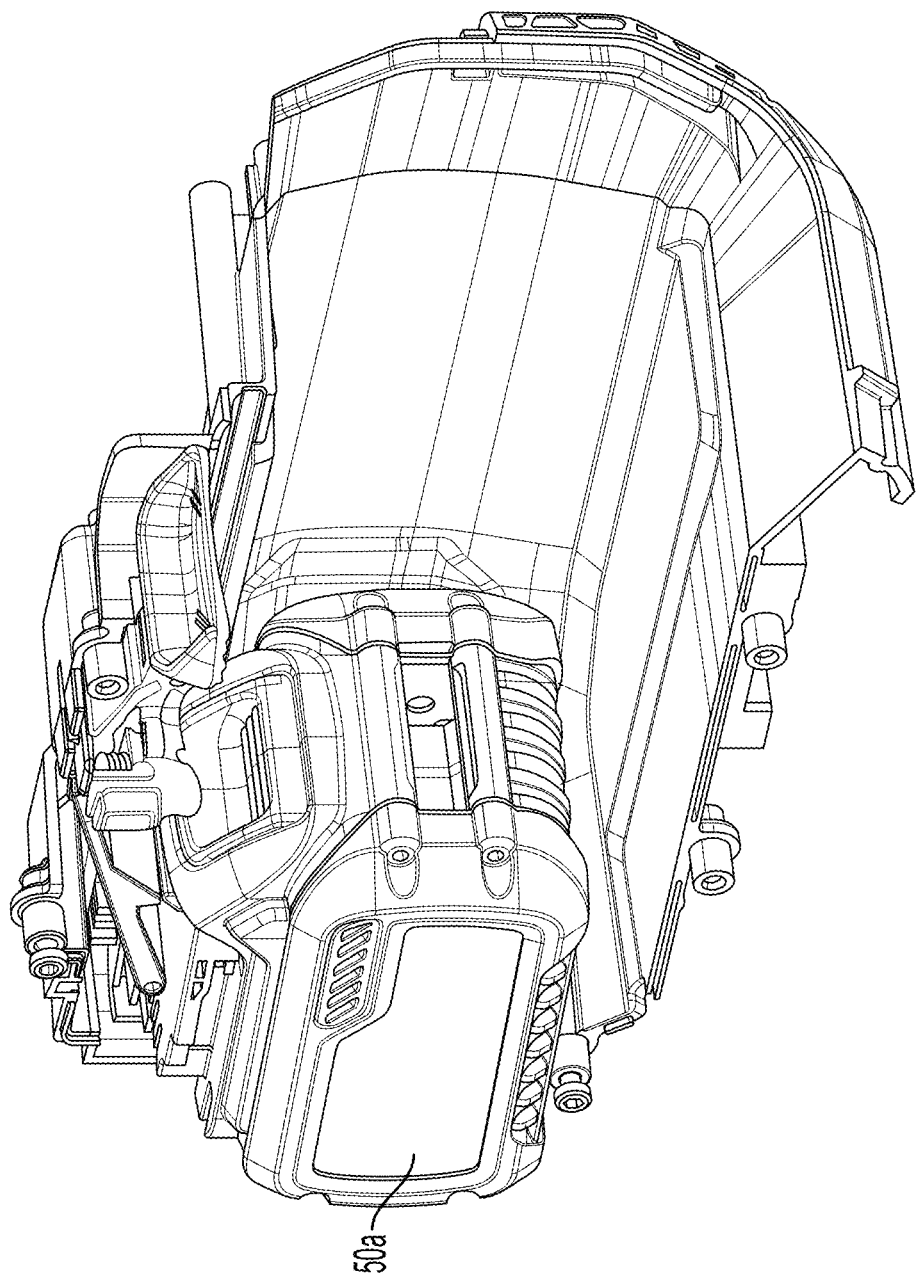
FIG. 21 illustrates a front, isometric view of FIG. 20.
Figure 22:
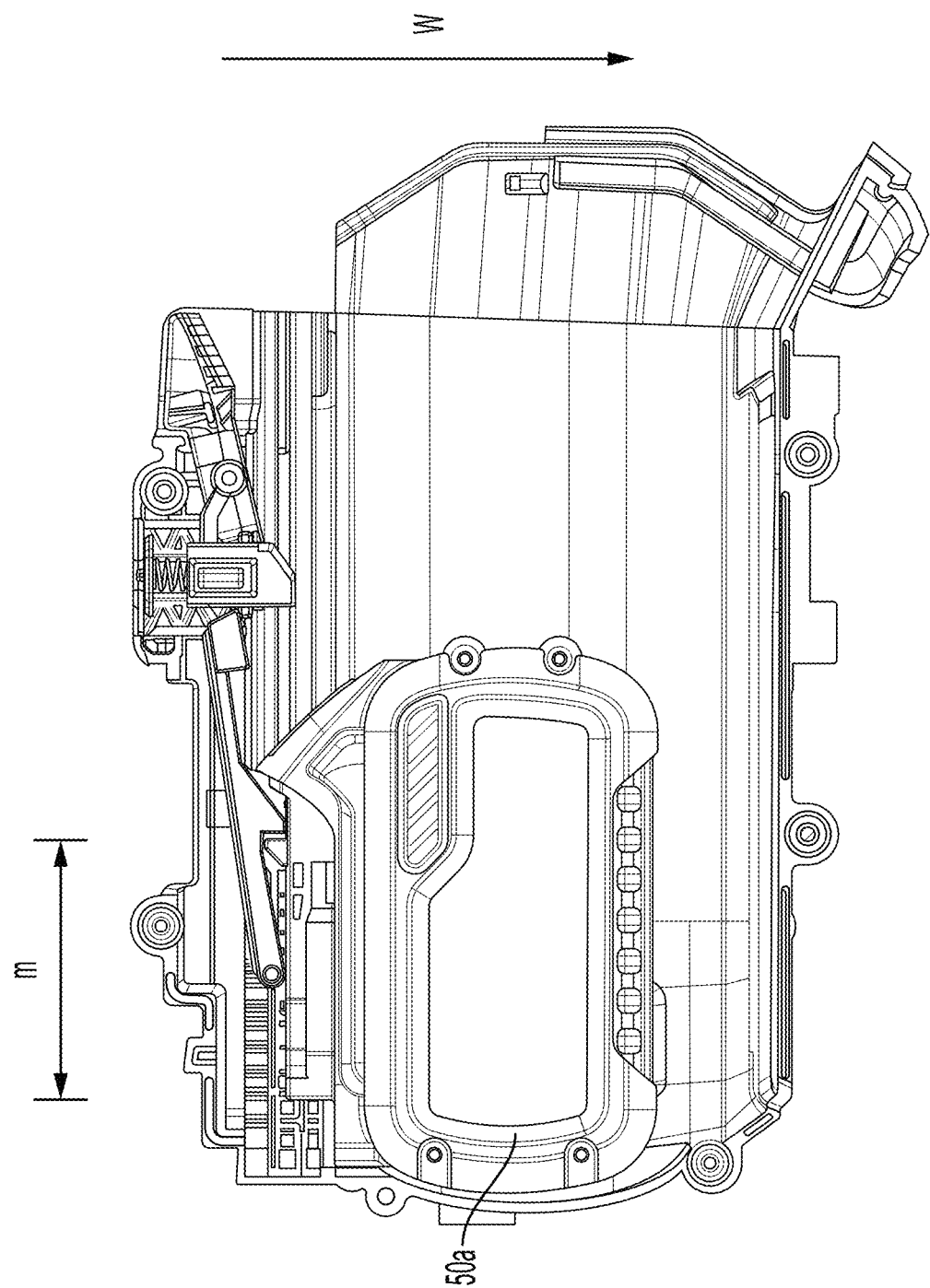
FIG. 22 illustrates a left side, elevation view of the example battery pack of FIG. 4 positioned in the example power tool receptacle of FIG. 10, wherein half of the receptacle housing is removed and the multi-latch mechanism is in the latching position.
Figure 23:
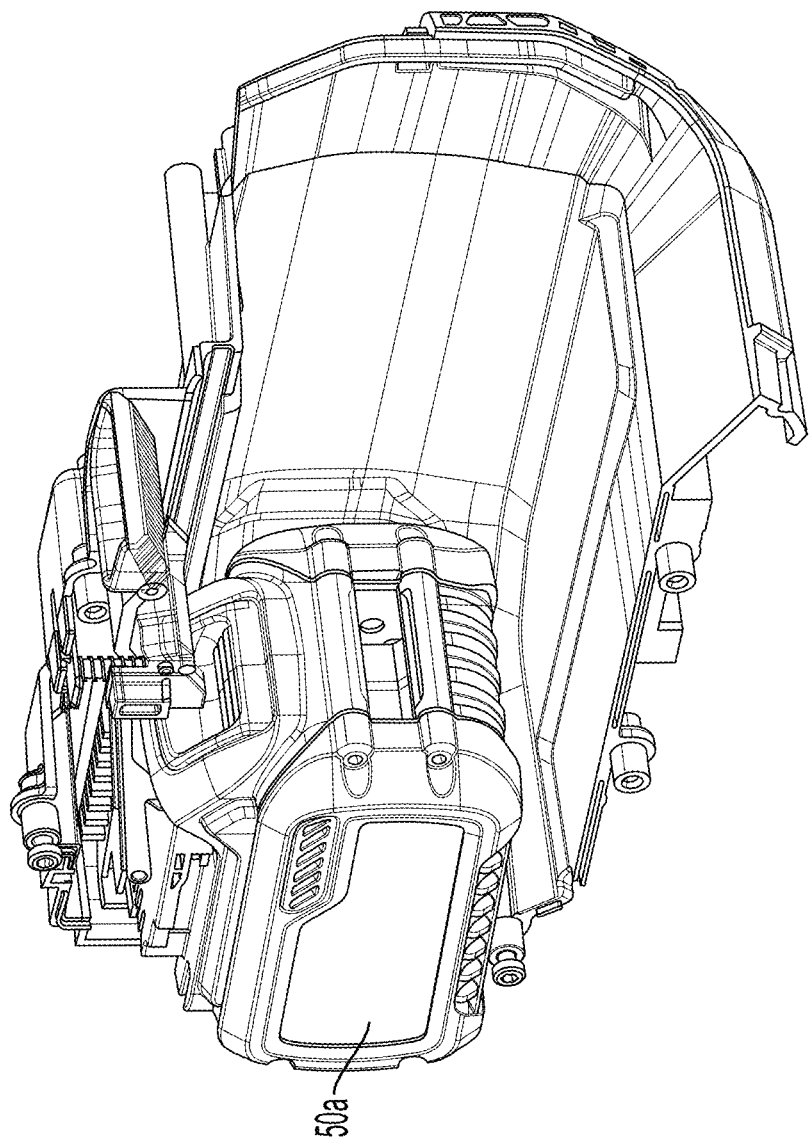
FIG. 23 illustrates a front, isometric view of FIG. 22.
Figure 24:
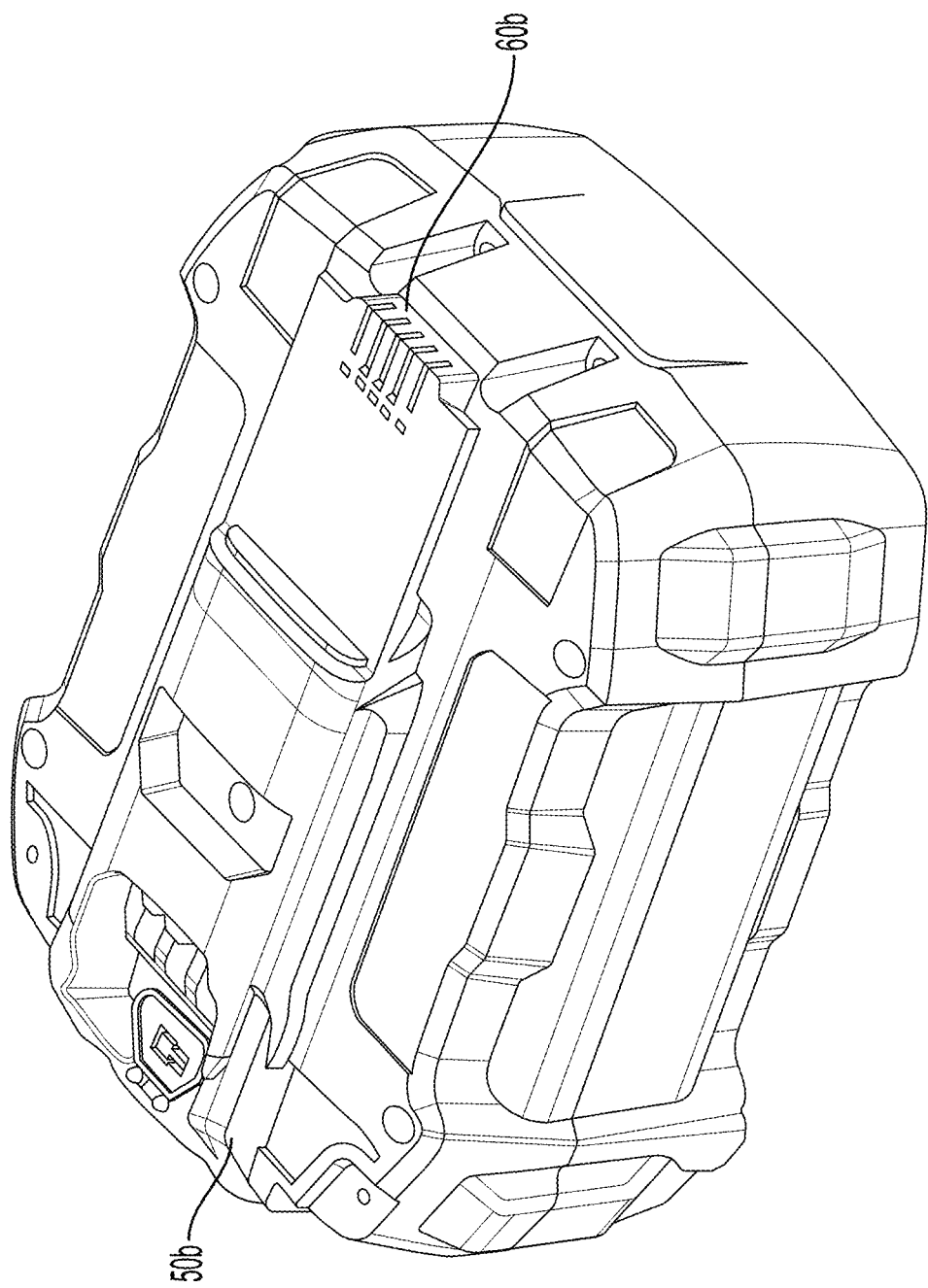
FIG. 24 illustrates a rear, isometric view of an example embodiment of a second battery pack.
Figure 25:
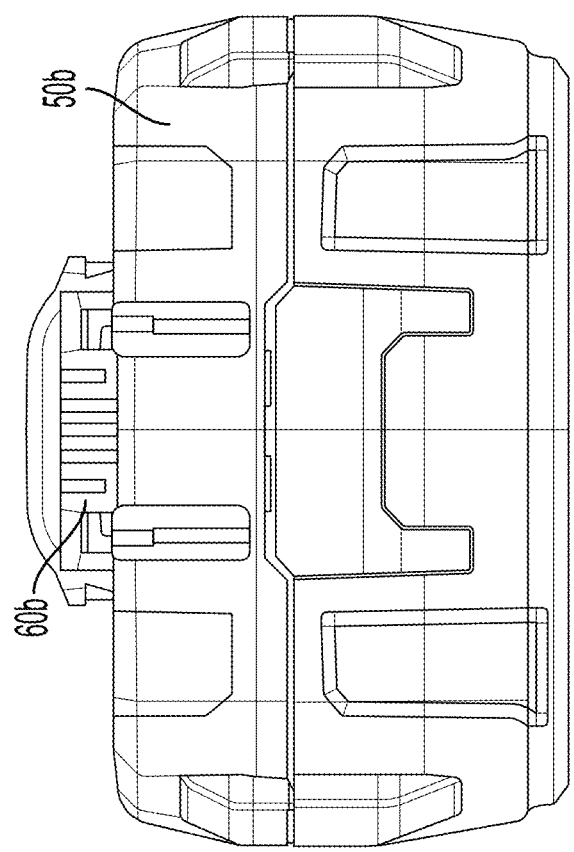
FIG. 25 illustrates a rear, elevation view of the battery pack of FIG. 24.
Figure 26:
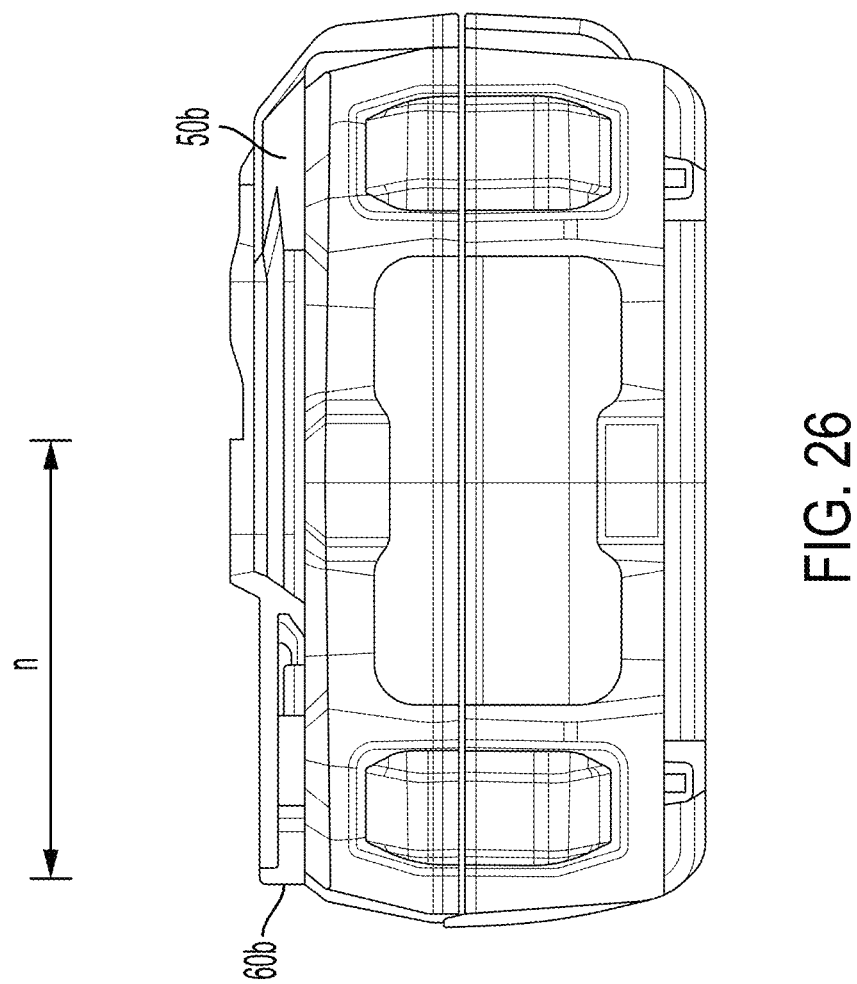
FIG. 26 illustrates a left side, elevation view of the battery pack of FIG. 24.
Figure 27:
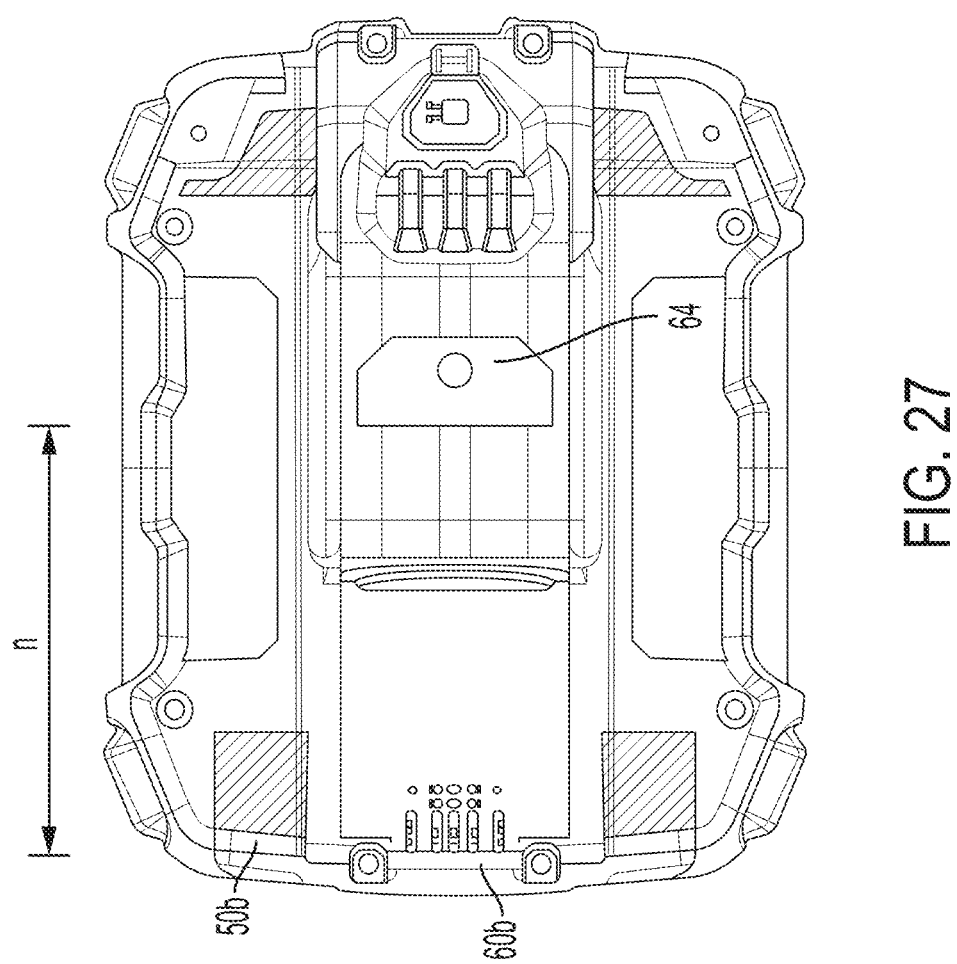
FIG. 27 illustrates a top, plan view of the battery pack of FIG. 24.
Figure 28:
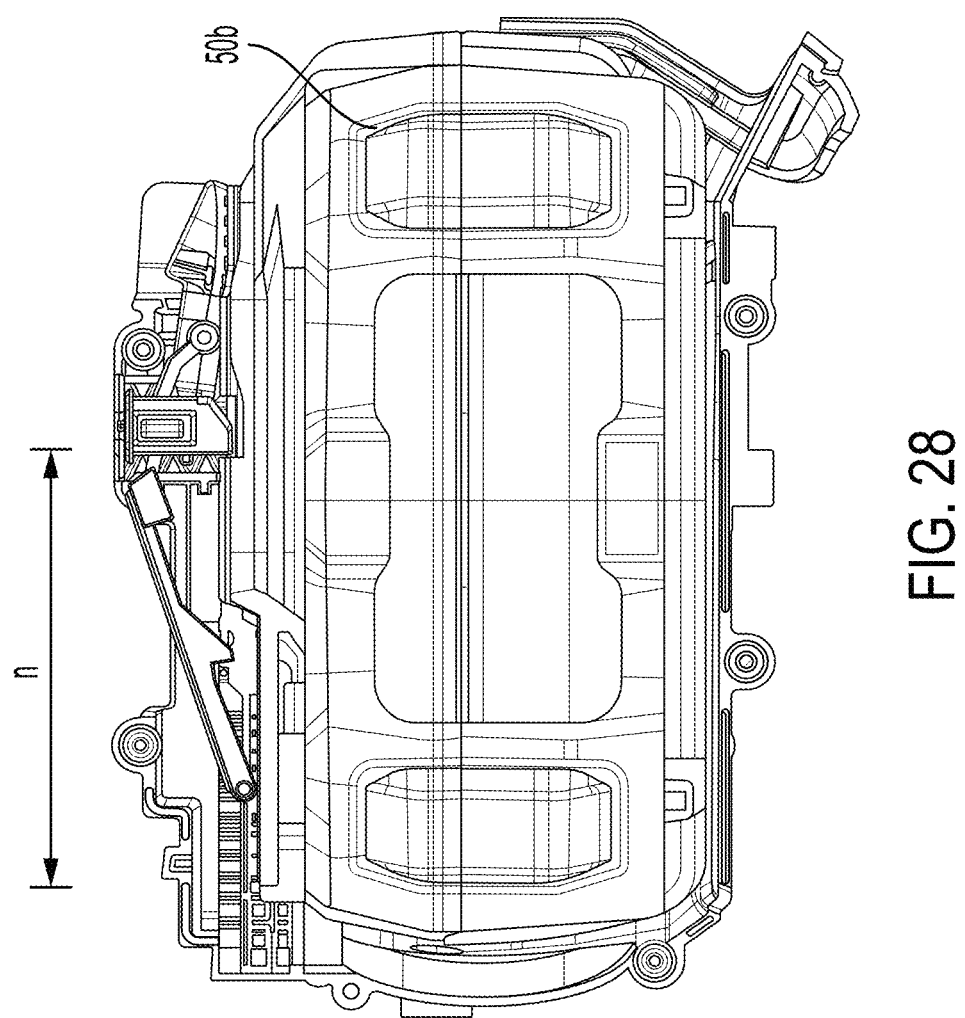
FIG. 28 illustrates a left side, elevation view of the example battery pack of FIG. 24 positioned in the example power tool receptacle of FIG. 10, wherein half of the receptacle housing is removed and the multi-latch mechanism is in the releasing position.
Figure 29:
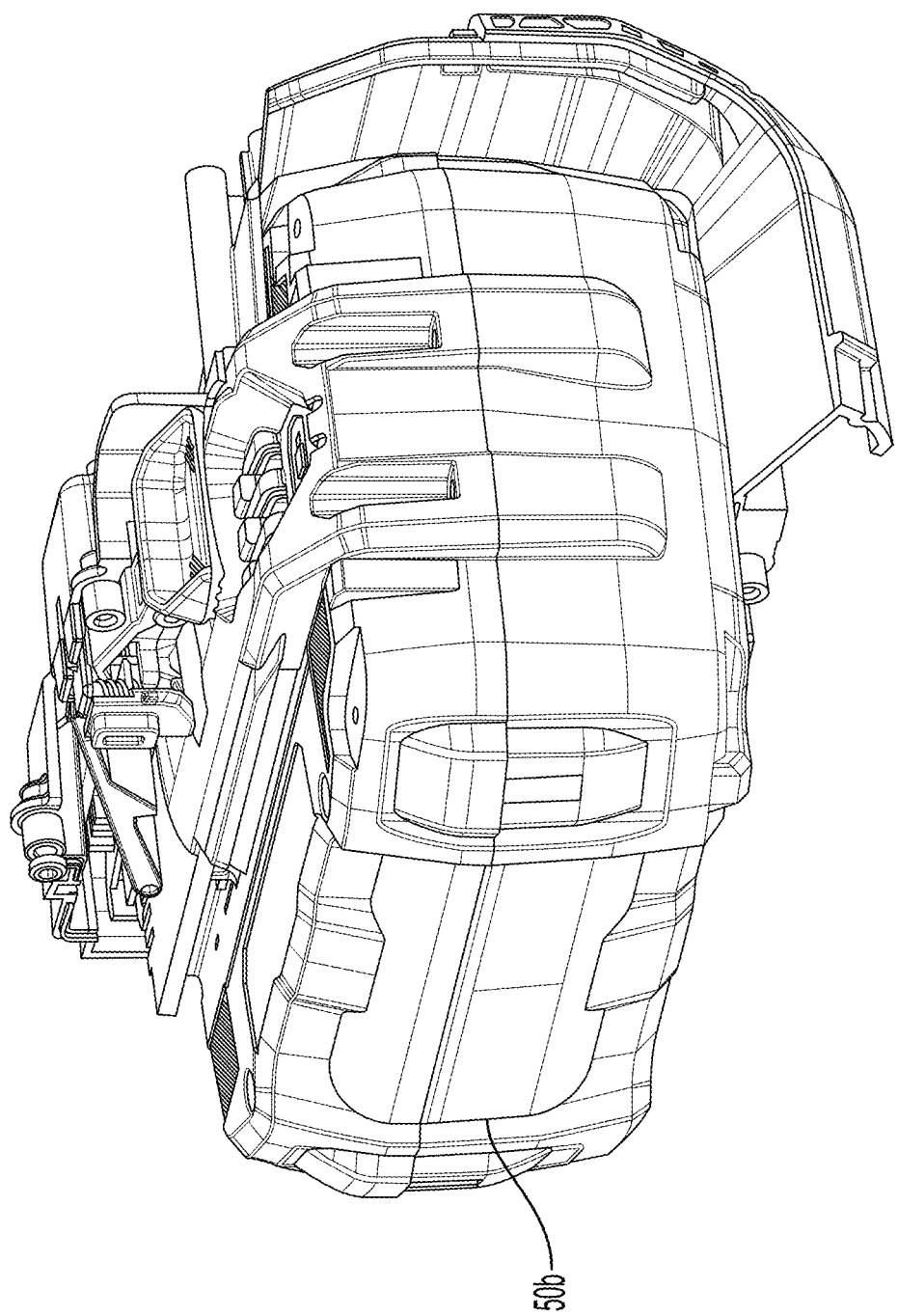
FIG. 29 illustrates a front, isometric view of FIG. 28.
Figure 30:
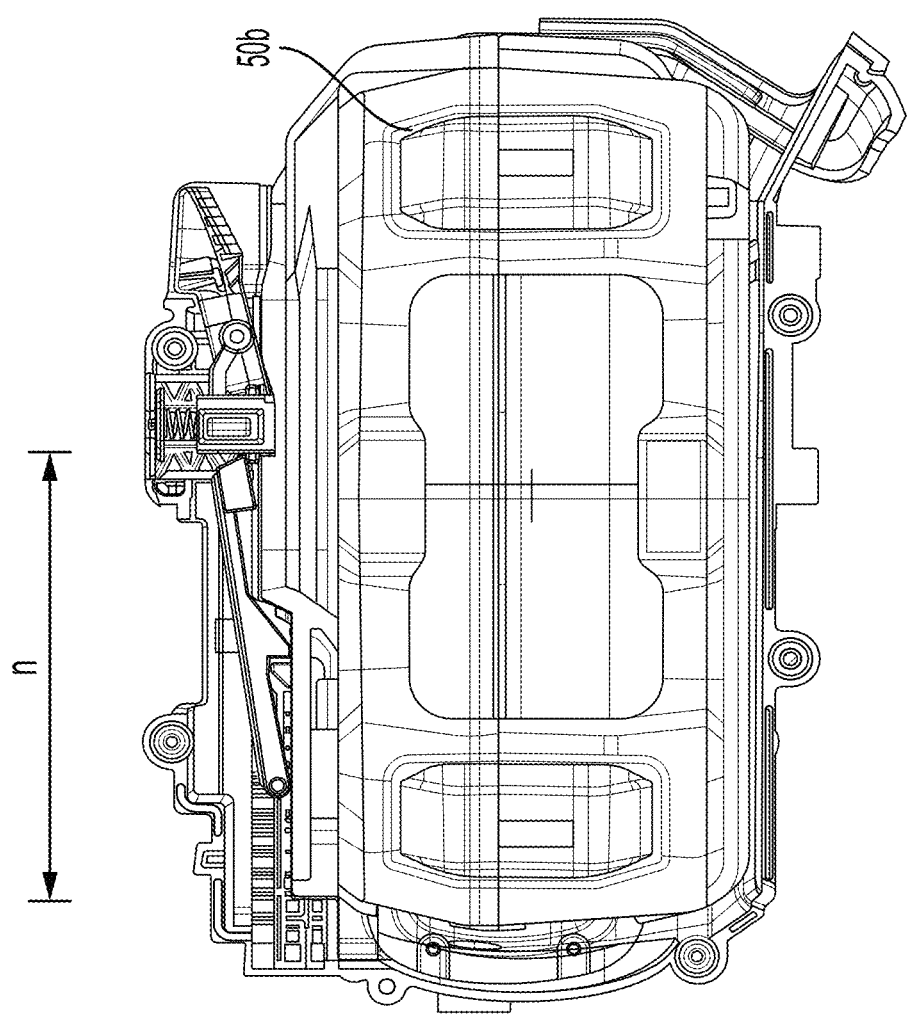
FIG. 30 illustrates a left side, elevation view of the example battery pack of FIG. 24 positioned in the example power tool receptacle of FIG. 10, wherein half of the receptacle housing is removed and the multi-latch mechanism is in the latching position.
Figure 31:
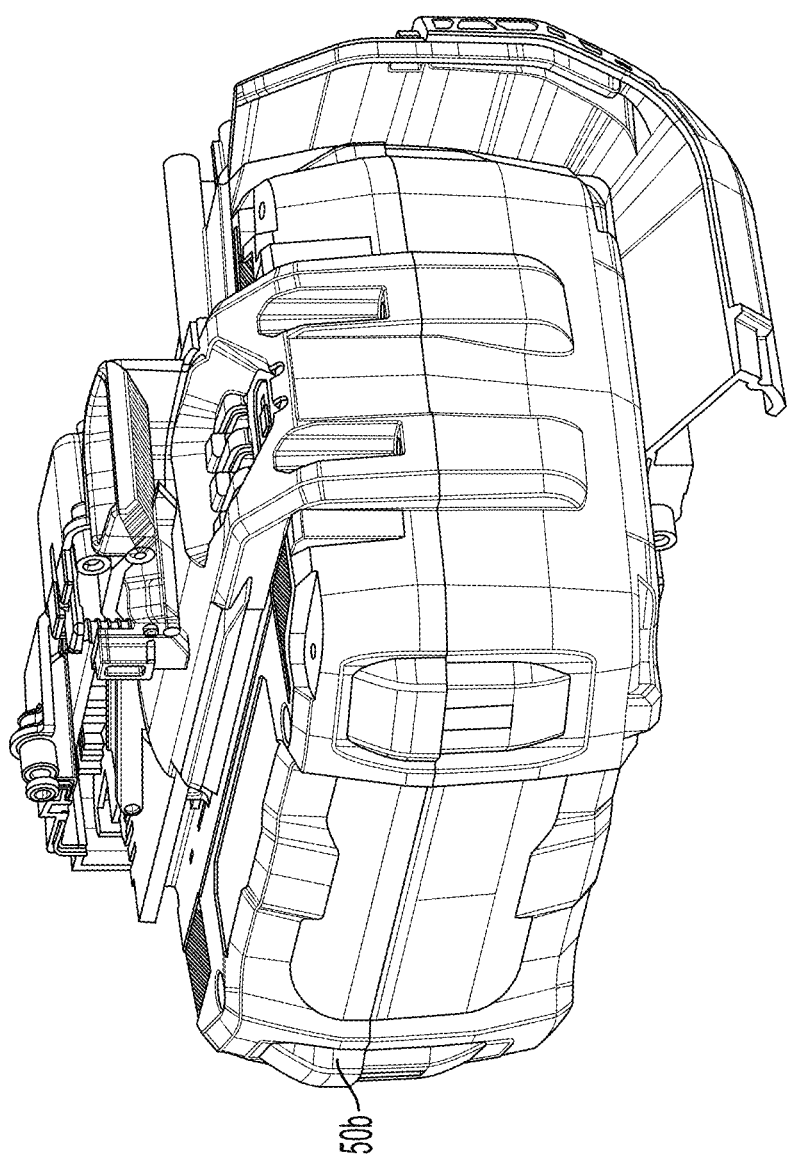
FIG. 31 illustrates a front, isometric view of FIG. 30.

FIG. 8 illustrates a partial isometric view of an example embodiment of an electric power tool 90 having a first example embodiment of a multi-latch mechanism 100. FIG. 9 illustrates a partial isometric view of the electric power tool 90 with half of the tool housing removed.

The power tool 90 includes a housing 92 that houses an electric motor (not shown) therein. The electric motor imparts a rotary movement on one or more transmission components (not shown) for producing a rotary and/or reciprocating motion on an output spindle. The electric motor may be, for example, a brushless direct-current (BLDC) motor and may be configured to output a maximum power output of at least 1500 watts. The electric motor is powered by a secondary battery pack (not shown) that is removably mounted on a battery receptacle 94 of the housing 92. The battery receptacle 94 includes a tool terminal block (not shown) housing a plurality of tool terminals that mate with corresponding terminals of the battery pack to supply DC power to the electric motor. A trigger switch 96 may be provided on a handle 98 for selectively activating supply of power from the battery pack to the electric motor. While the power tool 90 in this example is a motorized hammer, it should be understood that any rotary or non-rotary cordless power tool that includes a motor, including but not limited to, hammer drills, demolition hammers, grinders, sanders, drills, impact drivers, cut-out tools, polishers, saws, circular saws, miter saws, reciprocating saws, nailers, etc., or any other powered apparatuses that receive power tool battery packs, including but not limited to lighting devices, radios, mowers, trimmers, blowers, etc., is encompassed by the term "power tool" as used within this disclosure. The power tool 90 is powered by one or more battery packs that provide a total rate voltage in the range of 60 V to 120 V to the power tool. A battery pack having a rated voltage of 60 V has a maximum voltage of approximately 63 V, a minimum working voltage of approximately 30 V prior to shutoff, and a nominal (average) voltage of approximately 54 V.

FIGS. 10-14 illustrate an example embodiment of a power tool battery pack receptacle 114 including the multi-latch mechanism 100 illustrated in FIGS. 8 and 9. The battery pack receptacle 114 is optionally provided with a cavity 122 that houses the battery pack 50. The cavity 122 may be suitable for use in power tool applications involving large amount of debris and contamination. Though the cavity 122 is displayed in various embodiments of this disclosure, it should be understood that the cavity 122 is provided merely by way of example and is not an essential part of the disclosure.

The power tool 90 may be configured to receive battery packs 50 of different voltage or capacity ratings. For example, the power tool 90 may be configured to receive one or more conventional 60V Max 4 Ah battery packs, or one or more higher voltage (e.g., 120V) battery packs to increase the output speed and/or power of tool, or one or more high capacity (e.g., 6 Ah) battery packs to increase the battery pack runtime and/or power output.

Increasing the number of cells in a battery pack may result in an increase in the length (i.e., along the insertion axis A) of the battery pack. In many configurations, it is preferable for the latching location be positioned in proximity to the rear of the battery pack or close to the center in order to limit wobble and vibration of the pack. In addition, where a translating latch and an actuator is utilized as described above, mechanically linking the movement from the actuator to the latch can be complex and difficult in a long battery pack unless the latch is positioned in relative proximity of the actuator. Furthermore, in some configurations, the area adjacent to the battery pack terminal block may be used for other purposes, for example to house a circuit board, making it difficult to position the latching location uniformly across different battery pack platforms.

To enable the power tool 90 to engage and lock in different battery packs 50 of different sizes, voltage ratings, capacity ratings, or configurations provided with different latching locations, the battery receptacle 114 is provided with multi-latch mechanism 100, as described in detail herein. In an embodiment, the multi-latch mechanism 100 is disposed on the battery receptacle 114 to engage and lock at least two different battery packs 50 having different latching configurations.

FIGS. 15-19 illustrate various views of the multi-latch mechanism alone 100 in latching and releasing positions. The multi-latch mechanism 100 includes a first interface element 110 for engagement with short battery pack 50a, a second interface element 120 for engagement with long battery pack 50b, and an actuator 130 engageable outside battery receptacle 114 by a user to move both of the interfaces 120 and 130 of the multi-latch mechanism 100 from the latching position to the releasing position simultaneously.

The first interface element 110 includes an arm 112 pivotably coupled to battery receptacle 114 via a first pivot member 114. The first interface element 110 further includes a first latch member 116 projecting downwardly from approximately a middle portion of the arm 112. In an embodiment, the first latch member 116 includes a downward straight surface 116a and a ramped surface 116b. The ramped surface 116b allows sliding movement of the battery pack into the battery receptacle 114. The downward straight surface 116a forms a hook for engagement with a corresponding female catch member (e.g., a pocket or a recess) of the battery pack in the latched position, as described in more detail below. Alternatively, the downward straight surface 116a forms a catch for engagement with a corresponding male hook member (e.g., a translating latch) of the battery pack in the latched position, as described in more detail below.

The actuator 130 includes an arm 132 that is coupled on a first end to a front end 118 of arm 112 of first interface element 110 and includes an engagement portion 136 on a second end. A middle portion of arm 132 is coupled to the battery receptacle 114 via a second pivot member 134. Downward actuation of the engagement portion 136 causes the first end of arm 112 to move upwardly around the second pivot member 134 and cause upward movement of the first interface element 110 away from the battery pack.

The second interface element 120 includes a main body 122 coupled between the first end of arm 132 of the actuator 130 and the second pivot member 134, and a second latch member 126 projecting downwardly from the main body 122. In an embodiment, the second latch member 126 includes a downward straight surface 126a and a ramped surface 126b. The ramped surface 126b allows sliding movement of the battery pack into the battery receptacle 114. The downward straight surface 126a forms a hook for engagement with a corresponding female catch member (e.g., a pocket or a recess) of the battery pack in the latched position, as described in more detail below. Alternatively, the downward straight surface 126a forms a catch for engagement with a corresponding male hook member (e.g., a translating latch) of the battery pack in the latched position, as described in more detail below.

One or more spring elements 128 are mounted on the main body 122 of the second interface element 120 to bias the main body 122 downward (in the context of FIG. 16), and thus the first latch member 116 and the second latch member 126 and the multi-latch mechanism 100 assembly as a whole, into the latching position. The spring elements 128 may be supported via upright posts provided on the main body 122 of the second interface element 120 on one end and via a housing part 129 on the other end. Alternatively, the spring elements 128 may engage the first interface element 110 or the actuator 130.

Referring to FIGS. 20-23, when the multi-latch mechanism 100 interfaces with the short battery pack 50a, the first interface element 110 engages the translating latch 62 of the battery pack 50a in the latching position. The translating latch 62 is positioned at a distance "m" from the battery vertical datum plane, where m<n (FIGS. 26, 27, 28, 30). The first latch member 116 of the first interface element 110 is positioned to engage and catch a front portion of the translating latch 62 when the battery pack 50a is fully inserted into the battery receptacle 114 to lock the battery pack 50a in place. The first latch member 116 may be disengaged from the translating latch 62 by pressing the actuator 130 of the multi-latch mechanism 100 in a direction W. Alternatively, the user may reach into the battery receptacle 114 and press the actuator 64 of the battery pack 50a in the direction W to disengage the translating latch 62 from the first interface element 110. The second latch member 126 does not contact the battery pack 50a when it is fully inserted into the battery receptacle 114.

FIGS. 23-26 illustrate another example embodiment of a second battery pack 50b. For purposes of this disclosure, the battery pack 50b is designated as a "long" battery pack, as will be explained below. The battery pack 50b includes a main housing 52b that houses a plurality of battery cells (not shown), and one or more guide rails 54b that form elongate grooves 56b along the sides. The battery pack 50b also includes a set of slots 58b formed in a battery vertical datum plane 60b. The battery vertical datum plane 60b serves a basis to define relative positions and orientations of various elements of the battery pack 50b, in general, and of the combination interface, relative to a vertical plane. The plurality of slots 58b provide access to a plurality of battery pack terminals (not shown). The battery pack terminals are housed in a battery pack terminal block (not shown). As the battery pack 50b is slid into the battery receptacle 114 along the receiving axis X, the guide rails 124 are received within the elongate grooves 58b of the battery pack 50b, and the battery pack 50b is guided along the receiving axis X until the battery pack terminals mate with the power tool terminals 122 of the battery receptacle 114.

The battery pack 50b further includes a female catch or pocket 62b disposed on top of battery pack housing 52b between the guide rails 56b. The catch 62b is configured to receive a corresponding latch 126 of the multi-latch mechanism 100. The catch 62b includes a catch face or wall 64b that is generally perpendicular to the battery vertical datum plane 60b.

In the example embodiment, there is a distance "n" between the battery vertical datum plane 60b and the catch wall 64b. The distance "n" extends along the X axis.

The battery pack 50b is adapted to mate with the battery pack receptacle 114. As noted above, the multi-latch mechanism 100 of the battery pack receptacle 114 includes a male latch member 126 located to engage the female catch k member (e.g., catch 62b) to hold the battery pack 50b in place within a battery receptacle 114 of the power tool. The latch member of the power tool must be positioned at a specific location designed to correspond to the location of the catch 62b of the battery pack 50a. This location is at a distance "n" from the tool vertical datum plane 60b. Engagement of the latch member 126 of the power tool with the catch member 62b of the battery pack 50b axially blocks and locks the battery pack 50b into the battery receptacle 114 of the power tool. It is noted that while in this example the battery pack 50b is provided with a female catch member (e.g., a pocket or a recess), it may be alternatively provided with a male hook member (e.g., an actuatable translating hook) that engages a female catch member provided on the battery receptacle of the power tool. The male hook member on either the battery pack or the battery receptacle may be a moveable component or a stationary component. Similarly, the female catch member on either the battery pack or the battery receptacle may be a movable component or a stationary component. For example, the female catch may be provided as a moveable pocket within the battery receptacle that interfaces with a fixed male hook on the battery pack. Alternatively, both the battery receptacle and the battery pack may include moveable components that cooperate together to latch and/or release the battery pack.

FIGS. 28-31 illustrate various views of the battery receptacle 114 including the multi-latch mechanism 100 interfacing with a long battery pack 50b in latching and releasing positions. The long battery pack 50ba is provided with a pocket 64 for engagement with the second interface element 120 and the short battery pack 50a is provided with a translating latch 62 for engagement with the first interface element 110. It should be understood, however, that this arrangement is provided by way of example only and either battery pack may be provided with either a pocket or a translating latch.

Referring to FIGS. 28-31, when the multi-latch mechanism 100 interfaces the long battery pack 50b, the second interface element 120 engages the pocket 64 of the battery pack 50b in the latched position. The pocket 64 is positioned at a distance n relative to the battery vertical datum plane 60b. The second latch member 126 of the second interface element 120 is positioned to engage and catch the pocket 64 when the battery pack 50b is fully inserted into the battery receptacle 114 to lock the battery pack 50b in place. The first latch member 116 may come into contact with an upper portion of the battery pack 50b when the actuator 130 is disengaged, but it does not engage any pocket or hook of the battery pack 50b when it is fully inserted into the battery receptacle 114. The second latch member 126 may be disengaged from the pocket 64 of the battery pack 50b by pressing the actuator 130 in the direction W.

Figure 32:
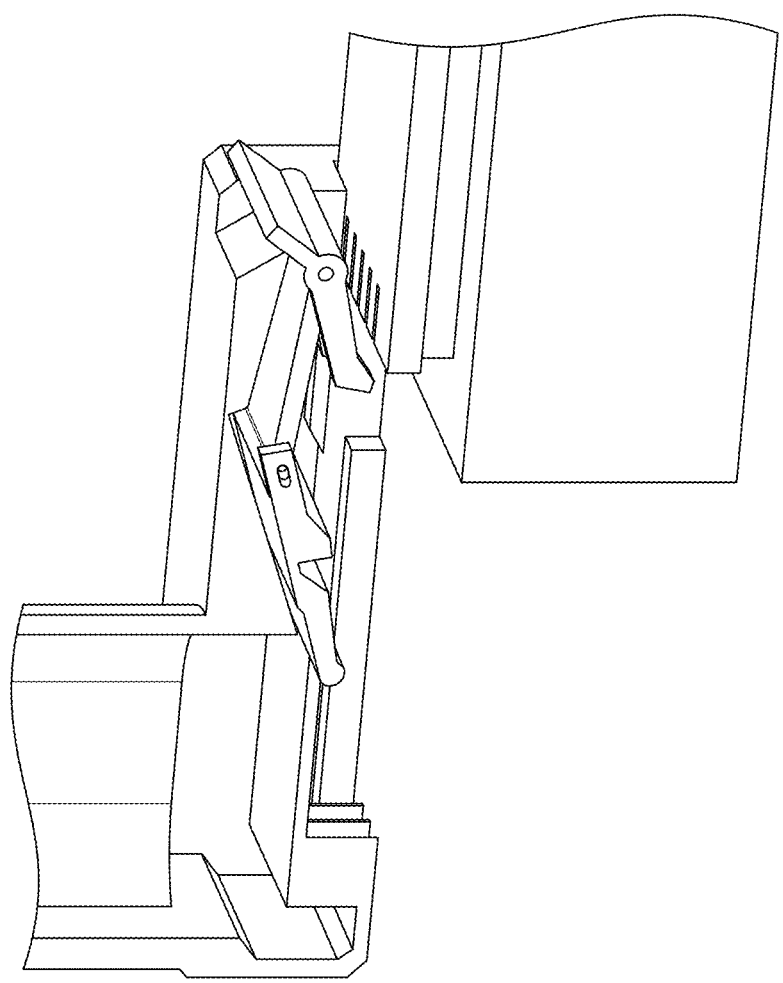
FIG. 32 illustrates a partial isometric view of another example embodiment of a power tool having another example embodiment of a multi-latch mechanism, wherein half of the tool housing is removed.
Figure 33:
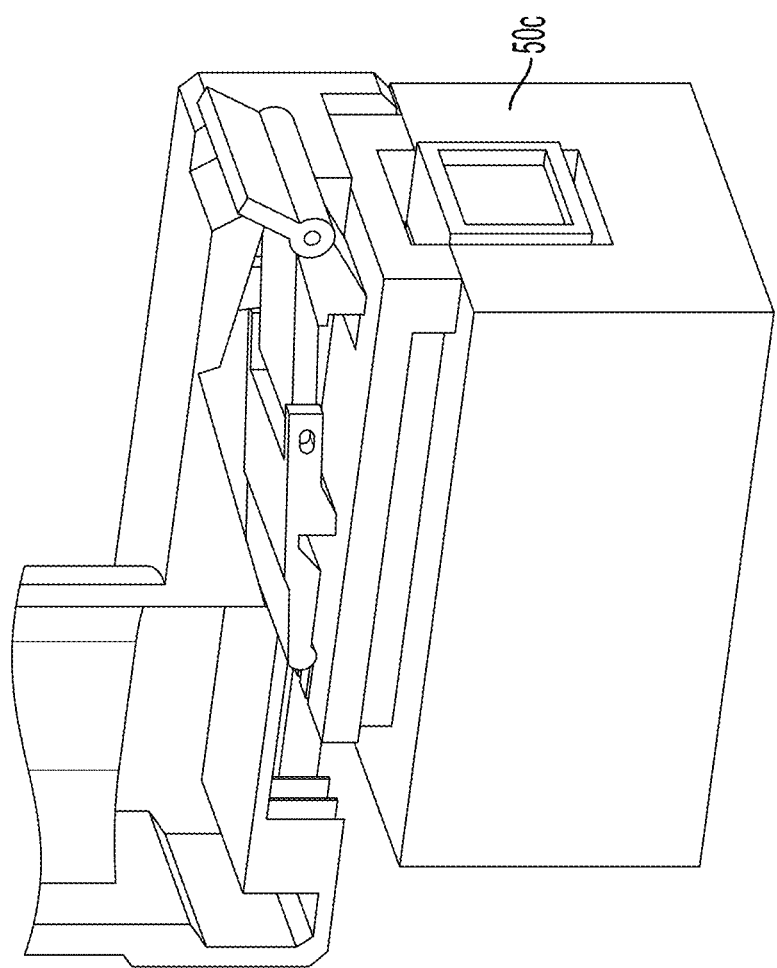
FIGS. 33-38 illustrate the example power tool of FIG. 32 and an example embodiment of a third battery pack.
Figure 34:
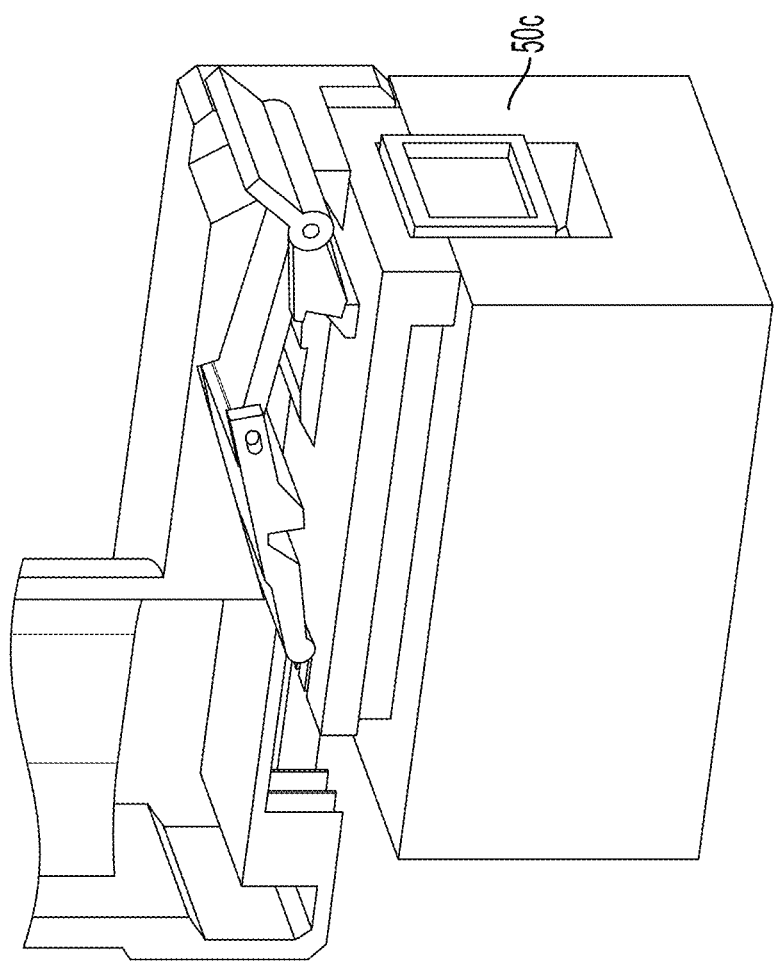
Figure 35:
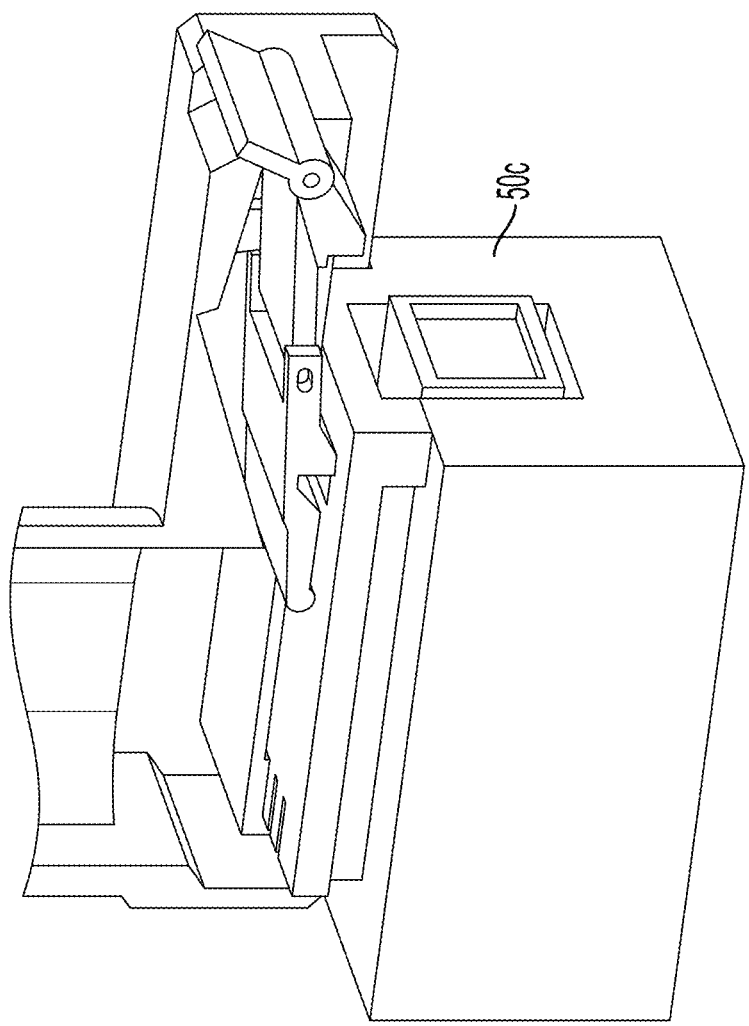
Figure 36:
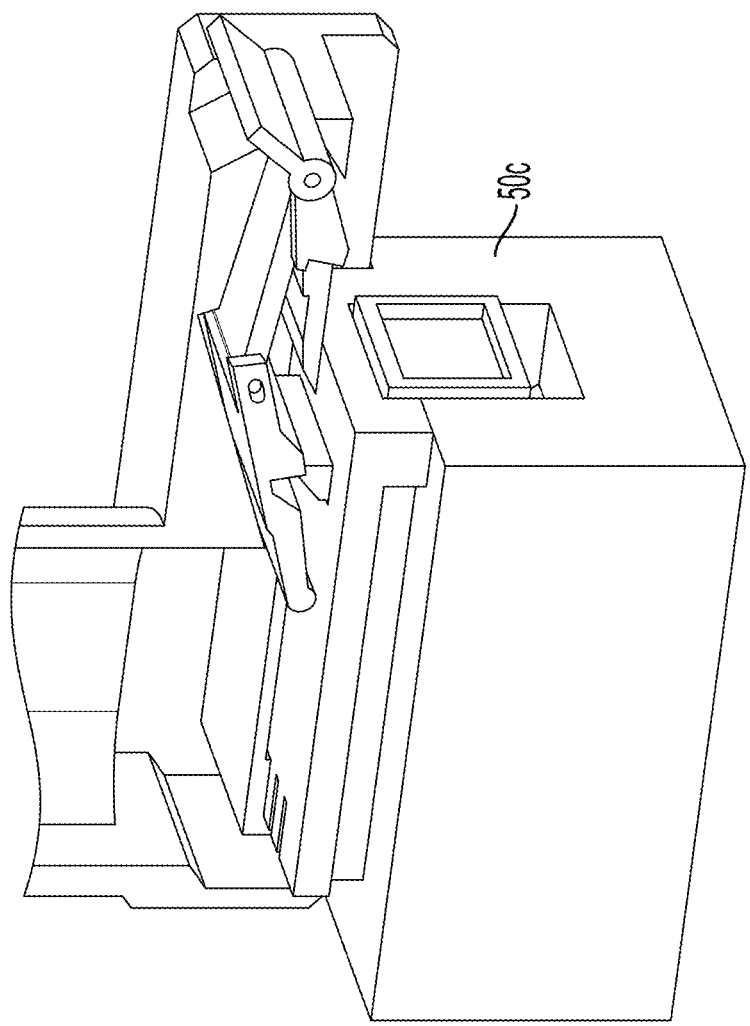
Figure 37:
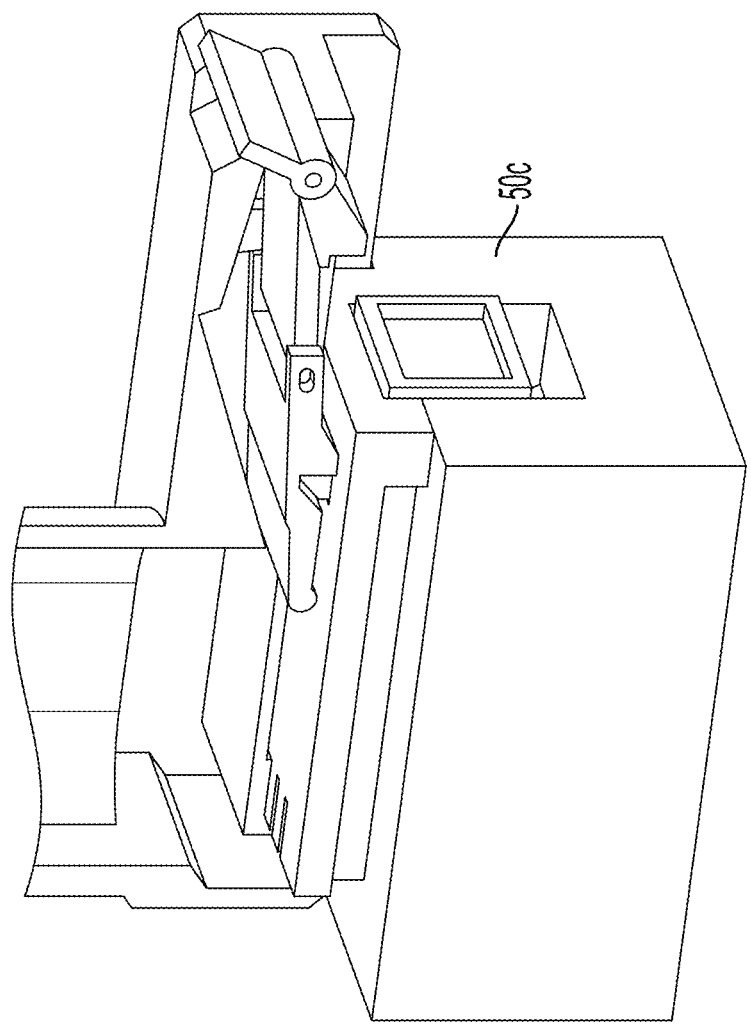
Figure 38:
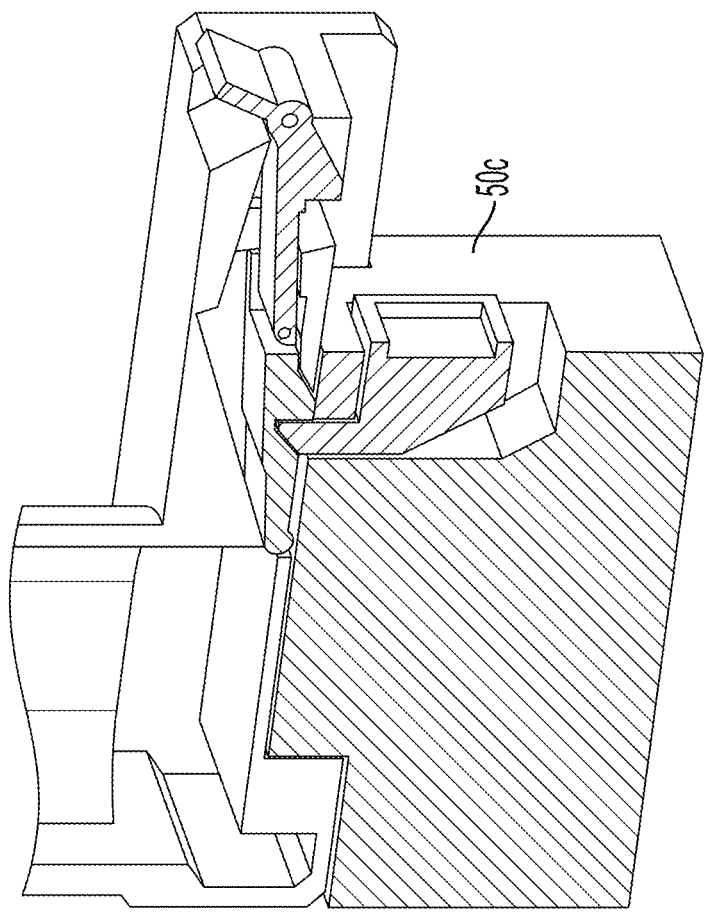
Figure 39:
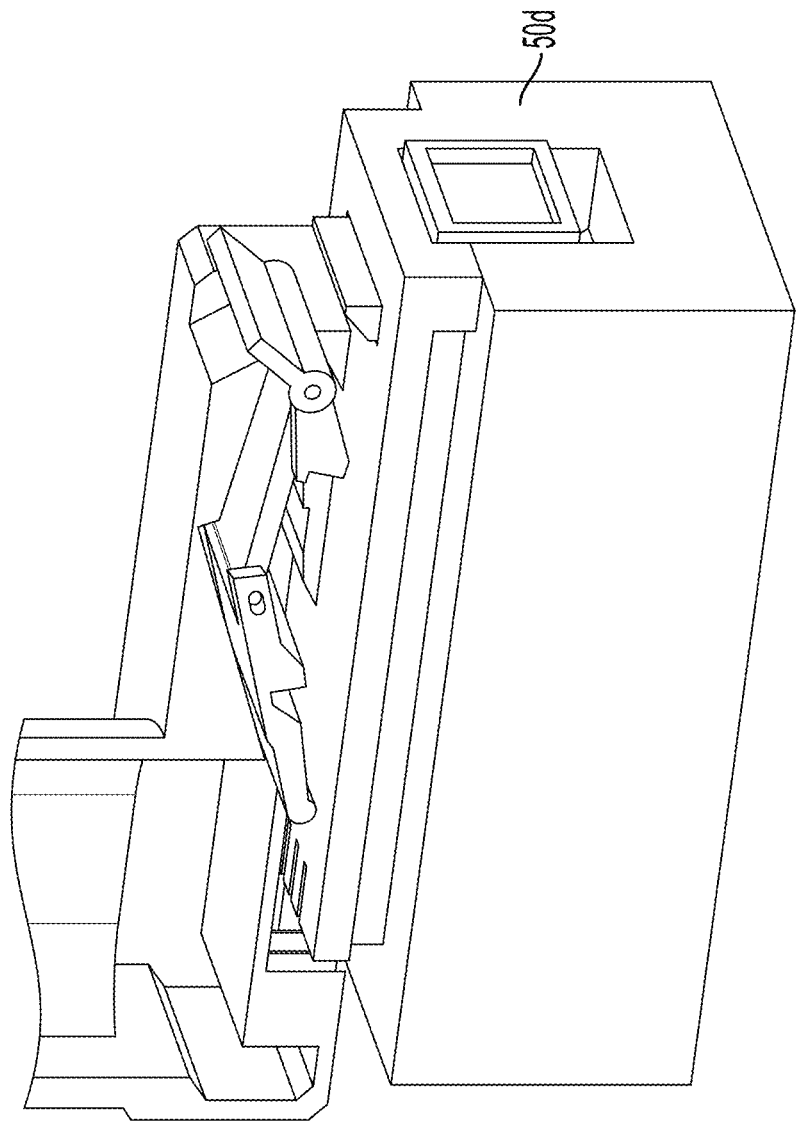
FIGS. 39-45 illustrate the example power tool of FIG. 32 and an example embodiment of a fourth battery pack.
Figure 40:
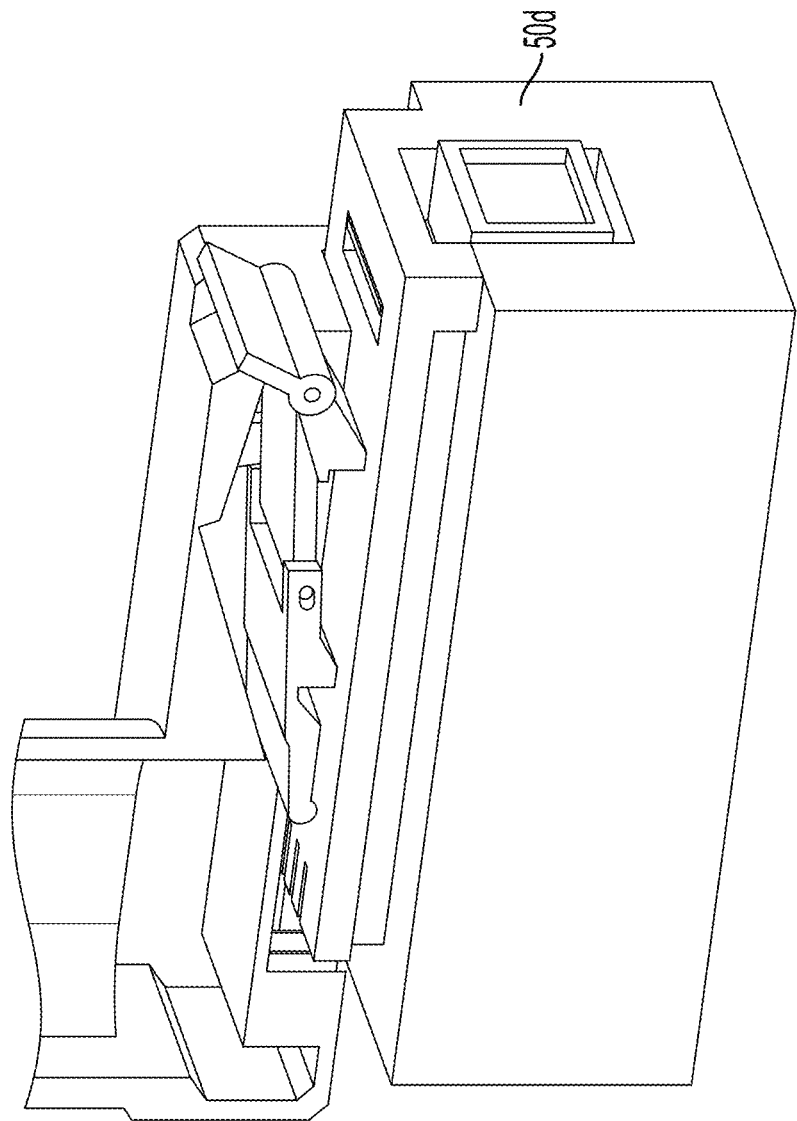
Figure 41:
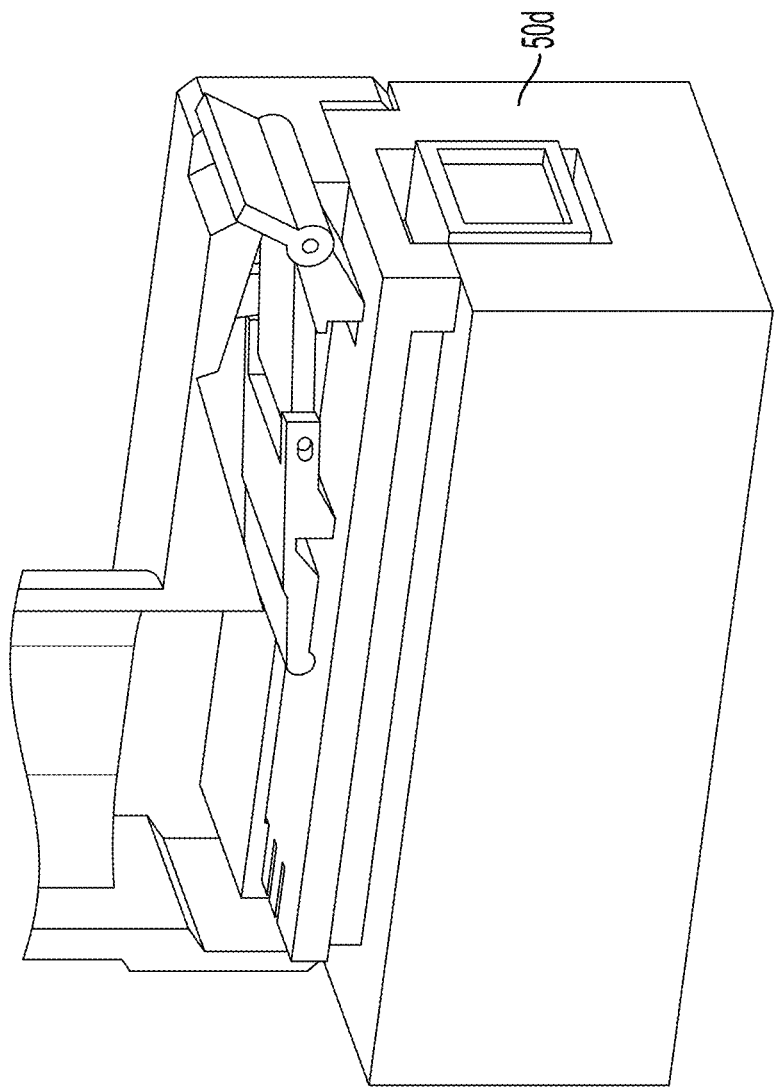
Figure 42:
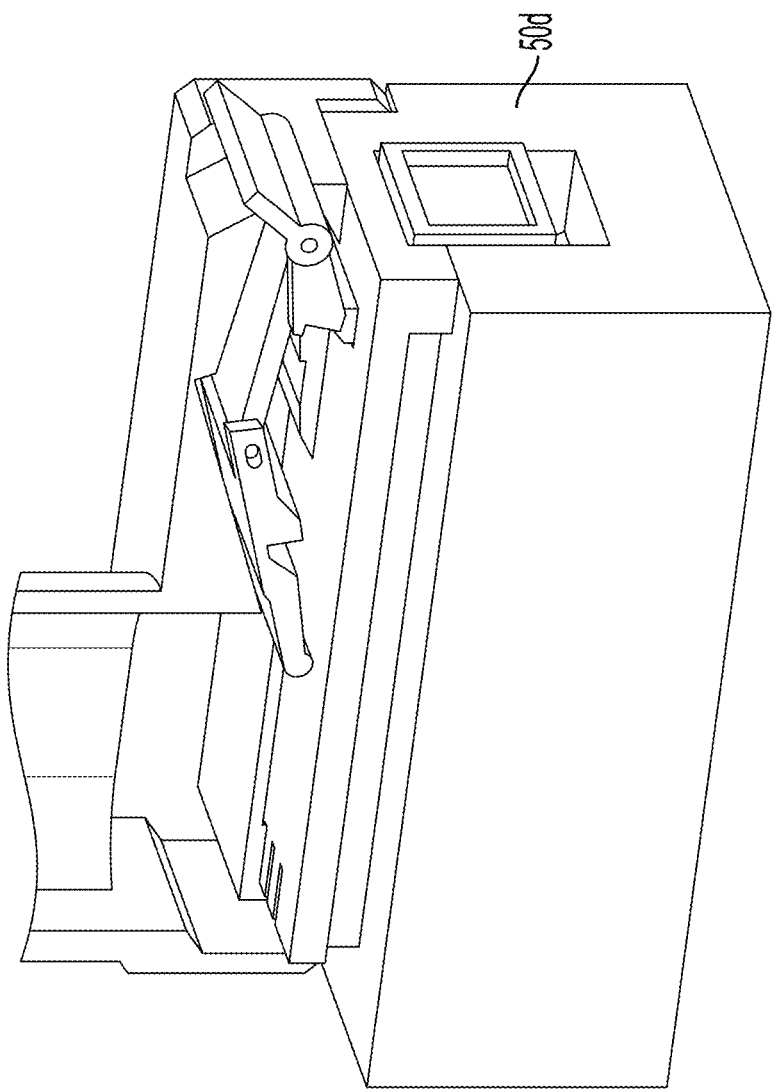
Figure 43:
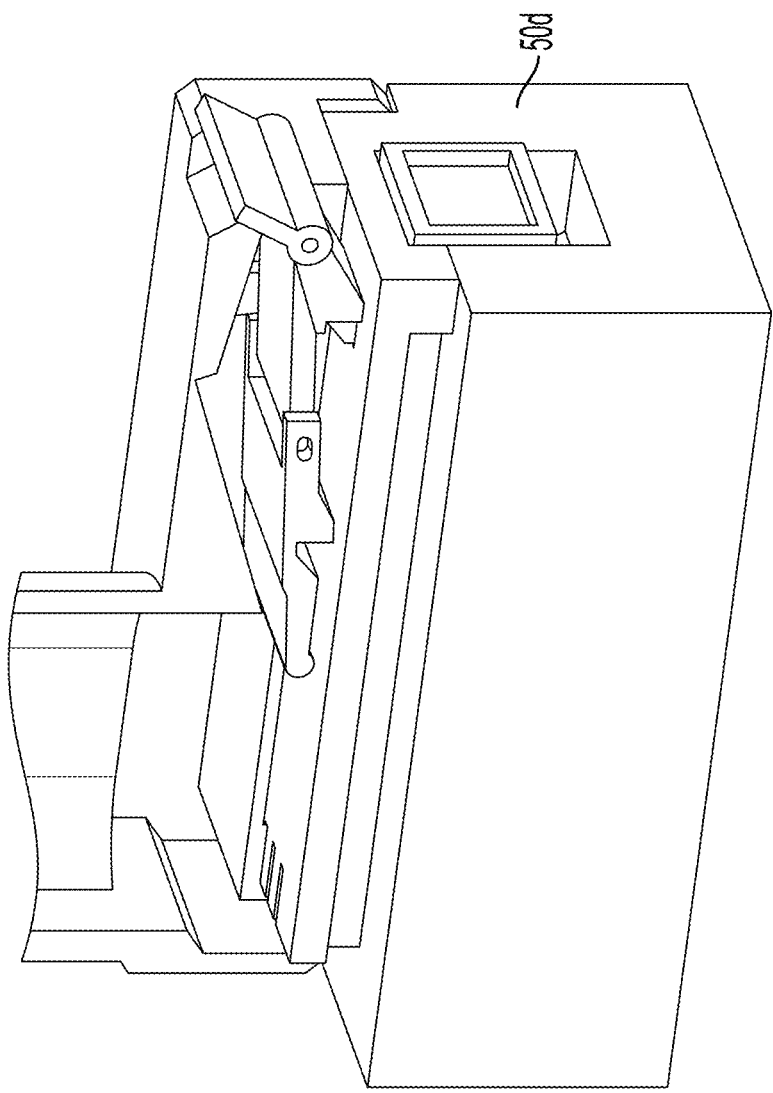
Figure 44:
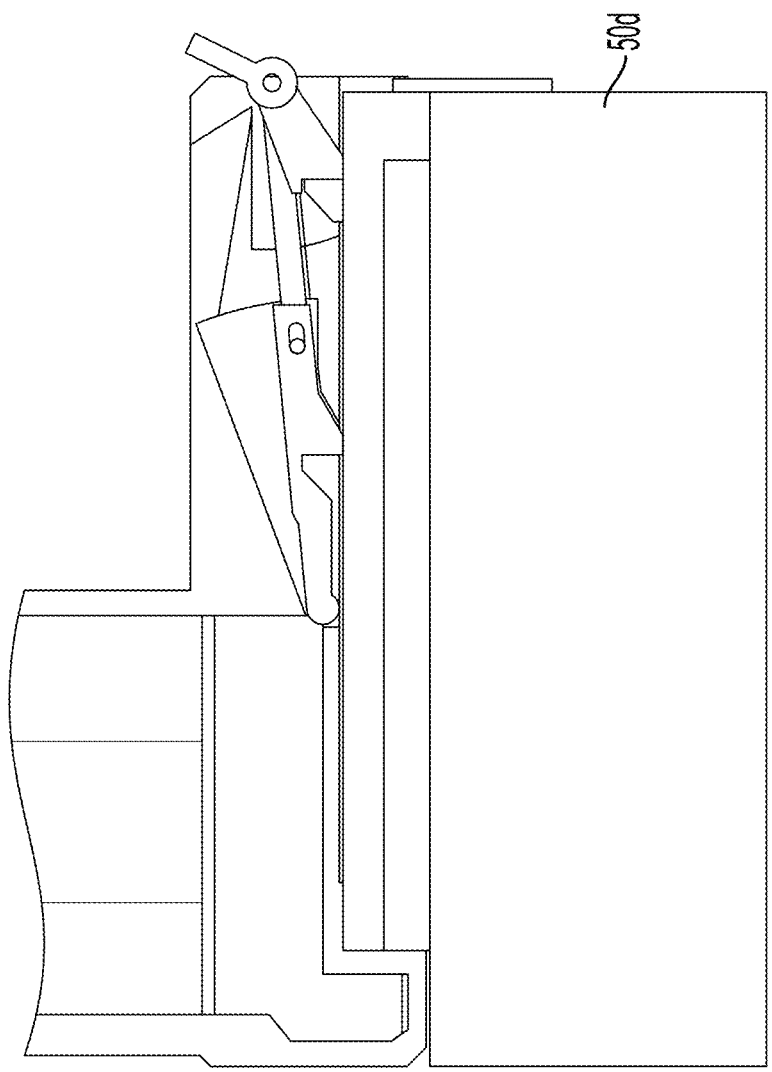
Figure 45:
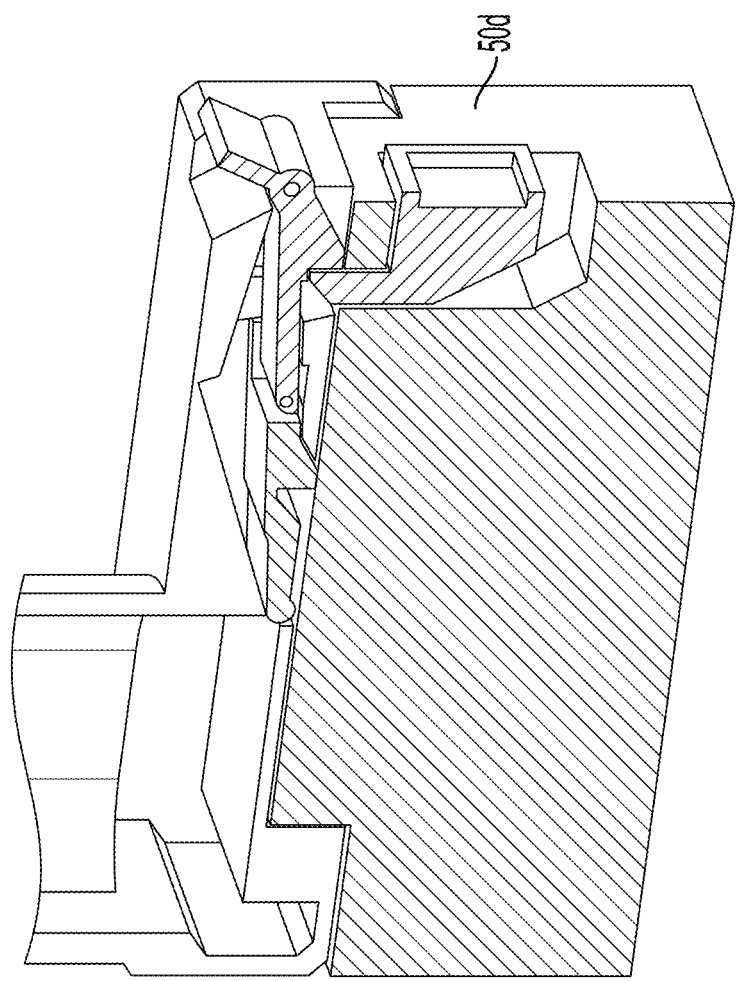
Figure 46:
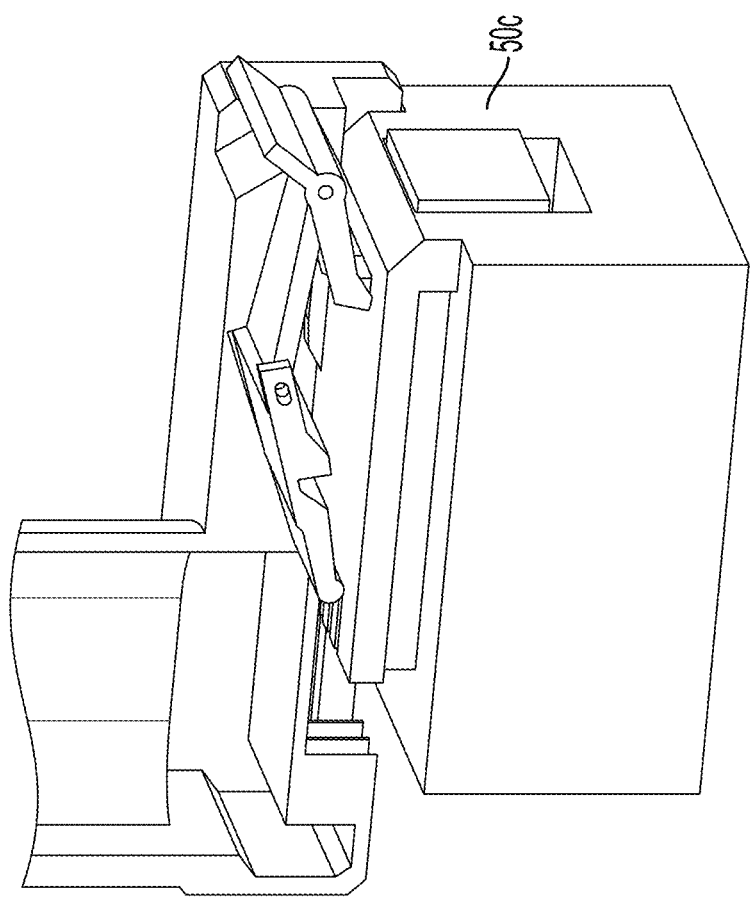
FIGS. 46-53 illustrate the example power tool of FIG. 32 with an alternative example embodiment of the multi-latch mechanism and an alternative example embodiment of the third battery pack.
Figure 47:
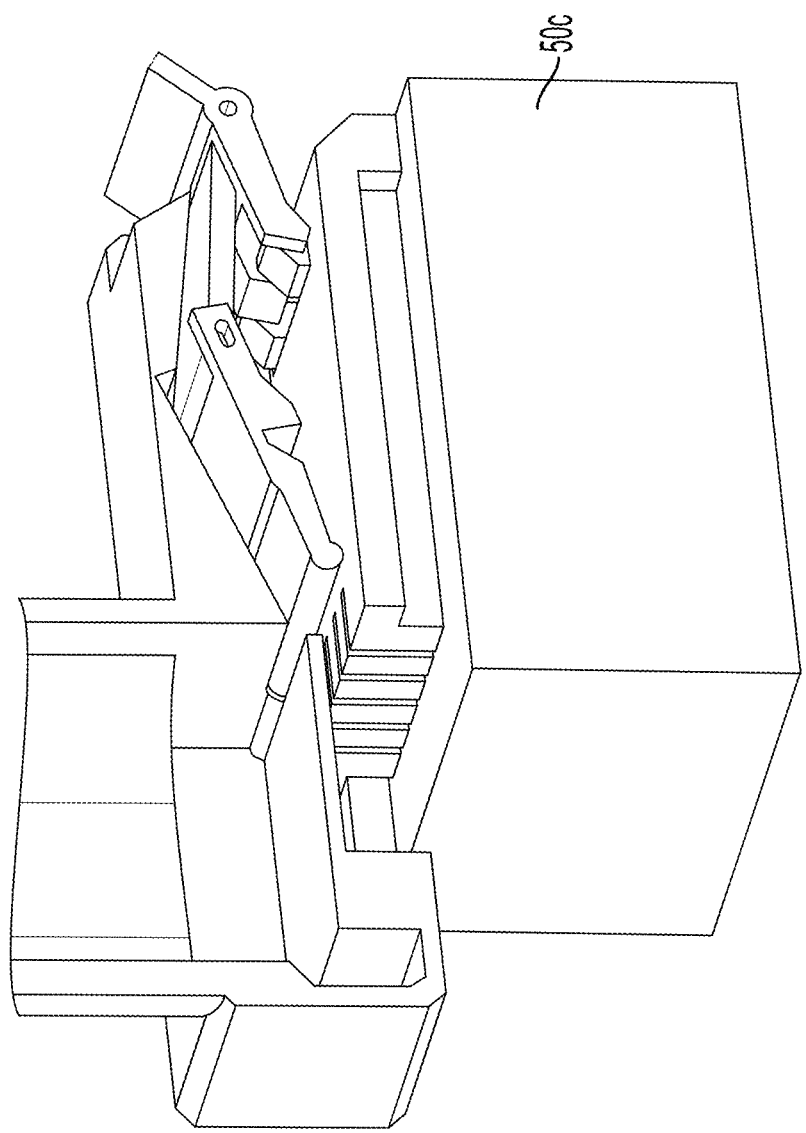
Figure 48:
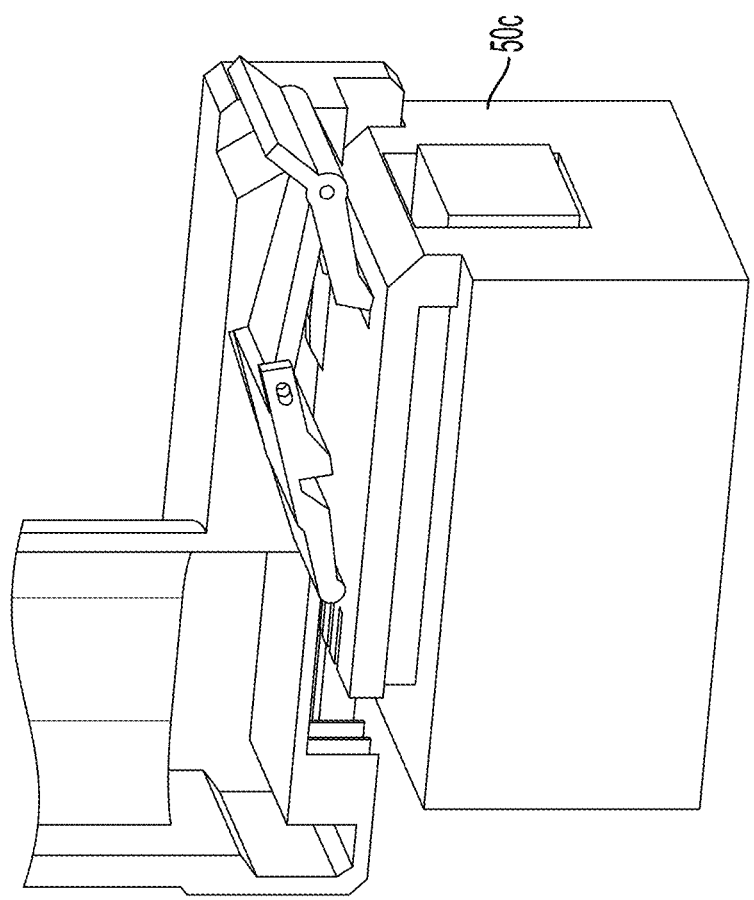
Figure 49:
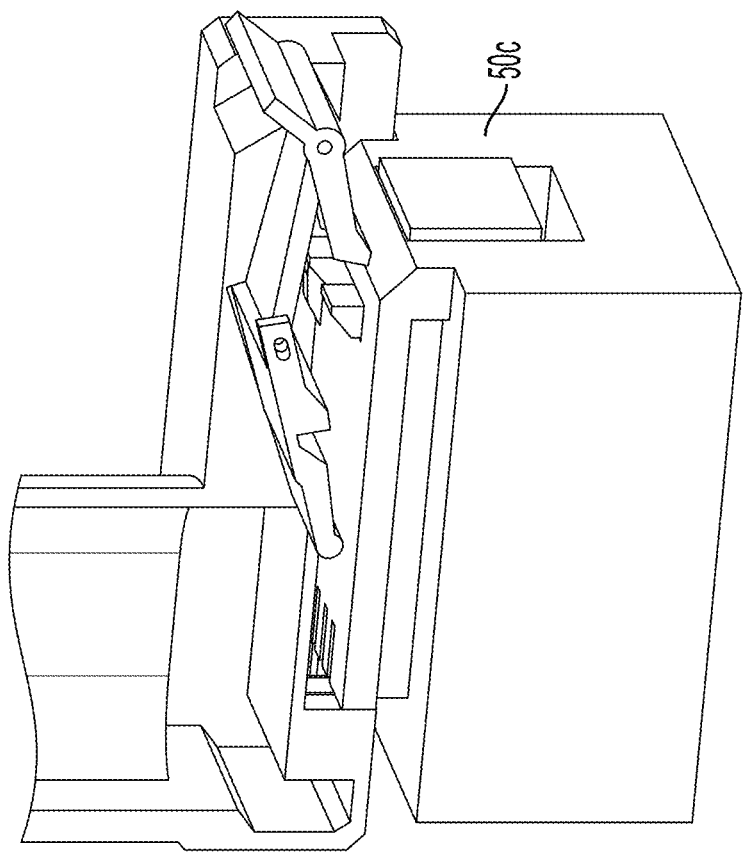
Figure 50:
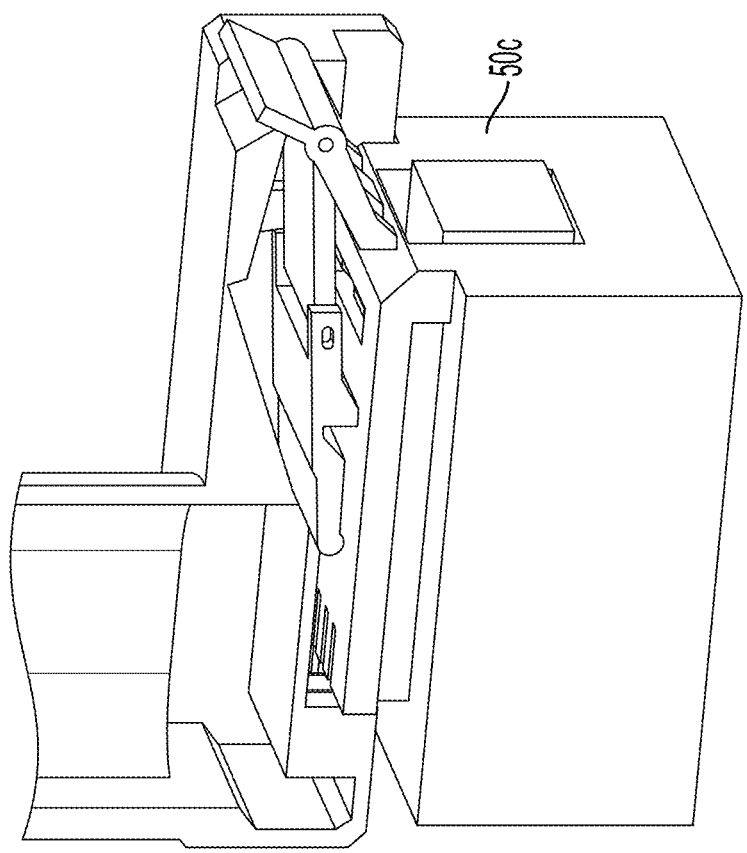
Figure 51:
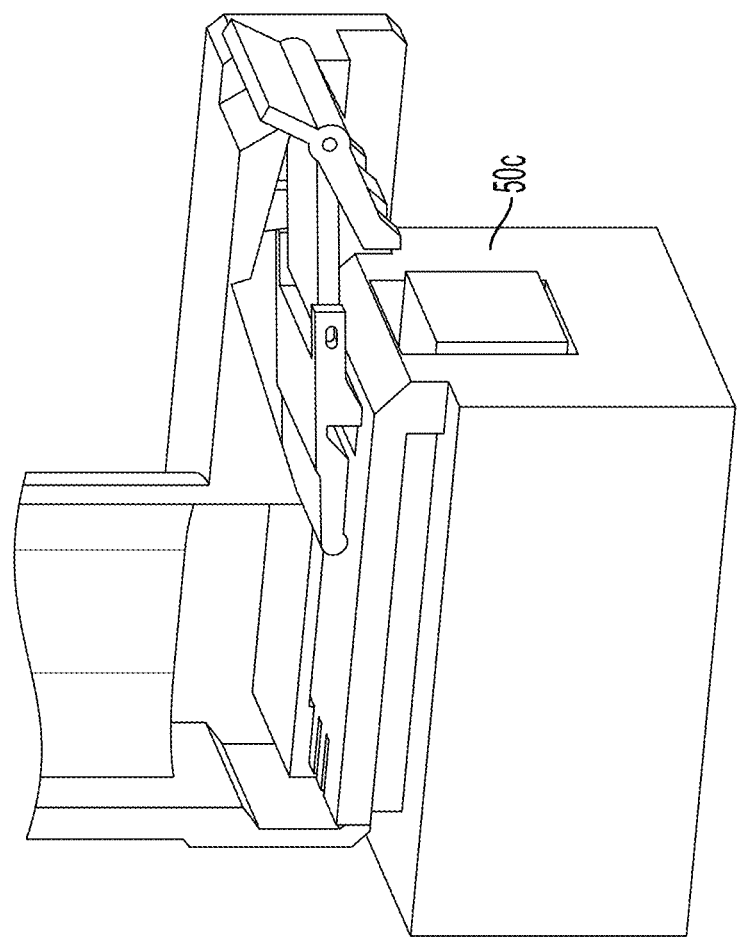
Figure 52:
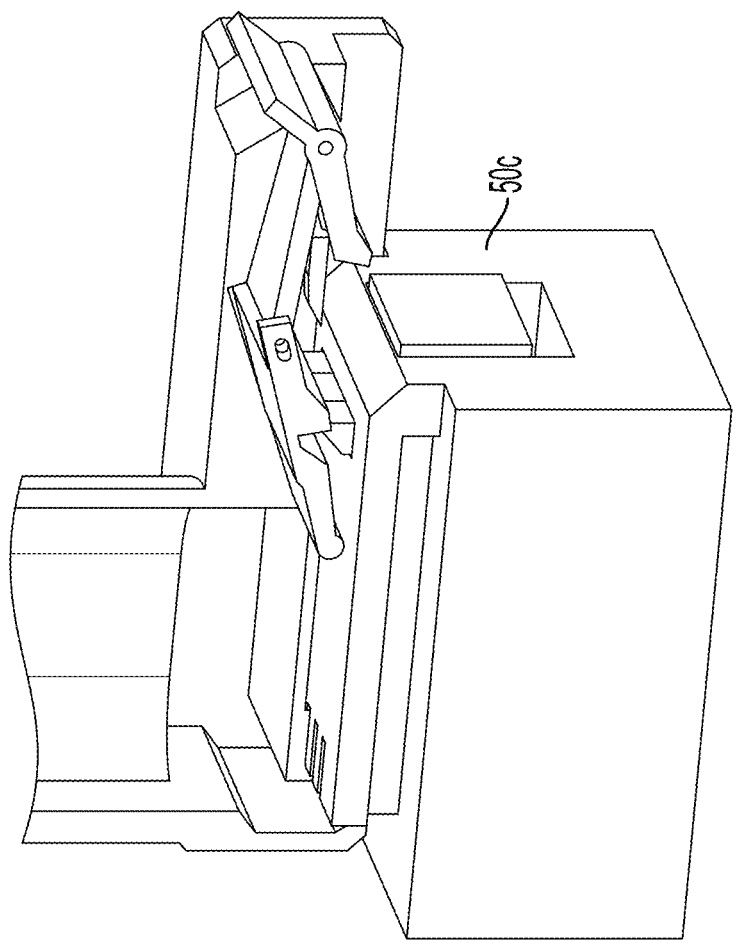
Figure 53:
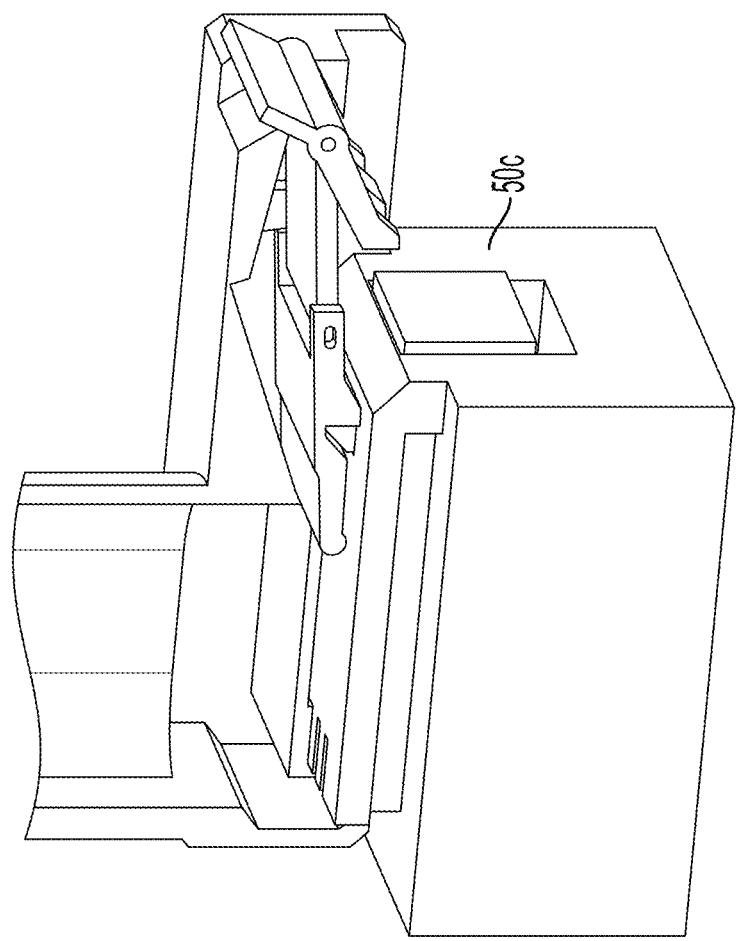
Figure 54:
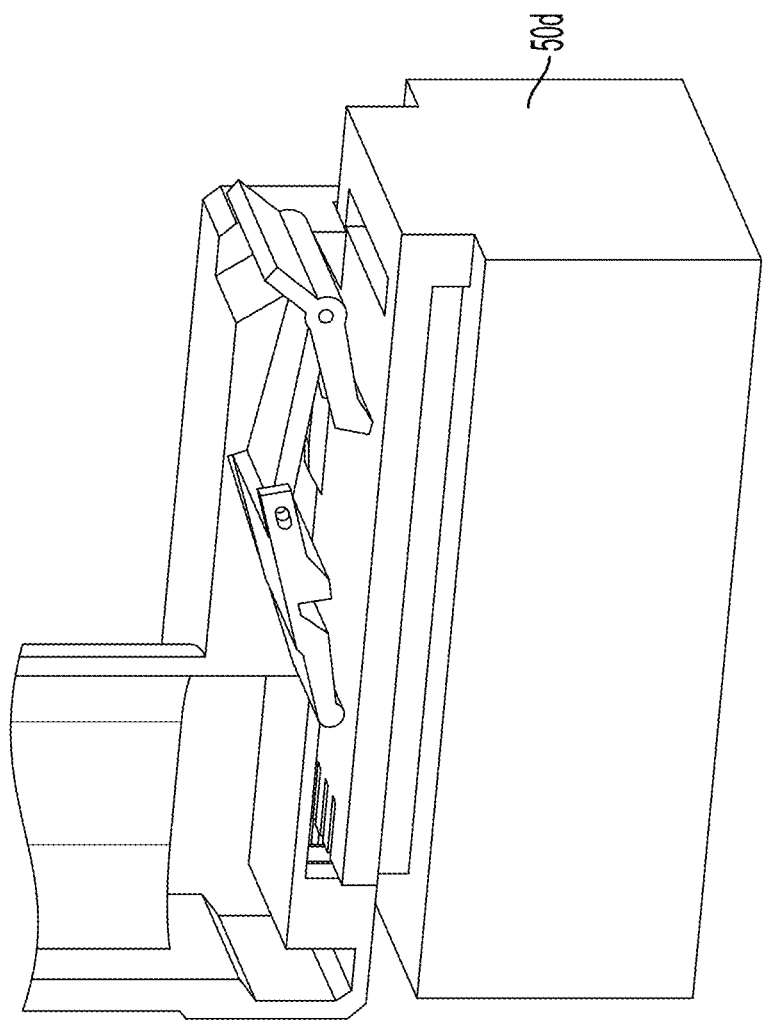
FIGS. 54-58 illustrate the example power tool of FIGS. 46-53 and an alternative example embodiment of the fourth battery pack.
Figure 55:
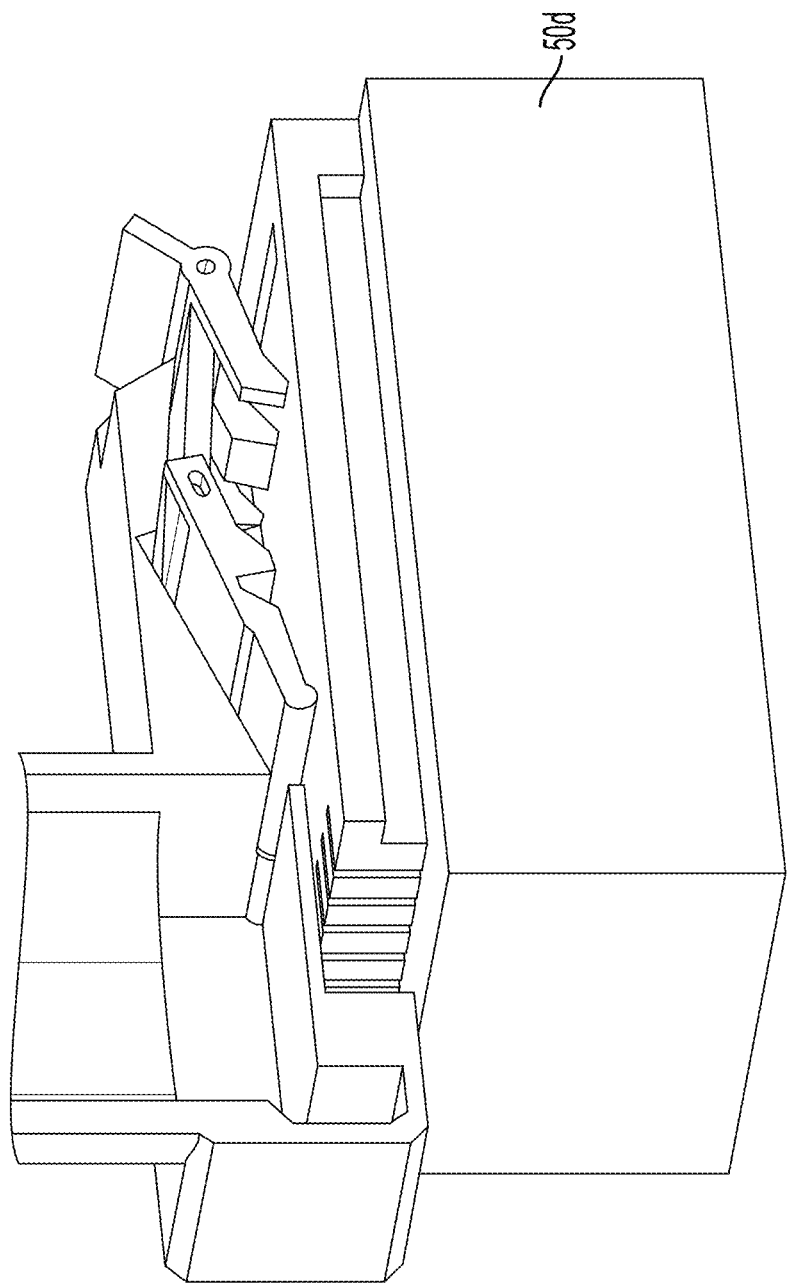
Figure 56:
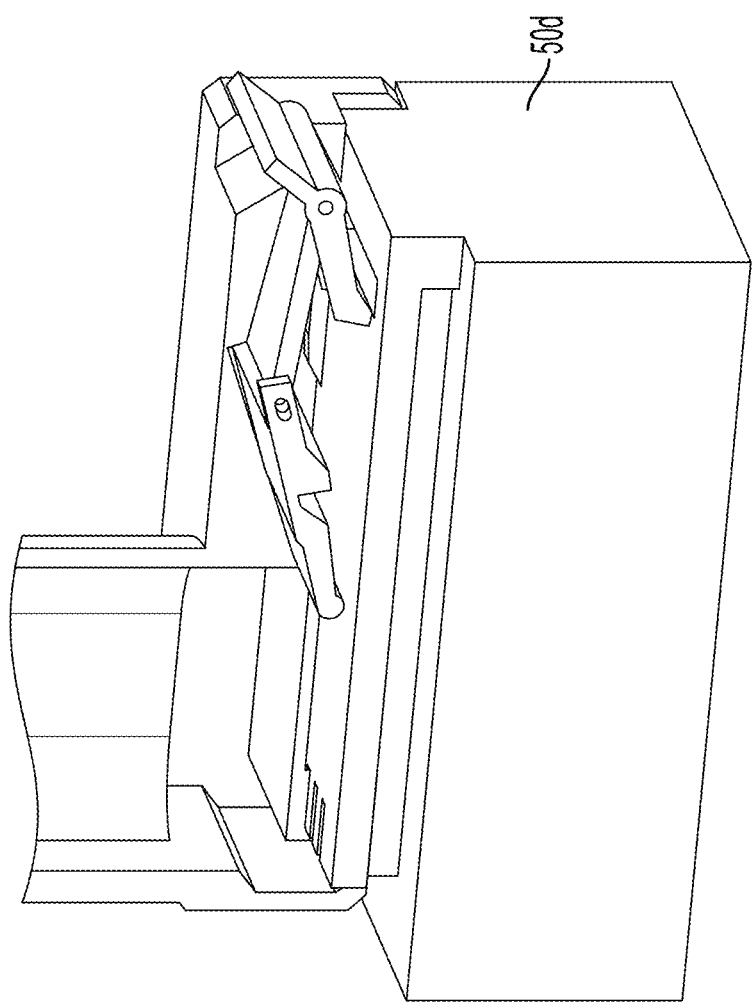
Figure 57:
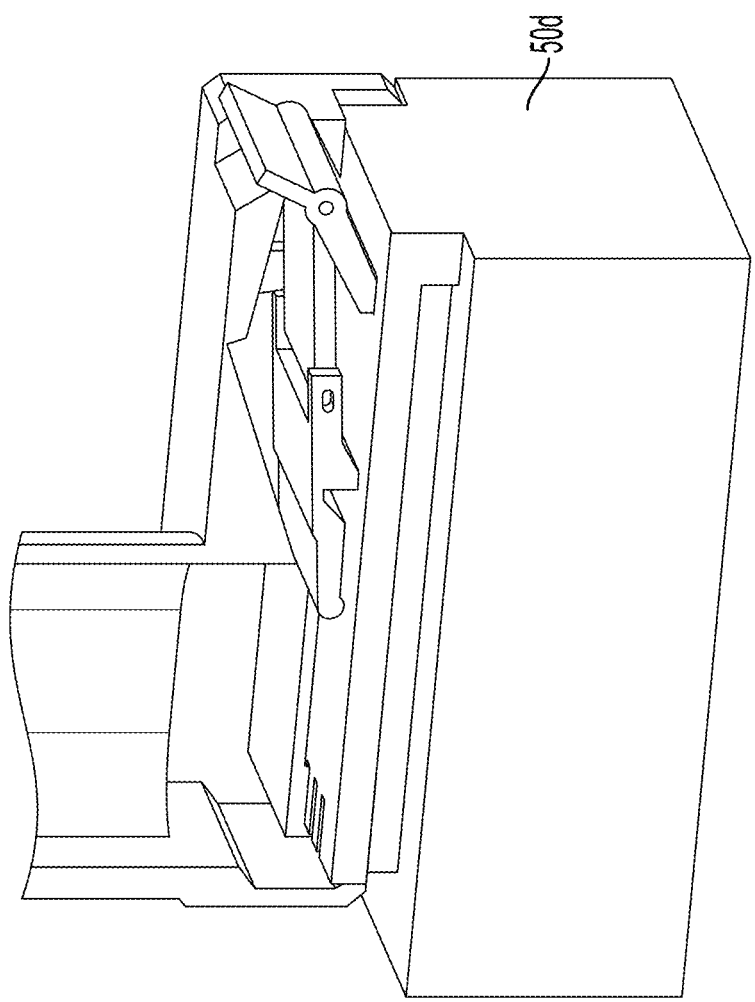
Figure 58:
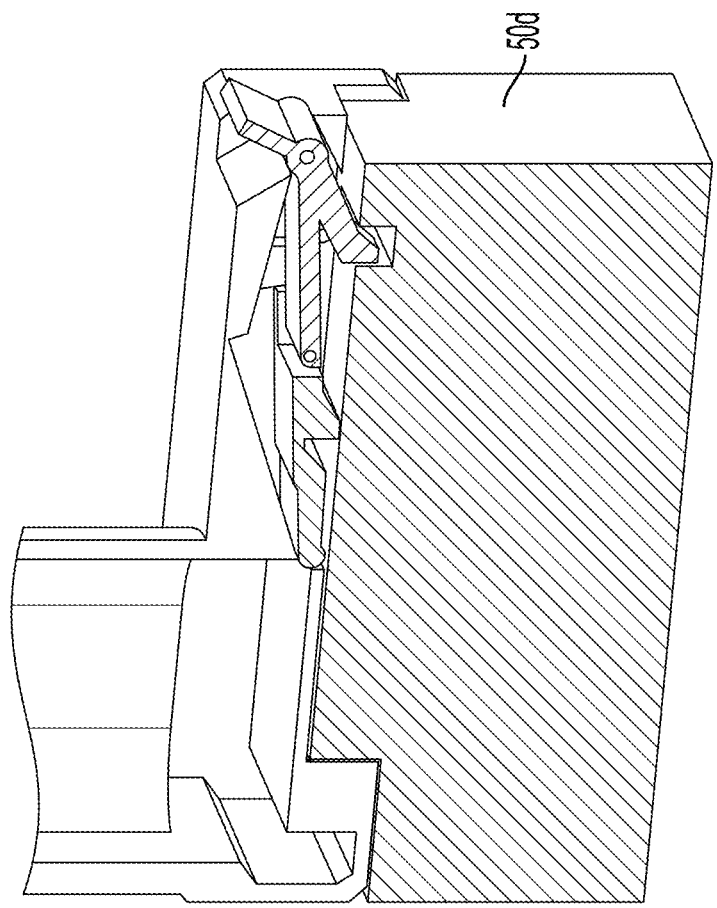
Figure 59:
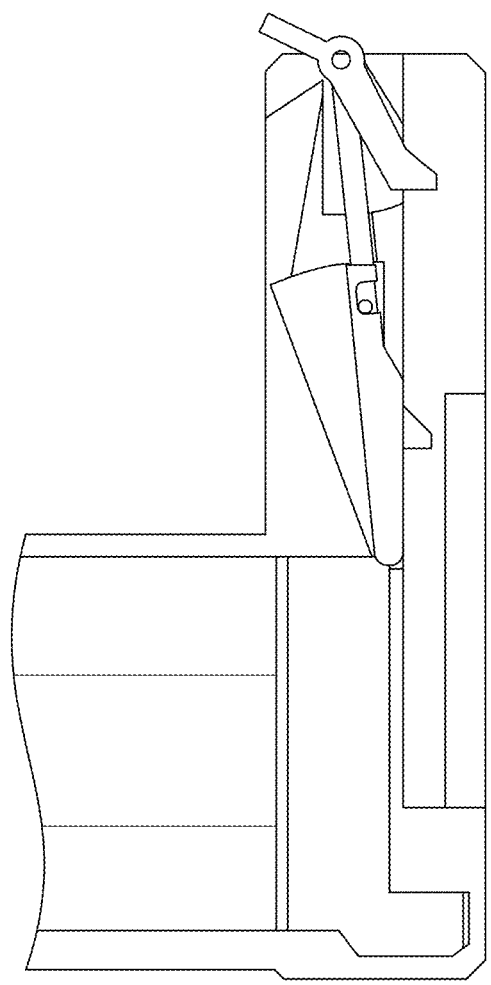
FIG. 59 illustrates a partial left side, elevation view of another example embodiment of a power tool having another example embodiment of a multi-latch mechanism, wherein half of the tool housing is removed.
Figure 60:
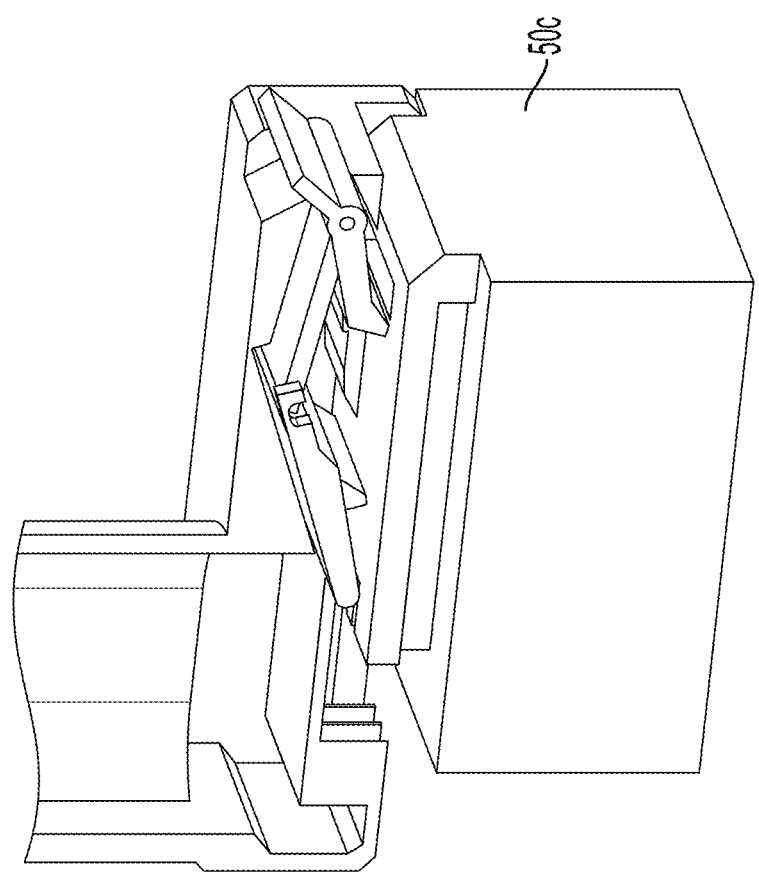
FIGS. 60-63 illustrate the example power tool of FIG. 32 with an alternative example embodiment of the multi-latch mechanism and an alternative example embodiment of the third battery pack.
Figure 61:
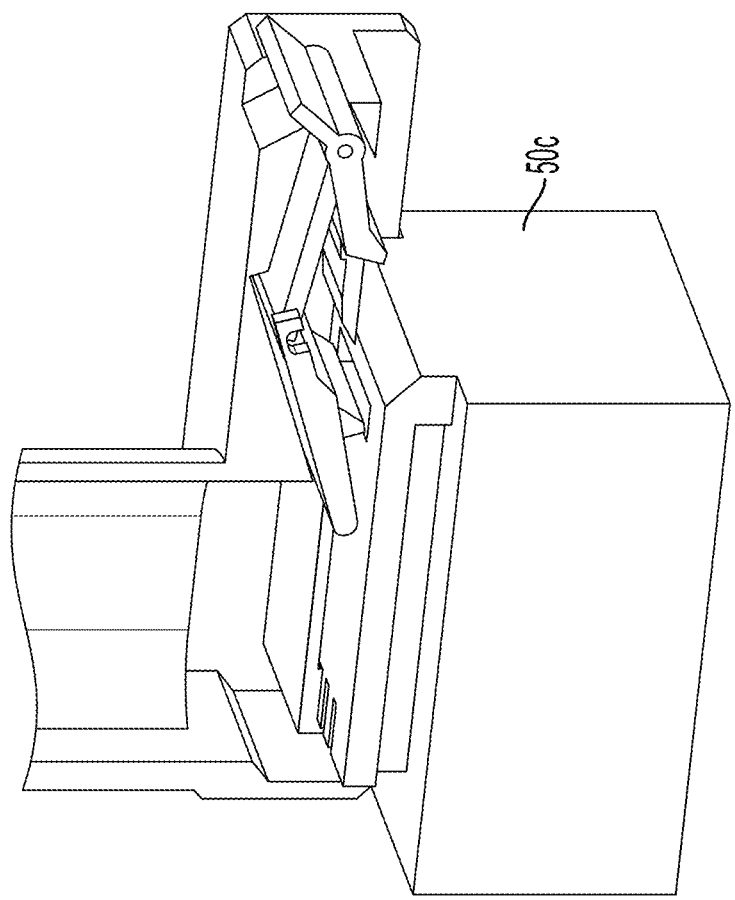
Figure 62:
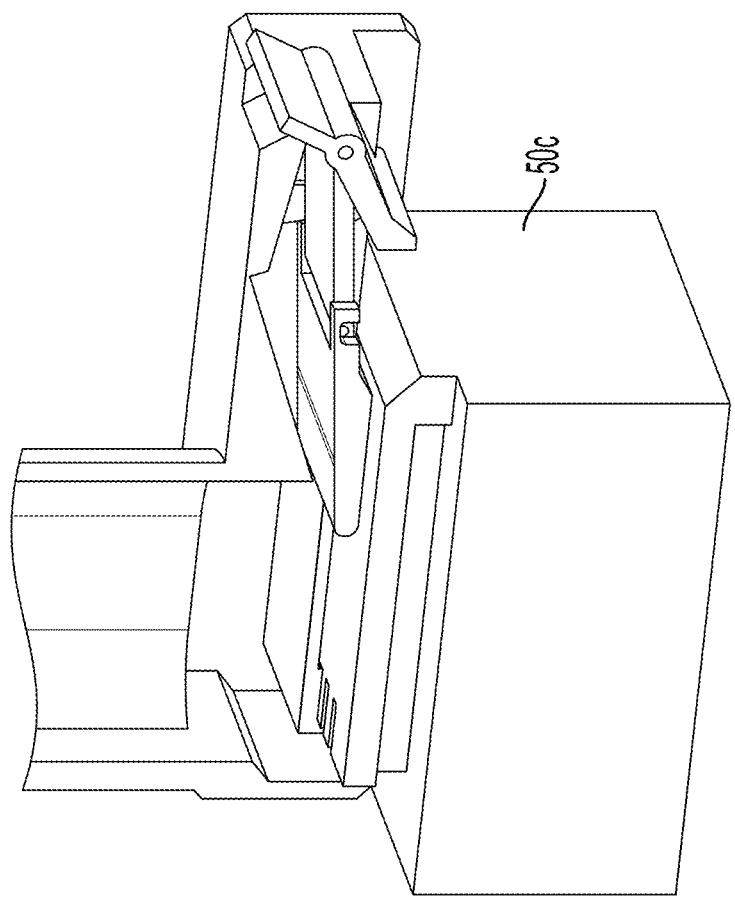
Figure 63:
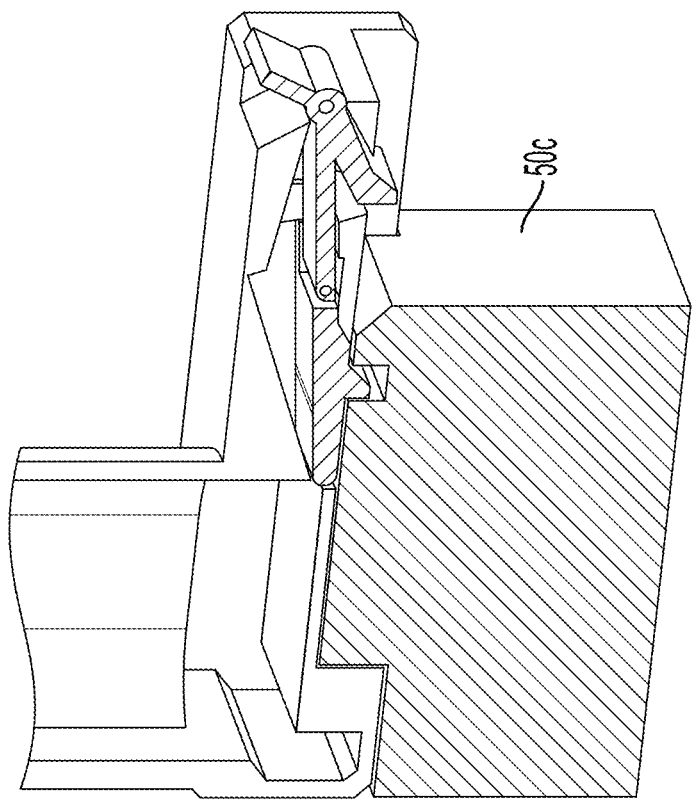
Figure 64:
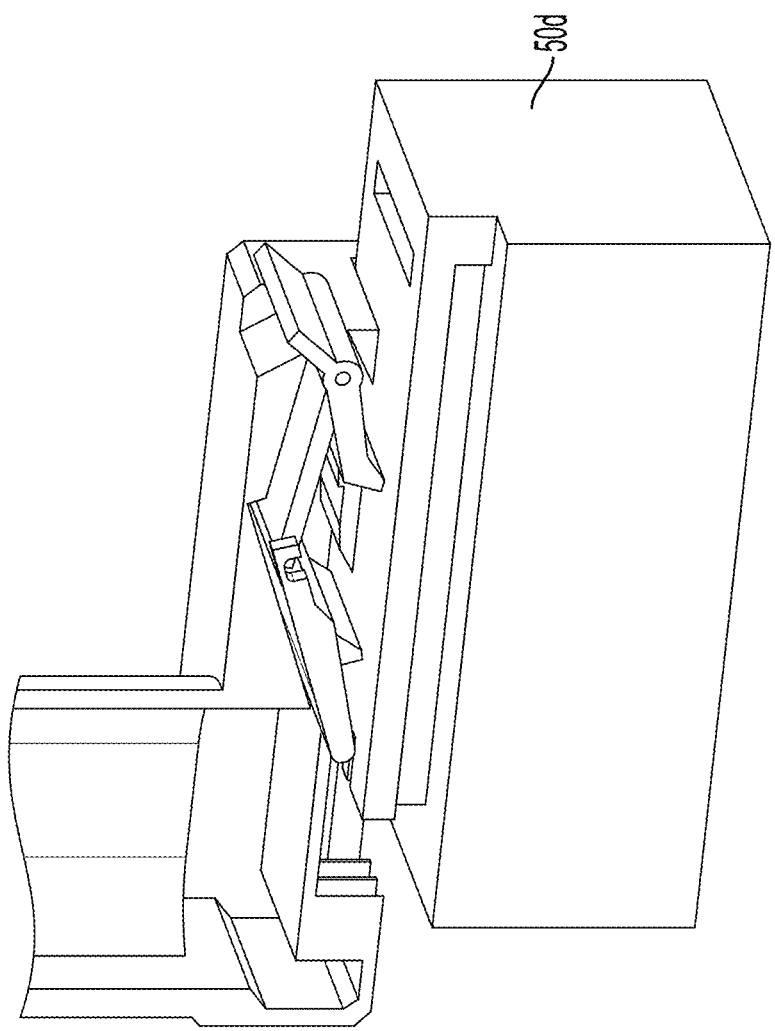
FIGS. 64-67 illustrate the example power tool of FIGS. 59-63 and an alternative example embodiment of the fourth battery pack.
Figure 65:
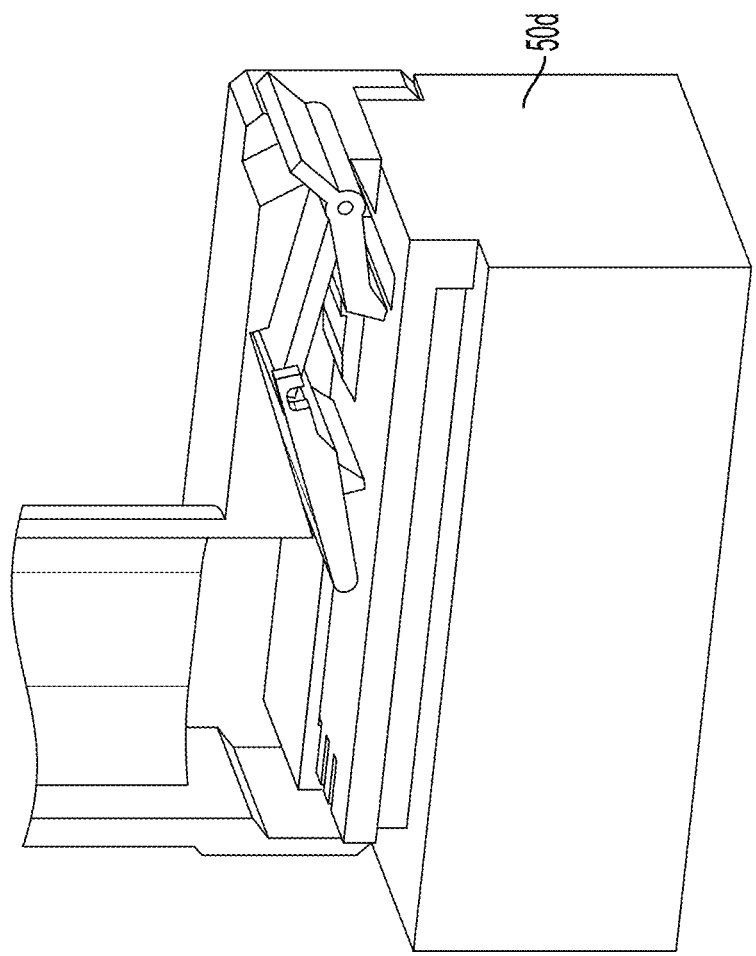
Figure 66:
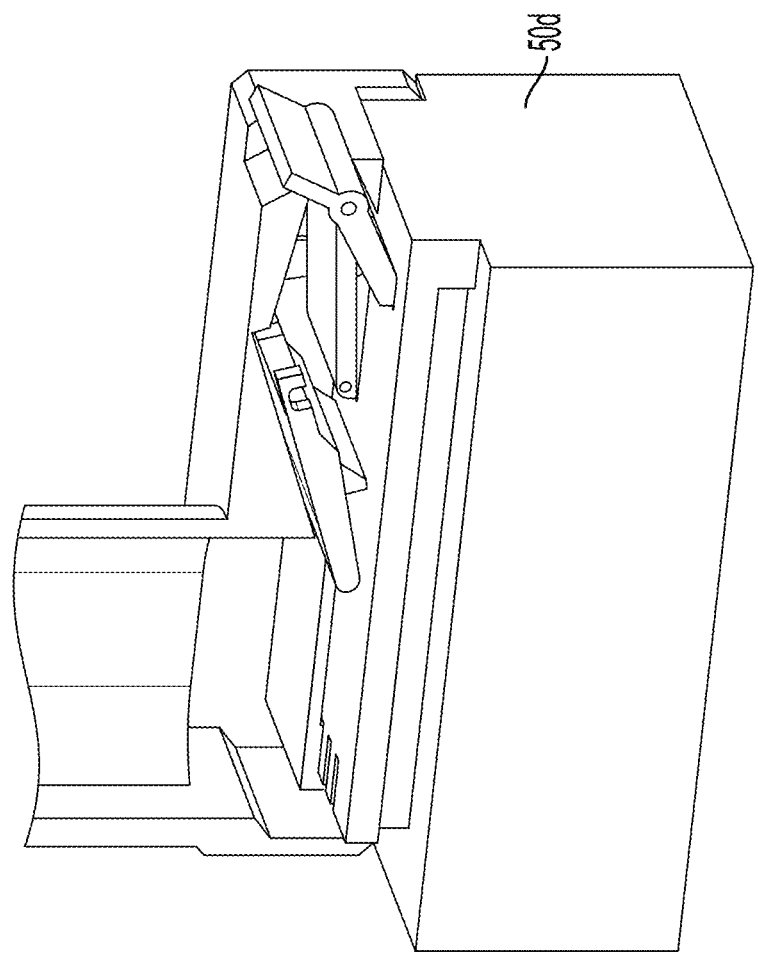
Figure 67:
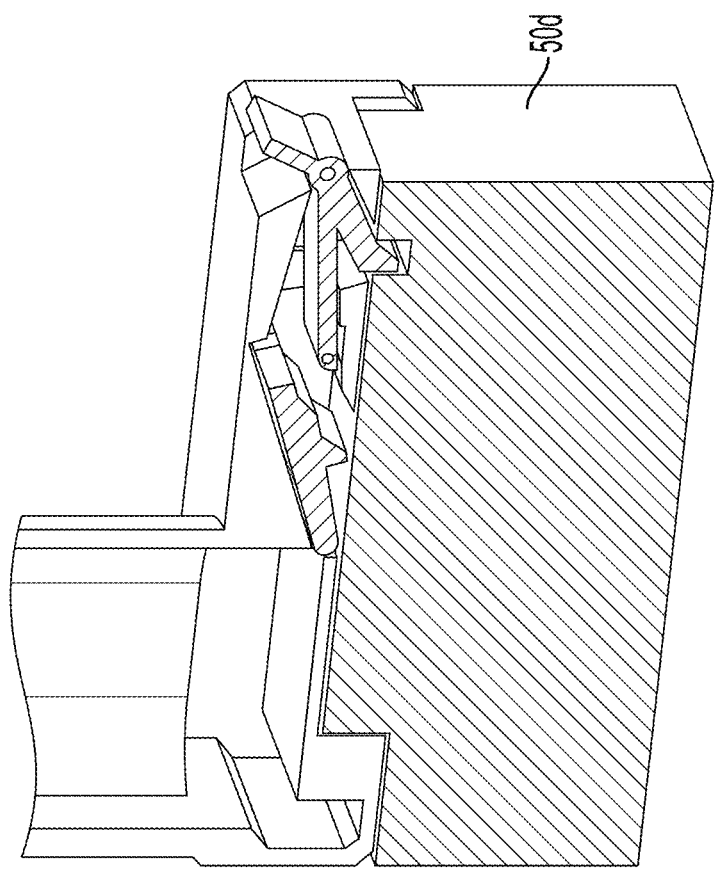
Figure 68:
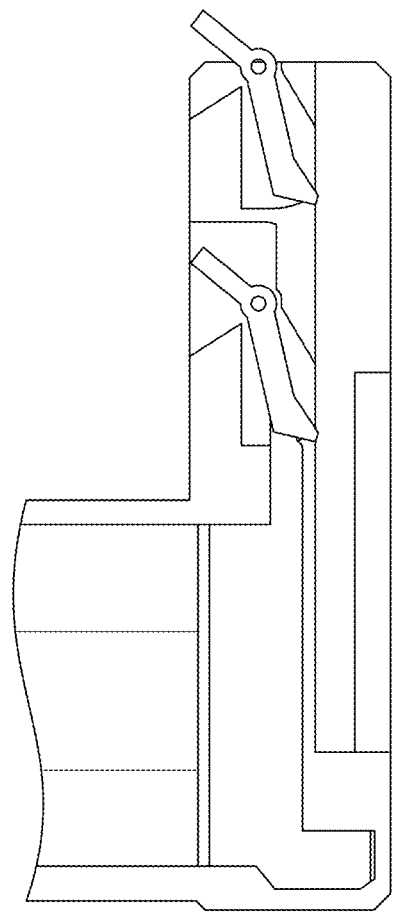
FIG. 68 illustrates a partial left side, elevation view of another example embodiment of a power tool having another example embodiment of a multi-latch mechanism, wherein half of the tool housing is removed.
Figure 69:
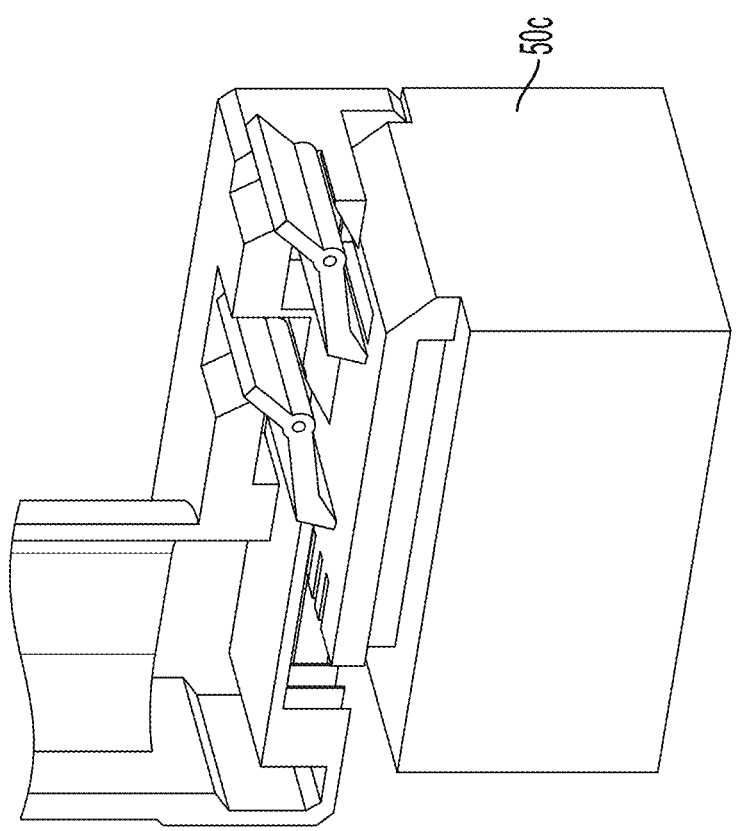
FIGS. 69-76 illustrate the example power tool of FIG. 68 and the example embodiment of the third battery pack of FIGS. 60-63.
Figure 70:
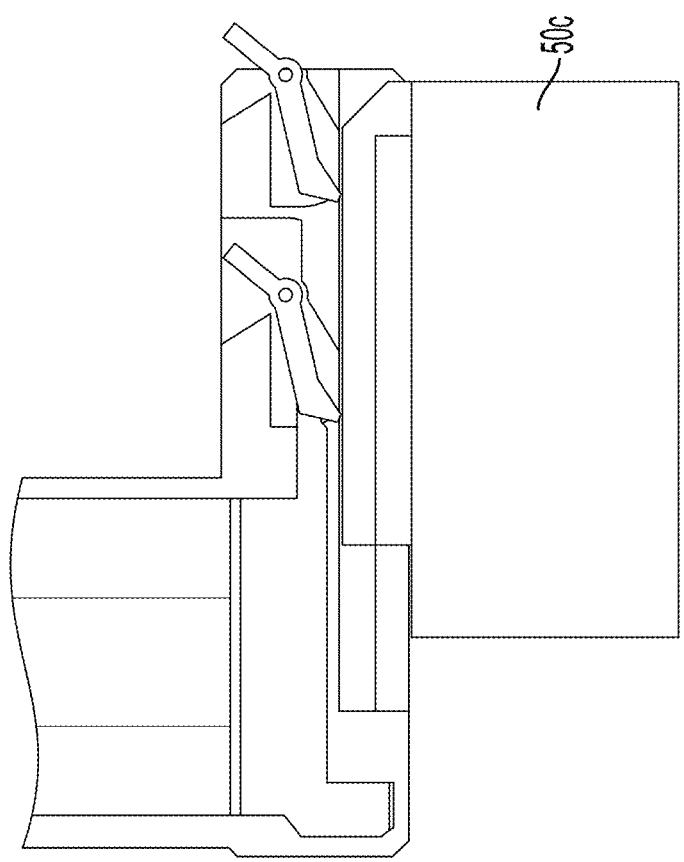
Figure 71:
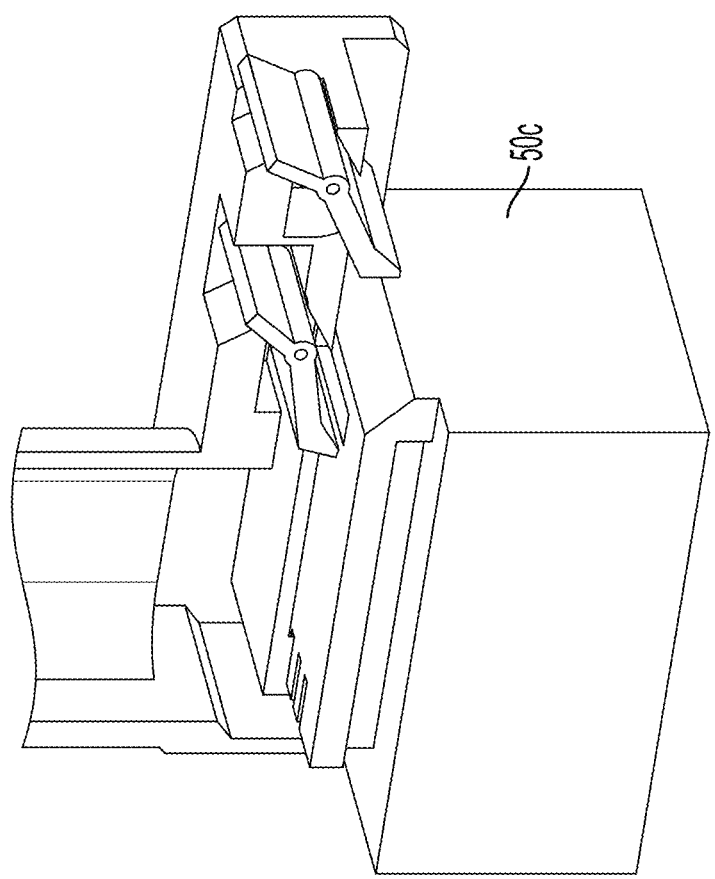
Figure 72:
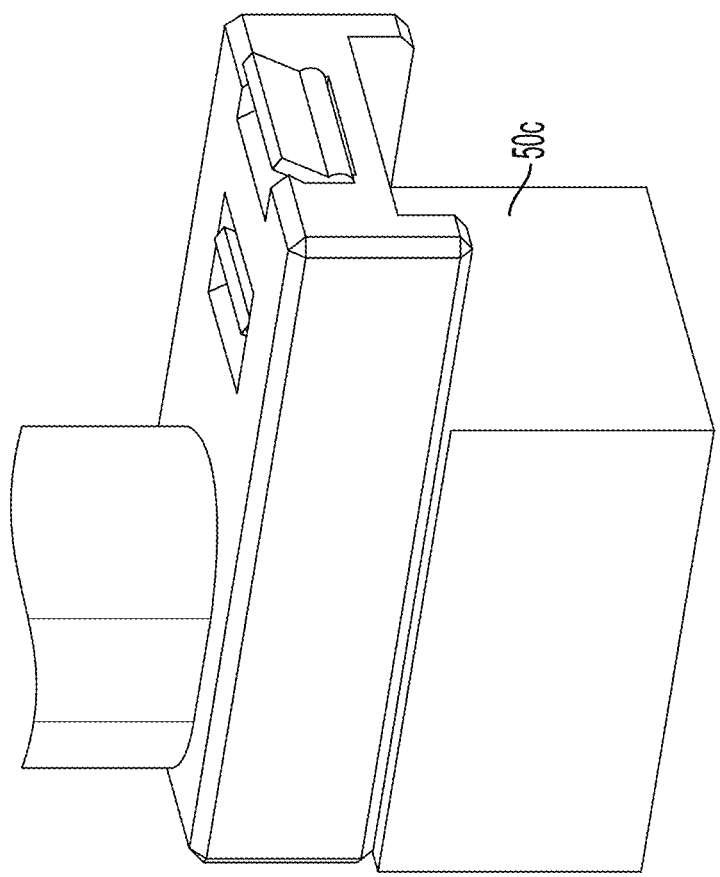
Figure 73:
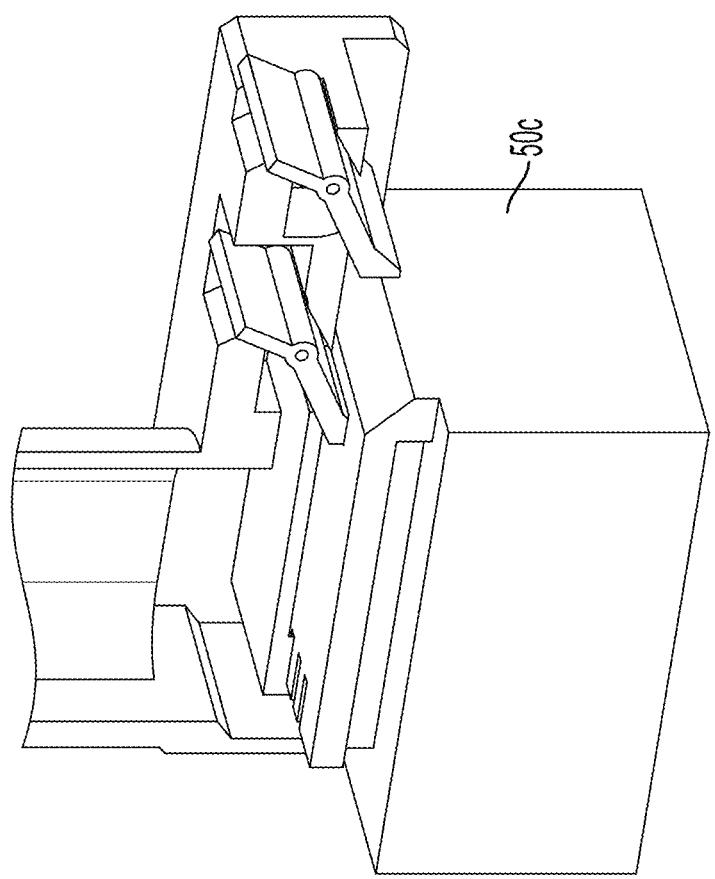
Figure 74:
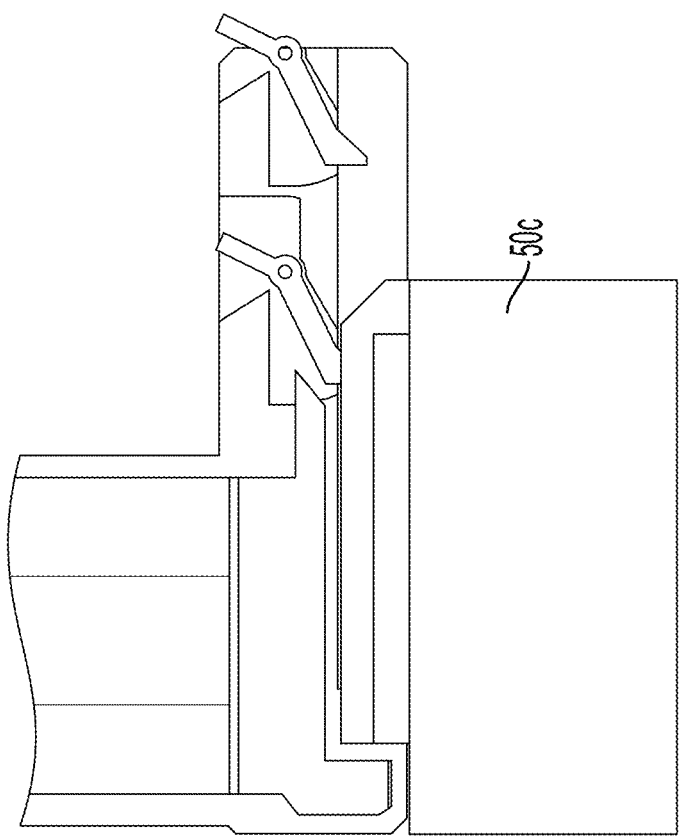
Figure 75:
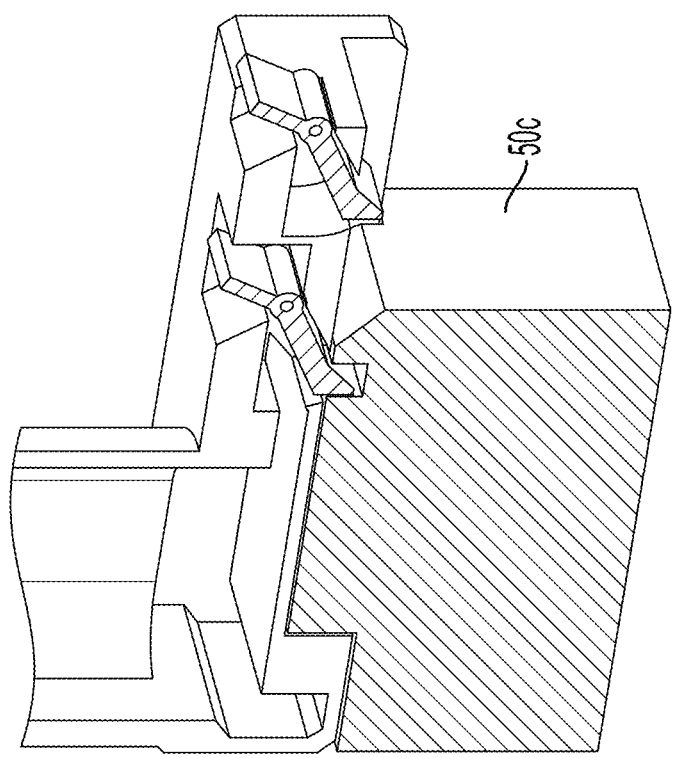
Figure 76:
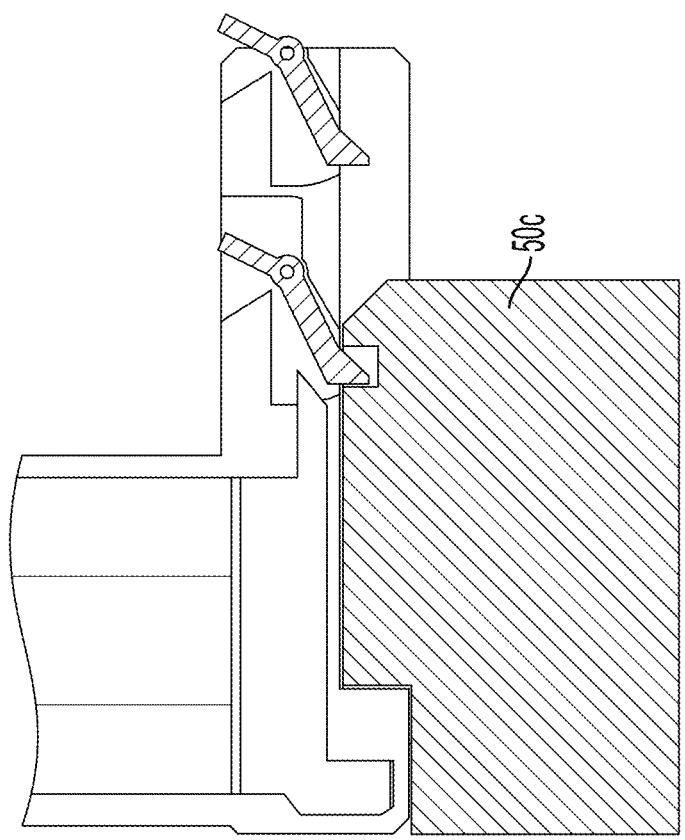
Figure 77:
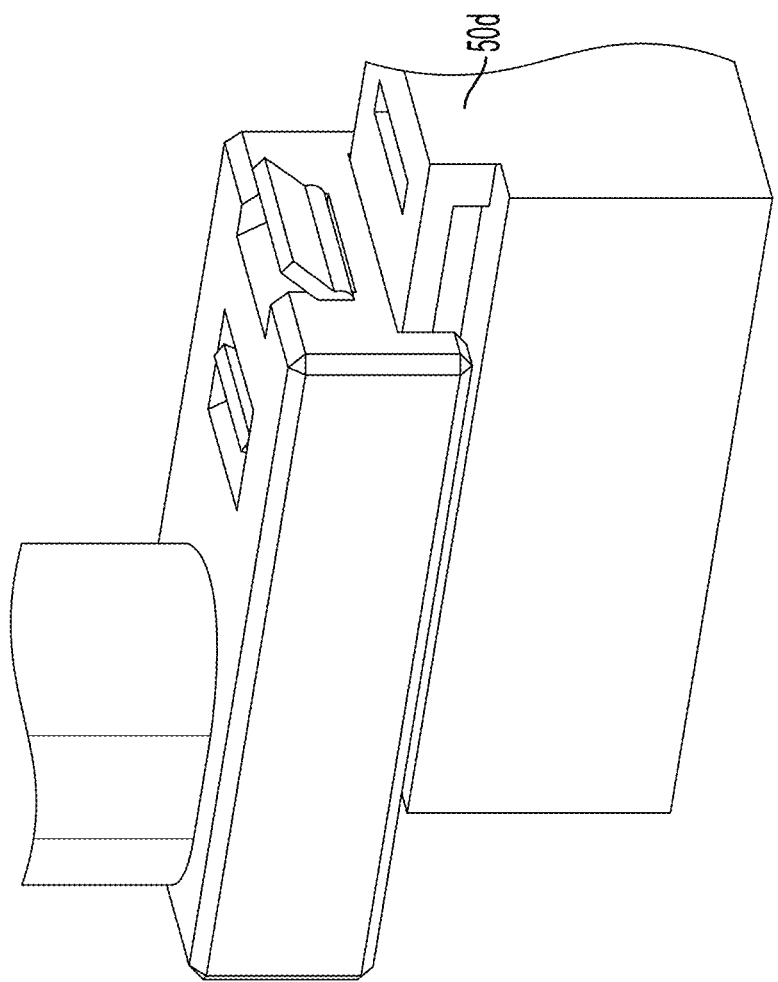
FIGS. 77-84 illustrate the example power tool of FIG. 68 and the example embodiment of the fourth battery pack of FIGS. 64-67.
Figure 78:
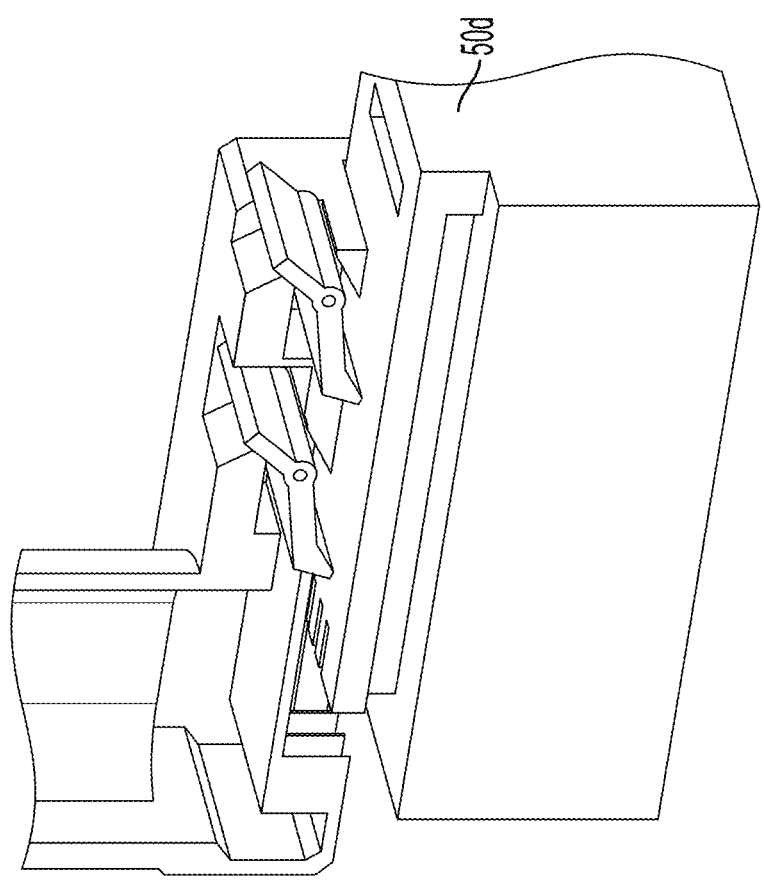
Figure 79:
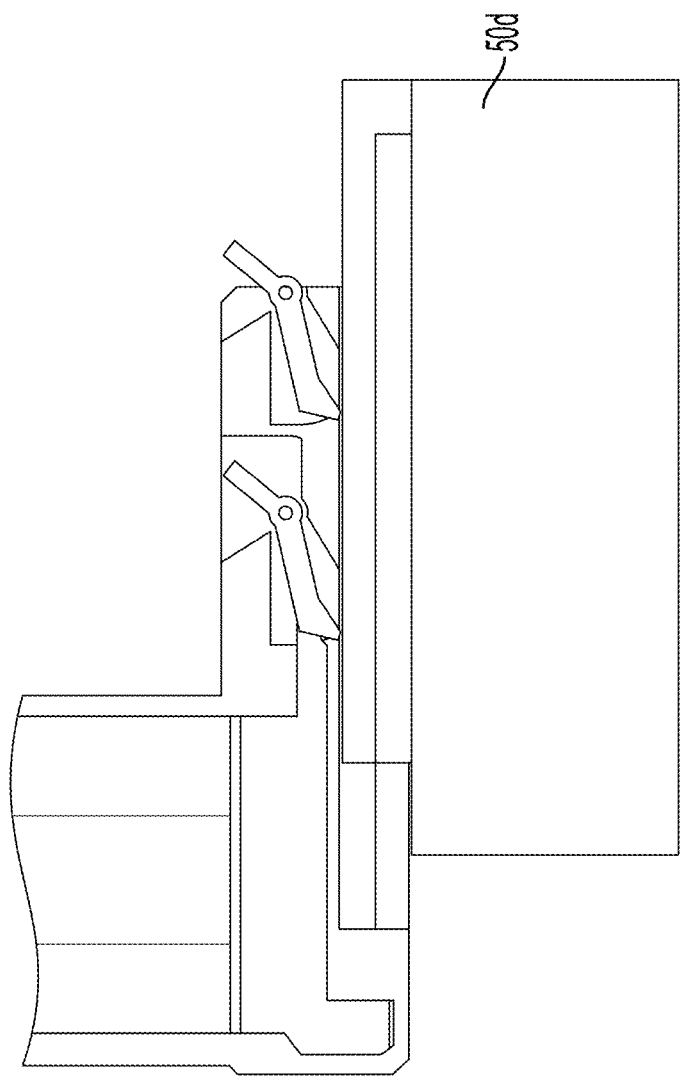
Figure 80:
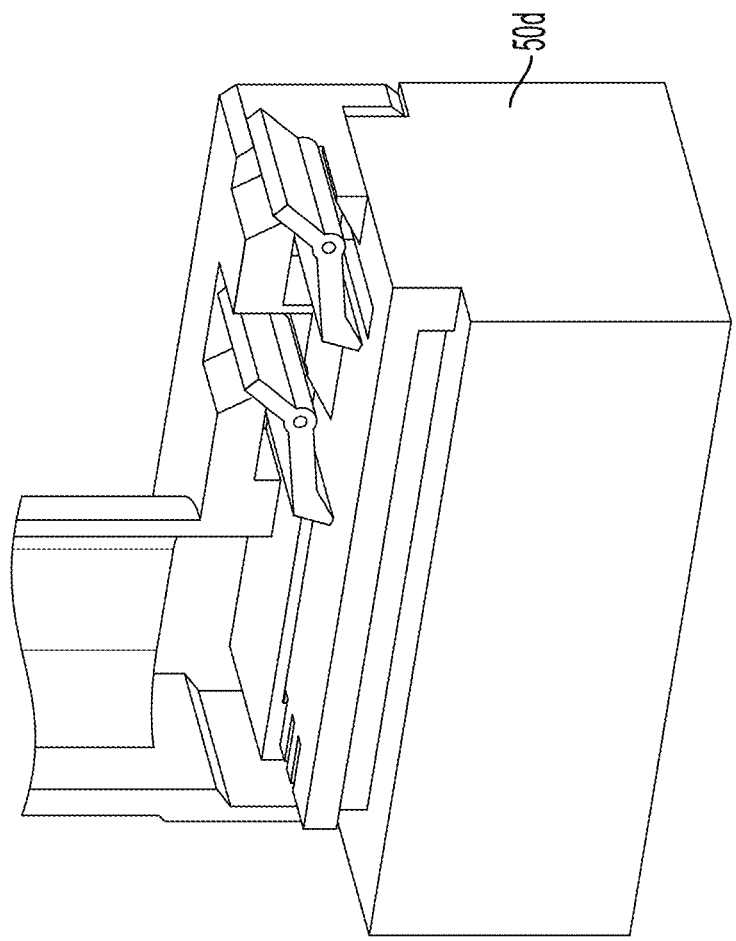
Figure 81:
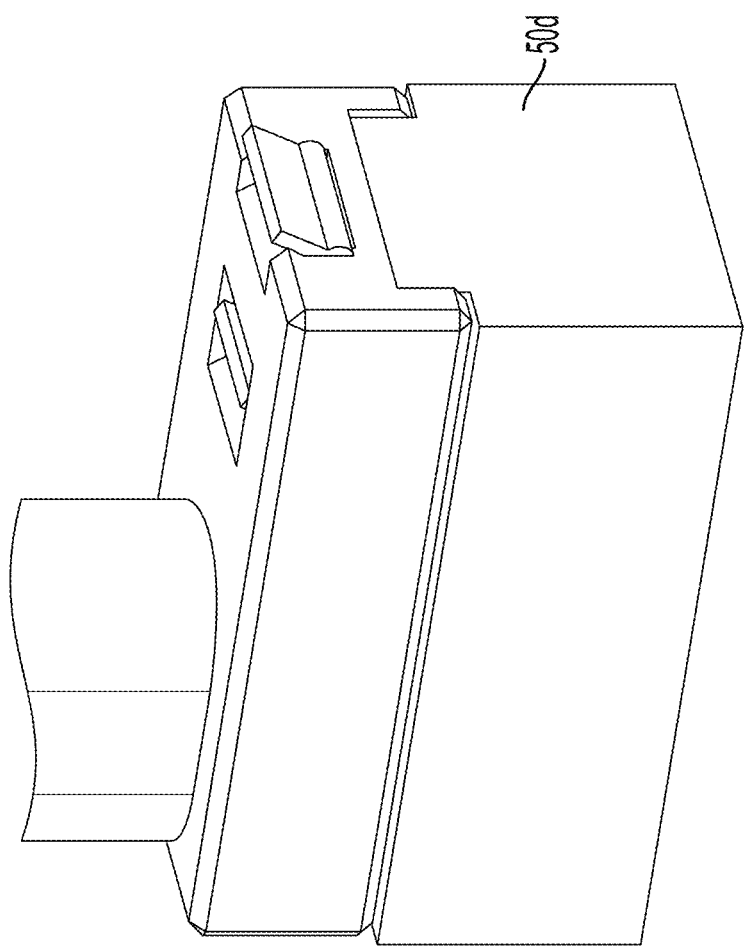
Figure 82:
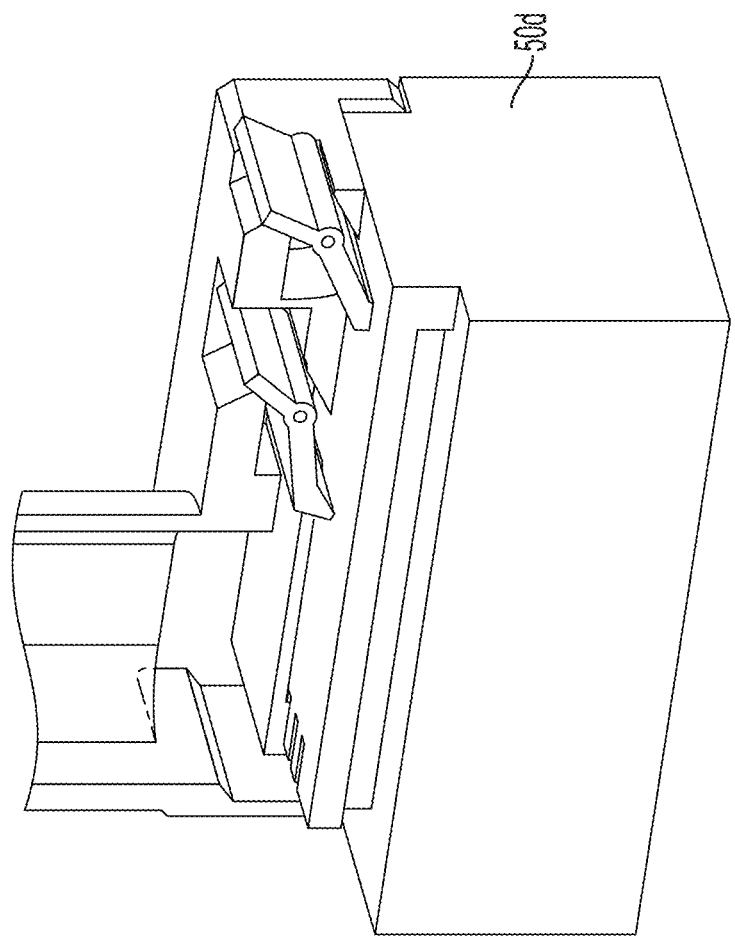
Figure 83:
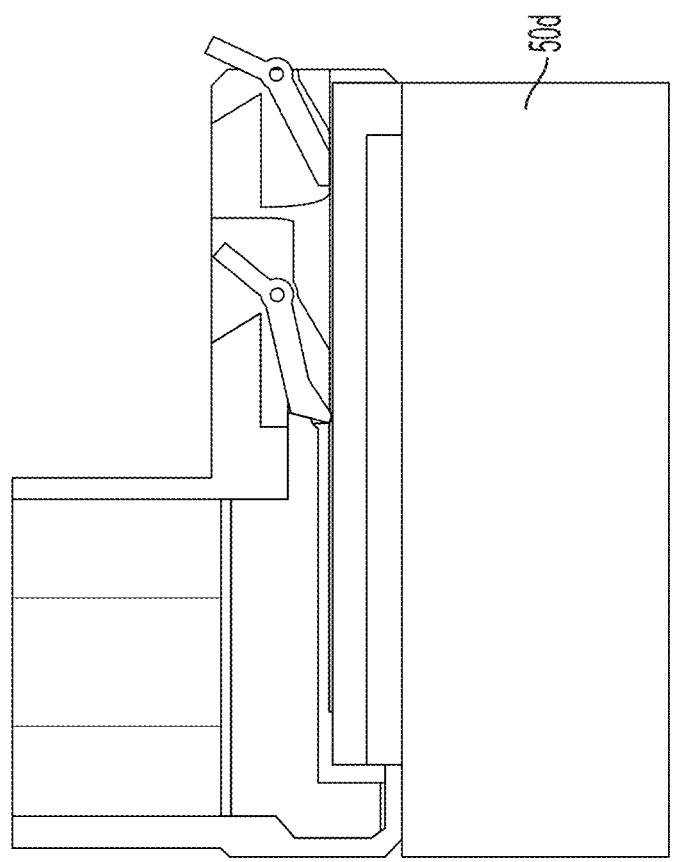
Figure 84:
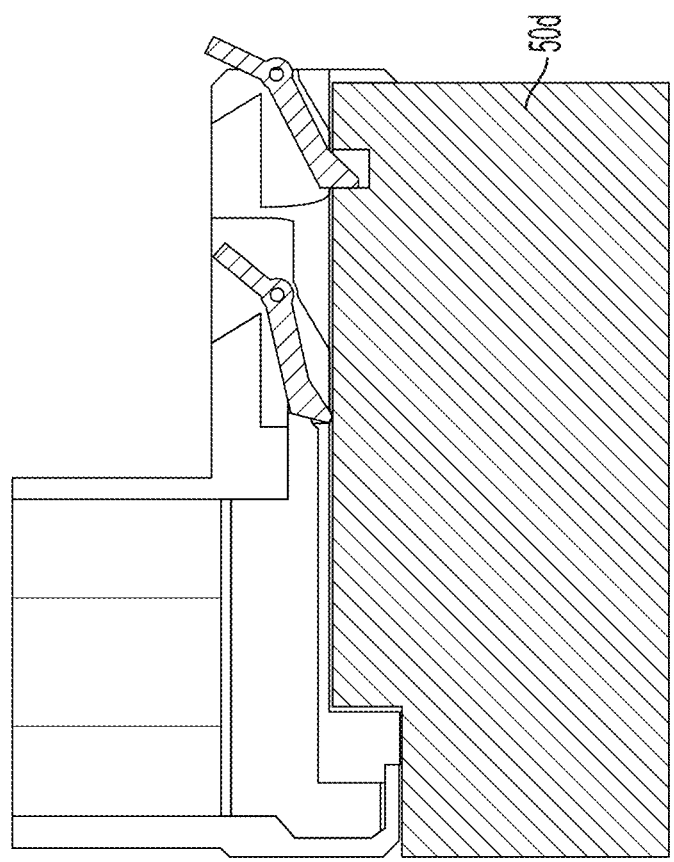
Figure 85:
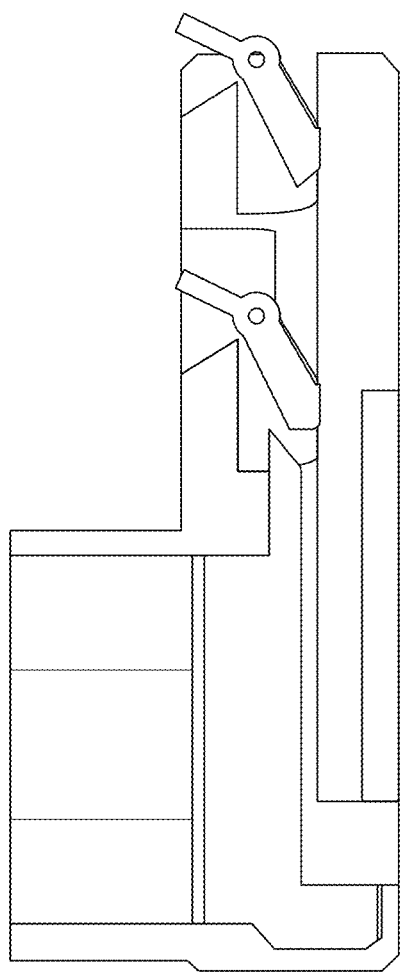
FIGS. 85 and 86 illustrate a partial left side, elevation view and a partial rear, isometric view, respectively, of an alternative example embodiment of the power tool and an alternative example embodiment of the multi-latch mechanism of FIG. 68, wherein half of the tool housing is removed.
Figure 86:
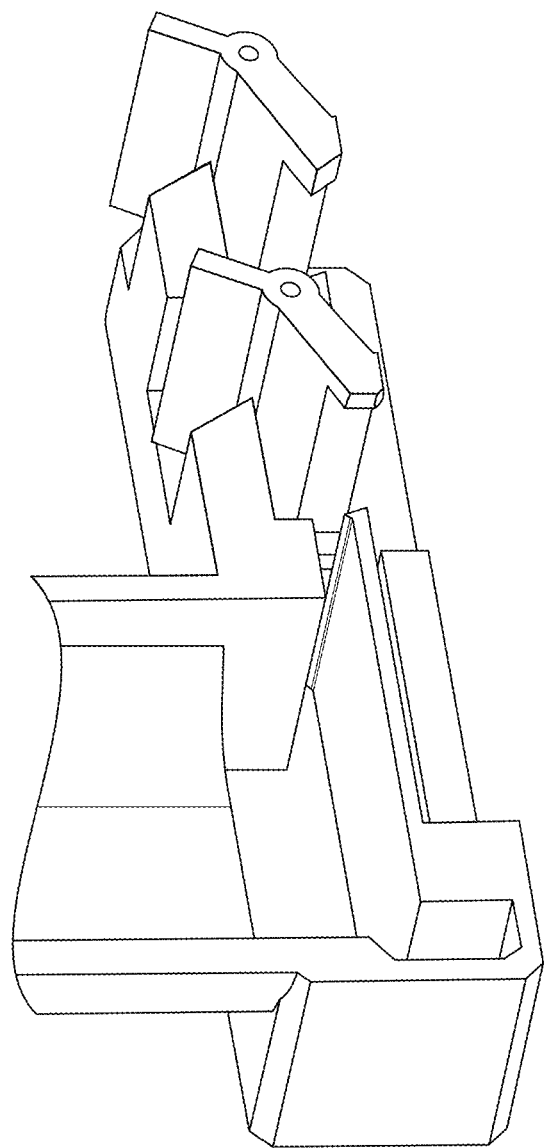
Figure 87:
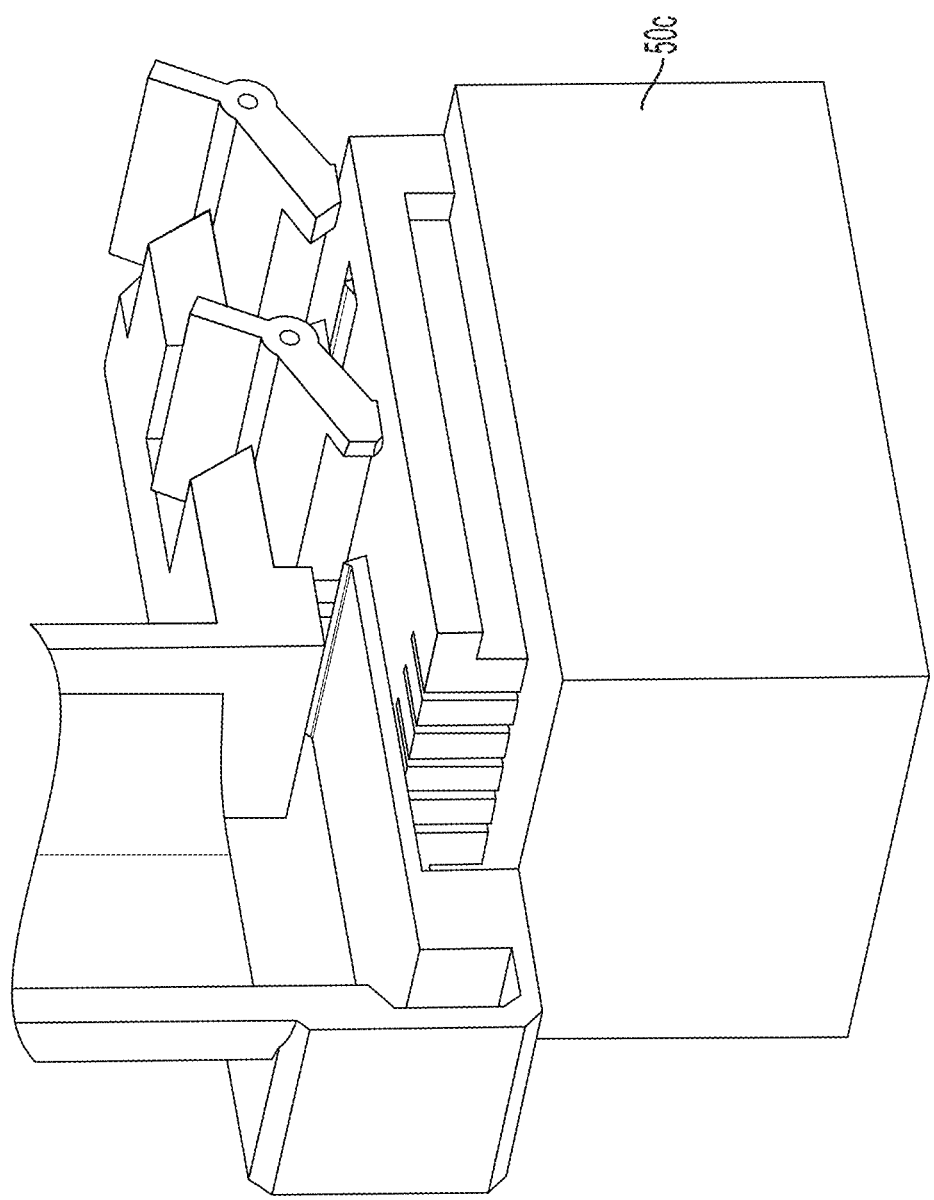
FIGS. 87-91 illustrate the example power tool of FIGS. 85 and 86 and an alternative example embodiment of the third battery pack.
Figure 88:
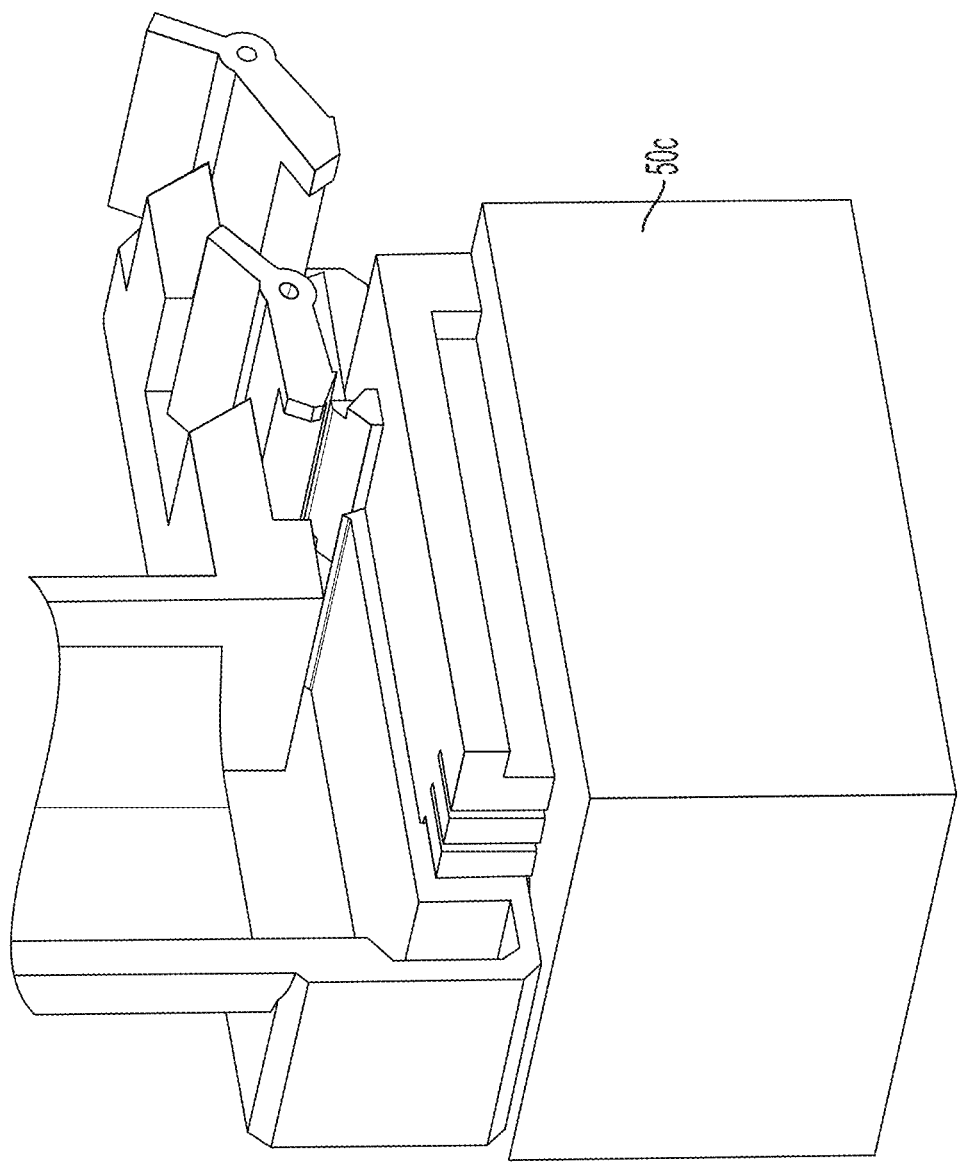
Figure 89:
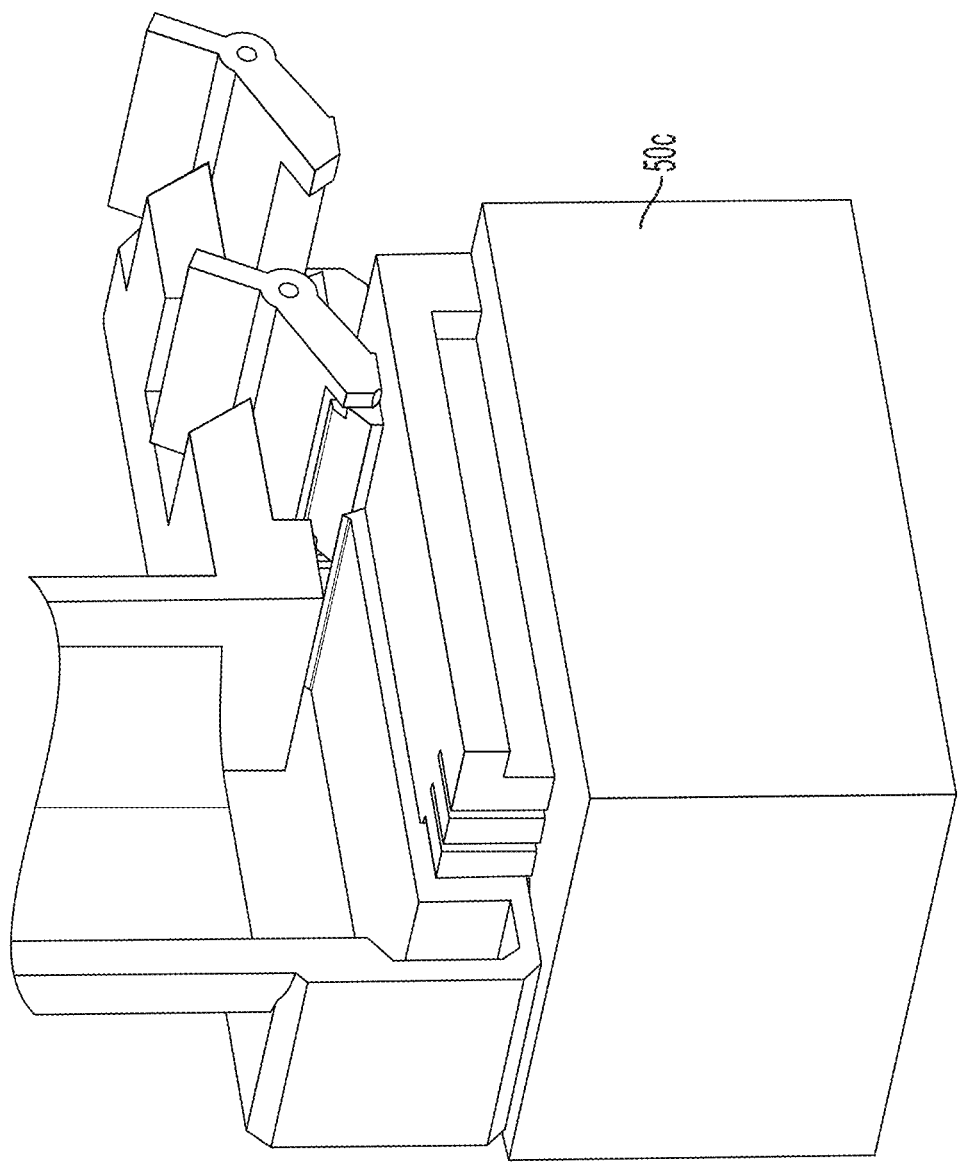
Figure 90:
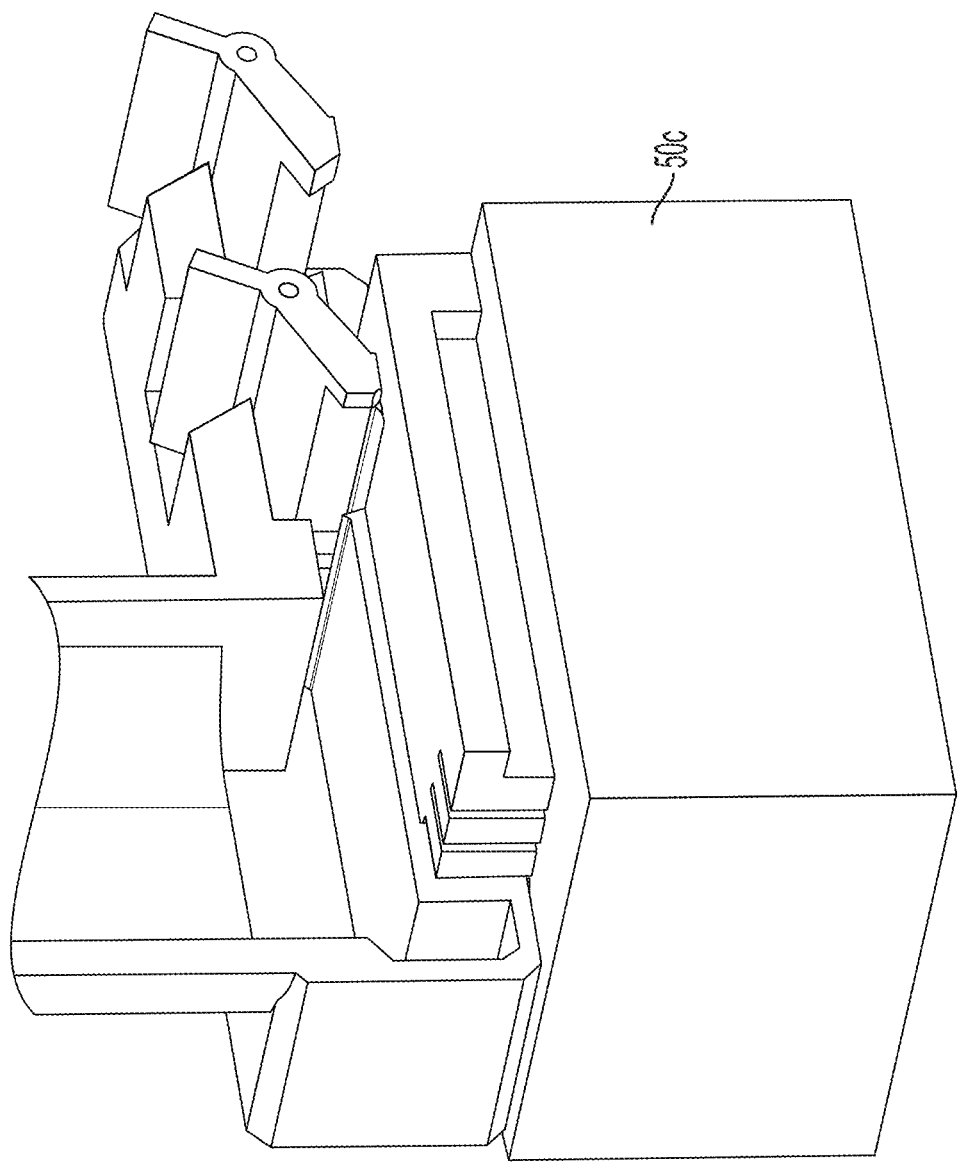
Figure 91:
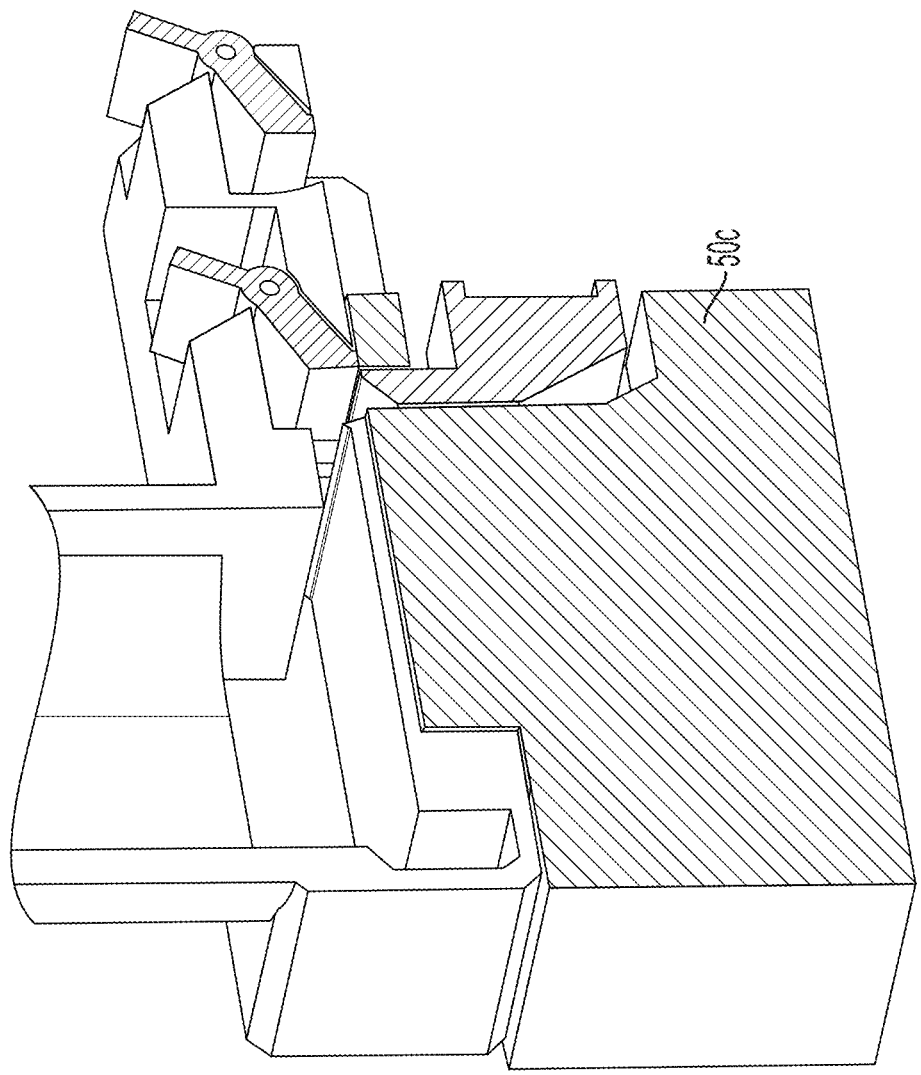
Figure 92:
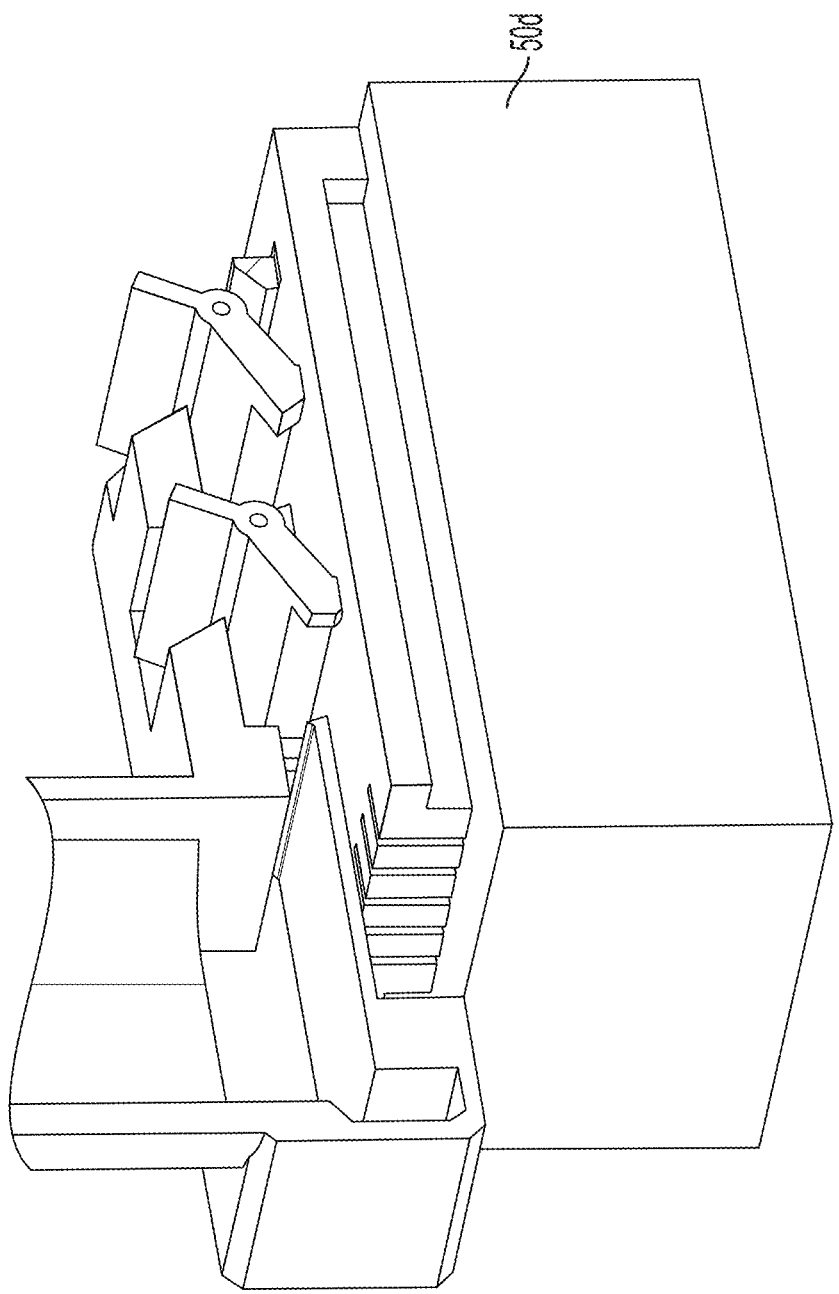
FIGS. 92-96 illustrate the example power tool of FIGS. 85 and 86 and an alternative example embodiment of the fourth battery pack.
Figure 93:
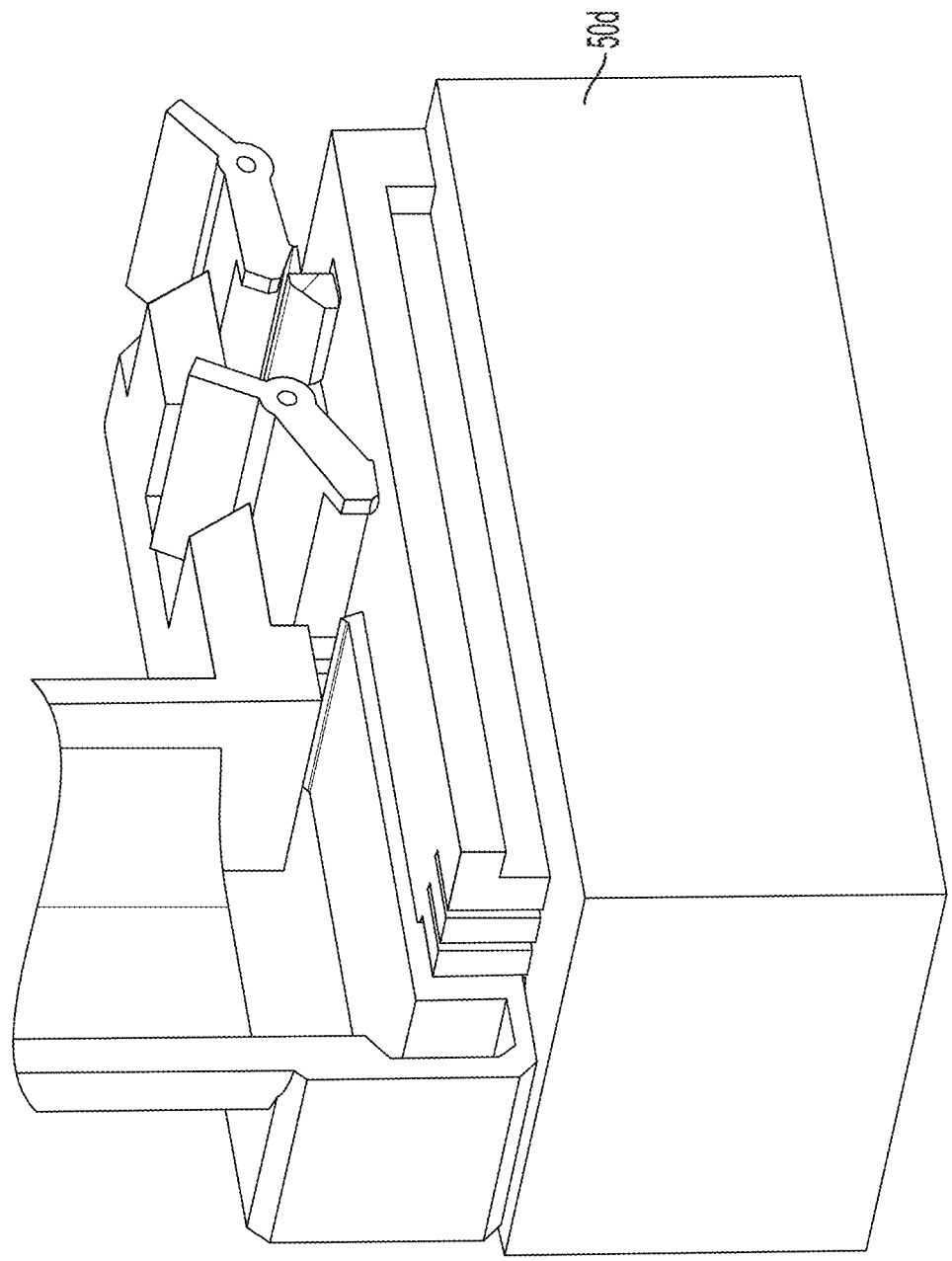
Figure 94:
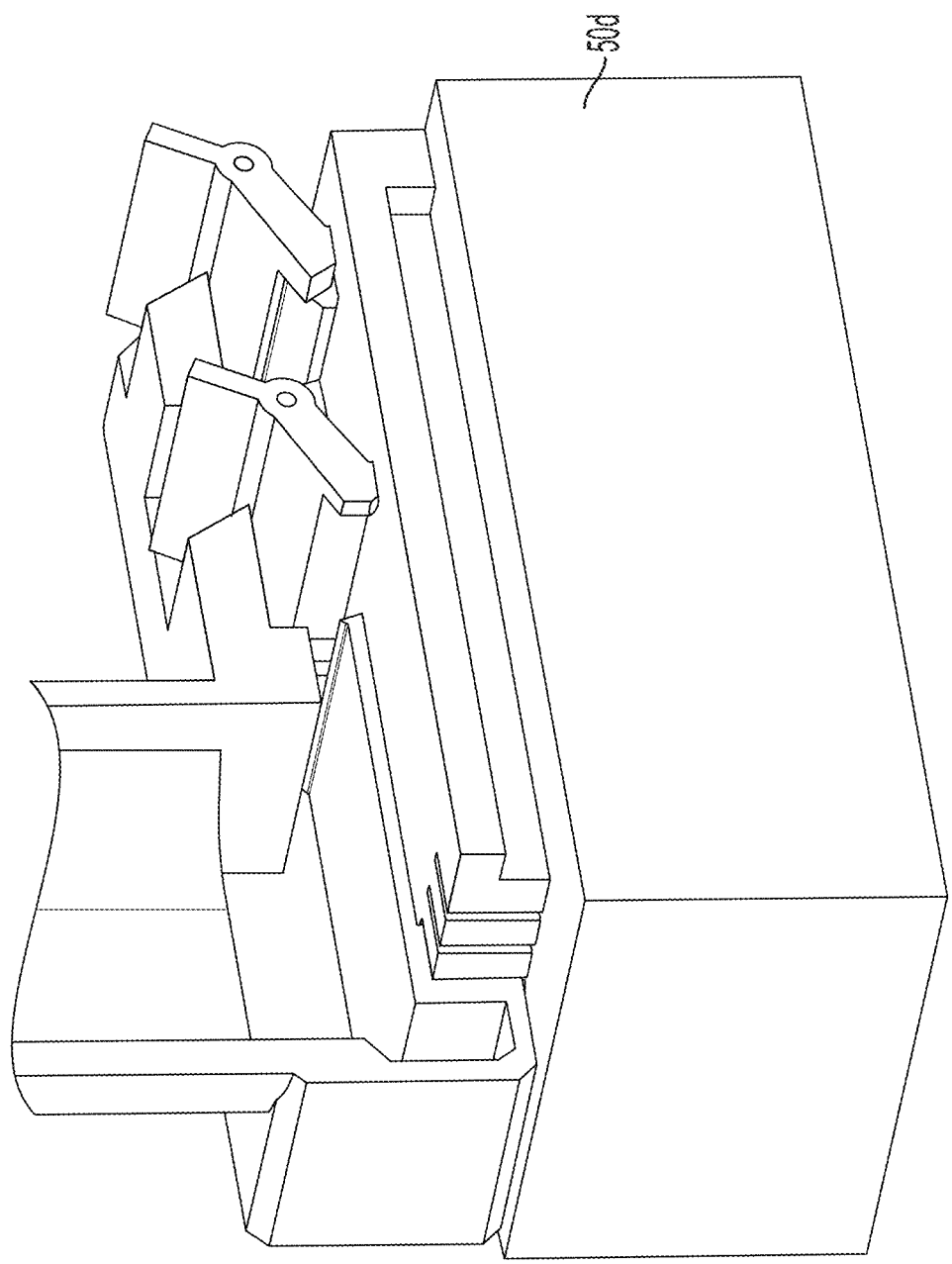
Figure 95:
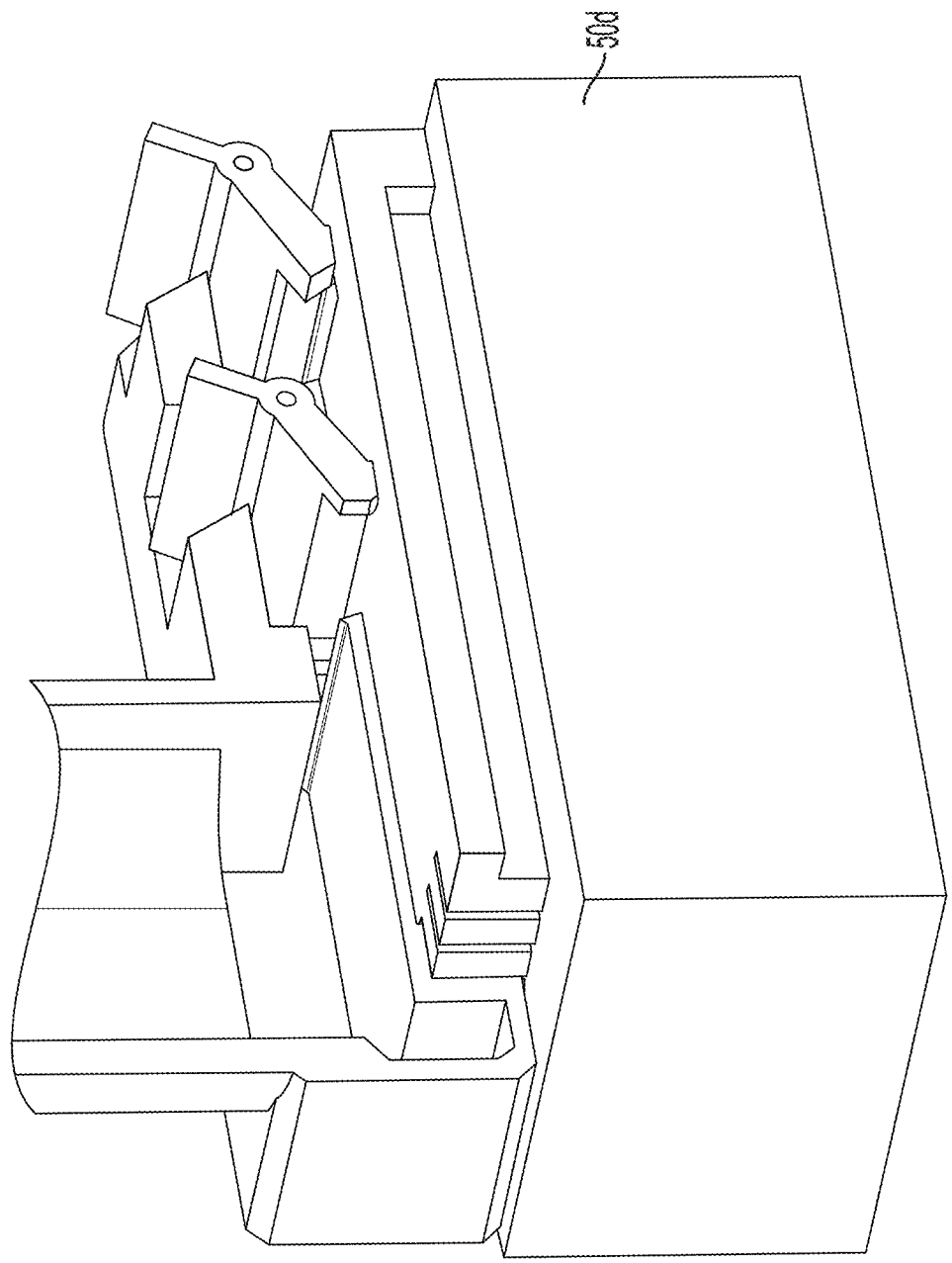
Figure 96:
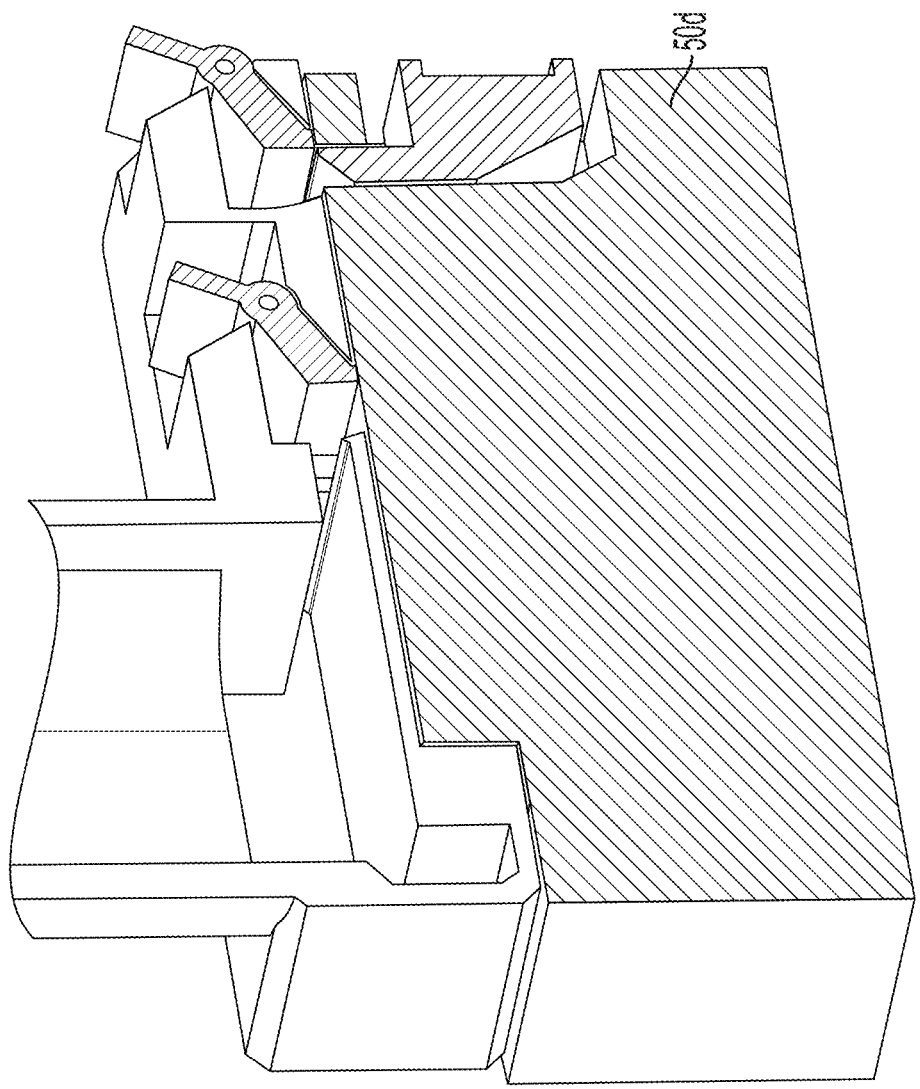
Figure 97:
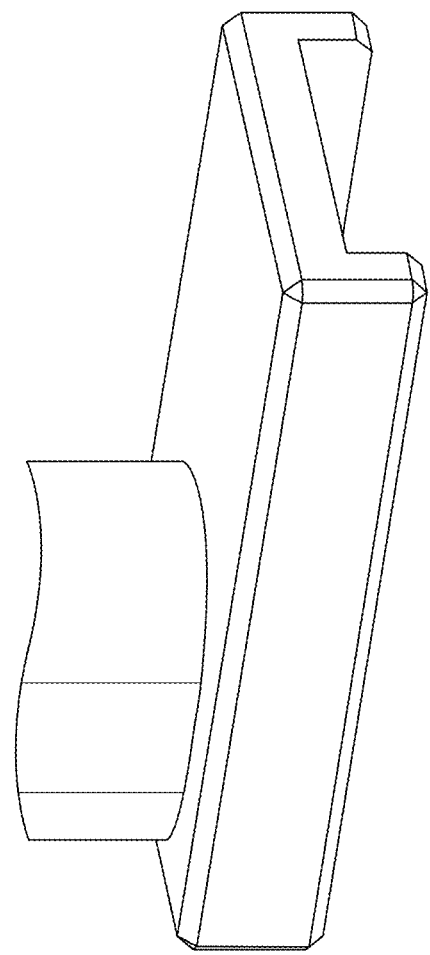
FIGS. 97-99 illustrate a partial, front elevation view, a partial, front elevation view wherein half of the tool housing is removed, and partial left side elevation view wherein half of the tool housing is removed, respectively of an alternative example embodiment of a power tool having an alternative example embodiment of a multi-latch mechanism.
Figure 98:
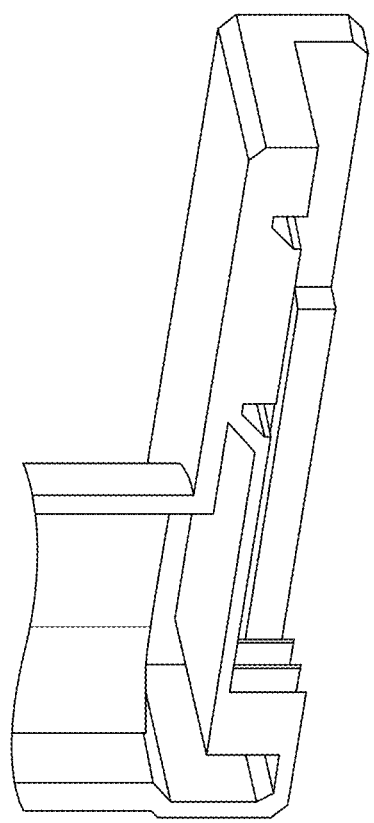
Figure 99:
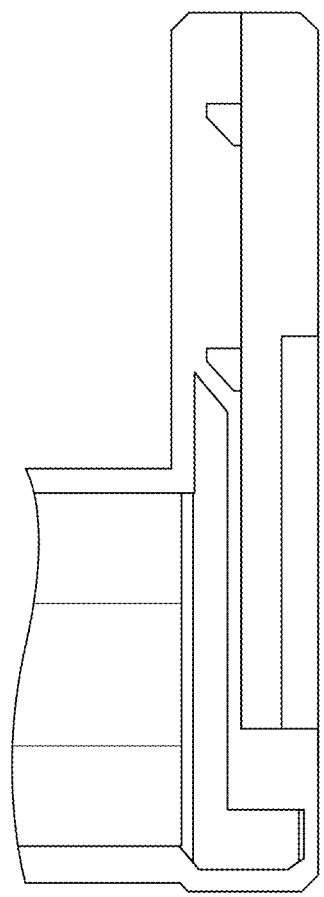
Figure 100:
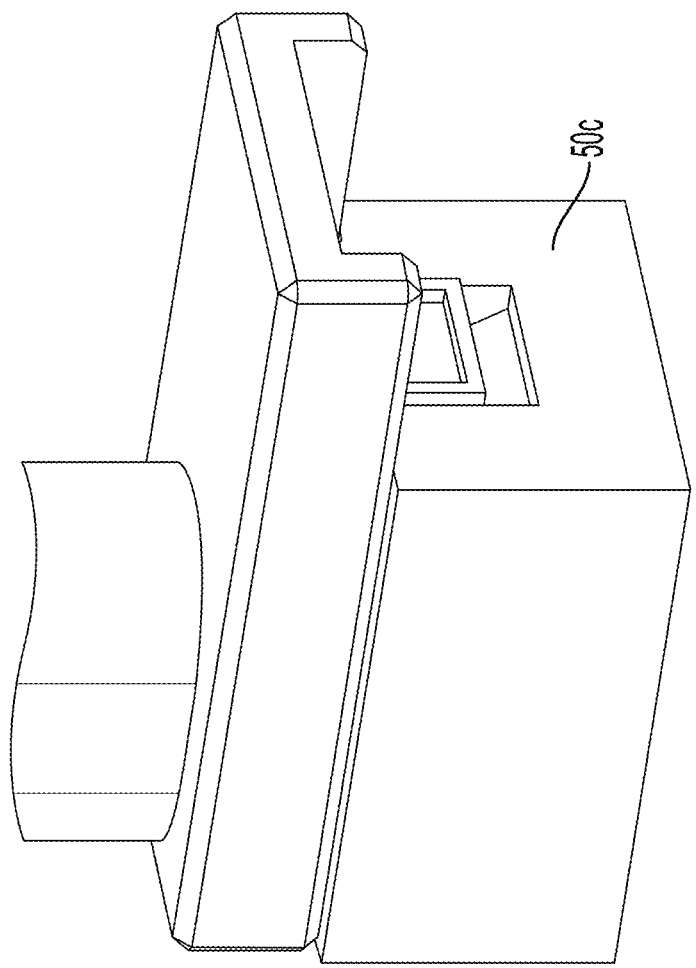
FIGS. 100-105 illustrate the example power tool of FIGS. 97-99 and an example embodiment of the third battery pack of FIGS. 33-38.
Figure 101:
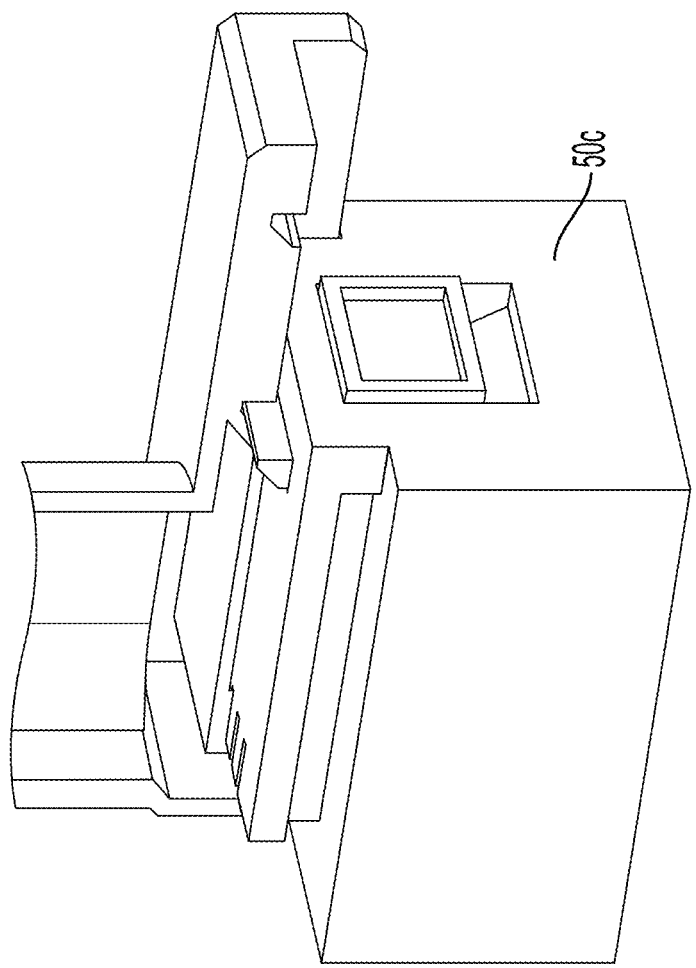
Figure 102:
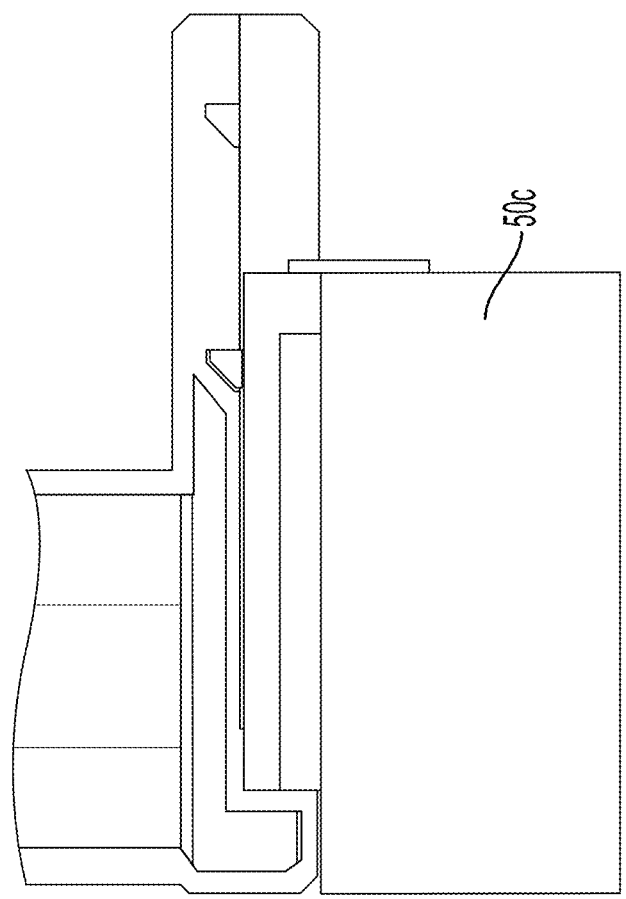
Figure 103:
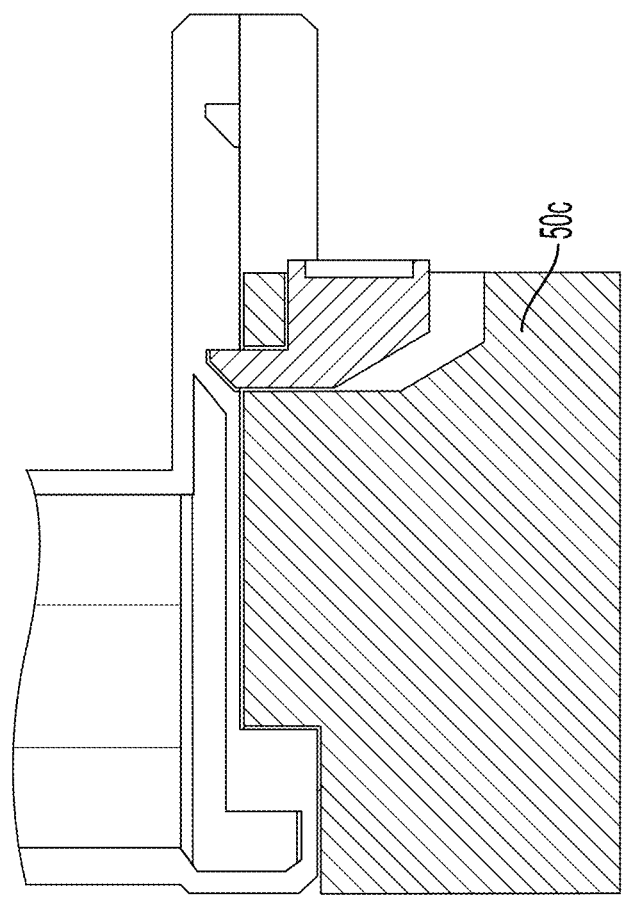
Figure 104:
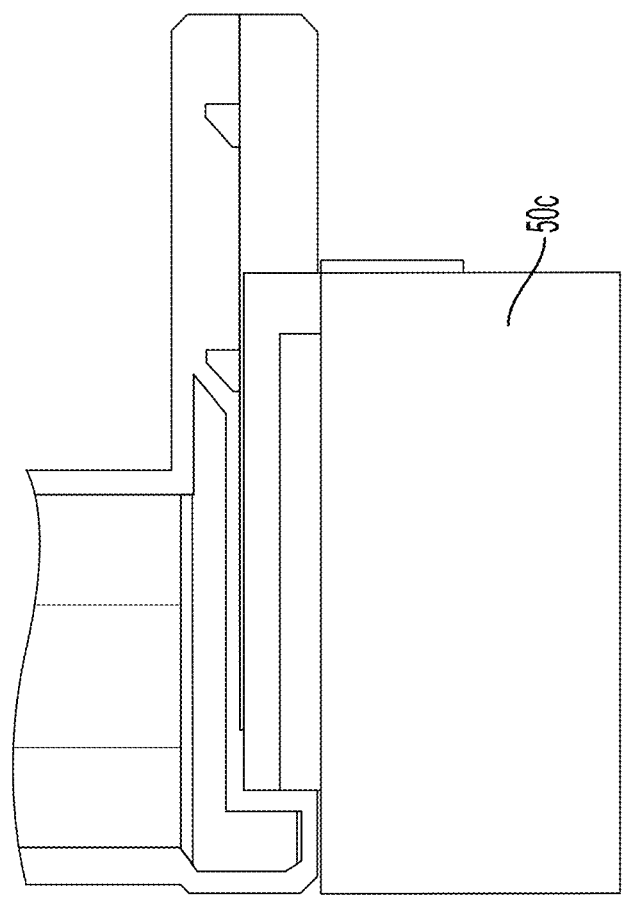
Figure 105:
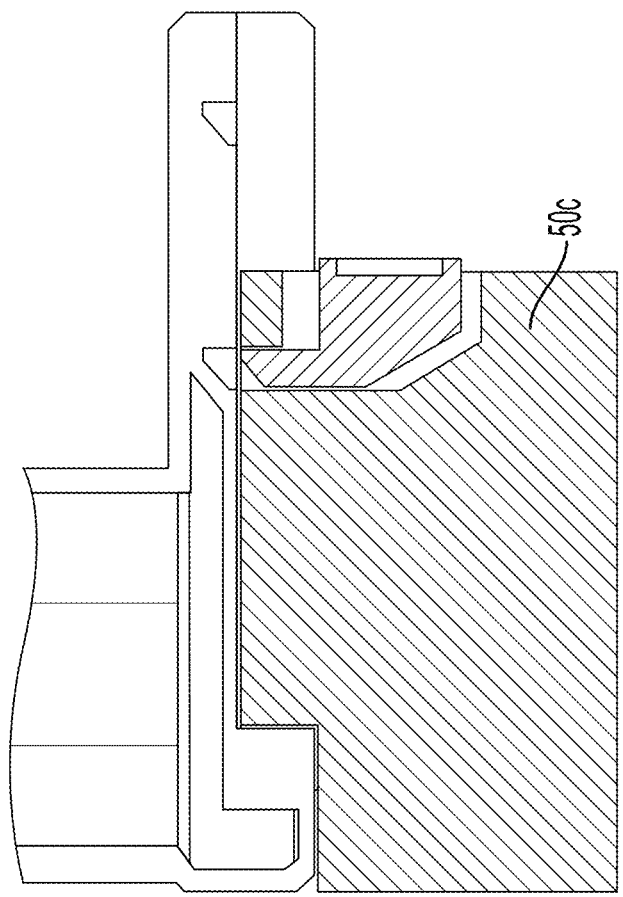
Figure 106:
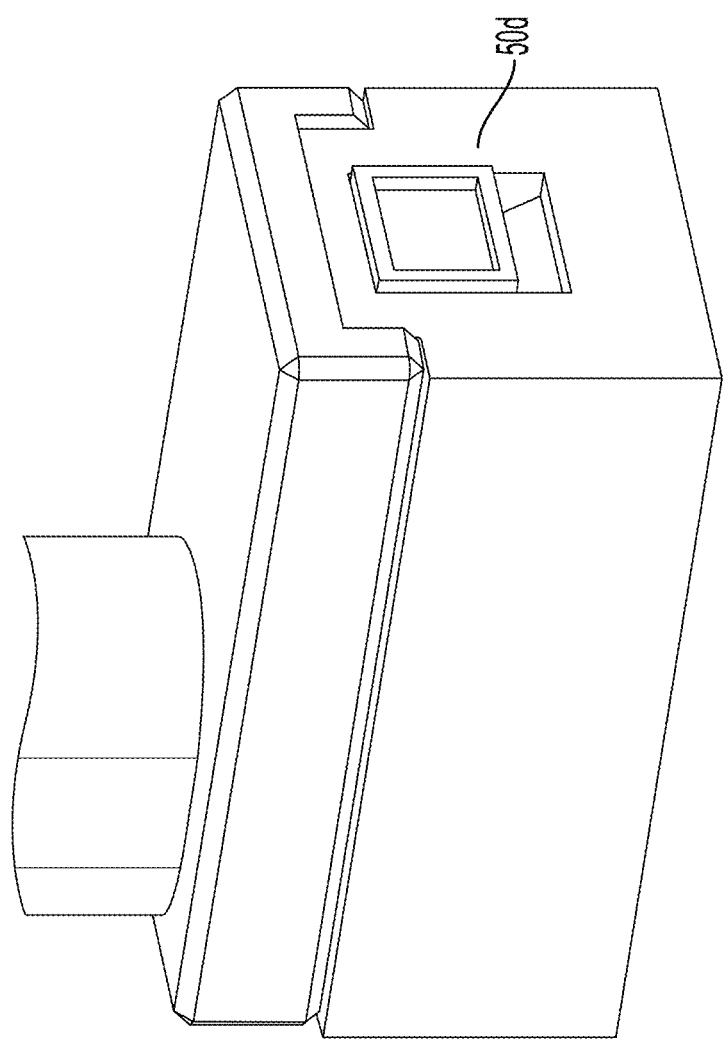
FIGS. 106-111 illustrate the example power tool of FIGS. 97-99 and an alternative example embodiment of the fourth battery pack.
Figure 107:
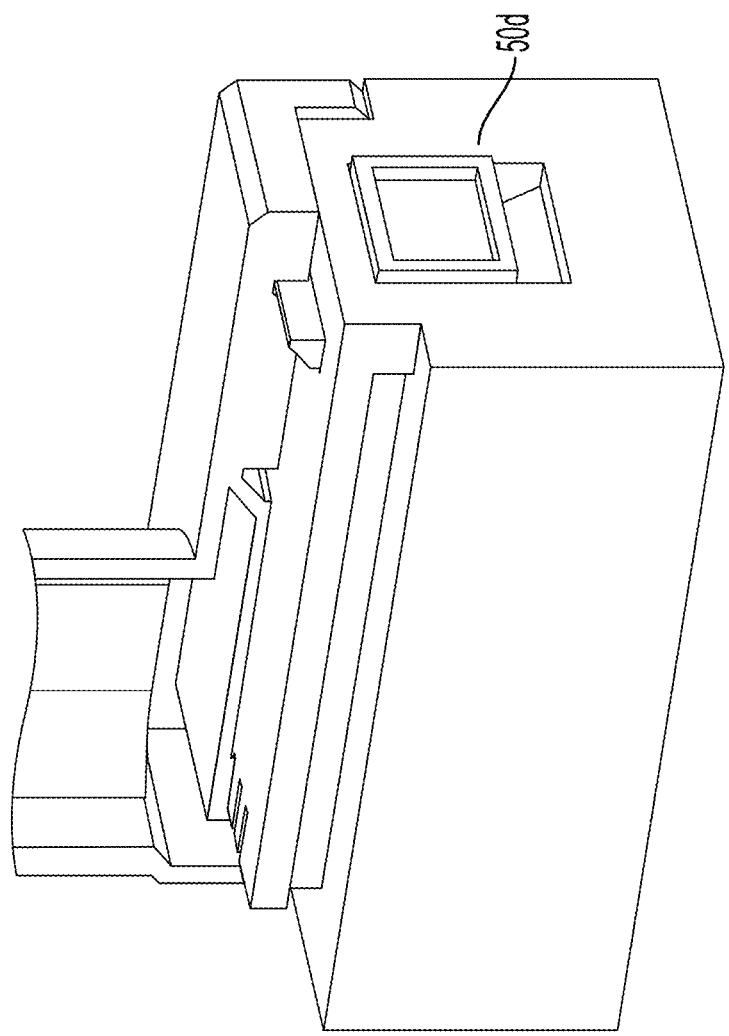
Figure 108:
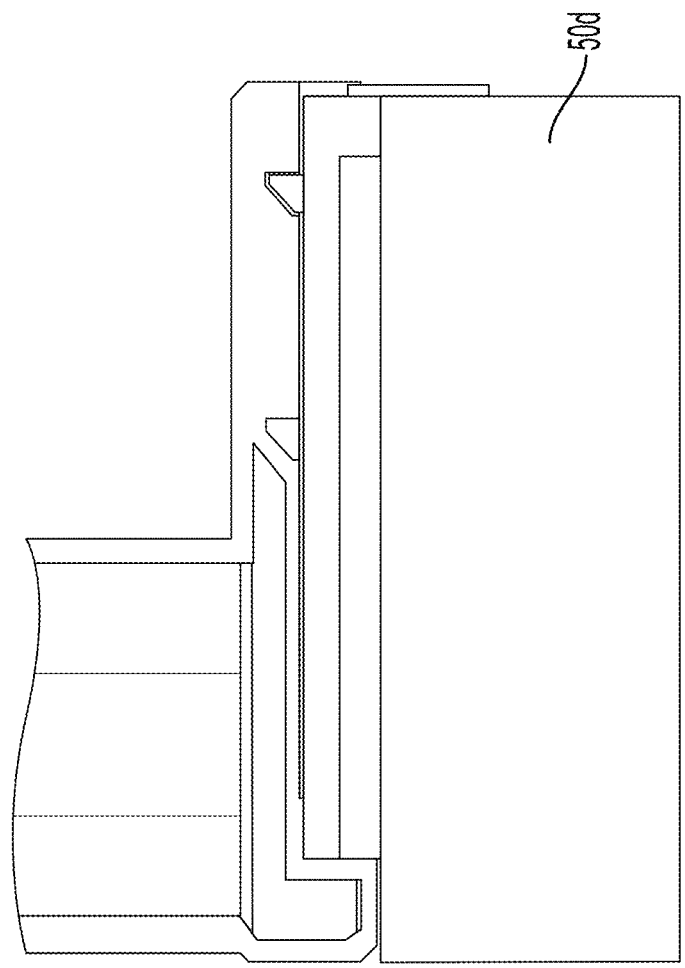
Figure 109:
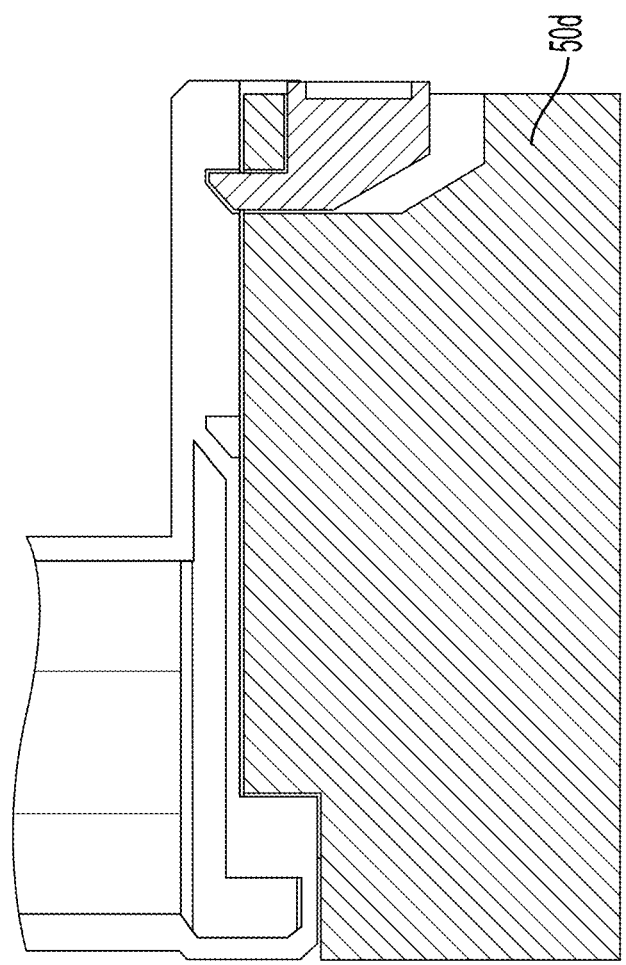
Figure 110:
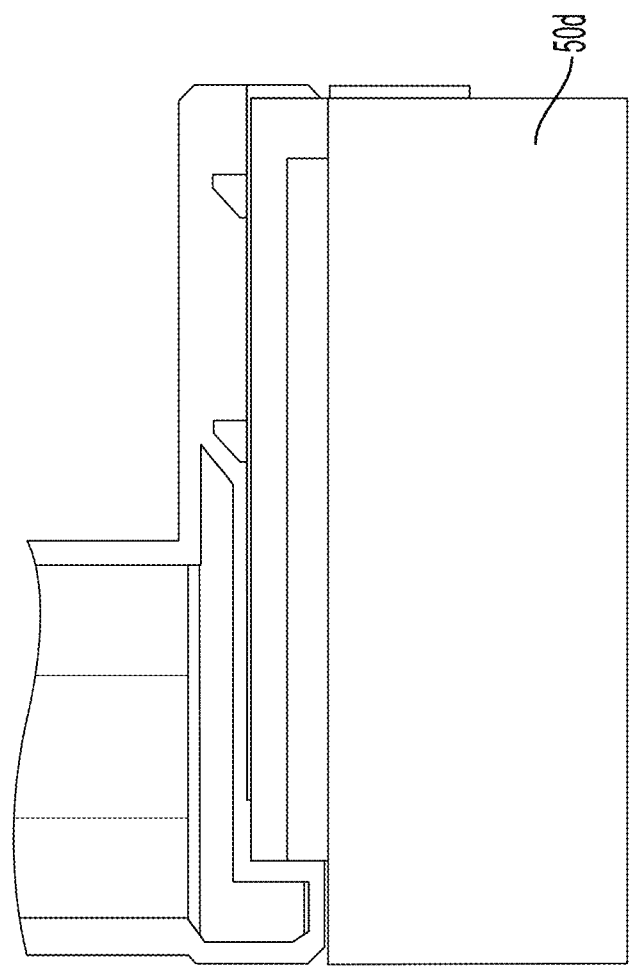
Figure 111:
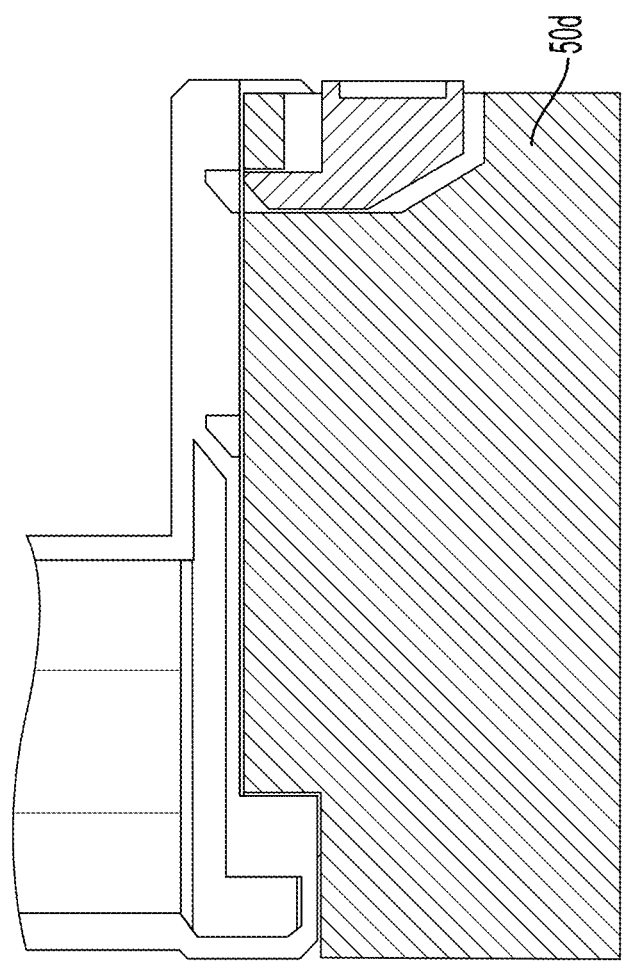
Figure 112:
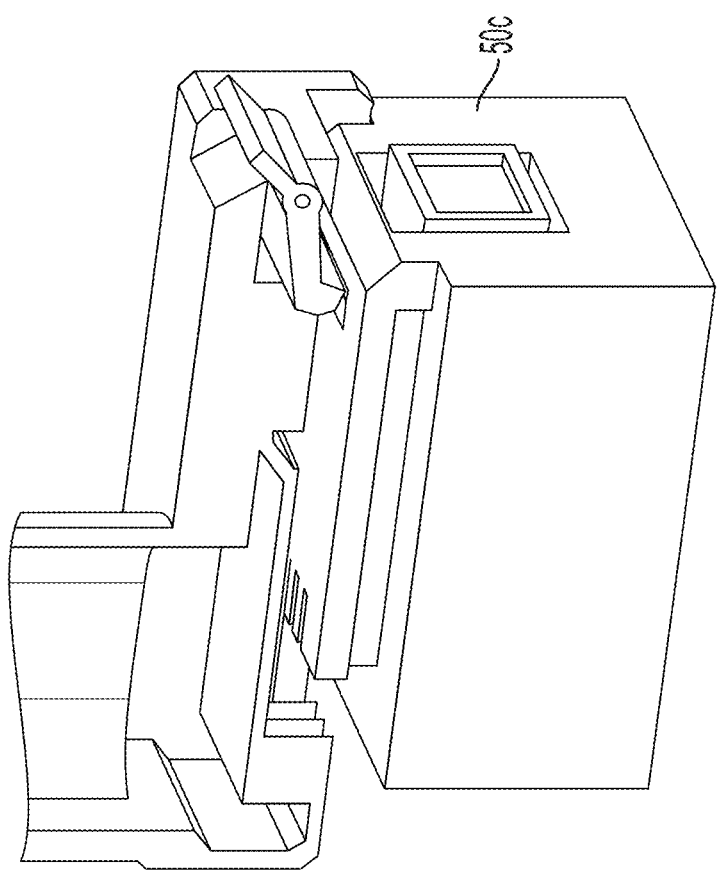
FIGS. 112-116 illustrate another example embodiment of a power tool having another example embodiment of a multi-latch mechanism, wherein half of the tool housing is removed and example embodiment of the third battery pack of FIGS. 33-38.
Figure 113:
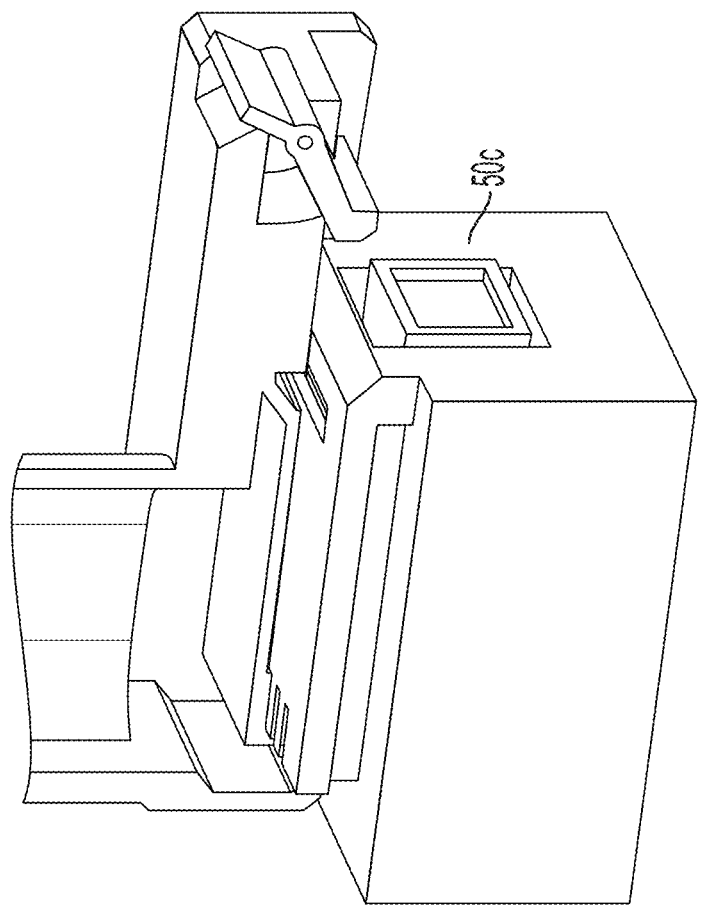
Figure 114:
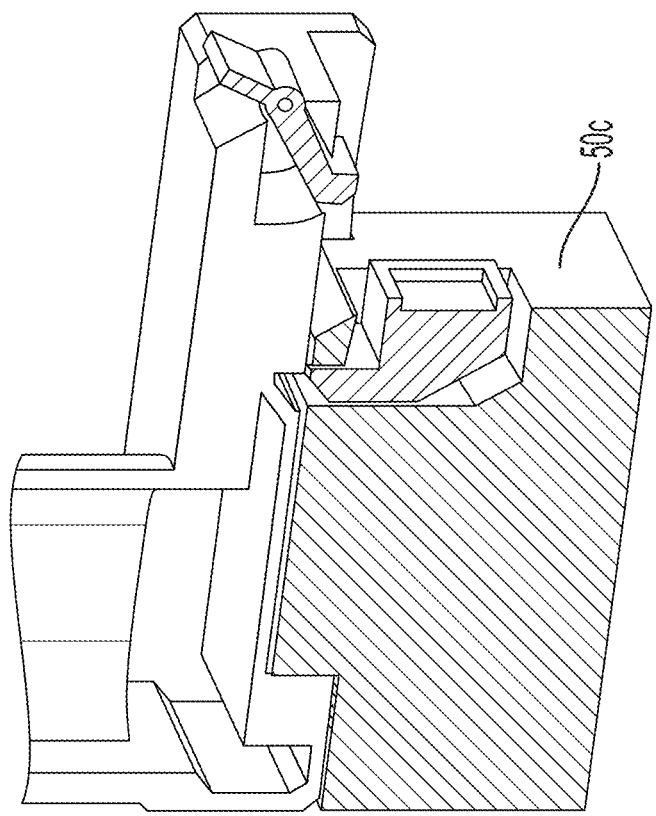
Figure 115:
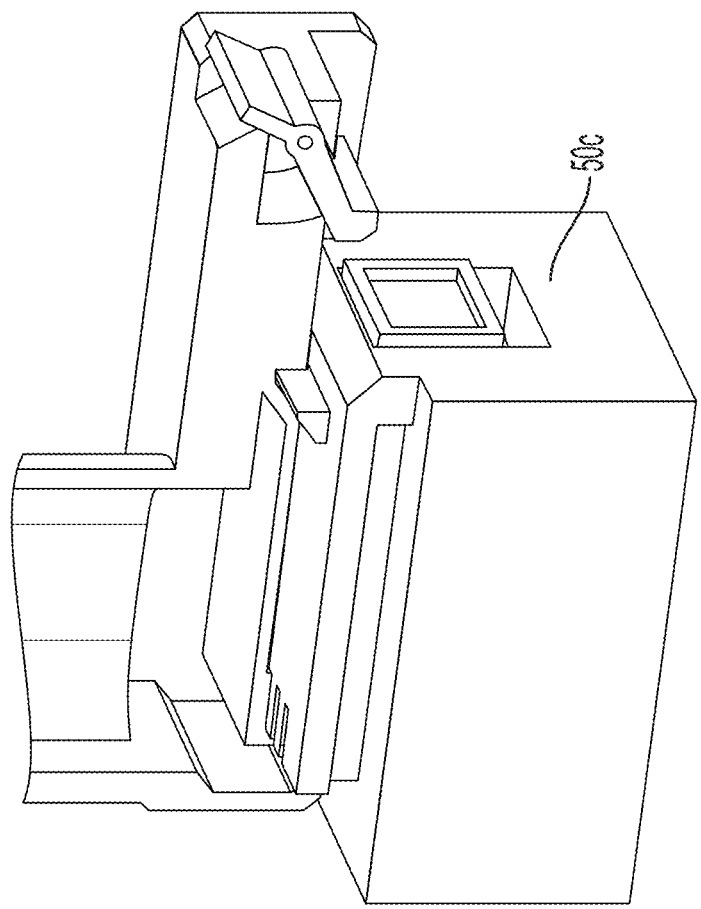
Figure 116:
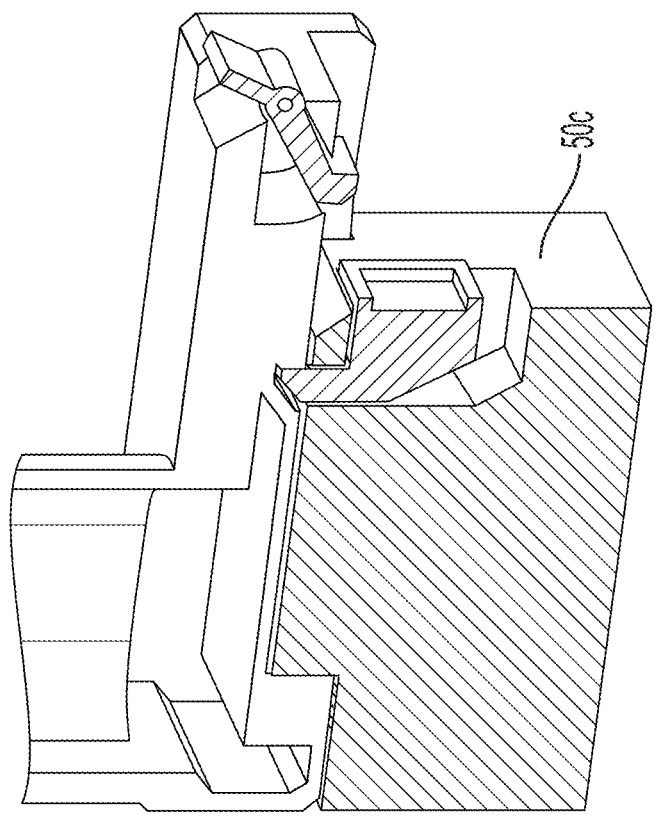
Figure 117:
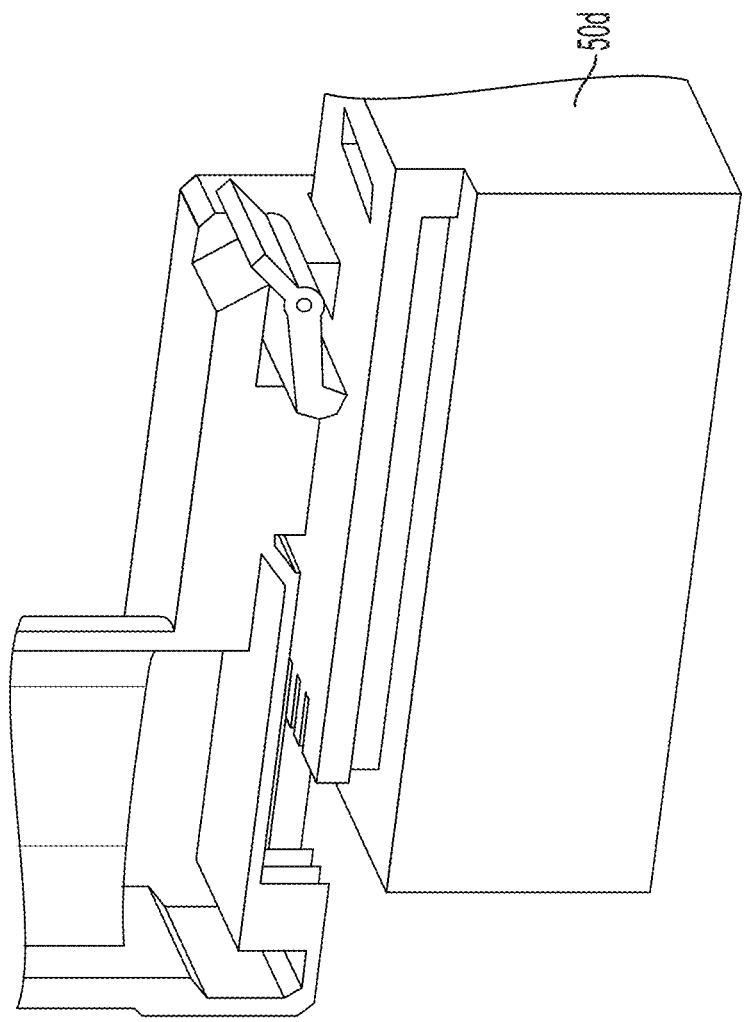
FIGS. 117-120 illustrate the example power tool of FIGS. 112-116 and the example embodiment of the fourth battery pack of FIGS. 77-84.
Figure 118:
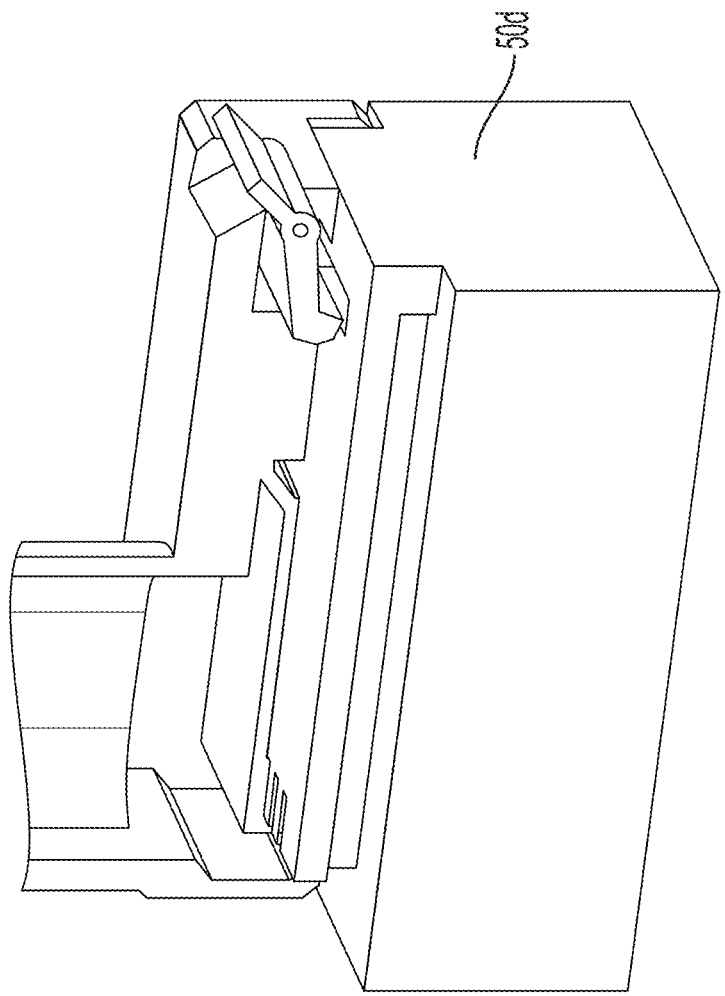
Figure 119:
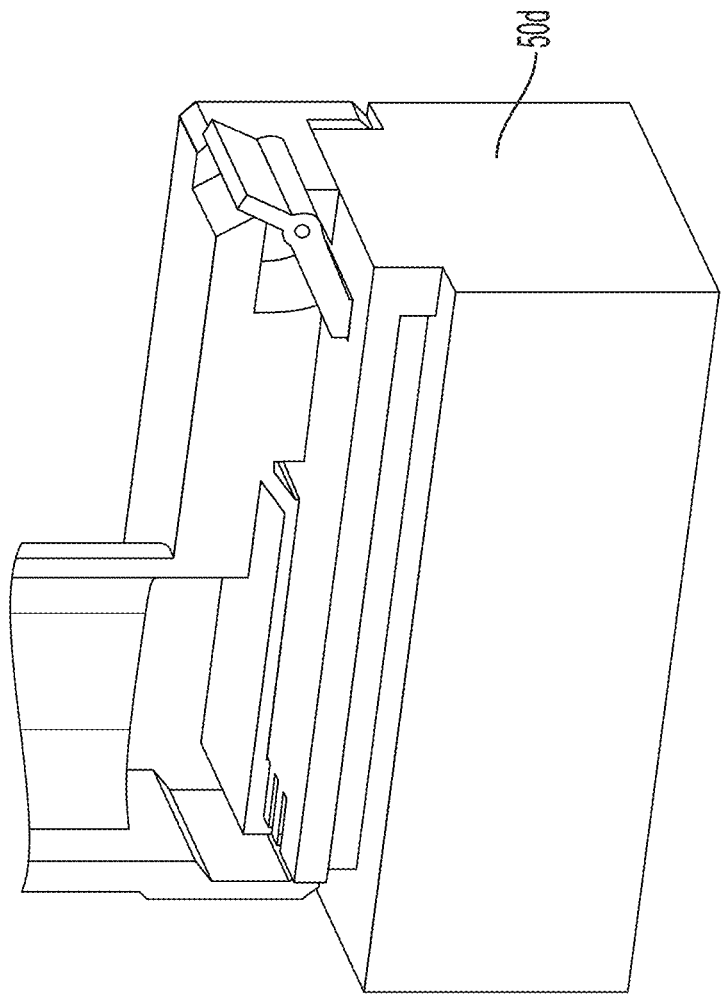
Figure 120:
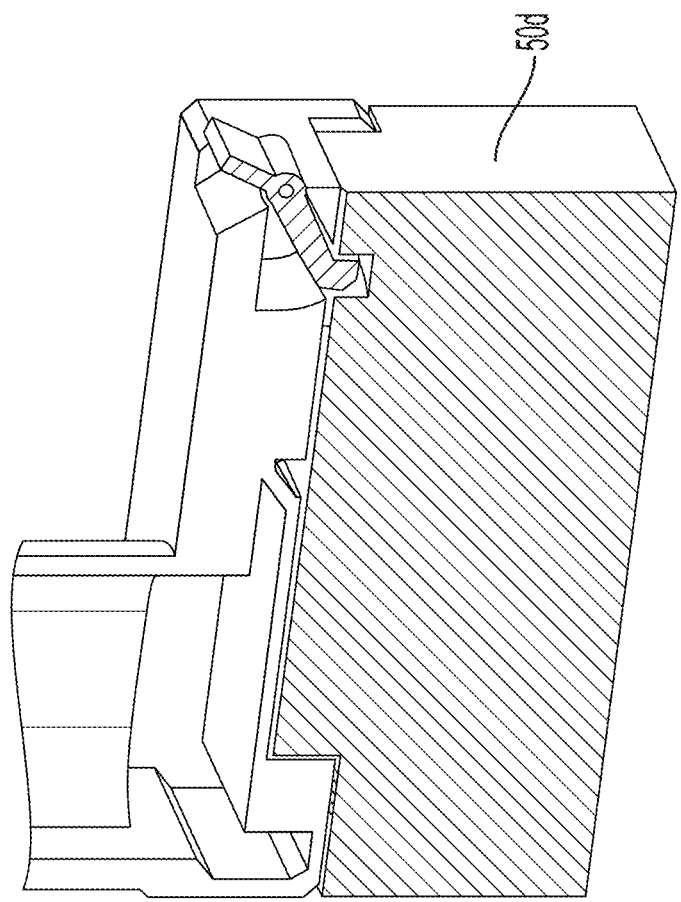
Figure 121:
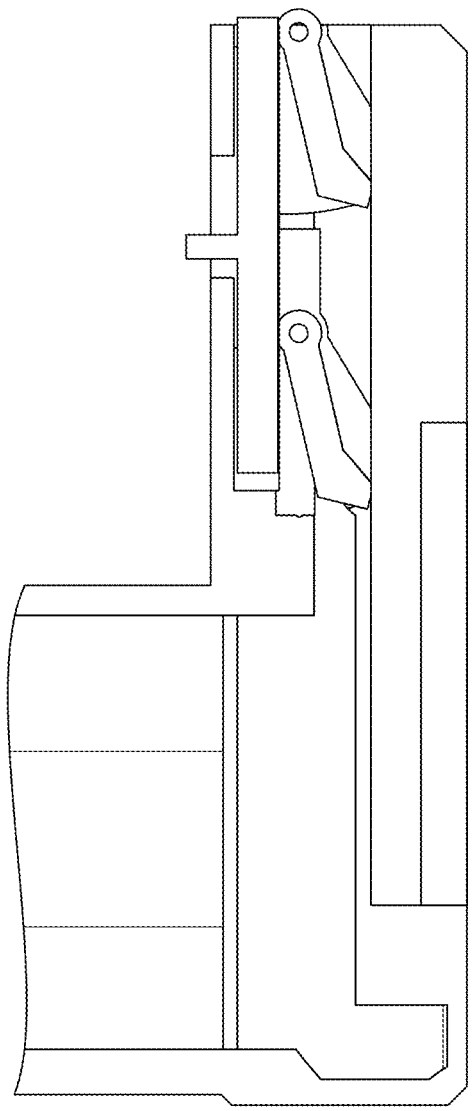
FIG. 121 illustrates a partial, left side elevation of another example embodiment of a power tool having another example embodiment of a multi-latch mechanism.
Figure 122:
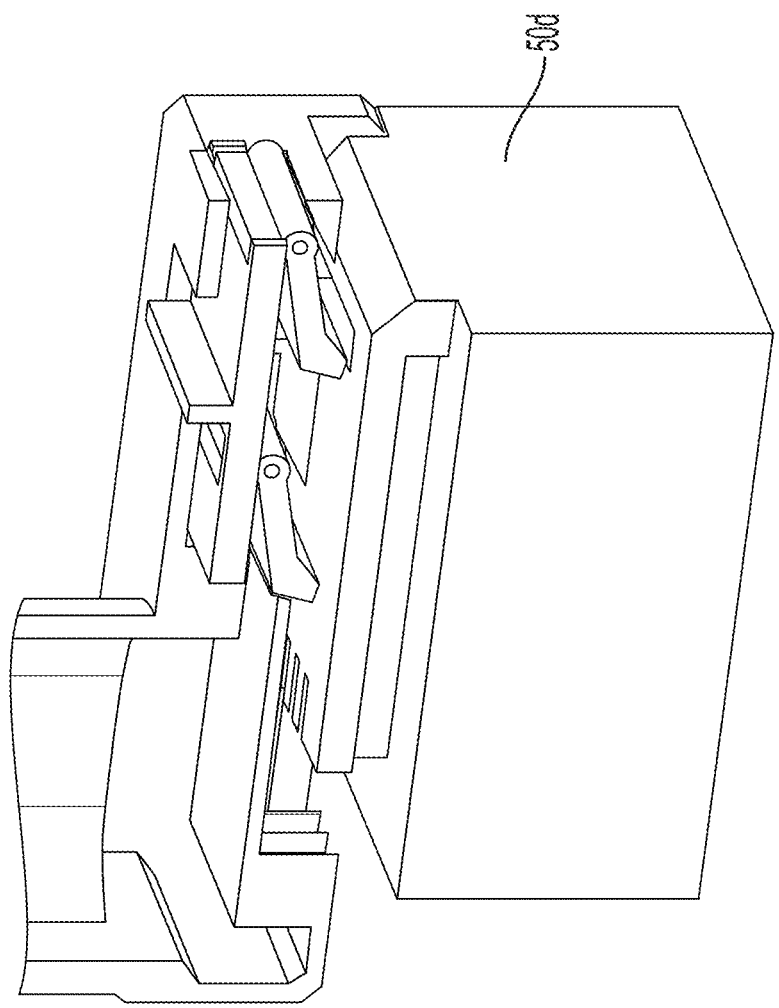
FIGS. 122-126 illustrate the example power tool of FIG. 121 and the example embodiment of the third battery pack of FIGS. 69-76.
Figure 123:
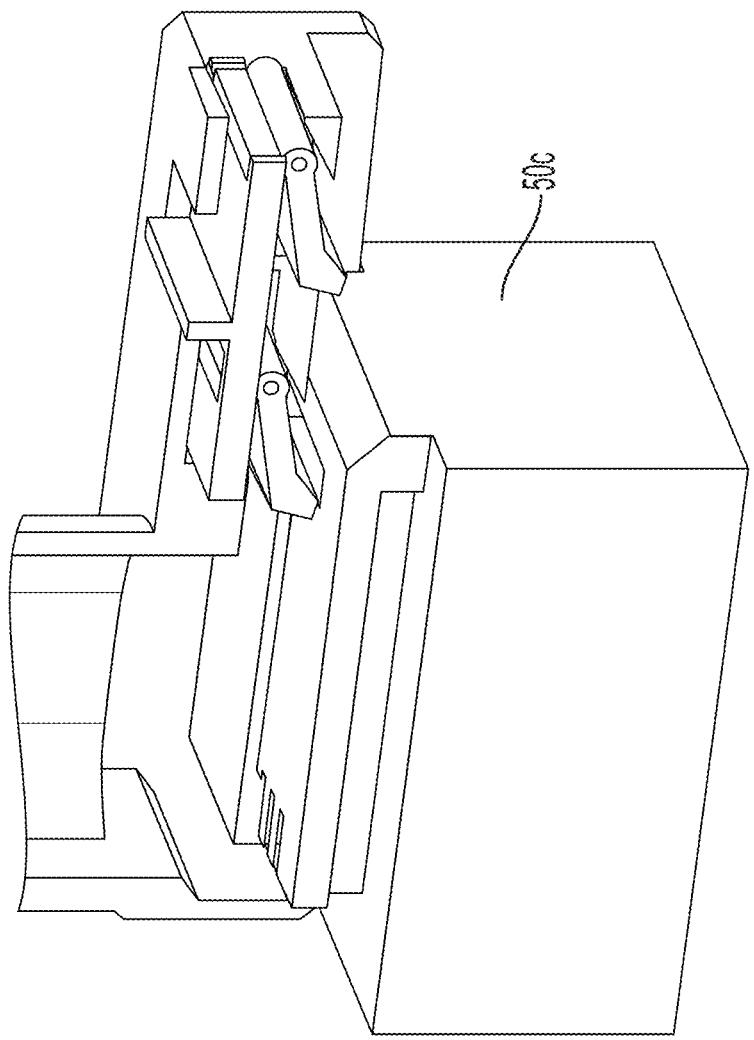
Figure 124:
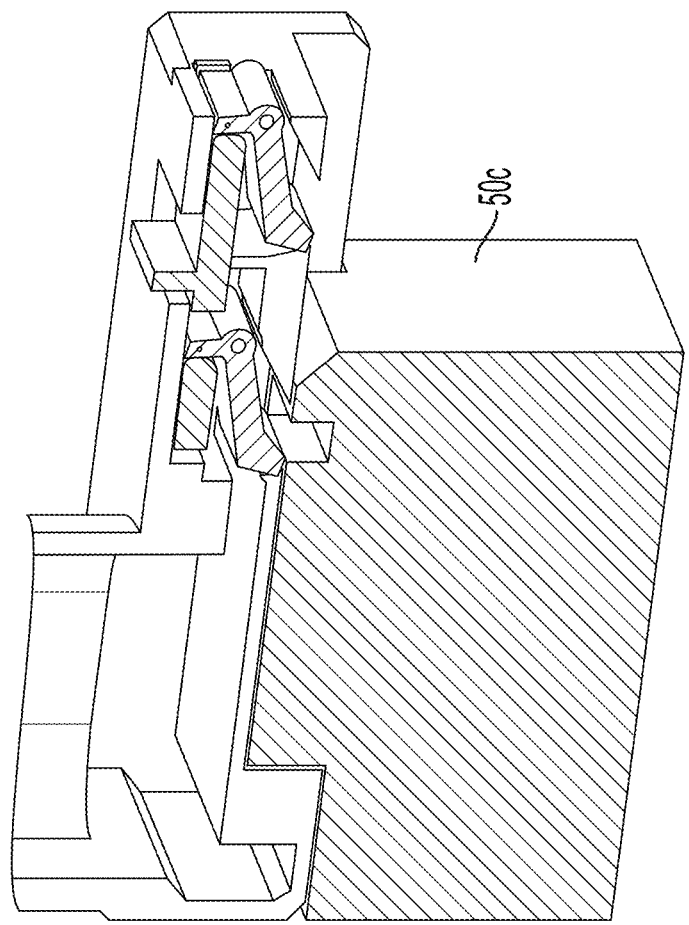

FIG. 32 illustrates a partial isometric view of another example embodiment of a power tool 90 including another example embodiment of a battery pack receptacle 114 with half the housing removed showing another example embodiment of a multi-latch mechanism 100'. The multi-latch mechanism 100' includes a second interface element 120 formed integrally with the actuator 130. As shown here, the second interface element 120 extends from a portion of the actuator 130—in this example from the second pivot member 134—at a fixed angle relative to the arm 132 of the actuator 130. Pivoting movement of the engagement portion 136 around the second pivot member 134 thus causes the second interface element 120 to pivot away from the battery pack 50. A distal connection point 138 of the arm 132 of the actuator 130 distal connection point 138 is coupled to the first interface element 110 and causes the first interface element 110 to pivot around the first pivot member 114 away from the battery pack 50. An advantage of this embodiment is that it reduces the number of components needed for manufacturing of the multi-latch 100' assembly, thus providing an easier and less expensive manufacturing process.

FIGS. 33-38 illustrate various isometric views of the example embodiment of the battery receptacle 114 with half of the housing removed, showing the multi-latch mechanism 100' interfacing with an example embodiment of a third battery pack 50c. In this embodiment, the battery pack 50c is a short battery pack.

FIGS. 39-45 illustrate various isometric views of the battery pack receptacle 114 with half of the housing removing, showing the multi-latch mechanism 100' interfacing with an example embodiment of a fourth battery pack 50d. In this embodiment, the battery pack 50d is a long battery pack. The battery pack 50d is similar to the long battery pack 50b previously described, but it includes a translating latch 70 in place of a pocket. The translating latch 70 is spring-loaded and is coupled to an actuator 72 disposed on the battery pack 50d. The actuator 72, when pressed, causes the translating latch 70 to move downwardly in a direction perpendicular to the receiving axis of the battery pack 50d. In an embodiment, the multi-latch mechanism 100 according to this embodiment is designed such that, even in the latched position, the first and second latch members 116 and 126 are located at or slightly above a top plane of the battery pack 50d (i.e., the plane at the surface of the battery pack 50d where the pocket that receives the latch 70 opens). Thus, in the latched position, the first and second latch members 116 and 126 can catch the translating latch 62 of battery pack 50c and the translating latch 70 of the battery pack 50d respectively. However, in this embodiment, the first and second latch members 116 and 126 are not capable of extending into a female recess or pocket of the battery pack. Alternatively, however, the multi-latch mechanism 100 may be configured such that the first and second latch members 116 and 126 extend below the top plate of the battery pack and are shaped to engage female recesses or pockets as well as male translating latches and hooks of various battery packs.

FIGS. 46-57 illustrate various views of another example embodiment of a multi-latch mechanism 100 including an improved second interface element 120 configuration. Specifically, the figures illustrate the multi-latch mechanism 100 with the improved second interface element 120 interfacing with the short battery pack 50c in latched and released positions respectively. The figures illustrate the short battery pack 50c being inserted into the battery receptacle 114. The figures also illustrate the multi-latch mechanism 100 with the improved second interface element 120 interfacing the long battery pack 50d in released position (with battery pack 50d in motion) and latched position respectively.

In this example embodiment, as shown in the figures, the second latch member 126 of the second interface element 120 is shaped to allow passage of the translating latch 62 of the short battery pack 50c without having to be pivoted away from the battery pack 50c. In one embodiment, the second latch member 126 is fork-shaped including two or more spaced-apart teeth forming gaps therebetween. The translating latch 62 of the short battery pack 50c is similarly fork-shaped with corresponding teeth arranged to slide within the gaps formed between the teeth of the second latch member 126 as the battery pack 50c is inserted into or removed from the battery receptacle 114. Accordingly, in an embodiment, battery pack 50c may be removed from or inserted into the battery receptacle 114 by the user pressing down on actuator 64 of the battery pack 50c, without any actuation of actuator 130 of the multi-latch mechanism 100. As illustrated in the figures, when receiving the long battery pack 50d, teeth of the second latch member 126 engage pocket 64 in the latched position a described above. In an embodiment, second latch member 126 includes two outer teeth and a middle tooth therebetween, and the translating latch 62 includes two teeth positioned to slide within the gap formed between the outer and middle teeth of the second latch member 126.

In an alternative embodiment, second latch member 126 may be U-shaped with two outer teeth forming a large enough gap therebetween to allow passage of the translating latch 62 of the short battery pack 50c without providing teeth on the translating latch 62 or otherwise modifying the shape of the translating latch 60. In this configuration, in an embodiment, a length of the pocket 64 of the long battery pack 50d is greater than a length of translating latch 60 of the short battery pack 50c to accommodate the outer teeth of the second latch member 126. The outer teeth of the second latch member 126 are sized to be positioned around the two sides of the translating latch 60 of the short battery pack 50c as the short battery pack 50c is inserted into or removed from the battery receptacle 114.

In yet another embodiment, battery receptacle 114 may include a rib or a ramp that gradually presses down on the translating latch 60 as battery pack 50b is being removed, allowing it to slide past the second latch member 126.

FIGS. 60-63 illustrate the battery pack 50c is similar to the short battery pack 50a previously described, but it includes a pocket 74 in place of a translating latch. In an embodiment, the multi-latch mechanism 100 according to this embodiment is designed such that, in the latched position, the first and second latch members 116 and 126 are located below the top plane of the battery pack 50c (i.e., the plane at the surface of the battery pack 50c where the pocket 74 opens). Thus, in the latched position, the first and second latch members 116 and 126 can catch the pocket 74 of battery pack 50c and the pocket 64 of the battery pack 50d respectively. The first and second latch members 116 and 126 of this embodiment may be also be utilized to catch translating latches of battery packs 50a and 50d.

FIGS. 60-63 illustrate various isometric views of alternative example embodiment of multi-latch mechanism 100 in which first interface element 110 is unfixed to the actuator 130, according to an embodiment. In this embodiment, distal connection point 138 of the actuator 130 is in not in fixed contact with the front end 118 of the first interface element 110. Rather, in an embodiment, distal connection point 138 of the actuator 130 detachable from the front end 118 of the first interface element 110 in some positions. In an embodiment, distal connection point 138 of the actuator 130 is received through a lower opening 119 formed in the front end 118 of the first interface element 110 when it contacts the first interface element 110.

As shown in FIGS. 60-63, when receiving the short battery pack 50c, the distal connection point 138 of the actuator 130 is in contact with the front end 118 of the first interface element 110 in latched and released positions. When receiving the long battery pack 50d, the distal connection point 138 of the actuator 130 is in out of contact with the front end 118 of the first interface element 110 in the latched position as the first latch member 116 rests on top of the battery pack 50d. In the release position, the distal connection point 138 of the actuator 130 is received within the lower opening 119 of the front end 118 of the first interface element 110 to engage and lift the first latch member 116 away from the battery pack 50d.

FIGS. 68-82 illustrate various views of another example embodiment of a power tool battery receptacle 114 provided with another example embodiment of a multi-latch mechanism 200 having at least two independently actuated interfaces. The battery receptacle 114 and the multi-latch mechanism 200 interface with the long battery pack 50d in latched and released positions respectively. The battery receptacle 114 and the multi-latch mechanism 200 interface with the short battery pack 50c in latched and released positions respectively.

As shown in these figures, the multi-latch mechanism 200 includes a first interface element 210 for engagement with the pocket 74 of the short battery pack 50c and a second interface element 220 for engagement with the pocket 64 of the long battery pack 50d.

In an embodiment, the first interface element 210 includes a first arm 212 pivotably coupled to a first actuator 218 via a first pivot member 214 supported by the battery receptacle 114. First interface 210 further includes a first latch member 216 projecting downwardly from approximately an end of the first arm 212. Similarly, the second interface element 220 includes a second arm 222 pivotably coupled to a second actuator 228 via a second pivot member 224 supported by the battery receptacle 114. The second interface element 220 further includes a second latch member 226 projecting downwardly from approximately an end of the second arm 222.

The battery receptacle 114 in this embodiment includes first and second recesses or openings 230 and 232 through which the first and second actuators 218 and 228 are accessible and engageable by the user. In an embodiment, the second recess 232 is provided at an end of the battery receptacle 114 away from the housing 12 (i.e., the handle portion in this example), and the first recess 230 is provided between the housing 12 and the second recess 232. In an embodiment, the first and second pivot members 224 are provided below the recesses 230 and 232.

Each of the first and second actuators 218 and 228 is spring-loaded (e.g., via a spring that is not shown) to a latched position and operates independently by the user to move the first and second interfaces 210 and 220 from the latched position to the released position. Thus, in an embodiment, to remove the short battery pack 50c from the battery receptacle 114, the user initially presses the first actuator 218 to disengage the battery pack 50c, and then presses the second actuator 228 to allow passage of the battery pack 50c out of the battery receptacle 114.

Alternatively, the second latch member 216 has a greater width and/or shape than the first latch member 226. The pocket 64 of the long battery pack 50d similarly has a greater corresponding width and/or shape than the pocket 74 of the short battery pack 50c. The second latch member 216 therefore does not slide into the pocket 74 as the short battery pack 50c is being inserted or removed from the battery receptacle 114.

The above description of the second embodiment is made by way of example with reference to battery packs 50c and 50d having pockets 74 and 64 respectively. In an alternative embodiment, as shown in FIGS. 85-96, the multi-latch mechanism 200 may be additionally and/or alternatively configured to interface with battery packs 50c and 50d having translating latches 60 and 70 respectively. The multi-latch mechanism 200 according to this embodiment is designed such that, even in the latched position, the first and second latch members 216 and 226 are located at or slightly above a top plane of the battery packs 50c and 50d (i.e., the plane at the surface of the battery pack where the pocket 74 or 64 opens). Thus, in the latched position, the first and second latch members 216 and 226 can catch the translating latch 62 of battery pack 50c and the translating latch 70 of the battery pack 50d respectively. However, in this embodiment, the first and second latch members 216 and 226 are not capable of extending into a female recess or pocket of the battery pack. Alternatively, however, multi-latch mechanism 200 may be configured such that the first and second latch members 216 and 226 extend below the top plate of the battery pack and shaped to engage female recesses or pockets as well as male translating latches and hooks of various battery packs.

According to an embodiment, first arm 212 of first interface element 210 may be additionally provided with side walls 213 extending from two sides of the first latch member 216 to delimit lateral movement of the translating latch 62 when receiving the short battery pack 50c. Similarly, second arm 222 of second interface element 220 may be additionally provided with side walls 223 extending from two sides of the second latch member 226 to delimit lateral movement of the translating latch 70 when receiving the long battery pack 50d.

FIGS. 97-111 illustrate various views of another example embodiment of a power tool battery receptacle 114 provided with another example embodiment of a multi-latch mechanism 300 having at least two discrete and spaced-apart stationary female catches in the form of fixed pockets for engagement with moveable male hooks in the form of translating latches of different battery packs, according to a third embodiment of the invention. As shown in these figures, in an embodiment, multi-latch mechanism 300 includes a first pocket 310 for engagement with short battery pack 50c having translating latch 62 and a second pocket 320 for engagement with long battery pack 50d having translating latch 70 at a different location from translating latch 62. The first and second pockets 310 and 320 are formed as lateral recesses formed in a lower surface of the battery receptacle 114 facing the top of the battery pack. Each pocket 310 and 320 includes a straight front surface arranged perpendicularly to the receiving axis of the battery pack, and a sloped rear surface extending downwardly from the top of the straight surface. The first pocket 310 is disposed closer to the housing 90 (in this case the power tool handle) than is second pocket 320. The second pocket 320 is disposed close to a front end of the battery receptacle 114 and first pocket 310 is disposed approximately halfway between the handle and the second pocket 320. In an embodiment, a distance between the first and second pockets is in the range of 1-5 cm, preferably approximately 2-4 cm.

FIGS. 112-120 illustrate various views of another example embodiment of a power tool battery receptacle 114 provided with another example embodiment of a multi-latch mechanism 400 having a stationary female catch in the form of a fixed pocket 410 provided for engagement with a moveable male hook in the form of a translating latch of a battery pack, provided at a distance from moveable male hook in the form of an actuatable interface 420 for engagement with a stationary female catch in the form of a pocket of a different battery pack, according to a fourth embodiment of the invention. As shown in these figures, in an embodiment, the pocket 410 is positioned to engage with the translating latch 62 of the short battery pack 50c, and actuatable interface 420 is positioned to engage the pocket 64 of the long battery pack 50d. In an embodiment, actuatable interface 410 is similar to second interface element 220 of the second embodiment described above, and includes an arm 422 pivotably coupled to an actuator 428 via a pivot member 414 supported by the battery receptacle 114 and a latch member 426 projecting downwardly from approximately an end of the arm 422. In an embodiment, pocket 410 is similar to pocket 310 of the third embodiment described above and includes a vertical surface and an angled surface formed in the lower surface of the battery receptacle 114. In an embodiment, pocket 410 is disposed closer to the housing 90 (in this case the power tool handle) than is actuatable interface 420.

FIGS. 121-130 illustrate various views of another example embodiment of a power tool battery receptacle 114 provided with another example embodiment of a multi-latch mechanism 500 having two interfaces actuated by a horizontally sliding actuator 530, according to a fifth embodiment of the invention. The figures illustrate views of the multi-latch mechanism 500 including the horizontally sliding actuator 530.

As shown in these figures, in an embodiment, the multi-latch mechanism 500 includes a first interface element 510 for engagement with the short battery pack 50c and a second interface element 520 for engagement with the long battery pack 50d.

The first interface element 510 includes a first arm 512 pivotably coupled to a first actuator 518 via a first pivot member 514 supported by the battery receptacle 114. The first interface element 510 further includes a first latch member 516 projecting downwardly from approximately an end of the first arm 512. Similarly, the second interface element 520 includes a second arm 522 pivotably coupled to a second actuator 528 via a second pivot member 524 supported by the battery receptacle 114. The second interface element 520 further includes a second latch member 526 projecting downwardly from approximately an end of the second arm 522. In an embodiment, both first and second actuators 518 and 528 extend approximately vertically.

The sliding actuator 530 includes a main planar body 534 and a slider button 532 projecting vertically upwardly from the main body 534. The battery receptacle 114 includes an opening 540 through which the slider button 532 is accessible and slidable between two positions. The opening 540, in an embodiment, is formed on top of the battery receptacle 114 and includes a width slightly greater than a length of the slider button 532 and a length that allows traversal movement of the slider button 532 between the two positions. The main body 534 of the sliding actuator 530 is located below the opening 540 of the battery receptacle 114.

The sliding actuator 530 further includes a slot 536 forward of the slider button 532 and a rear end 538 rearward of the slider button 532. The slot 536 is sized and positioned to receive the first actuator 518 of the first interface element 510 therein. The rear end 538 is arranged to be mechanically coupled to the second actuator 528 of the second interface element 520. The first actuator 518 is sized such that a top portion of the first actuator 518 is received within the slot 536 but does not protrude out of the top of the slot 536 to avoid contact with the battery receptacle 114. Similarly, a top portion of the second actuator 528 is connected (e.g., via a known means such as a pin and socket or a snap) to the rear end 538 so as to avoid contact with the battery receptacle 114.

As shown in the figures sliding movement of the slider button 532 in a rear direction 'E' moves the first and second actuators 518 and 528 so as to pivot the first and second arms 512 and 522 away from the battery pack 50a or 50d in the released position. As shown in the figures, forward movement the slider button 532 to its default position disengages the main body 534 from the first actuator 518 and causes downward movement of the second actuator 528, thus allowing the first and second arms 512 and 522 to engage pockets 64 or 74 of battery packs 50a or 50d in the latched position. A spring member (not shown) may be provided to bias one or both of first and second arms 512 and 522 away from the battery receptacle 114. The spring member may be provided to bias the sliding actuator 530 in the forward direction.

Figure 125:
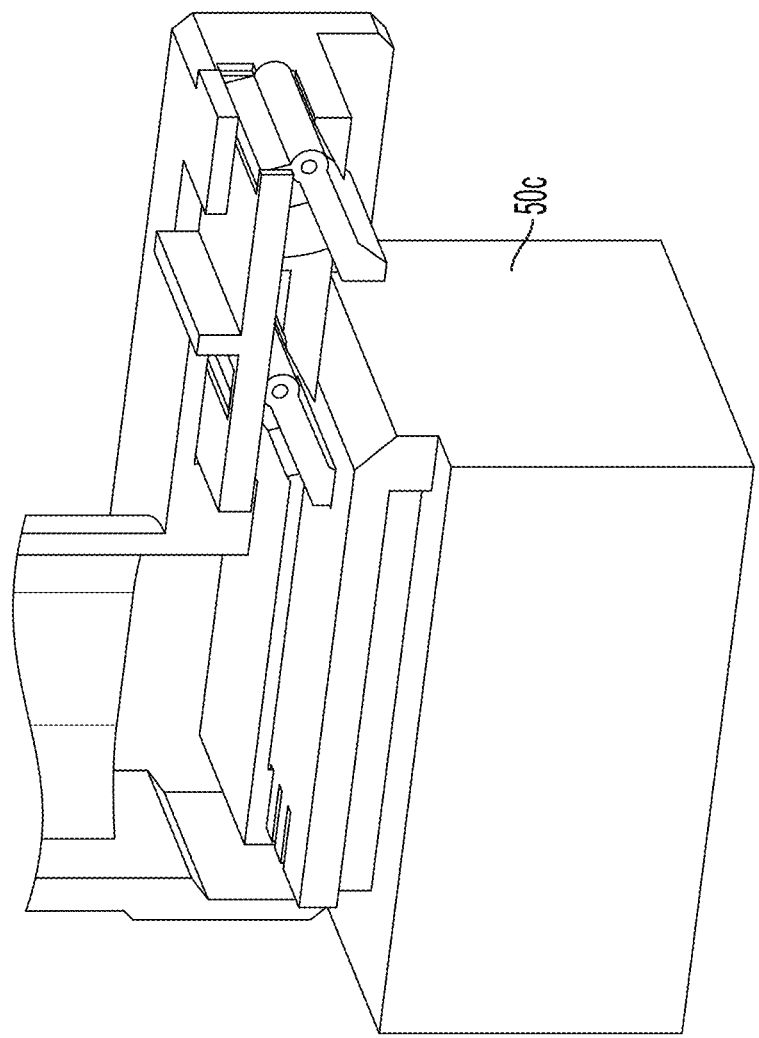
Figure 126:
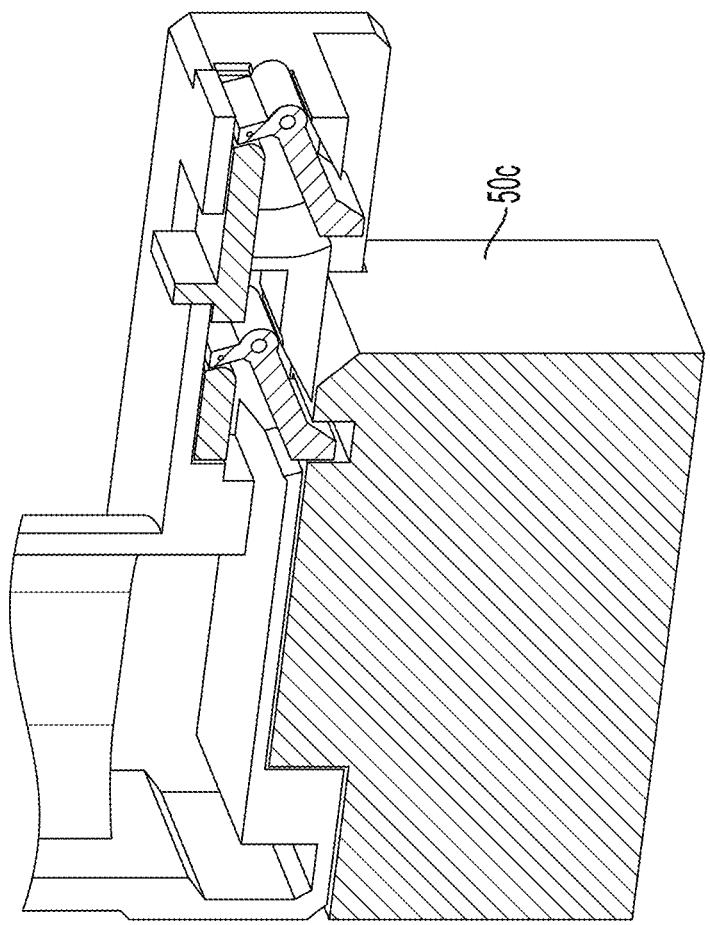
Figure 127:
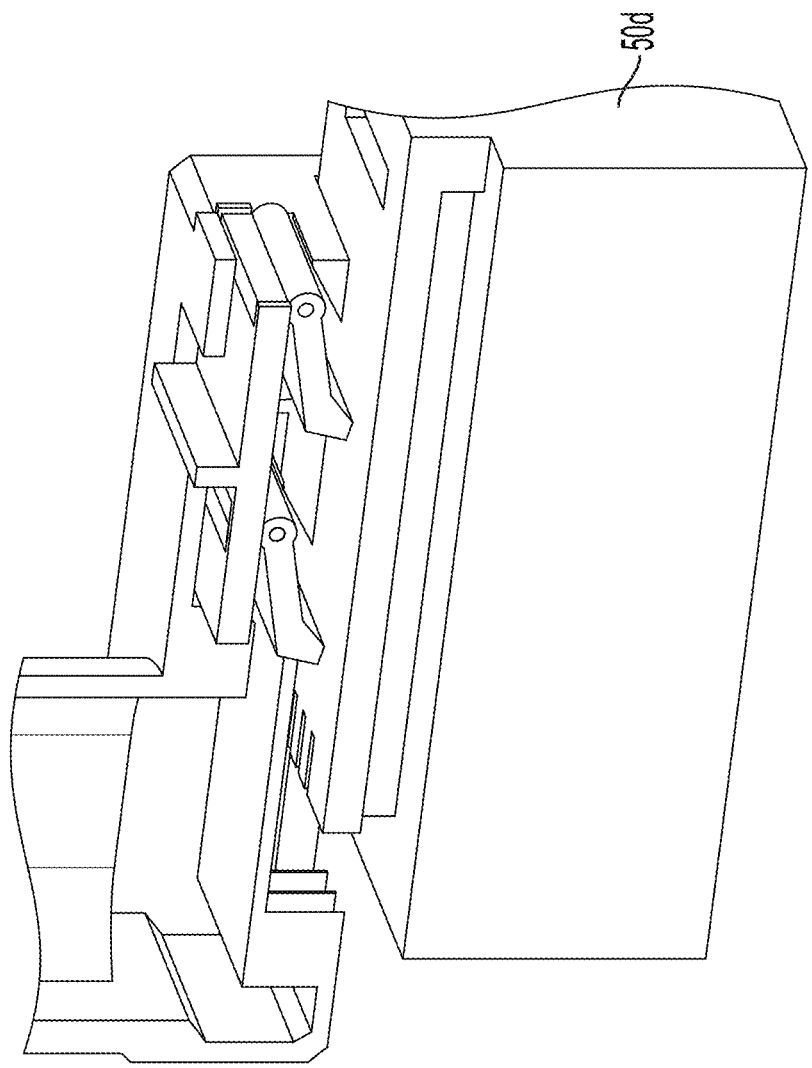
FIGS. 127-130 illustrate the example power tool of FIG. 121 and the example embodiment of the fourth battery pack of FIGS. 77-84.
Figure 128:
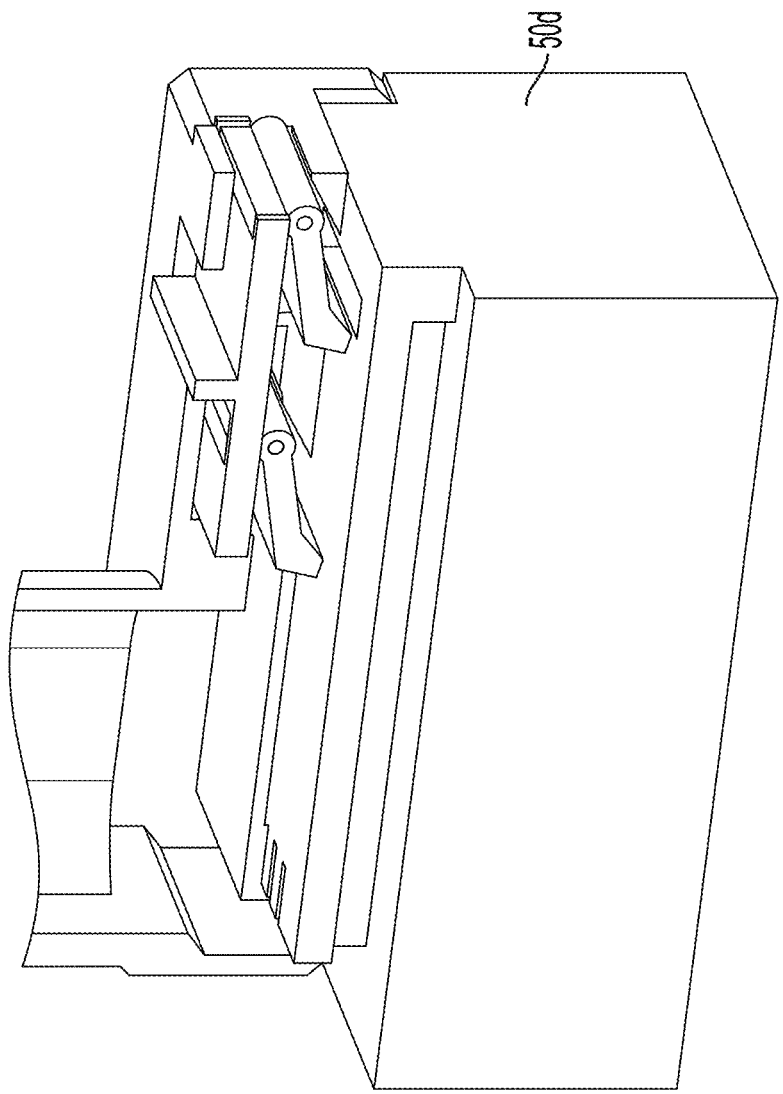
Figure 129:
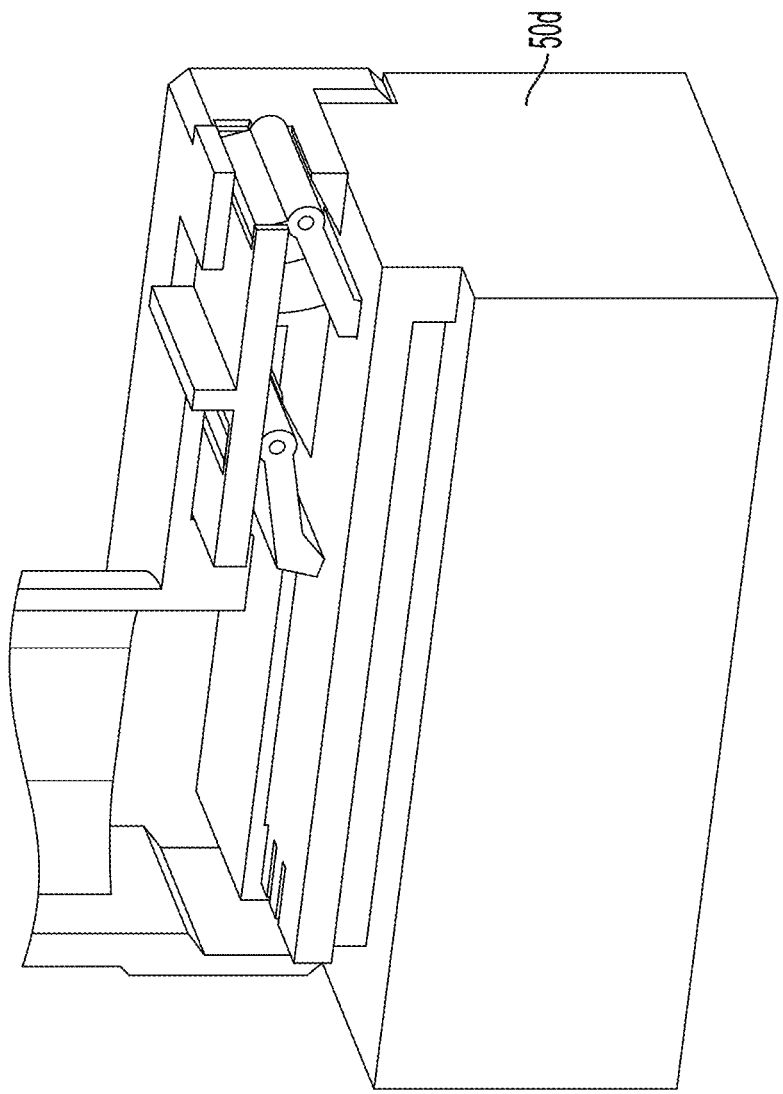
Figure 130:
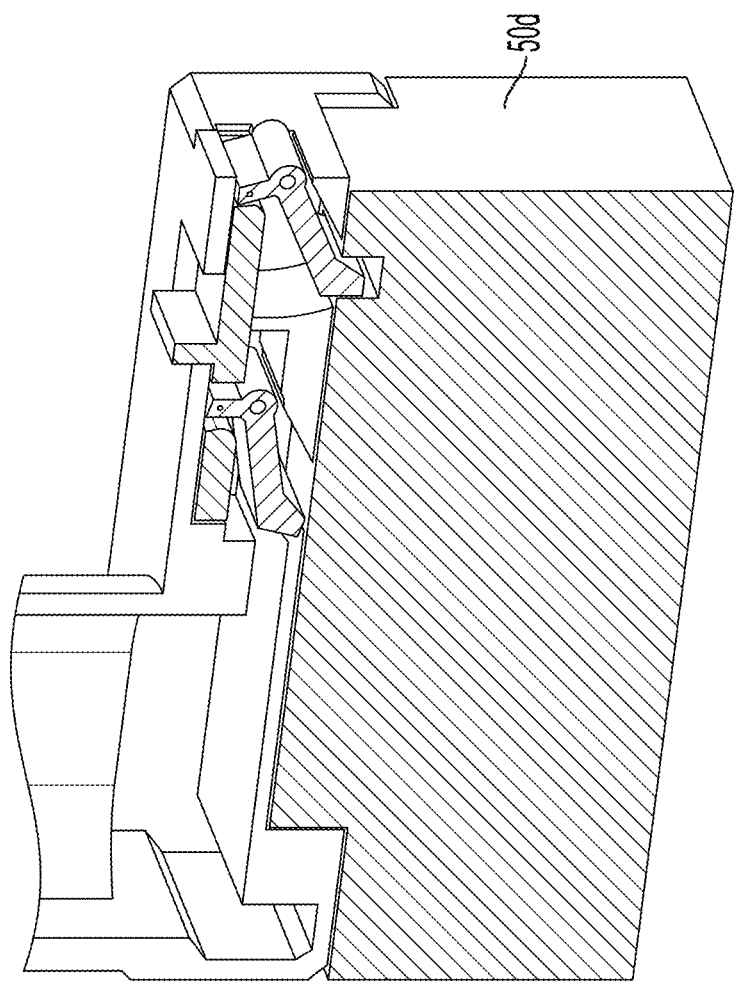
Figure 131:
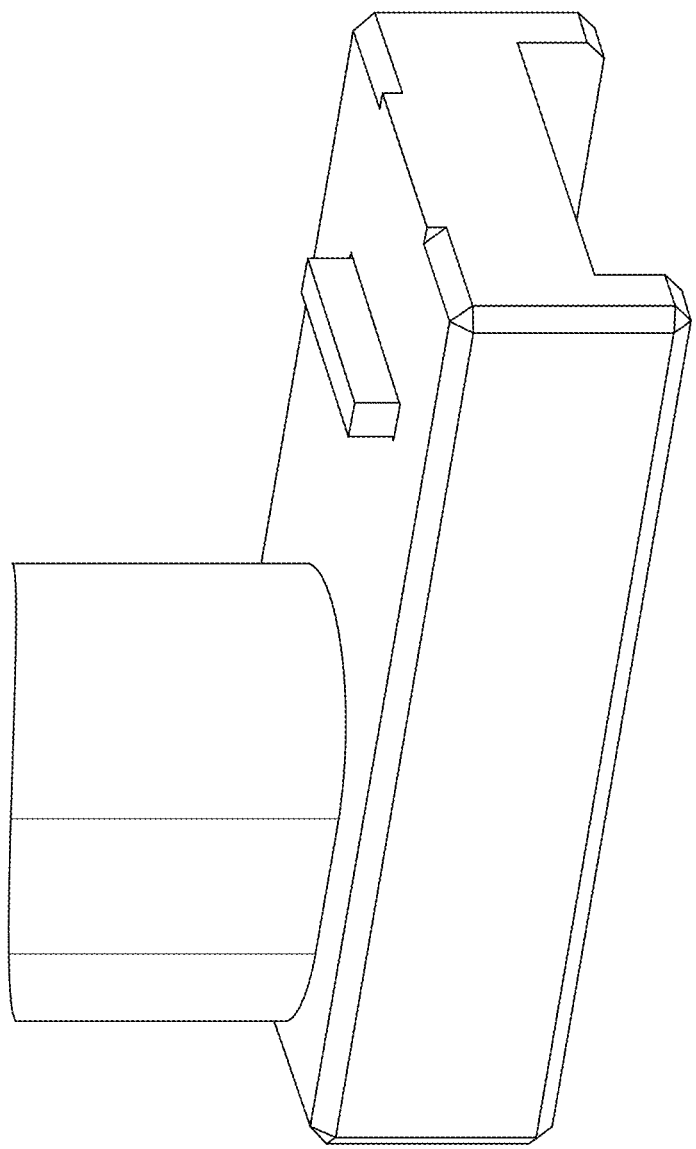
FIGS. 131-134 illustrate another example embodiment of a power tool having another example embodiment of a multi-latch mechanism.
Figure 132:
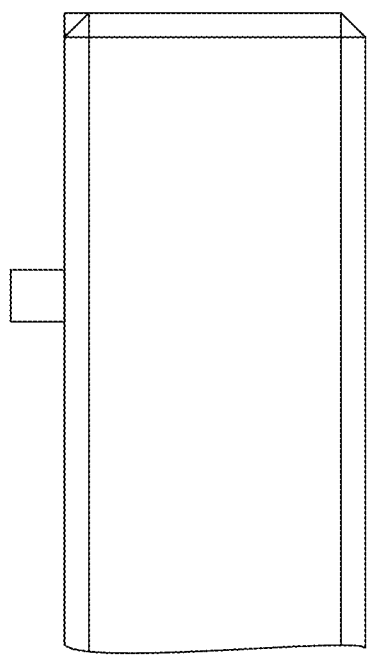
Figure 133:
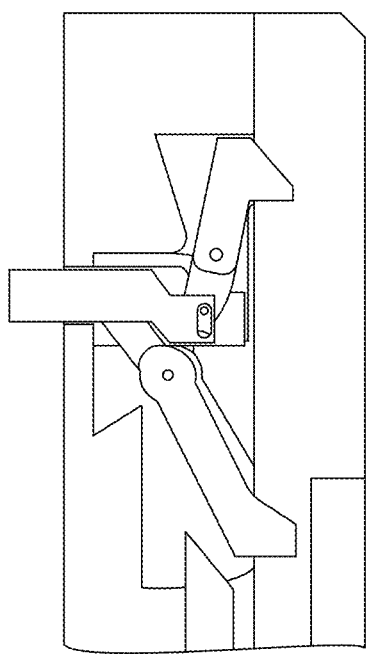
Figure 134:
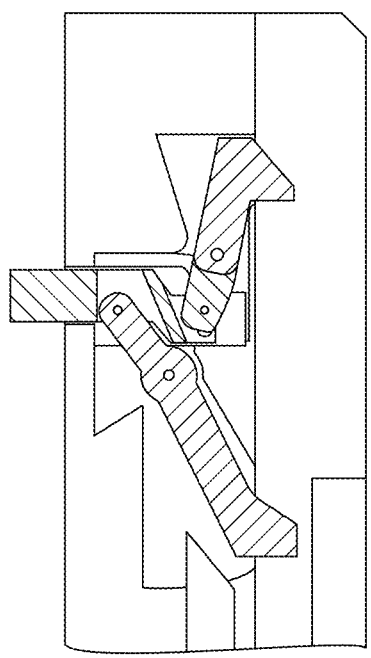
Figure 135:
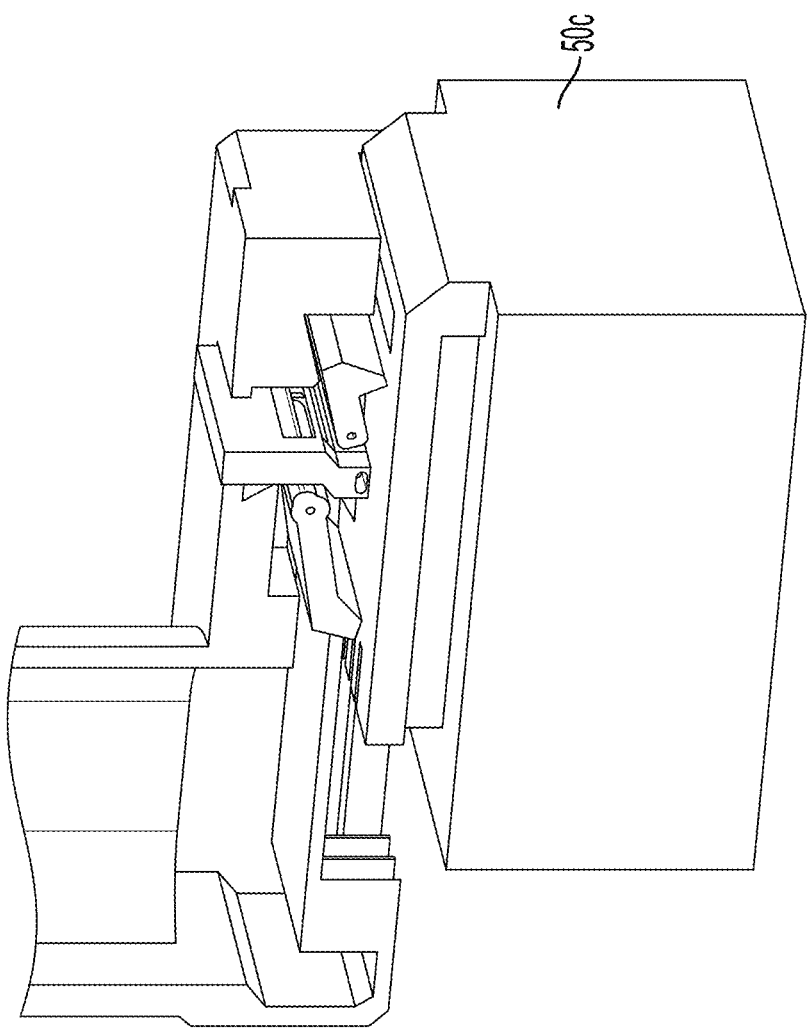
FIGS. 135-138 illustrate the example power tool of FIGS. 131-134 and the example embodiment of the third battery pack of FIGS. 69-76.
Figure 136:
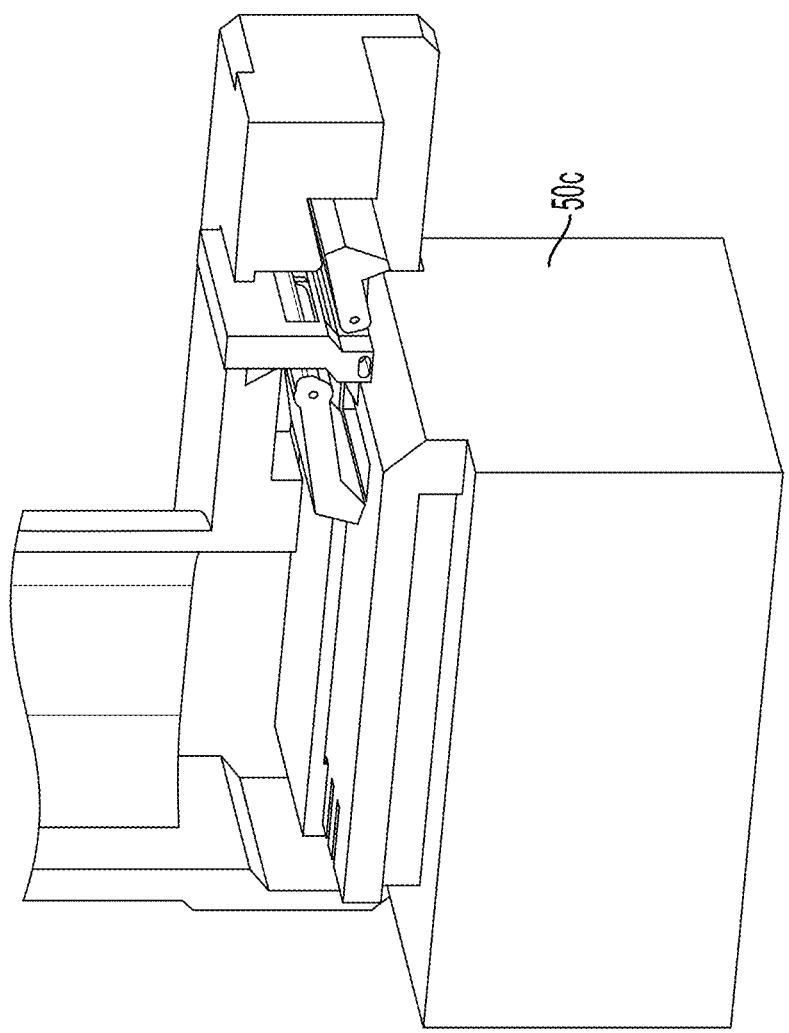
Figure 137:
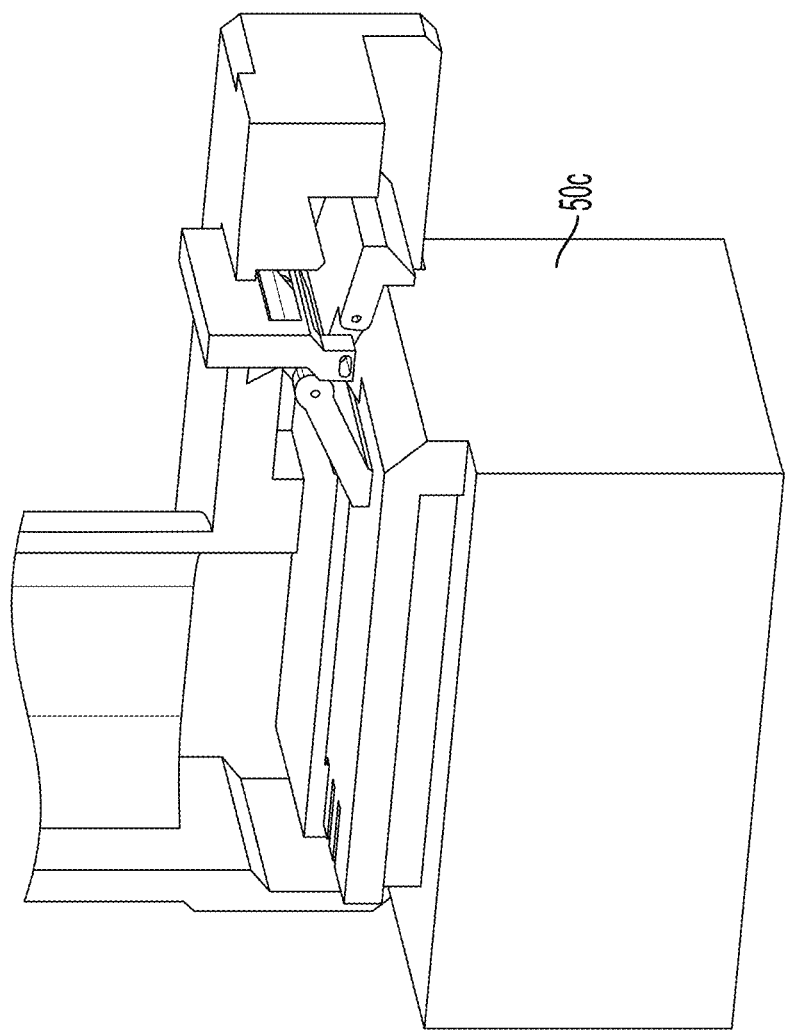
Figure 138:
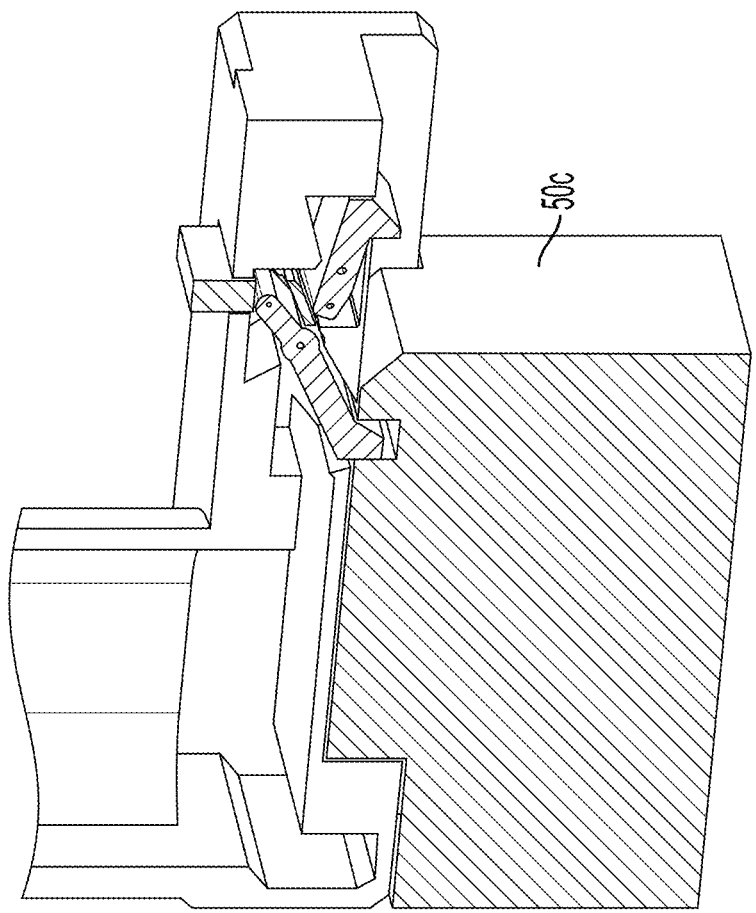
Figure 139:
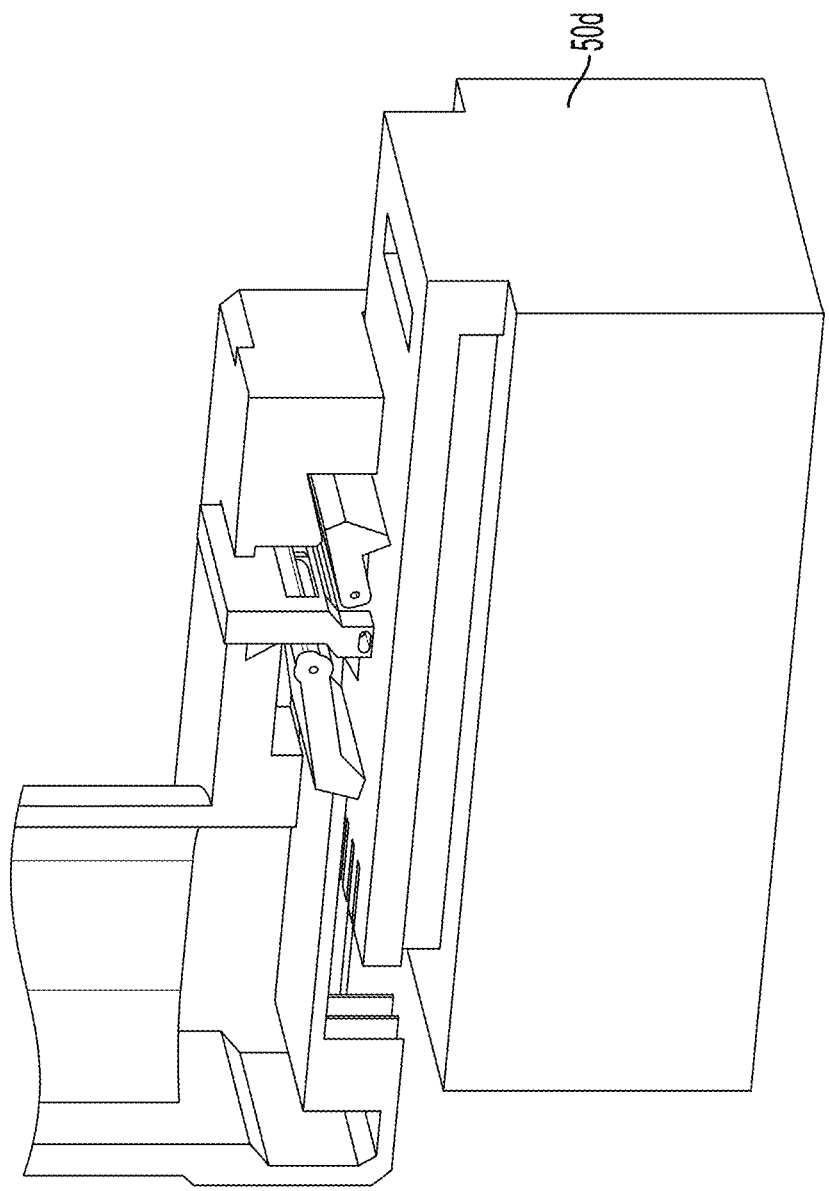
FIGS. 139-142 illustrate the example power tool of FIGS. 131-134 and the example embodiment of the third battery pack of FIGS. 77-84.
Figure 140:
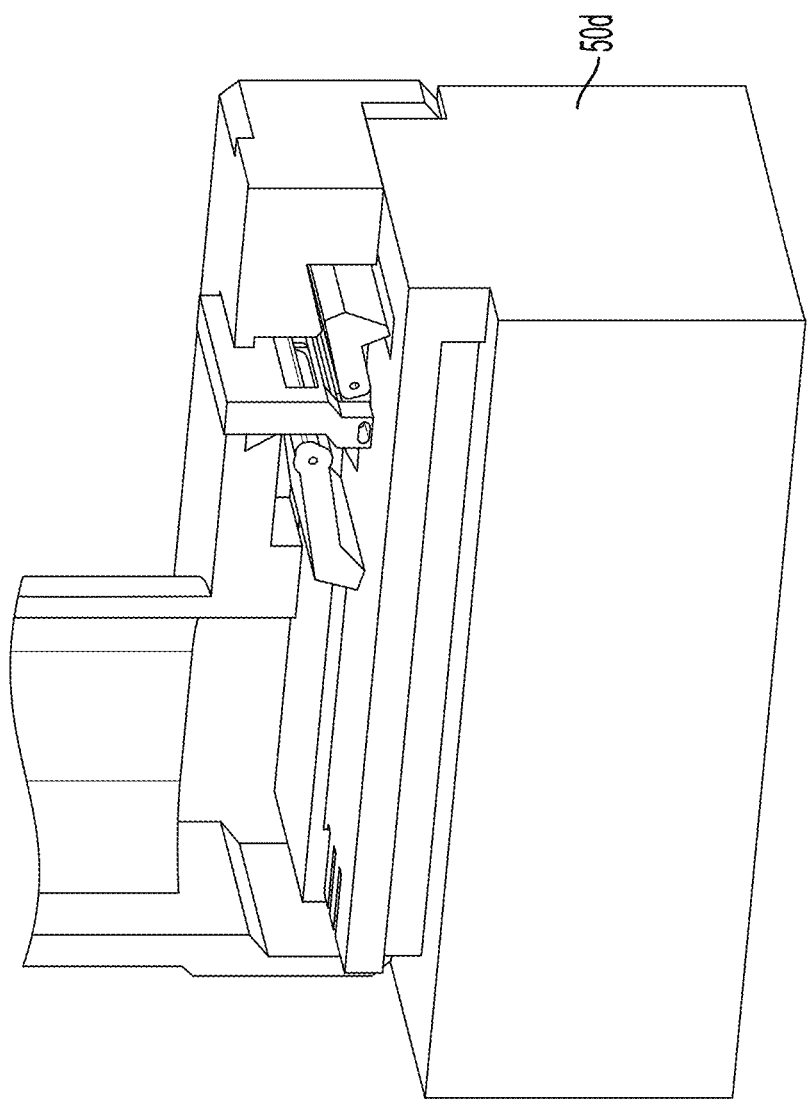
Figure 141:
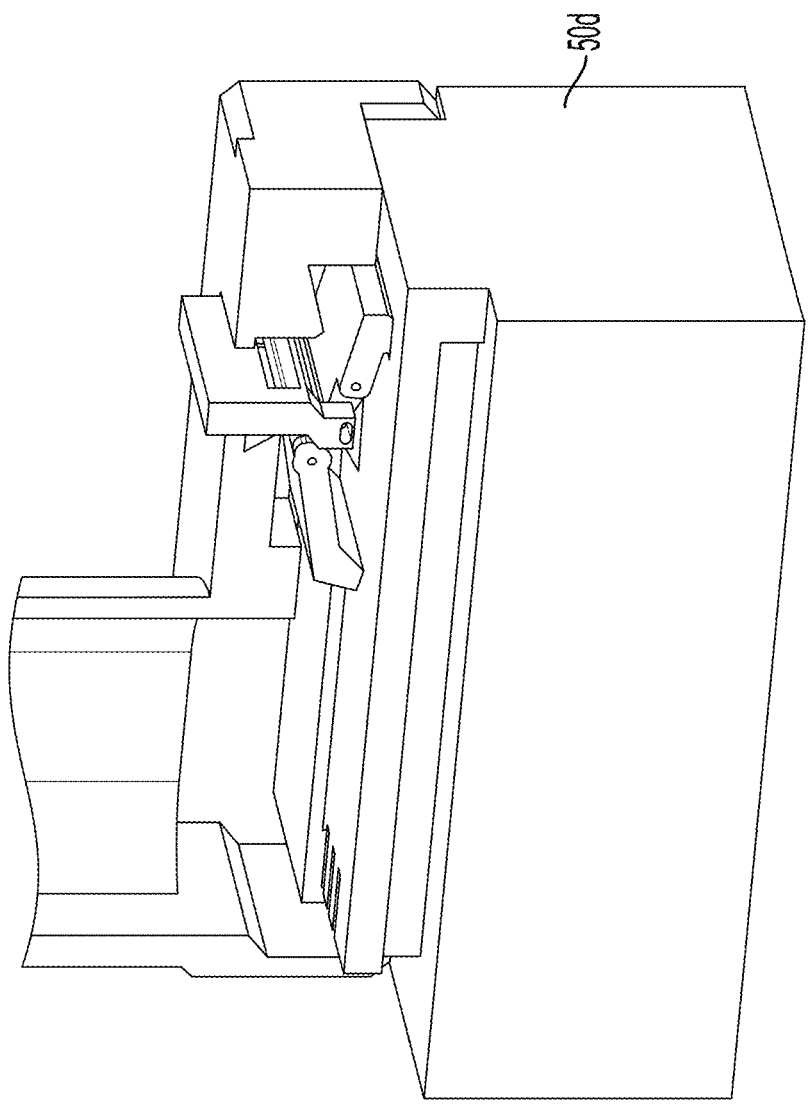
Figure 142:
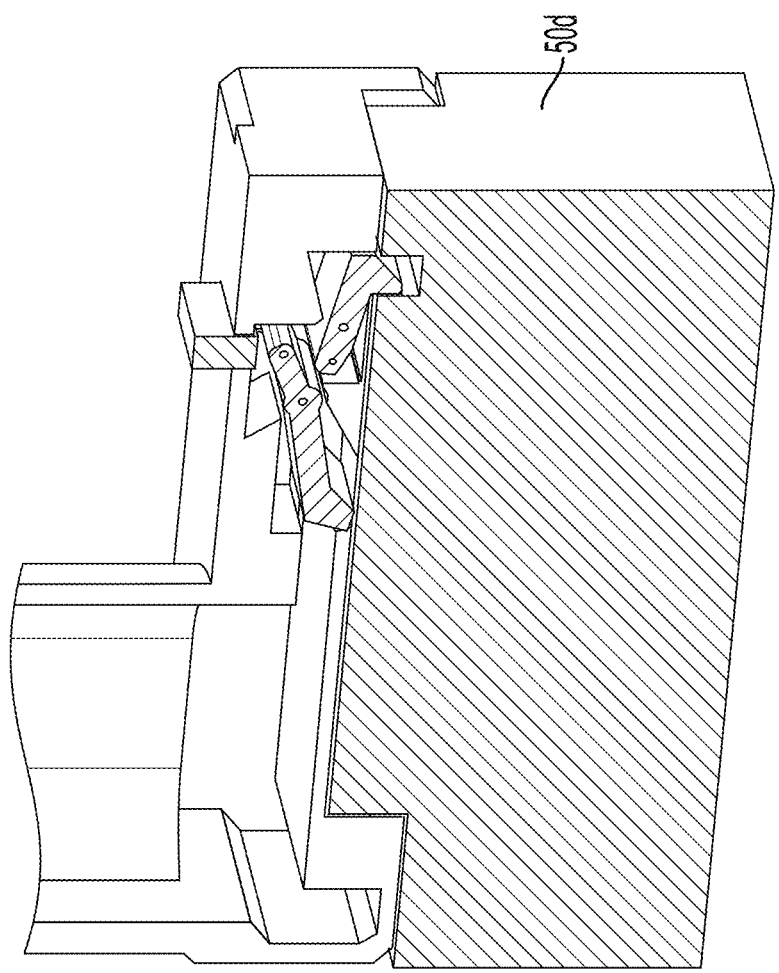
Figure 143:
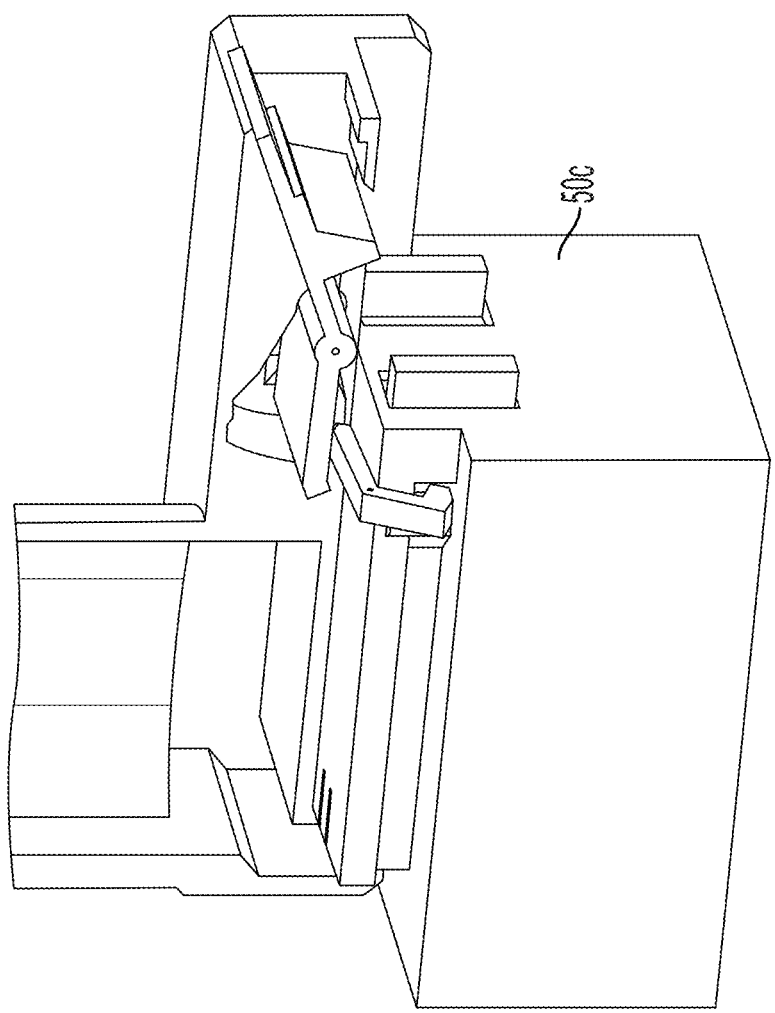
FIGS. 143-149 illustrate another example embodiment of a power tool having another example embodiment of a multi-latch mechanism and another alternative example embodiment of the third battery pack.
Figure 144:
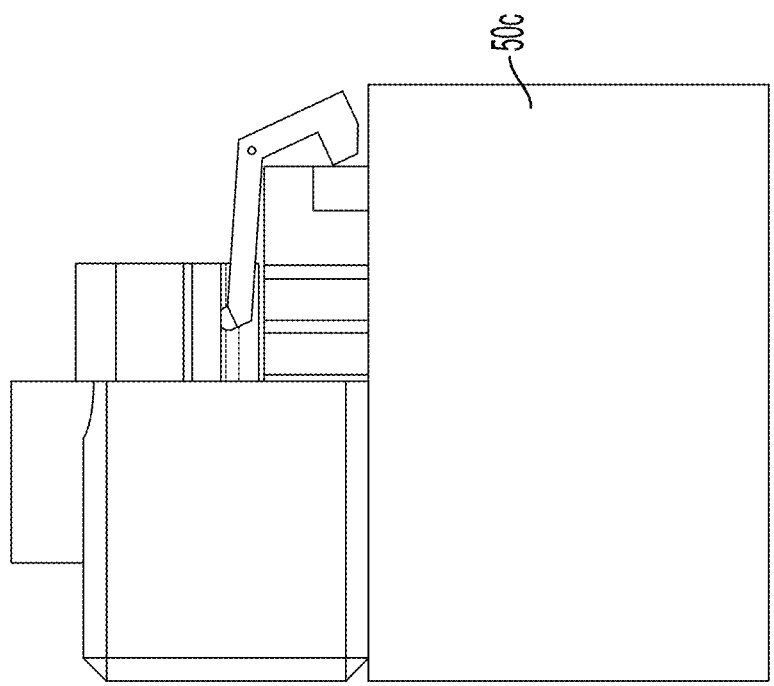
Figure 145:
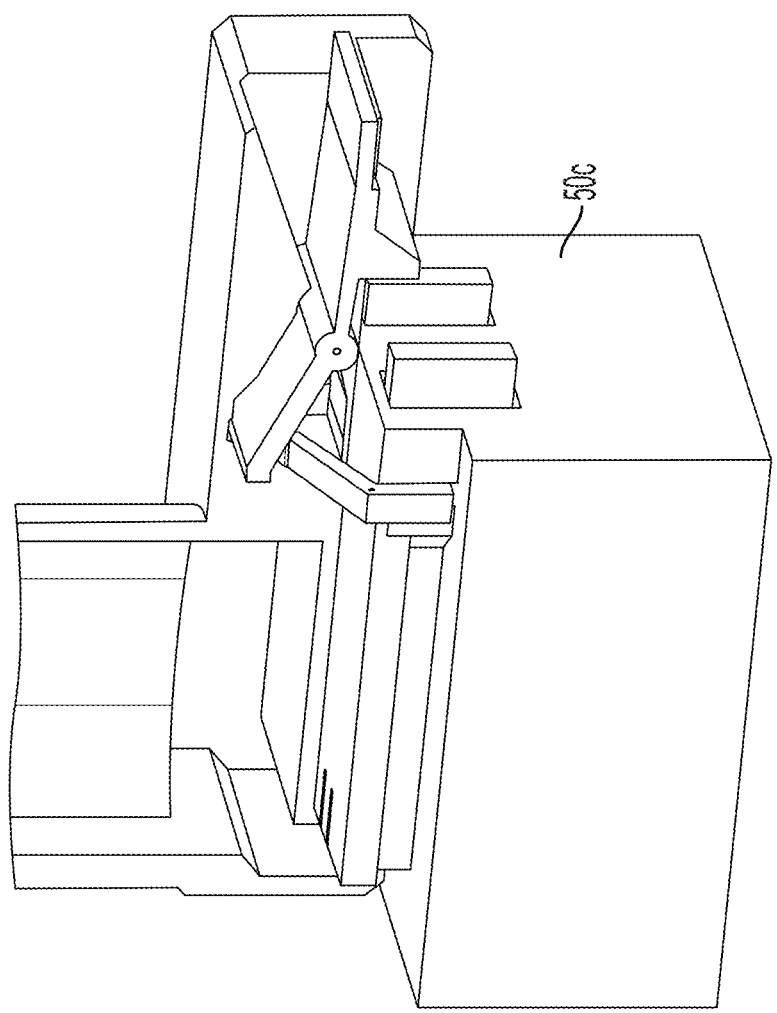
Figure 146:
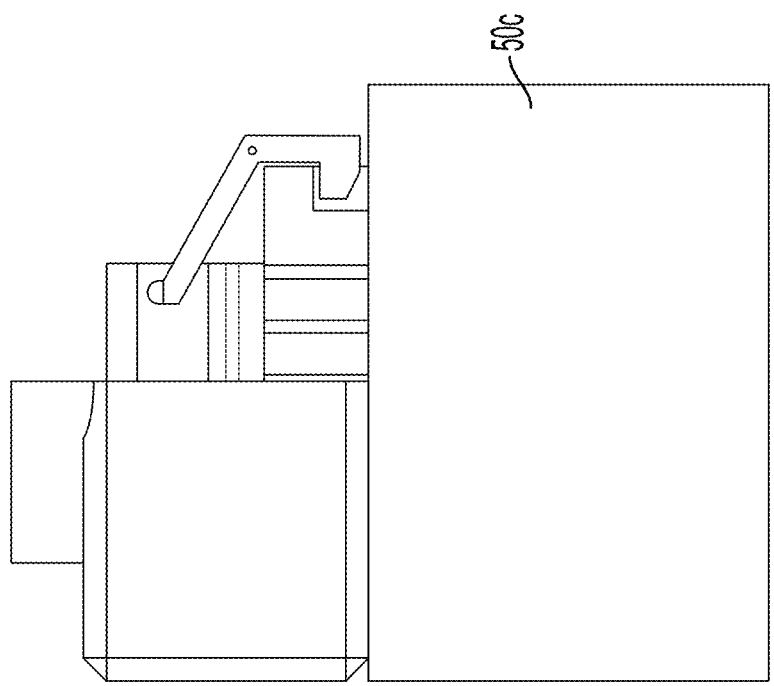
Figure 147:
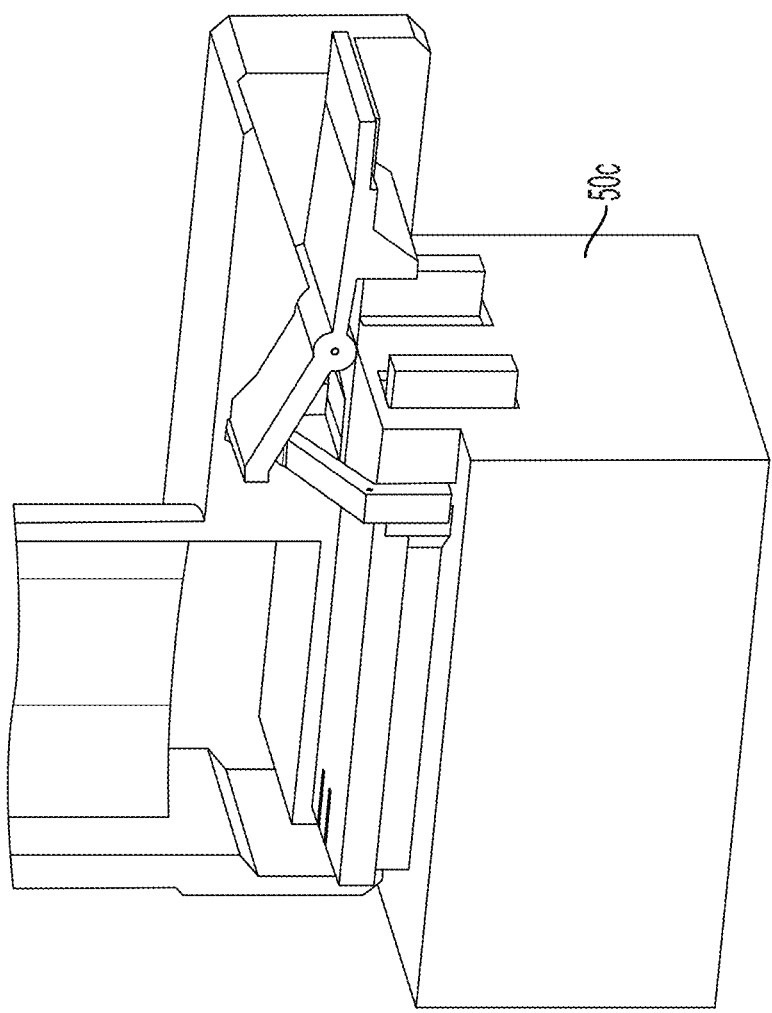
Figure 148:
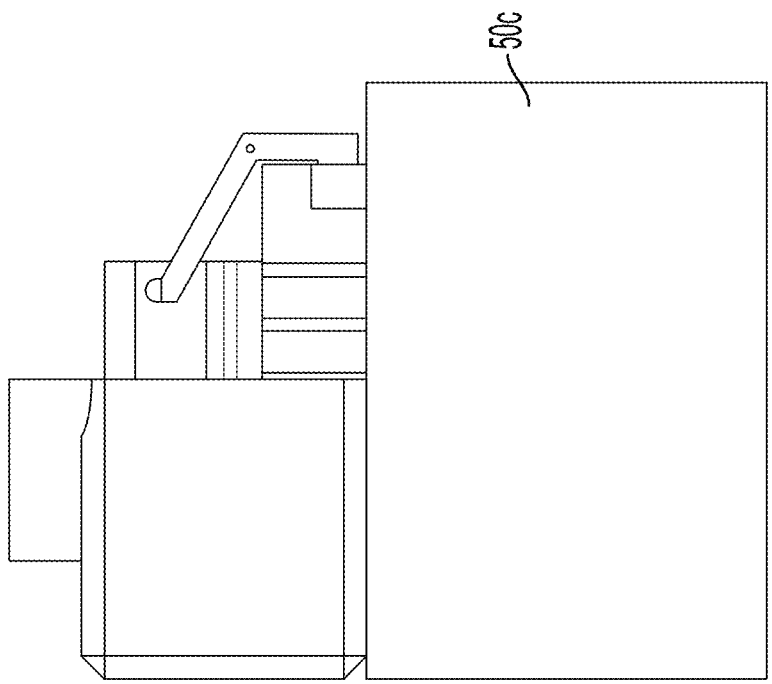
Figure 149:
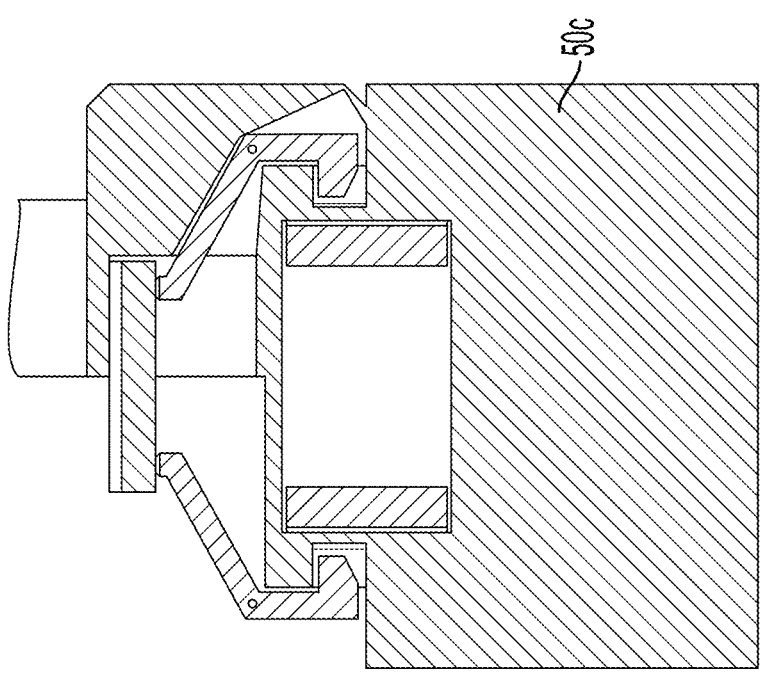
Figure 150:
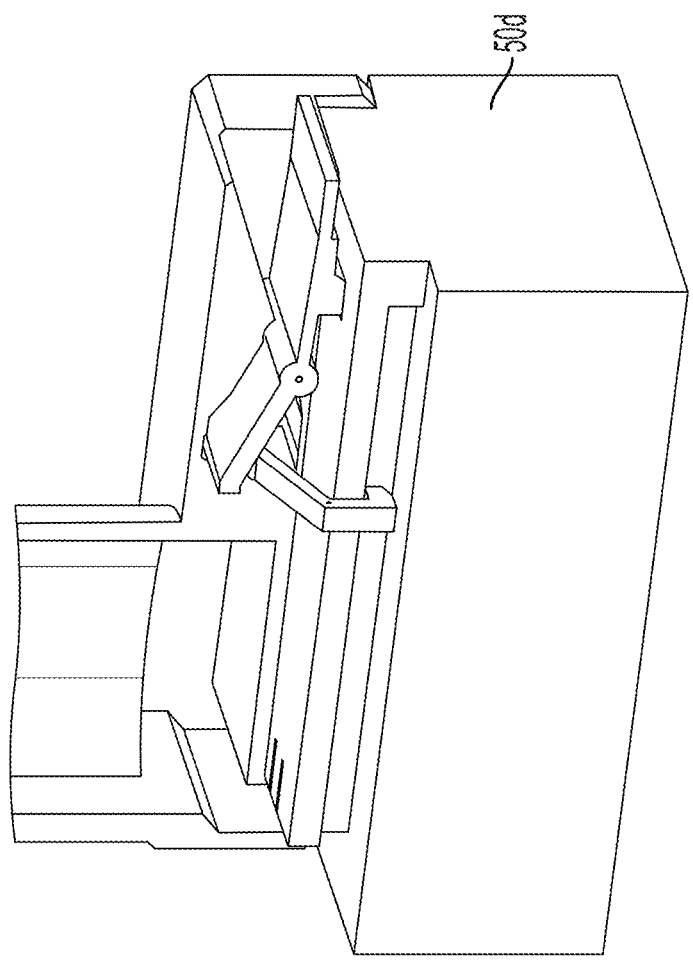
FIG. 150 illustrates the example embodiment of the power tool of FIGS. 143-149 and another alternative example embodiment of the fourth battery pack.
Figure 151:
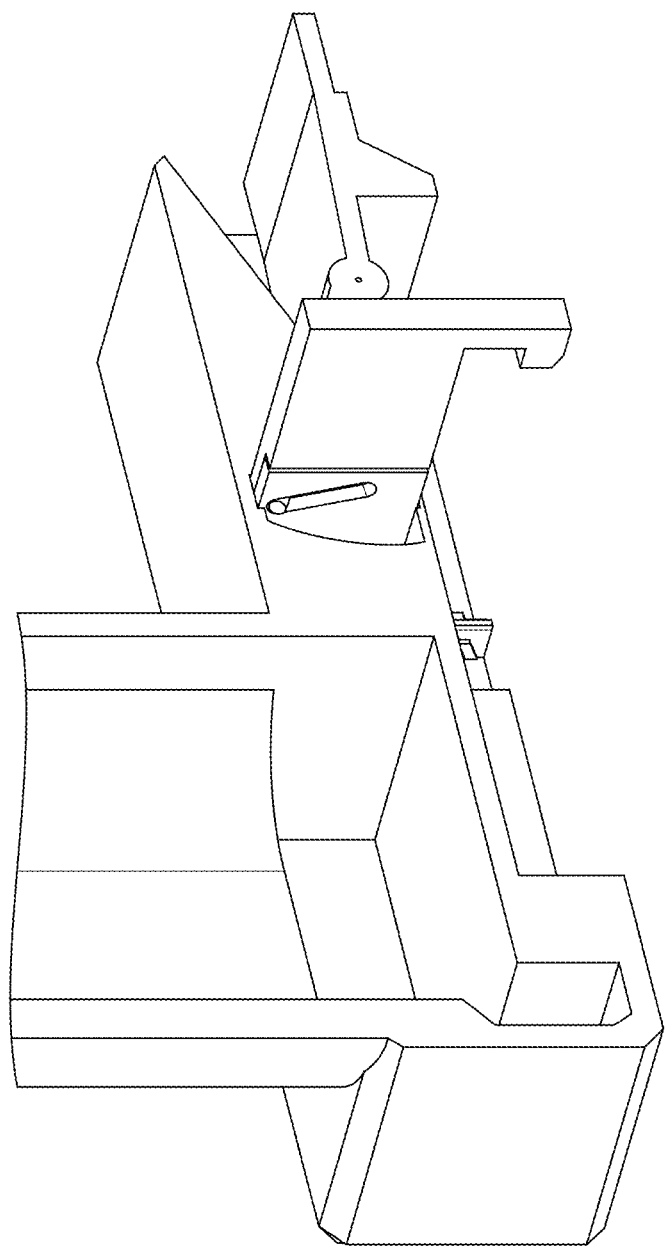
FIGS. 151-155 illustrate another example embodiment of a power tool having another example embodiment of a multi-latch mechanism.
Figure 152:
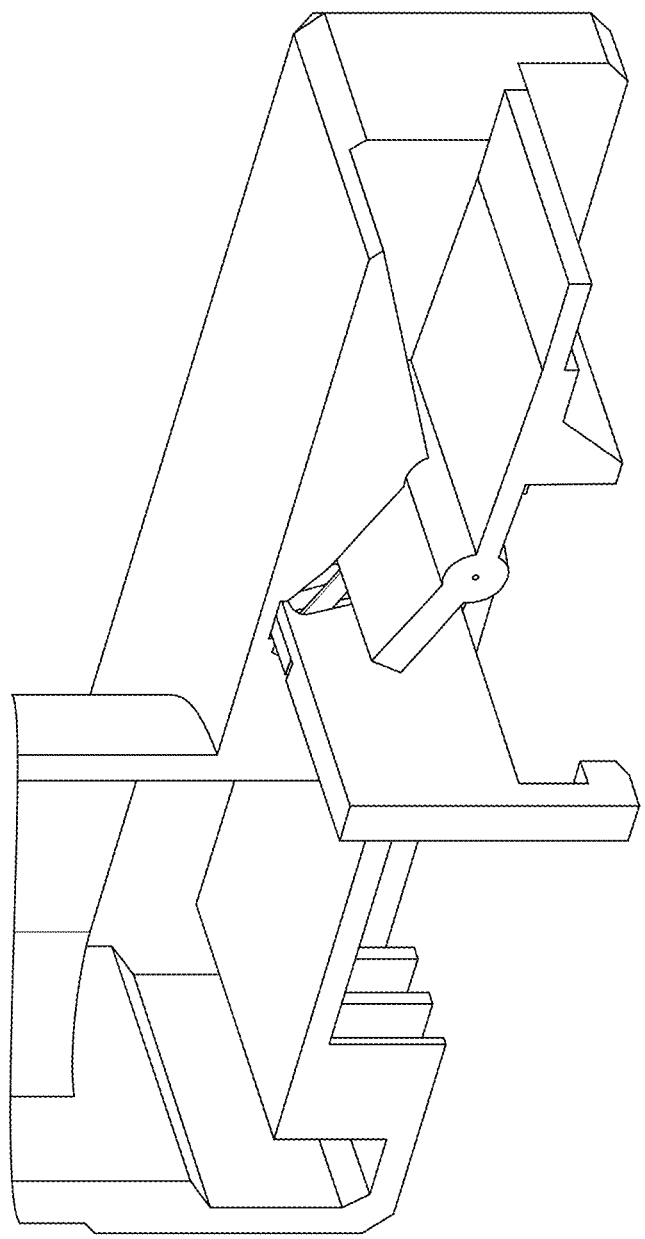
Figure 153:
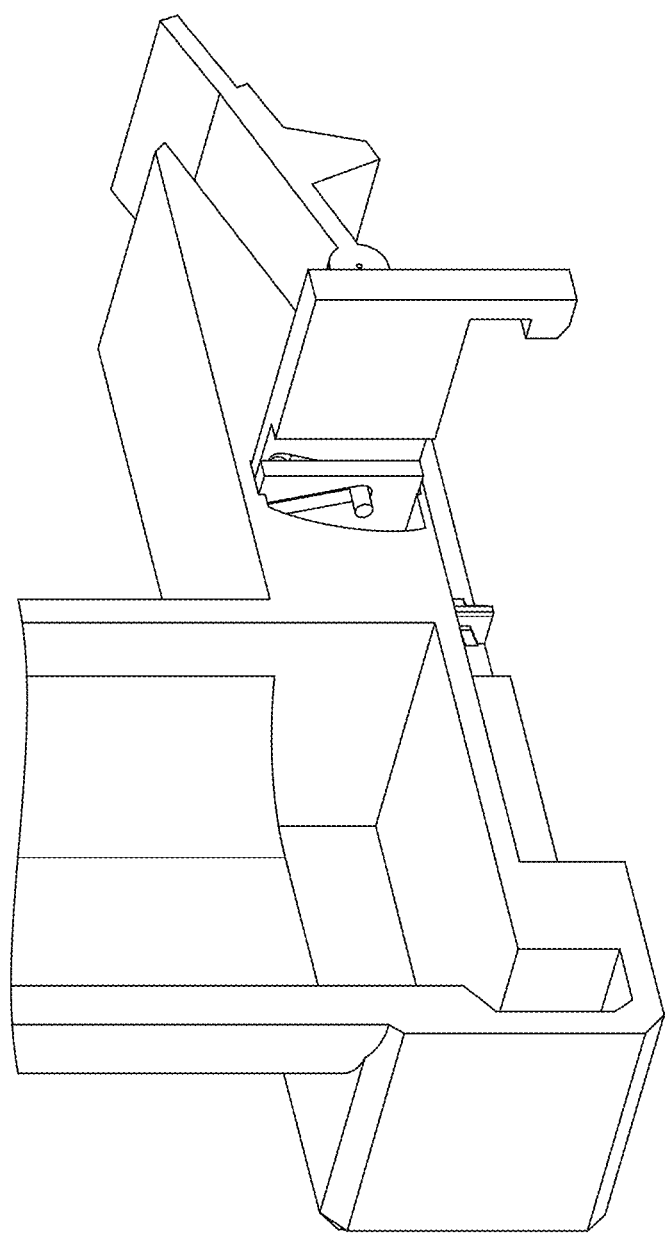
Figure 154:
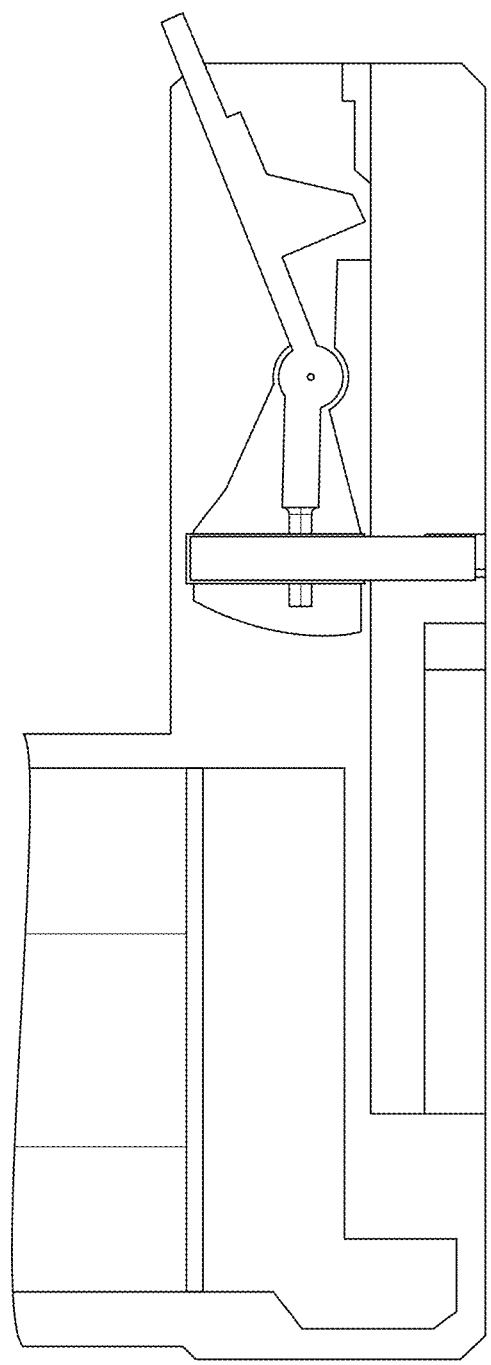
Figure 155:
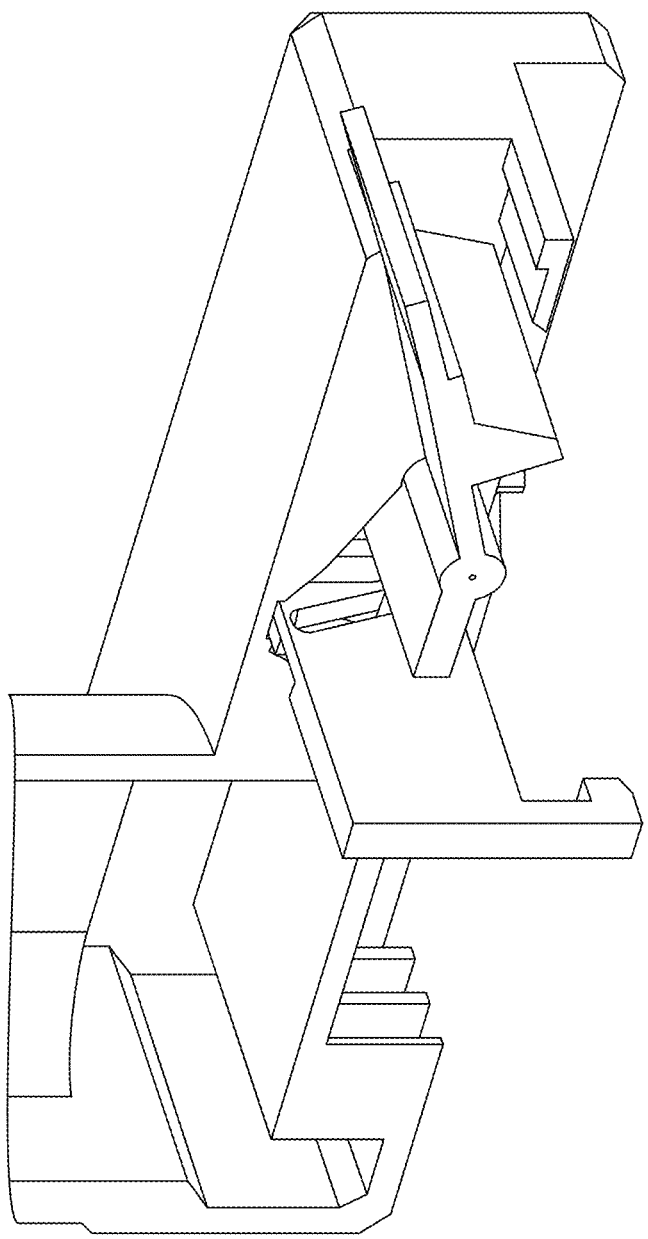
Figure 157:
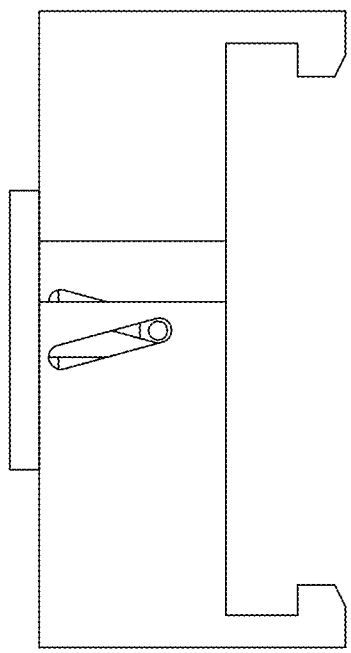
FIGS. 156 and 157 illustrate rear, elevation views of the multi-latch mechanism, in a latching position and a releasing position, respectively.
Figure 156:
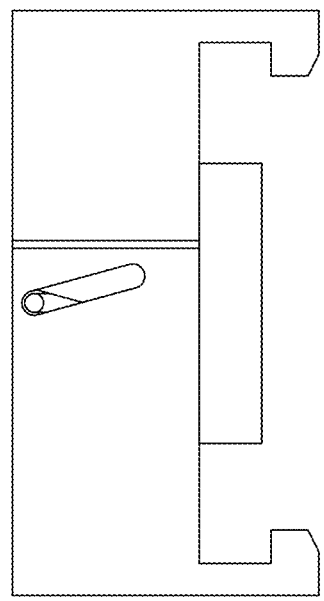
Figure 158:
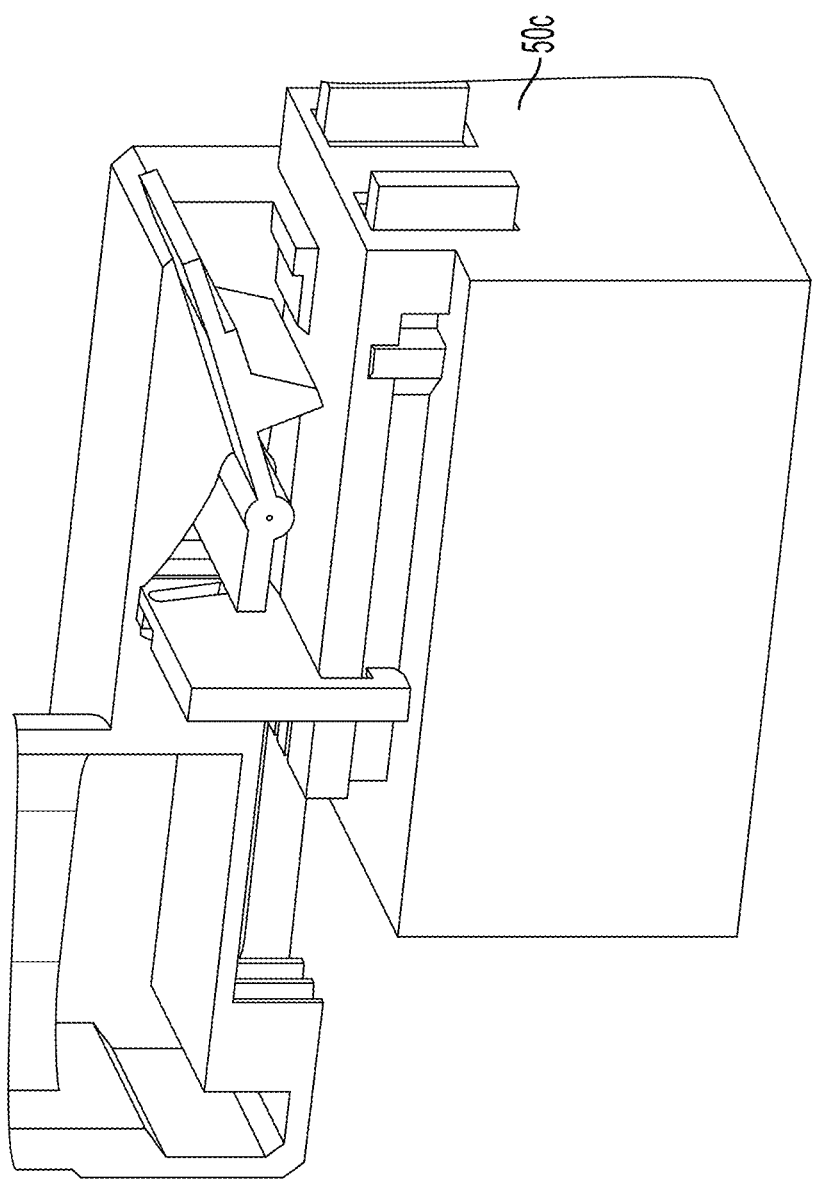
FIGS. 158-160 illustrate the example power tool of FIGS. 151-155 and another example embodiment of the third battery pack.
Figure 159:
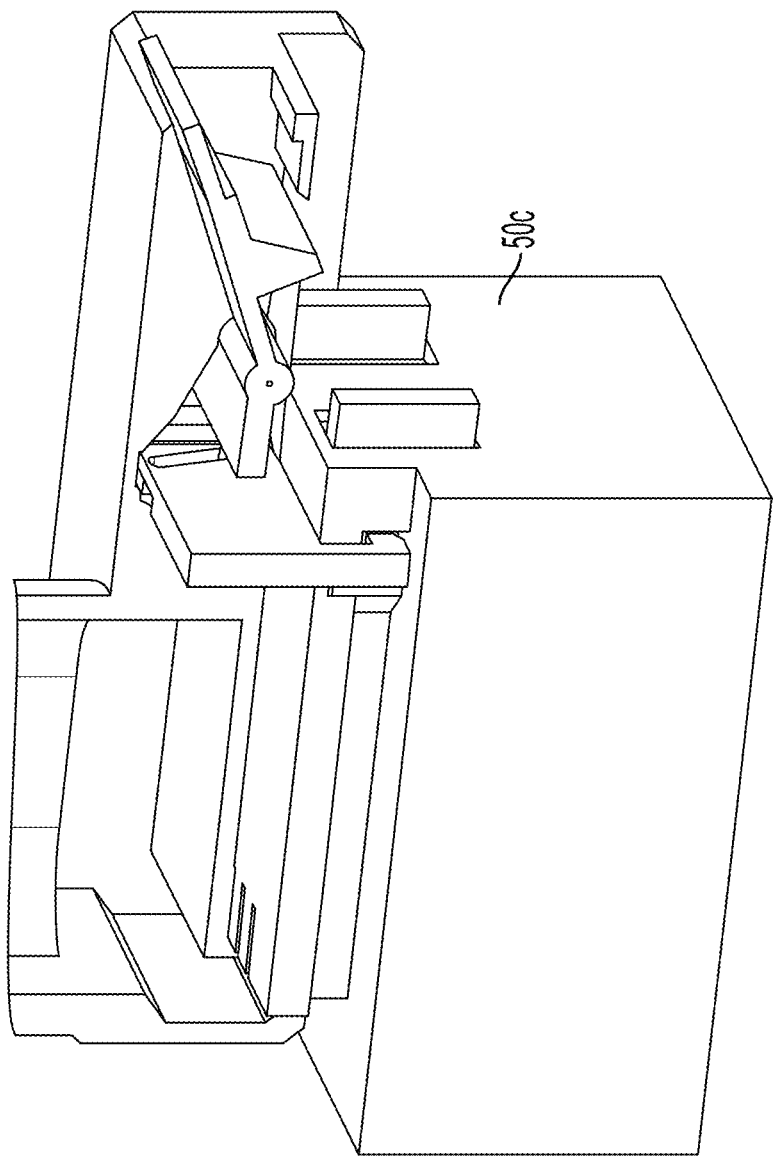
Figure 160:
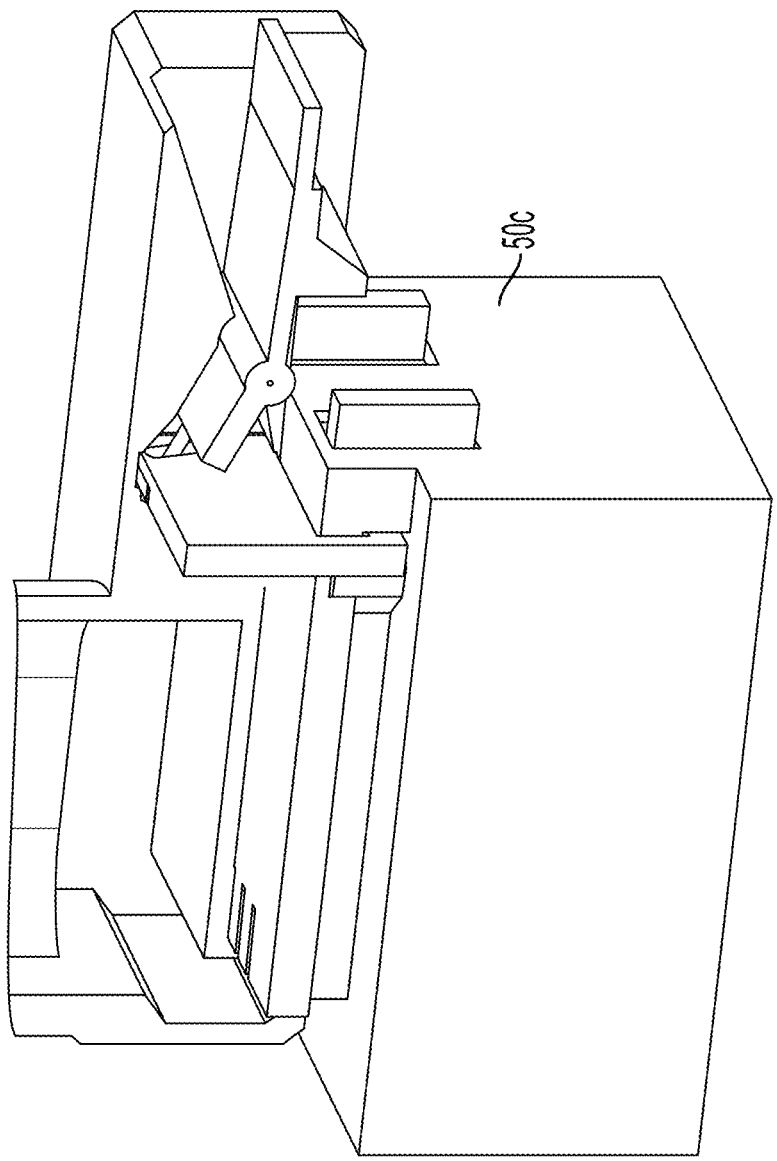
Figure 161:
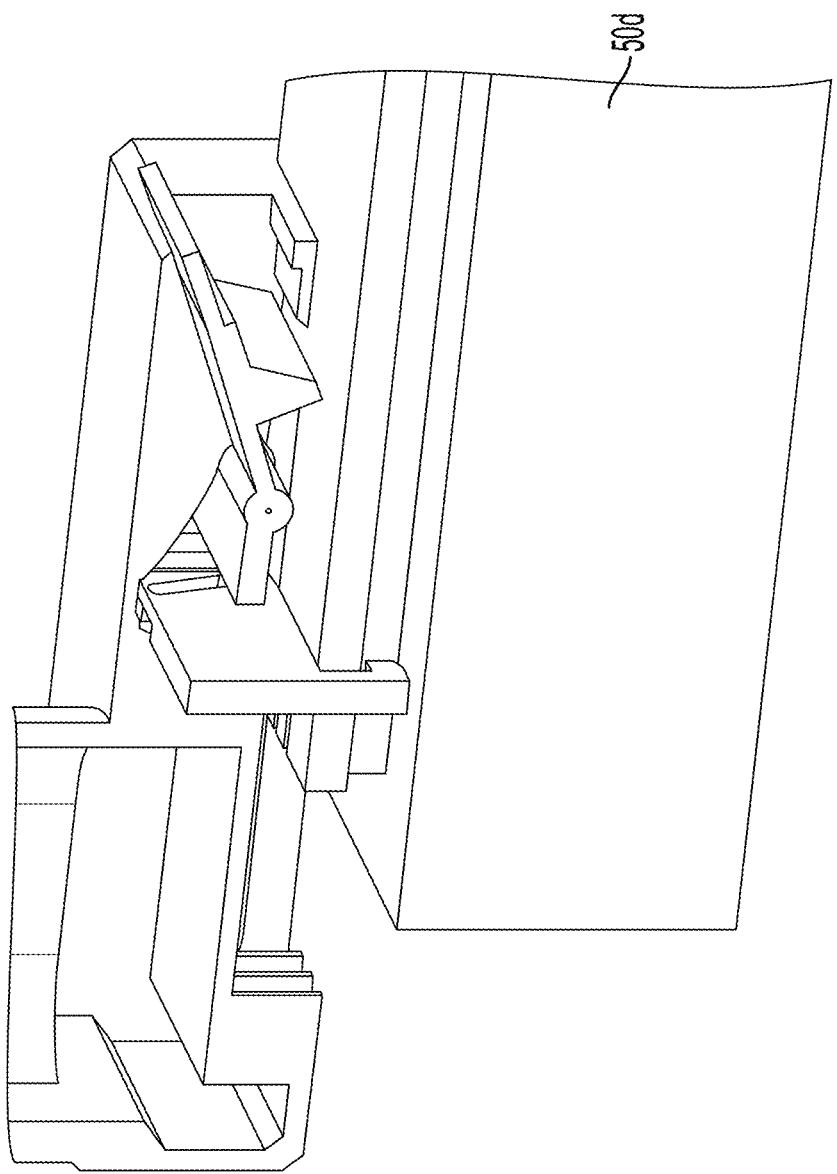
FIGS. 161-163 [[164]] illustrate the example power tool of FIGS. 151-155 and another example embodiment of the fourth battery pack.
Figure 162:
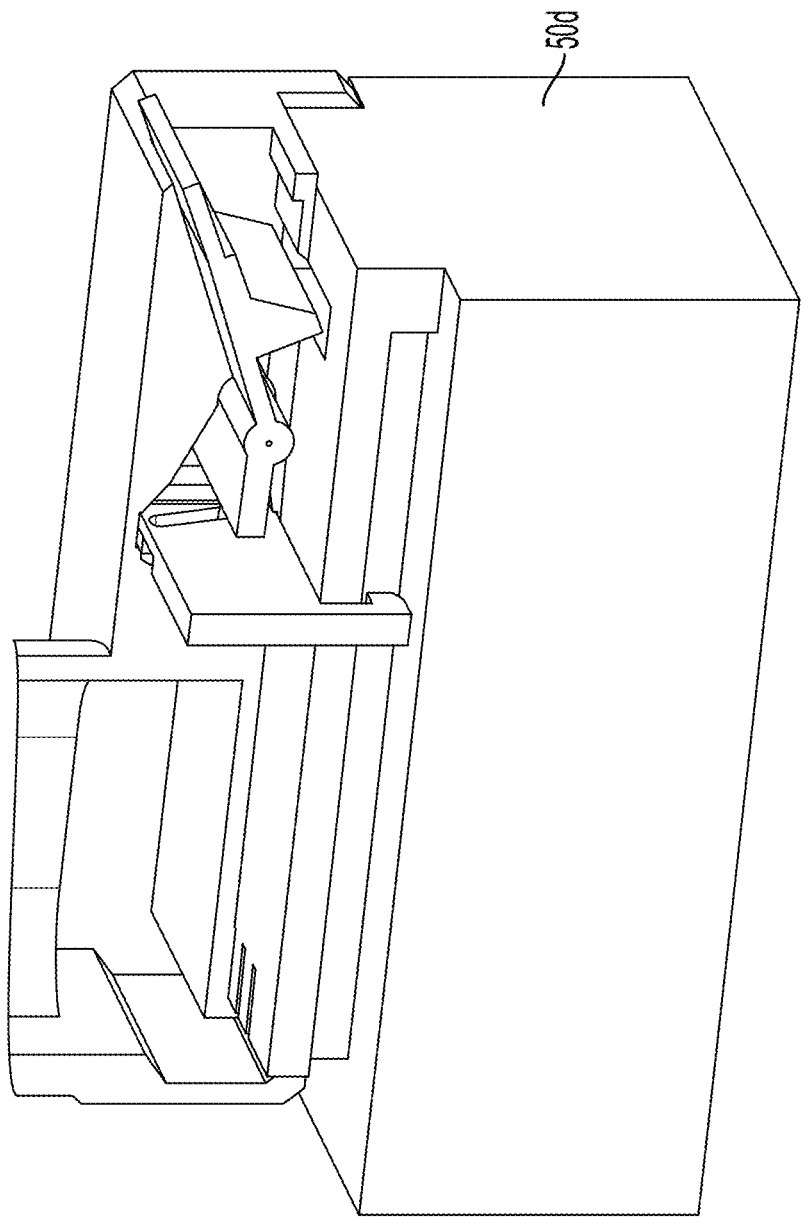
Figure 163:
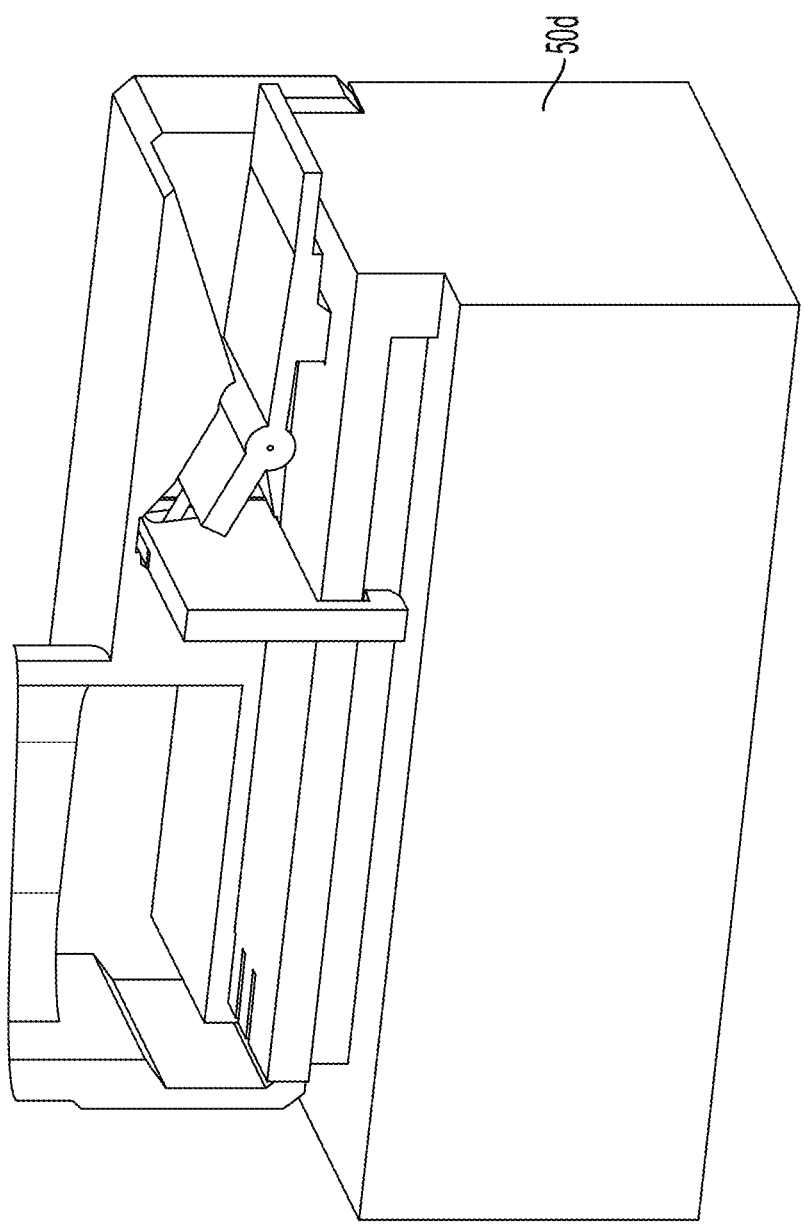

A width of the slot 536 may be greater than a thickness of the first actuator 518. This provides some slack for the first interface element 510 to traverse relative to the sliding actuator 530. Specifically, in an embodiment, in the released position as shown in the figures, the main body 534 engages the first actuator 518 to cause rotation of the first arm 512 away from the battery pack 50c. However, in the latched position, the first actuator 518 is allowed to move downward to engage pocket 74 when receiving the short battery pack 50c as shown in FIG. 125, or to rest on top of the battery pack when receiving the long battery pack 50d as shown in FIG. 129.

FIGS. 131-142 illustrates various views of another example embodiment of a power tool battery receptacle 114 provided with another example embodiment of a multi-latch mechanism 600 having two interfaces actuated by a vertically moveable actuator 630, according to a sixth embodiment of the invention. The figures illustrate the multi-latch mechanism 600 including the vertically moveable actuator 630.

As shown in these figures, the multi-latch mechanism 600 includes a first interface element 610 for engagement with the short battery pack 50c and a second interface element 620 for engagement with the long battery pack 50d.

The first interface element 610 includes a first arm 612 pivotably coupled to a first actuator 618 via a first pivot member 614 supported by the battery receptacle 114. The first interface element 610 further includes a first latch member 616 projecting downwardly from approximately an end of the first arm 612. Similarly, the second interface element 620 includes a second arm 622 pivotably coupled to a second actuator 628 via a second pivot member 624 supported by the battery receptacle 114. The second interface element 620 further includes a second latch member 626 projecting downwardly from approximately an end of the second arm 622.

The vertically moveable actuator 630 includes a main planar body oriented along a plane that is perpendicular to the top surface of the battery pack 50c and extends through an opening 640 of the battery receptacle 114. In an embodiment, the opening 640 is sized to allow vertical movement of the actuator 630. In an embodiment, the actuator 630 includes an elongate opening 632 that extends laterally (i.e., along an axis perpendicular to the receiving axis of the battery pack) and is positioned to receive end of the first actuator 618 of the first interface element 610, and a lower end 634 positioned below the elongate opening 632 that is positioned to be coupled to the second actuator 628 of the second interface element 620. In an embodiment, the actuator 630 is moveable from a default upper position, which is the latched position, to a lower position, which is the released position, when pressed by the user.

In the latched position, the actuator 630 allows the first and second arms 612 and 622 of the first and second interfaces 610 and 620 to engage pockets of respective battery packs 50d or 50c, as shown in the figures. In this position, the elongate opening 632 is positioned to provide leeway for the end of the first actuator 618 to move. Movement of the first interface element 610 is therefore not fully fixed to the actuator 630 in the latched position. This allows the first arm 612 of the first interface element 640 to freely move downwardly into engagement with pocket 74 when receiving short battery pack 50c, or to rest on top of the pack housing when receiving long battery pack 50d.

Further, in the latched position, the lower end 634 of the actuator 630 is positioned to force the second arm 622 of the second interface element 620 to pivot downwardly into engagement with pocket 64 of long battery pack 50*d*.

In the released position, the actuator 630 forces the first and second actuators 618 and 628 of the first and second interfaces 610 and 620 to pivot the first and second arms 612 and 622 away from the battery pack 50*a* or 50*d*, as shown in the figures. In this position, in an embodiment, end of the first actuator 618 within the elongate opening 632 is pressed downwardly, causing the first arm 612 to pivot upwardly away from the battery pack 50*a* or 50*d*. The first interface element 610 is therefore fixed to the actuator 630 in the released position. Similarly, lower end 634 is positioned to force the second arm 622 of the second interface element 620 to pivot away from battery pack 50*a* or 50*d*.

A spring member (not shown) may be provided to bias one or both of first and second arms 612 and 622 away from the battery receptacle 114. The spring member may be provided to bias the actuator 630 in the upward direction.

FIGS. 143-150 illustrate various views of another example embodiment of a power tool battery receptacle 114 provided with another example embodiment of a multi-latch mechanism 700 including a side pivoting first interface element 710 and a top pivoting second interface element 720, according to a seventh embodiment of the invention.

The first interface element 710 is provided for engagement with a battery pack 50*c* including sideways-translating latches 80 oriented on two sides of the block terminal 84 below guide rails 86 and near front ends of grooves 88. The latches 80 are spring-loaded and are coupled to the actuators 82 disposed on the front side of the battery pack 50*c* that, when pressed, cause the translating latches 80 to move inside the housing of the battery pack 50*c* in a direction perpendicular to the receiving axis of the battery pack 50*c*. The battery pack 50*c* is illustrated as a short battery pack in this embodiment by way of example, though it should be understood that battery pack 50*c* may be of any size and may include any latch location.

The first interface element 710 includes a first arm 712 pivotably coupled to a pivot member 714 supported by the battery receptacle 114. In an embodiment, the first arm 712 actuates a pair of legs 716 that extend laterally from an underside of first arm 712 and are pivotable around a pair of side pivot members 715. Two side members 719 extend from the side pivot members 715 opposite the legs 716 around the guide rails 86 and include first latch members 718 formed inwardly and receivable within the grooves 88 of the battery pack 50*c*.

The second interface element 720 includes a second arm 722 extending from an actuator 724 to the pivot member 714 opposite the first arm 712. The second interface element 720 further includes a second latch member 726 projecting downwardly from approximately a middle portion of the second arm 722.

In the latching position, the second arm 722 of the second interface element 720 moves downwardly with the actuator 724. When interacting with the long battery pack 50*d*, this allows the second latch member 726 to move downwardly and catch the pocket 64 to lock in the battery pack 50*d*. Further, the first arm 712 of the first interface element 710 is moved upwardly opposite the direction of movement of the actuator 724. Thus, when interacting with the short battery pack 50*c*, in the upward position of the first arm 712, the side members 719 pivot in the direction of the terminal block 84 and meet the guide rails 86, and the first latch members 718 locate within the grooves 88. The sideways-translating latches 80 of the battery pack 50*c* catch the first latch members 718.

In the releasing position, with upward actuation of the actuator 724, the second arm 722 of the second interface element 720 moves up and the first arm 712 of the first interface element 710 pivots down. The first arm 712 forces pivoting movement of the side members 719 away from the battery pack 50*d* or 50*c*. In this manner, actuation of the actuator 724 thus allows removal of either of the battery pack 50*d* or 50*c* from the battery receptacle 114.

FIGS. 151-163 illustrate another example embodiment of a power tool-battery pack system, in accordance with the present invention. In this example embodiment, the power tool battery receptacle 114 is provided with another example embodiment of a multi-latch mechanism 800 including a side-sliding first interface element 810 and a top pivoting second interface element 820.

The side-sliding first interface element 810 is provided for engagement with the battery pack 50*c* including sideways-translating latches 80, as described above. Similar to the first interface element 710 of the aforementioned example embodiment, the first interface element 810 includes a first arm 812 pivotably coupled to a pivot member 814 supported by the battery receptacle 114. In contrast to first interface element 710 of the aforementioned example embodiment provided with pivoting arms, as described above, the first interface element 810 includes a pair of sliding plates 815 that slide in the sideways direction generally perpendicular to the receiving axis of the battery pack 50*c*. Each plate 815 is oriented generally perpendicular to the top surface of the terminal block 84 of the battery pack 50*e*. Each plate 815 includes a side arm 817 that extends downwardly along the respective guide rail 86 and a first latch member 818 projecting inwardly from the lower end of the side arm 817 and is receivable within the groove 88.

Each plate 815 includes a recessed region 832 having a smaller thickness than the rest of the plate 815. The recessed regions 832 of the two plates 815 overlap one another. Each plate 815 further includes an elongated slot 816 formed at an angle (e.g., 5 to 10 degrees) with respect to the vertical axis. The elongated slots 816 are disposed near inner edges 830 of the plates 815 within the recessed region 832. When the recessed regions 832 overlap one another, the two elongated slots 816 overlap one another at an angle (e.g., 10 to 20 degrees) so as to provide an opening therethrough. A pin 813 extending from the first arm 812 of the first interface element 810 is received through the opening formed by the two elongated slots 816. When the pin 813 is located in an upper position, as shown in FIGS. 17A and 17D, the two plates 815 move laterally towards one another. As the pin 814 moves downwardly towards a lower position, as shown in FIGS. 17B and 17E, the pin 814 slides within the elongated slots 816 and moves the two plates 815 laterally away from one another.

Similar to the second interface element 720 of the aforementioned example embodiment, the second interface element 820 includes a second arm 822 extending from an actuator 824 to the pivot member 814 opposite the first arm 812. The second interface element 820 further includes a second latch member 826 projecting downwardly from approximately a middle portion of the second arm 822.

In the latching position, the second arm 822 of the second interface element 820 moves downwardly with the actuator 824. When interacting with the long battery pack 50*d*, this allows the second latch member 826 to move downwardly and catch the pocket 64 to lock in the battery pack 50*d*.

Further, the pin 813 of the first interface element 810 is moved upwardly, opposite the direction of movement of the actuator 824. Thus, when interacting with the short battery pack 50c, in the upward position of the pin 813, the sliding plates 815 moves laterally in the direction of the terminal block 84 until the side arms 817 meet the guide rails 86, and the first latch members 818 locate within the grooves 88. The sideways-translating latches 80 of the battery pack 50e catch the first latch members 818.

In the releasing position, with upward actuation of the actuator 824, the pin 813 of the second interface element 820 moves up, causing the sliding plates 815 to move laterally away from the terminal block 84 of the battery pack 50e and disengage the first latch members 818 from the guide rails of the battery pack. In this manner, actuation of the actuator 724 thus allows removal of either the battery pack 50d or 50c from the battery receptacle 114.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
   a housing; and
   a battery receptacle formed in the housing or coupled to the housing, the battery receptacle capable of receiving, along a receiving axis, a first battery pack having a first latching location and a second battery pack having a second latching location, the battery receptacle comprising a power terminal block and at least one guide rail for guiding the first battery pack and the second battery pack along the receiving axis so as to make an electrical connection with the power terminal block and a multi-latch mechanism having a first interface element along the receiving axis configured to engage the latching location of the first battery pack when receiving the first battery pack and having a second interface element on the receiving axis configured to engage the latching location of the second battery pack when receiving the second battery pack.

2. The power tool of claim 1, wherein, along the receiving axis, the first latching location is closer to the power terminal block than is the second latching location.

3. The power tool of claim 1, wherein the first interface element includes a first latch hook pivotable around a first pivot member and the second interface element includes a second latch hook pivotable around a second pivot member.

4. The power tool of claim 1, wherein the first battery pack comprises a pocket at the first latching location.

5. The power tool of claim 1, wherein the second battery pack comprises a translating latch at the second latching location moveable via an actuator in a direction perpendicular to a receiving axis of the second battery pack.

* * * * *